United States Patent [19]

Elliott et al.

[11] Patent Number: 4,866,257
[45] Date of Patent: Sep. 12, 1989

[54] BAR CODE SCANNER AND METHOD

[75] Inventors: Randy D. Elliott; Robert J. Actis, both of Eugene, Oreg.

[73] Assignee: Spectra-Physics, Inc., San Jose, Calif.

[21] Appl. No.: 122,743

[22] Filed: Nov. 19, 1987

[51] Int. Cl.⁴ ............................................. G06K 7/00
[52] U.S. Cl. ..................................... 235/436; 235/462; 235/375
[58] Field of Search ............... 235/436, 375, 462, 463, 235/472; 364/900

[56] References Cited

U.S. PATENT DOCUMENTS 3,735,096 5/1973 Knockeart et al. ............. 235/463 X
4,563,739 1/1986 Gerpheide et al. ................. 235/462

Primary Examiner—David L. Trafton
Attorney, Agent, or Firm—Killworth, Gottman, Hagan & Schaeff

[57] ABSTRACT

A scanner for scanning bar code labels and for providing data related thereto to a host computer includes a scanning apparatus for optically scanning bar code labels and for providing an electrical signal in response thereto, and a decoding circuit, responsive to the scanning apparatus for translating the electrical signal into a digital signal. A microprocessor, responsive to the decoding circuit, controls operation of the scanner and translates the digital signal into data to be provided to the associated host computer under control of control characters. The scanner further includes a non-volatile random access control memory in which control characters are stored, and an interface, connected to the host computer and to the microprocessor, for transferring data from the microprocessor to the host computer and for transferring control characters from the host computer to non-volatile random access control memory via the microprocessor.

15 Claims, 4 Drawing Sheets

BAR CODE SCANNER AND METHOD

BACKGROUND OF THE INVENTION

The present invention relates to computer controlled bar code scanners and a method of programming the scanner and, more particularly, to such a scanner and method in which control data is supplied to a non-volatile memory in the scanner. The control data comprises character sets, which if read on two labels, indicate that the labels are affixed to the same product and further indicate the ordering of the labels. Any of a plurality of such character sets on the labels provide such an indication of a two label condition.

Laser scanners are known in which a beam of laser light is swept in a scan pattern to find and read a bar code printed on a surface which is presented to the scanner, such as for example a package label. Bar code labels are used on a broad range of retail packages for check-out and inventory purposes. A scanner, located for example at the check-out station in a retail establishment is used by a clerk automatically to enter product identification data into an associated computer system.

Typically such a scanner includes a laser source, such as a gas discharge laser, which produces a low power laser beam. The beam then passes through appropriate optical lenses and is swept across the package surface by a motor-driven, rotating mirror assembly. A portion of the light reflected from the package surface returns through the optical lenses to a detector which provides an electrical signal in dependence upon the level of the reflected light. A signal processing system in the scanner then analyses the electrical signal and translates the scanned characters into data which is transmitted to the host computer.

The computer then determines the total price of the products being purchased, as well as storing the identity of the purchased products for inventory and accounting purposes. The host computer may be located in the cash register associated with the scanner. Alternatively, a single host computer may service a number of scanners at the retail establishment.

A number of different bar codes have come into use. In some of these, it is possible for two labels to be applied to the same product with all of the information defined by the labels relating to the product. It is important for the scanner system to be able to distinguish those pairs of scanned labels which are affixed to the same product and, also, which of the labels in each such pair is the "first" label and which of the labels is the "second" label. In EAN 13 code, for example, the first two characters on each label are predetermined characters if the label is the first or second of a label pair affixed to the same product.

Each scanner typically includes a microprocessor which performs a number of functions, including recognizing the electrical signals produced when a label is scanned. Previously the valid character set for indicating "first" and "second" labels where the labels are affixed to the same product have been stored in the random access memory of the microprocessor, or have been manually set by means of mechanical switches.

Both approaches are disadvantageous. Either the character set cannot be easily changed, or the character set is not maintained in memory when the scanner is turned off and must be reloaded upon resumption of operation. A need exists, therefore, for a scanner in which the character set can be easily altered and in which the scanner does not require reloading of the character set into memory each time power is applied to the scanner.

SUMMARY OF THE INVENTION

This need is met by a scanner for scanning bar code labels and for providing data related thereto to a host computer which includes a scanning means for optically scanning bar code labels and providing an electrical signal in response thereto, and a decoding means, responsive to the scanning means for translating the electrical signal into a digital signal. A microprocessor means, responsive to the decoding means, controls operation of the scanner and translates the digital signal into data to be provided to the associated host computer under control of control characters. The scanner further includes a non-volatile random access control memory in which control characters are stored, and an interface means, connected to the host computer and to the microprocessor means, for transferring data from the microprocessor means to the host computer and for transferring control characters from the host computer to non-volatile random access control memory via the microprocessor means.

The non-volatile random access control memory may comprise an electrically erasable programmable read only memory. The interface means may comprise an optically isolated interface. The non-volatile random access control memory may comprise an EEPROM memory device. The control characters are character sets which when read by the scanner indicate that two bar code labels are associated with the same item.

A scanner for scanning bar code labels on products presented to the scanner and for providing the data from the bar code labels to a host computer, includes scanning means for optically scanning bar code labels and providing an electrical signal in response thereto; decoding means, responsive to the scanning means for translating the electrical signal into a digital signal; a non-volatile random access control memory in which a plurality of sets of control characters are stored. The sets of control characters define characters which, if detected on a pair of successively scanned labels, indicate that the labels are affixed to the same product and further indicate which is the first and which is the second of the label pair. The scanner further includes a microprocessor means responsive to the decoding means, for controlling operation of the scanner and for translating the digital signal into data to be provided to the associated host computer under control of control characters; and interface means, connected to the host computer and to the microprocessor means, for transferring data from the microprocessor means to the host computer and for transferring control character sets from the host computer to non-volatile random access control memory via the microprocessor means.

The non-volatile random access control memory may comprise an electrically erasable programmable read only memory. The interface means may comprise an optically isolated interface. The non-volatile random access control memory may comprise an EEPROM memory device. The non-volatile random access control memory may comprise an NOVRAM memory device.

A method of programming a bar code scanner of the type which optically scans bar code labels, the scanner including a non-volatile control memory in which a plurality of sets of control characters are stored, the sets of control characters defining characters which, if detected on a pair of successively scanned labels, indicate that the labels are affixed to the same product and further indicate which is the first and which is the second of the label pair, comprises the steps of:
a. connecting a data source to the scanner;
b. transmitting a plurality of sets of control characters to the scanner from the data source; and
c. storing the plurality of sets of control characters in the non-volatile control memory.

The method may further comprise the step of interrogating the scanner non-volatile control memory and comparing the sets of control characters stored therein with the previously transmitted control characters.

Accordingly, it is an object of the present invention to provide a scanner having non-volatile memory for storage of control characters which, if detected on a pair of successively scanned labels, indicate that the labels are affixed to the same product; to provide such a scanner in which the non-volatile storage includes a programmable device; and to provide a method of storing the control characters in such a scanner in which the characters are transmitted to the scanner by a data source.

Other objects and advantages of the invention will be apparent from the following description, the accompanying drawings and the appended claims.

DETAILED DESCRIPTION OF THE PREFERRED EMBODIMENTS

Figure 1:
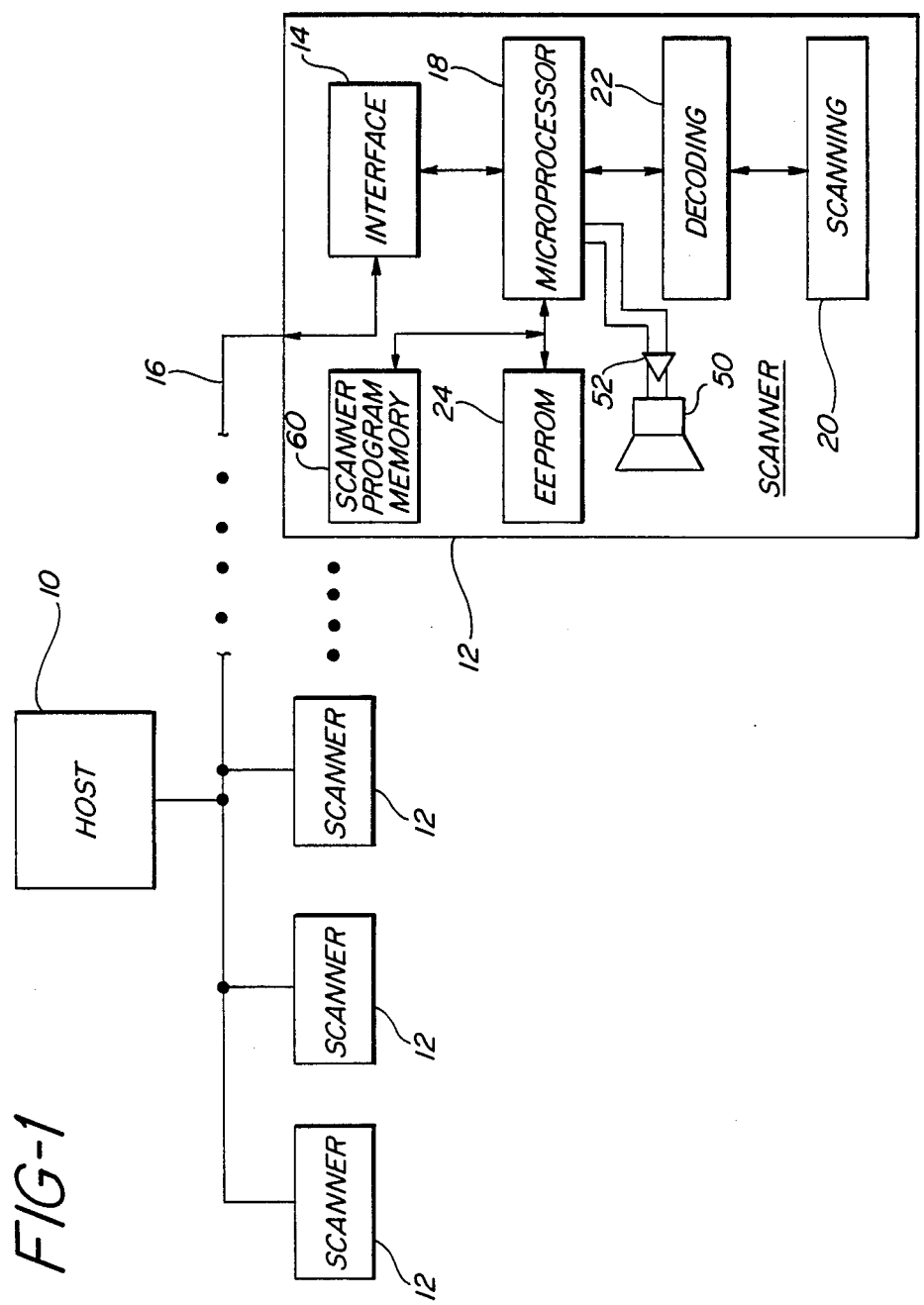
FIG. 1 is a schematic diagram showing a bar code scanning system constructed according to the present invention.

Reference is made to FIG. 1 of the drawings which illustrates a scanner system constructed according to the present invention including a plurality of scanners 12 for scanning bar code labels and for providing data related thereto to a host computer 10. Since each of the scanners 12 are identical, the electrical system of only one of the scanners is shown in somewhat greater detail.

Figure 4:
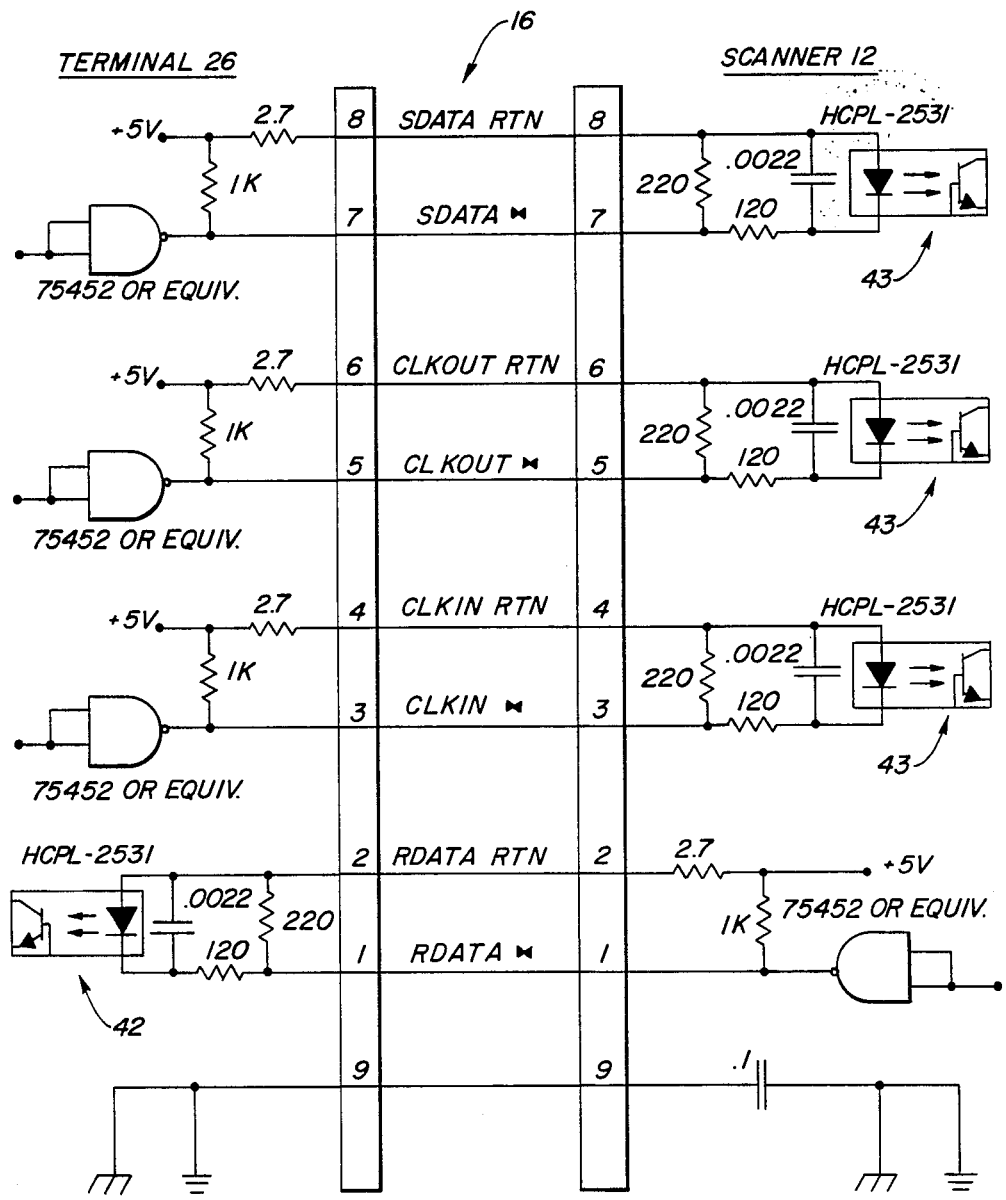
FIG. 4 is an electrical schematic diagram illustrating the electrical connections between the host computer and a scanner.

The scanner 12 includes interface circuitry 14 which communicates with the host computer over line 16. Line 16, although illustrated by a single line in FIG. 1, is actually a plurality of lines which provide for two way communication between host computer 10 and each of scanners 12, as illustrated in FIG. 4 and discussed below. Transmission of data is accomplished in a serial format.

A microprocessor means 18 is responsive to scanning circuitry 20 and decoding circuitry 22 for controlling operation of the scanner, identifying the characters on the scanned labels and transmitting the data produced by the scanning operation to the host computer 10 via interface means 14 over the line 16. Scanning means 20 optically scans bar code labels and provides an electrical signal in response thereto. Decoding means 22 is responsive to the scanning means 20 for translating the electrical signal into a digital signal. An example of such circuitry is shown in U.S. patent application Ser. No. 063,538, filed June 18, 1987, entitled SIGNAL TRANSITION DETECTION METHOD AND SYSTEM.

A control memory comprising electrically erasable programmable read only memory (EEPROM) 24 communicates with the microprocessor 18 and stores a plurality of sets of control characters in a non-volatile manner. Other types of non-volatile random access memory devices may be utilized in place of the EEPROM if desired, such as for example a NOVRAM. The scanner microprocessor 18 interprets the reading of labels bearing these control characters in predetermined positions on the labels as indicating that the labels are affixed to the same product, and that one of the labels is the "first" label of the pair and the other label is the "second" label of the pair.

In EAN 13 code the first two characters on each label provide an indication as to whether the label is one of two applied to a product and, if so, whether the label is the first or second of the pair of labels. A "21" appearing as the first two characters on a label, for example, may indicate that the label is the first of a pair affixed to a product. Similarly, a "22" appearing as the first two characters on a label may indicate that the label is the second of a pair affixed to the product.

The use of EEPROM 24 to store the control characters permits the scanner 12 to be programmed to recognize any desired control characters, and multiple sets of such characters as indicating a pair of labels on a single product. Further, the EEPROM 24 maintains the stored control characters in memory even when power to the scanner is terminated, but allows the stored control character sets to be easily verified or altered by the host computer 10.

In a large retail establishment, a single host computer 10 may service a great many scanners. When the scanners are installed or serviced, it may not be convenient to transmit the control characters to the scanner from the host computer, since this would interrupt the interaction of the host computer 10 with the balance of the scanners. Additionally the host computer 10 may be physically located at a site remote from the scanner being service or installed, making the use of the host computer 10 somewhat inconvenient for purposes of inputting control characters at times when the technician is performing tests at the scanner location.

Figure 2:
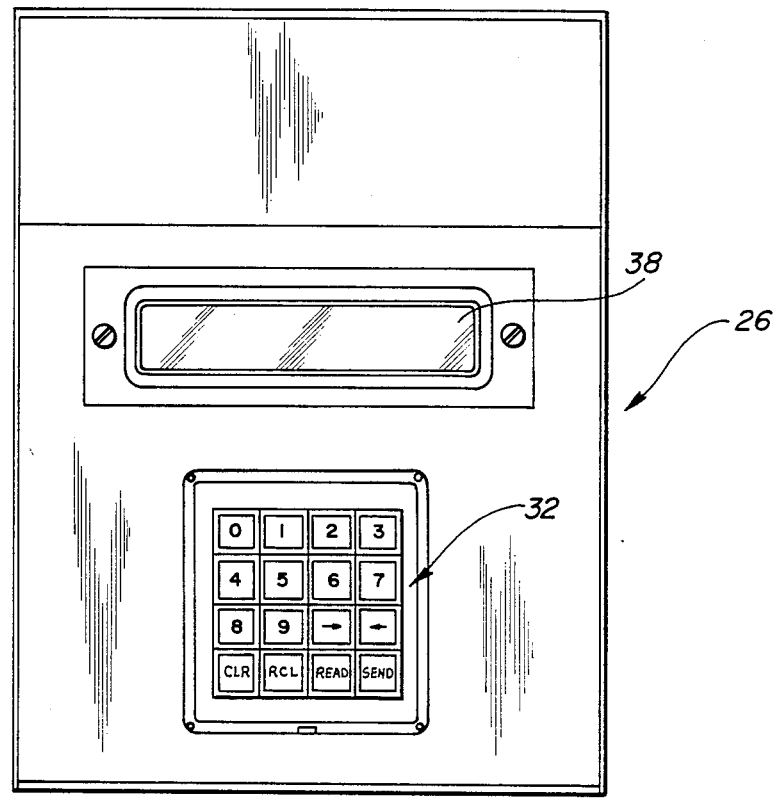
FIG. 2 is a plan view of the terminal which may be utilized as a source of control data for programming the scanner.
Figure 3:
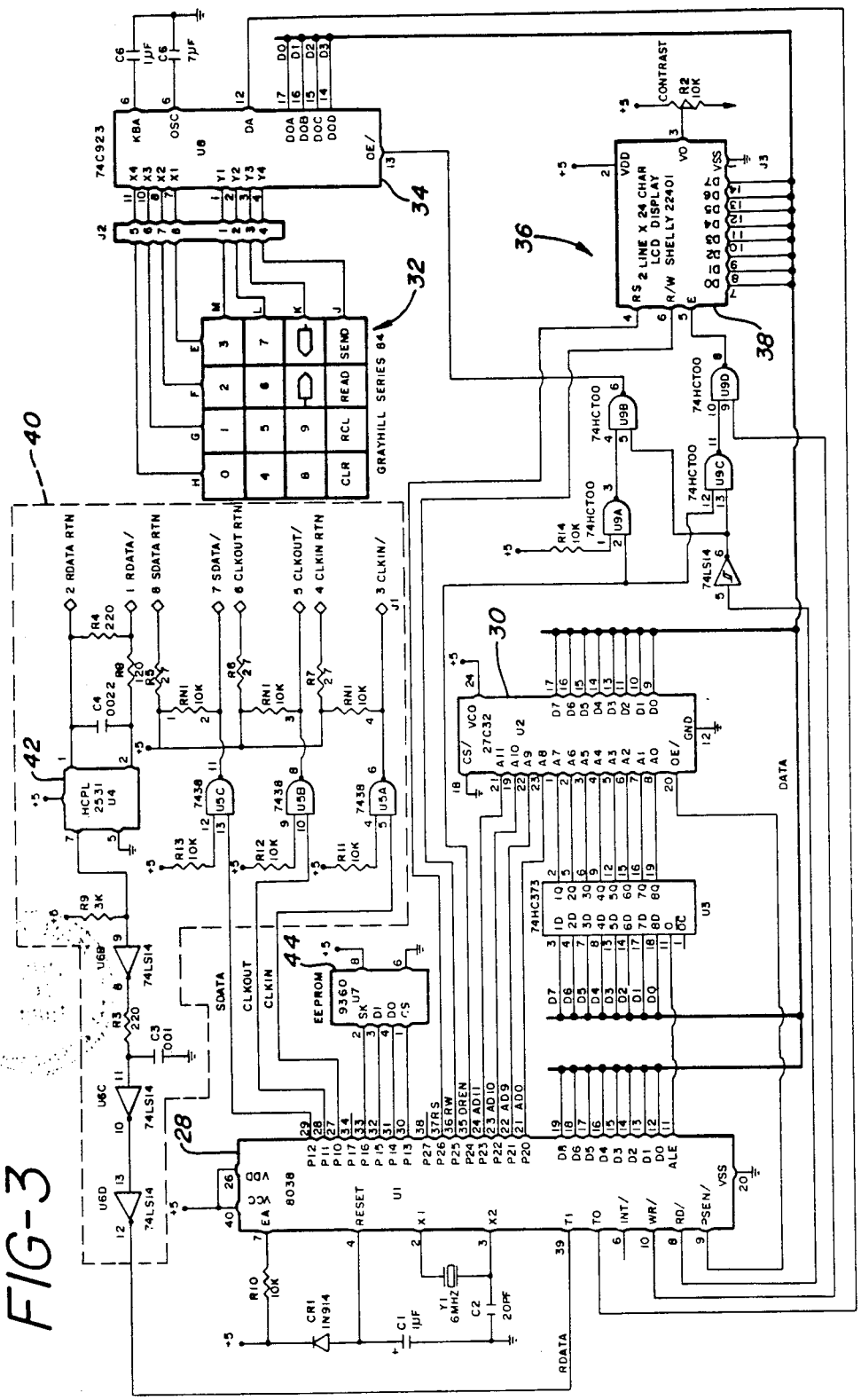
FIG. 3 is an electrical schematic diagram of the terminal of FIG. 2 which is useful in explaining the method of reprogramming the scanner.

FIGS. 2 and 3 illustrate a portable terminal 26 portable terminal which can be used as a data source by service personnel in installing or servicing a scanner of the type to which the present invention is directed. The terminal is sufficiently compact and light enough to be easily moved by a technician as required. As described more fully below, the terminal 26 communicates in such a manner as to simulate communication with a host computer. The terminal 26 includes a microprocessor chip 28 and EPROM memory 30, for data manipulation and control of the operation of the terminal 26. The microprocessor chip 28 preferably comprises an Intel 8039 chip, computer software which controls operation of the microprocessor is stored in memory 30 comprising an external 2732 EPROM.

The terminal further includes a keypad 32 and a decoder 34 operatively connected therewith for permitting an operator to supply data and command instructions to the microprocessor 28. The keypad 32 comprises an array of labeled keyboard switches, the individual functions of which are described below.

A display 36, cooperating with the keyboard and the microprocessor, displays both data and command instructions. The display 36 preferably comprises a liquid crystal display 38 which is capable of displaying two lines of 24 alpha-numeric characters.

The terminal 26 includes an interface 40 for providing an interface between the microprocessor 28 and the scanner 12. The interface 40 comprises an optically isolated interface including opto-isolator 42 in the data return path for data received by the terminal 26 from the scanner 12. As may be seen in FIG. 4, the interface 14 of the scanner 12 preferably includes opto-isolator circuits 43 for isolating the transmissions from the terminal 26 to the scanner 12. The terminals labeled RDATA RTN, RDATA/, SDATA RTN, SDATA/, CLKOUT RTN, CLKOUT/, CLKIN RTN, and CLKIN/, all are connected to cable 16. Data to the scanner 12 is transmitted over terminals SDATA/ and SDATA RTN under control of clock signals provided at terminals CLKOUT/ and CLKOUT RTN. Similarly, data from the scanner 12 is transmitted over terminals RDATA/ and RDATA RTN under control of clock signals provided at terminals CLKIN/ and CLKIN RTN.

Finally, the terminal 26 includes a non-volatile data memory 44 for storing data received from the keyboard 32 for subsequent supply to the scanner non-volatile control memory 24 via the interface means 14. The non-volatile data memory 44 comprises an electrically erasable programmable read only memory EEPROM). Since the terminal may be configured to be powered by the A.C. power typically available at the scanner location, the use of an EEPROM for memory allows the terminal to be unplugged by a technician as he goes between scanners without loss of any previously stored control data.

When the terminal 26 is turned on, the terminal displays the message "READY . . . " on the lower line of the display 38. The control character sets are then entered by pressing the numeric keys, labeled "0" through "9". The first numeric key switch actuated places the terminal in the programming mode, and displays "PROGRAM MODE" on the lower line of the display 36. Assume that the following four control data character sets are to be entered:

| Set | First Label | Second Label |
|---|---|---|
| 1 | 11 | 12 |
| 2 | 21 | 22 |
| 3 | 31 | 32 |
| 4 | 41 | 42 |

In this instance the entry sequence would be "11 12 21 22 31 32 41 42". It is not necessary to insert spaces between successively enter control characters.

The BACKSPACE key, indicated by the arrow pointing to the left, may be used to edit one or several incorrect entries. The CLEAR key, indicated by CLR, clears the display data and status lines of the display 36 with one keystroke. The CLEAR key does not, however, affect the non-volatile data memory 44.

After the character sets are entered through keyboard 32 and checked visually for accuracy, the SEND key is pressed to transmit the displayed data to the scanner 12 and store the control data character sets in the EEPROM memory 44. The terminal then performs a verification process automatically, querying the scanner 14 as to its stored control data character sets and comparing the sets stored in memory 44 therewith. The character sets stored in memory may be reviewed by a technician if desired by pressing the RECALL key designated by RCL.

If it is desired to perform repetitive programming of a series of scanners 12 with the same control data character sets, the previously entered character sets may be recalled using the RCL key when the terminal 26 is connected to each scanner. Next, the SEND key is pressed. This process may be repeated as many times as desired.

The control data character sets stored in the memory 24 of a scanner 12 may be read using the terminal 26. This is accomplished by actuation of the READ key. The display 36 will display the character sets and the message "SCANNER LABEL SETTINGS".

If desired, a speaker 50 and audio amplifier 52 may be provided in the scanner 12. Speaker 50 and amplifier 52 provide a means of producing an audible signal to the scanner operator, for example a "beep" on completion of a scanning operation. The frequency and volume of the audible signal may be defined by control characters supplied by the host 10 via interface 14 and stored in memory 24. Also defined by control characters may be the baud rate or rate of transfer of data and control characters between the host 10 and the interface 14.

A listing of exemplary software which may be stored in memory 60 for controlling the scanner of the present invention is as follows.

```
LOC  OBJ        LINE      SOURCE STATEMENT                                       SPR 010 P2
                  1  ;****************************************************************
                  2  ; FILE: TECSL2.SRC  07-20-87 17:30  RANDY ELLIOTT
                  3  ;
                  4  ; TEC 750SL TWO LABEL READ SCANNER PROGRAM (JAN13-JAN13 OR JAN13-JAN8).
                  5  ;
                  6  ; S-P PAR: NUMBER  R96-0130 (SECOND 4K OF EPROM OF TOTAL PROGRAM)
                  7  ; EPROM PART NUMBER 0438-0800
                  8  ;
                  9  ;****************************************************************
                 10  $      INCLUDE(:F3:HISTRY.SRC)
   *             11  ;****************************************************************
   *             12  ; FILE: HISTRY.SRC  02-18-87 08:30  BOB ACTIS
   *             13  ;
   *             14  ; IVRD53 - 750F IG DEMO, SP-OC, VERSION D3 W/ 2ND CHECK      MAY 1983
   *             15  ;
   *             16  ; FVRD53 - 750F FT DEMO, SP-OC, VERSION D3 W/ 2ND CHECK      OCT 1983
   *             17  ;
   *             18  ; FTLR53 - 750F, TWO LABEL READ, JAN13-JAN13 OR JAN13-JAN-8  MAR 1986
   *             19  ;
   *             20  ; G2L053 - 750SL, TWO LABEL READ, AS ABOVE                   FEB 1987
   *             21  ;
   *             22  ; TEC093 - 750SL TEC VERSION, TWO LABEL READ WITH EEPROM     APR 1987
   *             23  ;
   *             24  ; TEC193 - 750SL TEC VERSION, VERSION D WITH EEPROM          APR 1987
   *             25  ;****************************************************************
```

```
              26 $       INCLUDE(:F2:FTDEFS.SRC)
           =  27 ;***********************************************************
           =  28 ; FILE:  FTDEFS.SRC  10-27-83 13:50  BOB ACTIS
           =  29 ;        MODIFIED    03-27-86        DREW TAUSSIG
           =  30 ;        MODIFIED    08-21-86        ADD 2ND LABEL 2 FLAG (28 AND 29)
           =  31 ;        MODIFIED    11-20-86 14:15  BOB ACTIS, ADDED 3RD LABEL 2, 22
           =  32 ;        MODIFIED    02-18-87 08:35  CHANGED JUMPER SENSE FOR 750SL
           =  33 ;        MODIFIED    03-19-87 09:00  750SL TEC CHANGES BY RANDY ELLIOTT
           =  34 ;        MODIFIED    07-17-87 10:17  DELETE EAN13-EAN8 LABEL READ AND
           =  35 ;                                    INCORPORATE EEPROM PROGRAMING FROM
           =  36 ;                                    ENCODED UPC CODES READ FROM SCANNER.
           =  37 ;***********************************************************
           =  38 ;
           =  39 ;   *** SYSTEM DEFINITION ***
           =  40 ;
           =  41 ;   PORT 1 DEFINITION:
           =  42 ;
0001       =  43 ETEST    EQU     00000001B       ;P10-O-ENABLE TEST MODE
0002       =  44 ETMARK   EQU     00000010B       ;P11-O-TEST MARK
0002       =  45 EMTREB   EQU     00000010B       ;P11-O-ENABLE MOTOR
0004       =  46 EPRMDI   EQU     00000100B       ;P12-O-EEPROM_IN
0008       -= 47 EPRMSK   EQU     00001000B       ;P13-O-EEPROM_SK
0010       =  48 ELASDB   EQU     00010000B       ;P14-O-DISABLE LASER
0020       =  49 EGDLT    EQU     00100000B       ;P15-O-ENABLE GOOD LIGHT
0040       =  50 EBDLT    EQU     01000000B       ;P16-O-ENABLE BAD LIGHT
0080       =  51 ETONE    EQU     10000000B       ;P17-O-TONE BIT (AC COUPLED)
           =  52 ;
           =  53 ;   PORT 2 DEFINITION:
           =  54 ;
0010       =  55 ESENT    EQU     00010000B       ;P24-I-SENT LINE OF LSI3/VLSI
0020       =  56 EUP2SP   EQU     00100000B       ;P25-I-MOTOR UP2SPD SIGNAL
0040       =  57 EVLSIR   EQU     01000000B       ;P26-I-VLSI POWER RESET*
0080       =  58 EPRMCS   EQU     10000000B       ;P27-O-EEPROM_CS
           =  59 ;
           =  60 ;***********************************************************
           =  61 ;   FRAME CONTROL ARRAY:
           =  62 ;
           =  63 ;       EXTERNAL MEMORY ADDRESSES
           =  64 ;
0000       =  65 EPARRD   EQU     00H             ;R - PARITY BYTE
0001       =  66 ESRRD    EQU     01H             ;R - SEGMENT REGISTER
0001       =  67 EFRRST   EQU     01H             ;W - FRAME RESET (CLEARS SEGMENT)
0002       =  68 EOCIA    EQU     02H             ;R/W - OCIA REGISTERS
0003       =  69 EFCRST   EQU     03H             ;W - RESET FCA
0004       =  70 EPRDEC   EQU     04H             ;R - DECODED PARITY BYTE
0008       *= 71 SWLATC   EQU     08H             ;R - DIP SWITCHES
           =  72 ;DIPSWITCH DEFINITION
           =  73 ;       DIPSW1-DIPSW2           VOLUME CONTROL
           =  74 ;       DIPSW3                  INTERNAL/EXTERNAL SPEAKER
           =  75 ;       DIPSW4           B0     TONE CONTROL
           =  76 ;       DIPSW5           B1     TONE CONTROL
           =  77 ;       DIPSW6           B6     SPARE
           =  78 ;       DIPSW7           B2     TWO SCAN
           =  79 ;       DIPSW8           B3     TWO SCAN
           =  80 ;       DIPSW9           B5     EEPROM PROGRAM ENABLE VIA UPC CODE
           =  81 ;       DIPSW10          B4     VERSION D/2-SCAN*
           =  82 ;       JUMPER           B7     SPARE
           =  83 ;
           =  84 ;       PARITY DECODE BYTE
           =  85 ;
000F       =  86 EDECOD   EQU     00001111B       ;0-9 IS DECODED DIGIT
000A       =  87 EDEC8L   EQU     00001010B       ;A IS 8L
000B       =  88 EDEC8R   EQU     00001011B       ;B IS 8R
000C       =  89 EDECAL   EQU     00001100B       ;C IS AL
000D       =  90 EDECAR   EQU     00001101B       ;D IS AR
000E       =  91 EDECBE   EQU     00001110B       ;E IS NOT USED
000F       =  92 EDECBF   EQU     00001111B       ;F IS "NO DECODE" (ERROR)
0010       =  93 EDECE    EQU     00010000B       ;E-TAG
0020       =  94 EDECD    EQU     00100000B       ;D-TAG
0040       =  95 EDECBK   EQU     01000000B       ;BACKWARD CAPTURE
0080       =  96 EDECB7   EQU     10000000B       ;NOT USED. ALWAYS=1.
           =  97 ;
           =  98 ;       SHIFT REGISTER READ
           =  99 ;
000F       = 100 ESRCHR   EQU     00001111B       ;BCD CHARACTER
0010       = 101 ESR4CH   EQU     00010000B       ;4-CHAR CAPTURE
0020       = 102 ESRF13   EQU     00100000B       ;FRAME 1 TO 3 CAPTURE
0040       *= 103 ESRPER  EQU     01000000B       ;PERIODICAL CAPTURE
0080       = 104 ESRSDT   EQU     10000000B       ;SDATA BYTE AVAILABLE
           = 105 ;***********************************************************
           = 106 ; FLAG REGISTERS:
           = 107 ;
           = 108 ;       RB0-R4  SCAN FLAGS
           = 109 ;
0001       = 110 ESCNG    EQU     00000001B       ;SCANNING (FLAG CKFCA TO GET SEGMENTS)
0002       = 111 T2LNOK   EQU     00000010B       ;NOT USED
0004       = 112 EAMBMS   EQU     00000100B       ;ENABLE AMB LABEL MESSAGE
0008       *= 113 ESBFUL  EQU     00001000B       ;SEND BUFFER HAS DATA TO SEND
0010       = 114 ER4B4    EQU     00010000B       ;NOT USED
0020       = 115 EBFREQ   EQU     00100000B       ;BUFMAN REQUEST FLAG
0040       = 116 ER4B6    EQU     01000000B       ;NOT USED
0080       = 117 ER4B7    EQU     10000000B       ;ERROR FLAG FOR TWO LABEL READ
```

```
                        = 118 ;
                        = 119 ;   R80-R6  VERSION POINTER/FLAG
                        = 120 ;
0000                    = 121 EVER00   EQU      00H              ;NO VALID VERSIONS
0001                    = 122 EVERA    EQU      01H              ;UPC-A
0002                    = 123 EVER13   EQU      02H              ;EAN-13
0003                    = 124 EVERE    EQU      03H              ;UPC-E
0004                    = 125 EVER8    EQU      04H              ;EAN-8
0005                    = 126 EVTL8    EQU      05H              ;TWO LABEL READ (JAN13-JAN8)
0006                    = 127 EVTL13   EQU      06H              ;TWO LABEL READ (JAN13-JAN13)
0007                    = 128 EVERAM   EQU      07H              ;AMBIGUOUS 2-LABEL READ
                        = 129 ;
                        = 130 ;
0010                    = 131 ER684    EQU      00010000B        ;FLAG COUNTER (B0-TWO LABEL READ)
0020                    = 132 ER685    EQU      00100000B        ;FLAG COUNTER (B1-TWO LABEL READ)
0040                    = 133 ER686    EQU      01000000B        ;FLAG COUNTER (B2-TWO LABEL READ)
0080                    = 134 ER687    EQU      10000000B        ;NOT USED
                        = 135 ;
                        = 136 ;EEPROM OPCODES
0080                    = 137 OPREAD   EQU      80H              ;READ REGISTER
0030                    = 138 EWEN     EQU      30H              ;ERASE/WRITE ENABLE
0020                    = 139 ERAL     EQU      20H              ;ERASE ALL
0040                    = 140 OWRITE   EQU      40H              ;WRITE REGISTER
0000                    = 141 EWDS     EQU      00H              ;ERASE/WRITE DISABLE
00C0                    = 142 ERASE    EQU      0C0H             ;ERASE REGISTER
                        = 143 ;****************************************************************
                        = 144 ;   MISC. CONSTANTS:
                        = 145 ;
0032                    = 146 E1000M   EQU      50               ;1.00 SEC (100 CENTI-SECONDS)
                        = 147 ;
0008                    = 148 EGDTON   EQU      8                ;GOOD TONE ON TIME
0028                    = 149 EBDTON   EQU      40               ;BAD TONE ON TIME
                        = 150 ;
0014                    = 151 ETONCT   EQU      20               ;TONE COUNT (CYCLES/10MS)
FFFA                    = 152 ETONFQ   EQU      -6               ;TONE FREQUENCY CONSTANT (500US)
                        = 153 ;
0045                    = 154 ESEN     EQU      045H             ;SCAN ENABLE CHAR (LAST CHAR E)
00C4                    = 155 ESDIS    EQU      0C4H             ;SCAN DISABLE CHAR (LAST CHAR D)
00C1                    = 156 EAMESE   EQU      0C1H             ;ENABLE AMB LABEL MESS (LAST CHAR A)
00C2                    = 157 EAMESD   EQU      0C2H             ;DISABLE AMB LABEL MESS (LAST CHAR B)
0089                    = 158 STRAM1   EQU      089H             ;WRITE 'TWO LABEL' SETTINGS TO RAM ('I')
00C7                    = 159 WRPRM1   EQU      0C7H             ;WRITE 'TWO LABEL' SETTINGS TO EEPROM ('G')
00C8                    = 160 TRPRM1   EQU      0C8H             ;READ EEPROM 'TWO LABEL' SETTINGS ('H')
004A                    = 161 TRPRM2   EQU      04AH             ;READ 'TWO LABEL' SETTINGS FROM RAM ('J')
00CB                    = 162 SWSET1   EQU      0CBH             ;READ CURRENT SCANNER CONFIGURATION FROM RAM ('K')
008C                    = 163 OVRST1   EQU      08CH             ;OVERIDE SCANNER SETTINGS ('L')
                        = 164 ;
0040                    = 165 EBIT6    EQU      01000000B        ;LAST CHAR BIT FOR HOST DATA
000A                    = 166 EMISCN   EQU      00AH             ;MISSCAN CHARACTER (LAST CHAR Z)
00BB                    = 167 EMSNBY   EQU      0BBH             ;MISSCAN BYTE FOR SEND BUFFER
00CC                    = 168 ETRMBY   EQU      0CCH             ;TERMINATION BYTE FOR SEND BUFFER
0058                    = 169 EAMBIG   EQU      058H             ;AMBIGUOUS 2 LABEL READ (LAST CHAR X)
000D                    = 170 EAMBBY   EQU      00DH             ;AMBIGUOUS READ BYTE FOR SEND BUFFER
00AA                    = 171 ETL1BY   EQU      0AAH             ;2-LABEL INTER-LABEL TERMIN BYTE (SBUF)
                        = 172 ;
                        = 173 ;   FLATTOP TIME CONSTANTS
                        = 174 ;
000E                    = 175 EWAIT    EQU      14               ;VALUE FOR "NO SEGS" WAIT
0056                    = 176 EGDLTW   EQU      100-EWAIT        ;GD-LT ON WAIT CONSTANT
0024                    = 177 EDRDLY   EQU      50-EWAIT         ;DOUBLE READ WAIT CONSTANT
0002                    = 178 FACTOR   EQU      2                ;TIMER FACTOR 10/20MS TIMER ROUTINES
                        = 179 ;
                        = 180 ;   TWO LABEL READ CONSTANTS
                        = 181 ;
                        = 182 ;   SET BITS FOR 2-LABEL READ STATUS REGISTERS
                        = 183 ;
007F                    = 184 SETL11   EQU      01111111B        ;LEFT HALF LABEL 1
00BF                    = 185 SETL12   EQU      10111111B        ;LEFT HALF LABEL 1 - SECOND READ
00DF                    = 186 SETL21   EQU      11011111B        ;LEFT HALF LABEL 2
00EF                    = 187 SETL22   EQU      11101111B        ;LEFT HALF LABEL 2 - SECOND READ
00F7                    = 188 SETR11   EQU      11110111B        ;RIGHT HALF LABEL 1
00FB                    = 189 SETR12   EQU      11111011B        ;RIGHT HALF LABEL 1 - SECOND READ
00FD                    = 190 SETR21   EQU      11111101B        ;RIGHT HALF LABEL 2
00FE                    = 191 SETR22   EQU      11111110B        ;RIGHT HALF LABEL 2 - SECOND READ
                        = 192 ;
00FF                    = 193 E2SCN    EQU      11111111B        ;MASK VALUE FOR 2-SCAN REQUIREMENT
00AA                    = 194 EN2SCN   EQU      10101010B        ;MASK VALUE FOR 1-SCAN REQUIREMENT
00AF                    = 195 EN12SN   EQU      10101111B        ;MASK VALUE FOR ENHANCED 2-SCAN REQUIREMENT
                        = 196 ;
                        = 197 ;
                        = 198 ;   TWO LABEL READ TIME CONSTANTS - DISABLE SCANNING AFTER AMBIGUOUS
                        = 199 ;   READ
                        = 200 ;
000C                    = 201 EAMBWT   EQU      12               ;BAD LIGHT ON (OFF) TIME (CENTI-SECS)
000C                    = 202 EAMBCY   EQU      12               ;# OF BAD LIGHT FLASH CYCLES
                        = 203 ;
                        = 204 ;   NOTE: TOTAL TIME SCANNER IS DISABLED AFTER AMBIGUOUS READ IS
                        = 205 ;         (EAMBWT*2 * EAMBCY) / 100  SECONDS ( APPROX. 3 SECONDS HERE)
                        = 206 ;TONE CONSTANTS
000A                    = 207 ETNCT1   EQU      00AH             ;CYCLE COUNT FOR 500HZ
000F                    = 208 ETNCT2   EQU      00FH             ;CYCLE COUNT FOR 730HZ
0014                    = 209 ETNCT3   EQU      014H             ;CYCLE COUNT FOR 960HZ
001C                    = 210 ETNCT4   EQU      01CH             ;CYCLE COUNT FOR 1370HZ
00F4                    = 211 ETNFQ1   EQU      0F4H             ;FREQUENCY FOR 500HZ
00F8                    = 212 ETNFQ2   EQU      0F8H             ;FREQUENCY FOR 730HZ
```

```
00FA            = 213 ETNFQ3  EQU     0FAH            ;FREQUENCY FOR 960HZ
00FC            = 214 ETNFQ4  EQU     0FCH            ;FREQUENCY FOR 1370HZ
                = 215 ;****************************************************************
                = 216 ;
                = 217 ;   RAM POINTERS AND CONSTANTS USED IN THE HORSE TEST
                = 218 ;
0030            = 219 TSEG1   EQU     30H             ;SEGMENT BUFFER
0034            = 220 TSEG2   EQU     34H
                = 221 ;
0038            = 222 TCNT1   EQU     38H             ;SEGMENT COUNTER
003A            = 223 TCNT2   EQU     3AH
                = 224 ;
0050            = 225 TSCBUF  EQU     50H             ;FCA READ BUFFER
00D1            = 226 EHCNTL  EQU     0D1H            ;HORSE CONTROL BYTE
                = 227 ;****************************************************************
                = 228 ;   DATA MEMORY MAP - RAM - 8039 NEEDED
                = 229 ;
                = 230 ;       REGISTER BANK 0 (NON-INTERRUPT USEAGE)
0000            = 231         ORG     000H
0000            = 232 MRB0:   DS      4               ;R0 TO R3 - SCRATCH
0004            = 233 SCNFLG: DS      1               ;R4 - SCAN FLAGS
0005            = 234 DRTIMR: DS      1               ;R5 - DOUBLE READ TIMER
0006            = 235 VERFLG: DS      1               ;R6 - VERSION POINTER/FLAG
0007            = 236 TIMREG: DS      1               ;R7 - GENERAL PURPOSE TIMER/COUNTER
                = 237 ;
                = 238 ;   STACK AREA
0008            = 239 STACK:  DS      16              ;8 LEVELS OF SUBROUTINES ALLOWED
                = 240 ;
                = 241 ;   REGISTER BANK 1 (INTERRUPT USEAGE)
0018            = 242 MRB1:   DS      4               ;R0 TO R3 - SCRATCH (NOT USED)
001C            = 243 MRB1R4: DS      1               ;R4 - NOT USED
001D            = 244 TONCNT: DS      1               ;R5 - TONE CYCLE COUNTER (CYCLES/10MS)
001E            = 245 TONLTH: DS      1               ;R6 - TONE LENGTH COUNTER
001F            = 246 TASAVE: DS      1               ;R7 - TIMER "A" SAVE REGISTER
                = 247 ;
                = 248 ;   FREE MEMORY AREA
                = 249 ;
                = 250 ;       SEGMENT BUFFERS
0020            = 251 SEGBUF  EQU     $
0020            = 252 RCRAM   EQU     $               ;16 BYTES FOR 2 LABEL SCRATCH PAD
0020            = 253 SCNBUF: DS      4               ;SCAN BUFFER
                = 254 ;
0024            = 255 BF6CST  EQU     $
0024            = 256 L6S1:   DS      4               ;SCAN 1 BUFFER
0028            = 257 L6S2:   DS      4               ;SCAN 2 BUFFER
002C            = 258 L6SCNT: DS      1               ;PACKED SCAN COUNTER (SCAN2/SCAN1)
002D            = 259 L6STOT: DS      1               ;TOTAL COUNTER
                = 260 ;
002E            = 261 R6S1:   DS      3
0031            = 262 R6S2:   DS      3
0034            = 263 R6SCNT: DS      1
0035            = 264 R6STOT: DS      1
0012            = 265 BF6CNT  EQU     $-BF6CST
                = 266 ;
0036            = 267 BF4CST  EQU     $
0036            = 268 L4S1:   DS      2
0038            = 269 L4S2:   DS      2
003A            = 270 L4SCNT: DS      1
003B            = 271 L4STOT: DS      1
                = 272 ;
003C            = 273 R4S1:   DS      2
003E            = 274 R4S2:   DS      2
0040            = 275 R4SCNT: DS      1
0041            = 276 R4STOT: DS      1
                = 277 ;
000C            = 278 BF4CNT  EQU     $-BF4CST
                = 279 ;
                = 280 ;   TWO LABEL READ STORAGE AREAS
                = 281 ;
0042            = 282 STTL13: DS      1               ;JAN13-JAN13 2 LABEL READ STATUS
0043            = 283 STTL8:  DS      1               ;JAN13-EAN8 2 LABEL READ STATUS
0044            = 284 ERRTL:  DS      1               ;ERROR FLAG FOR 2 LABEL READ
0045            = 285 CKSUML: DS      1               ;LEFT SEGMENT HALF CHECK SUMS
0046            = 286 CKSUMR: DS      1               ;RIGHT SEGMENT HALF CHECKSUMS
                = 287 ;
                = 288 ;   SEND BUFFER
                = 289 ;
0047            = 290 SBFPNT: DS      1               ;POINTER
                = 291 ;
0048            = 292 SBUFAD  EQU     $               ;FIRST DATA BYTE ADDRESS
0048            = 293 SBUF:   DS      18              ;DATA BUFFER
0090            = 294 SBSTRT  EQU     2*SBUF          ;PACKED BUFFER START POINTER
0012            = 295 SBUFSZ  EQU     $-SBUF          ;BYTES IN SEND BUFFER
0059            = 296 SBFEND  EQU     $-1             ;LAST RAM LOCATION IN BUFFER
                = 297 ;
                = 298 ;   WORK AREA USED BY EMOD10 ROUTINE
005A            = 299 WRKBUF: DS      3
                = 300 ;
                = 301 ;   DOUBLE READ LABEL DATA SUM LOCATION
005D            = 302 DRSUM:  DS      1
                = 303 ;
                = 304 ;2 LABEL READ SUPPORT
```

```
005E            = 305 STSDTA: DS    1                ;COMMAND BYTE
005F            = 306 SWISET: DS    1                ;SWITCH SETTINGS
0060            = 307 INTSTR: DS    1                ;SCRATCH PAD STORAGE FOR R1 (TIMER INTERUPT)
0061            = 308 TWOLAB: DS    16               ;TWO LABEL READ FLAGS
0070            = 309 LSTUSD  EQU   $-1              ;LAST USED RAM LOCATION
                  310 ; FVECTR.SRC INCLUDES FTIMER.SRC
                  311 $       INCLUDE(:F3:FVECTR.SRC)
                = 312 ;******************************************************************
                = 313 ;  FILE:  FVECTR.SRC    11-18-86  12:00   BOB ACTIS
                = 314 ;
                = 315 ;  RESET AND INTERRUPT VECTORS
                = 316 ;
0000            = 317         ORG   000H             ;RESET TRAP
0000 E5         = 318 RSTTRP: SEL   MB0
0001 64A4       = 319         JMP   POWUP            ;GO START PROGRAM
                = 320 ;
0003            = 321         ORG   003H             ;EXTERNAL INTERRUPT TRAP
0003 93         = 322 INTTRP: RETR                   ;RETURN FROM SPURIOUS INTERRUPTS
                = 323 ;
0007            = 324         ORG   007H             ;INTERNAL TIMER INTERRUPT TRAP
0007            = 325 TIMTRP  EQU   $                ;GO TO TIMER ROUTINE
                = 326 $       INCLUDE(:F3:FTIMER.SRC)
               1= 327 ;******************************************************************
               1= 328 ; FILE: FTIMER.SRC   03-15-87  24:00   RANDY ELLIOTT  (TEC MOD.)
               1= 329 ; FUNCTION: IF NO TONE IN PROGRESS, DECREMENT RB0-R7 UNTIL 0.
               1= 330 ;           IF TONE IN PROGRESS, DECREMENT RB1-R6 UNTIL 0.
               1= 331 ; ENTRY: RB1-R6 = TONE LENGTH IN 10'S OF MS.
               1= 332 ;        RB0-R5 = DOUBLE READ TIMER COUNTER
               1= 333 ;        RB0-R7 = GENERAL PURPOSE TIMER COUNTER
               1= 334 ; EXIT:  RB1-R7 = ACCUMULATOR SAVE
               1= 335 ;        RB1-R5 = TONE CYCLE COUNTER
               1= 336 ;        RB1-R6 = DECREMENTED UNTIL 0
               1= 337 ;        RB0-R5 = DECREMENTED UNTIL 0
               1= 338 ;        RB0-R7 = DECREMENTED UNTIL 0
0007 D5        1= 339 TIMER:  SEL   RB1
0008 AF        1= 340         MOV   R7,A             ;SAVE A
               1= 341 ;SAVE R1 IN RAM SO AS TO RESTORE WHEN EXITING INTERRUPT.
0009 F9        1= 342         MOV   A,R1
000A 8960      1= 343         MOV   R1,#INTSTR       ;SET RAM POINTER
000C A1        1= 344         MOV   @R1,A            ;SAVE R1 (RB1)
               1= 345 ;
000D FE        1= 346         MOV   A,R6             ;GET TONE COUNTER
000E 9623      1= 347         JNZ   TIME30           ;JUMP IF TONE IN PROGRESS
0010 C5        1= 348         SEL   RB0
0011 FF        1= 349         MOV   A,R7
0012 C615      1= 350         JZ    TIME05           ;JUMP IF TIMER COUNTER IS 0
0014 CF        1= 351         DEC   R7
0015 FD        1= 352 TIME05: MOV   A,R5
0016 C619      1= 353         JZ    TIME10           ;JUMP IF DOUBLE READ TIMER IS 0
0018 CD        1= 354         DEC   R5
0019 2383      1= 355 TIME10: MOV   A,#-(250/FACTOR)  ;10MS/80US * T25
001B 62        1= 356 TIME20: MOV   T,A              ;SET TIMER COUNTER
001C D5        1= 357         SEL   RB1
               1= 358 ;RESTORE ACCUMULATOR AND R1 (RB1) BEFORE RETURNING.
001D 8960      1= 359         MOV   R1,#INTSTR       ;SET RAM POINTER
001F F1        1= 360         MOV   A,@R1            ;RETRIEVE R1 (RB1) FROM RAM
0020 A9        1= 361         MOV   R1,A             ;RESTORE R1
0021 FF        1= 362         MOV   A,R7             ;RESTORE A
0022 93        1= 363         RETR
0023 09        1= 364 TIME30: IN    A,P1             ;GET TONE BIT
0024 997F      1= 365         ANL   P1,#255-ETONE    ;SET TONE BIT LOW
0026 F22A      1= 366         JB7   TIME40           ;JUMP IF TONE BIT WAS HIGH
0028 8980      1= 367         ORL   P1,#ETONE        ;SET TONE BIT HIGH
               1= 368 TIME40:
002A ED3A      1= 369         DJNZ  R5,TIME60        ;JUMP IF NOT 10MS YET
               1= 370 ;SET TONE CYCLE COUNTER ACCORDING TO RAM (SWITCH SETTINGS)
002C B4AF      1= 371         CALL  TON1CT           ;SET TONE CYCLE COUNTER (R5)
               1= 372 ;
002E C5        1= 373         SEL   RB0
002F FF        1= 374         MOV   A,R7
0030 C633      1= 375         JZ    TIME50
0032 CF        1= 376         DEC   R7
0033 D5        1= 377 TIME50: SEL   RB1
0034 EE3A      1= 378         DJNZ  R6,TIME60        ;JUMP IF TONE NOT FINISHED
0036 8980      1= 379         ORL   P1,#ETONE        ;LEAVE TONE LINE HIGH
0038 0419      1= 380         JMP   TIME10
               1= 381 TIME60:
               1= 382 ;SET TONE FREQUENCY CONSTANT ACCORDING TO SWITCH SETTING
003A 895F      1= 383         MOV   R1,#SWISET       ;SET RAM POINTER
003C F1        1= 384         MOV   A,@R1            ;RETRIEVE SWITCH SETTING
003D 5303      1= 385         ANL   A,#03H           ;MASK ALL BUT TONE BITS
003F 0344      1= 386         ADD   A,#LOW FREQAD    ;SET EPROM ADDRESS FETCH
0041 A3        1= 387         MOVP  A,@A             ;GET TONE FREQUENCY
0042 041B      1= 388         JMP   TIME20
               1= 389 ;
0044           1= 390 FREQAD  EQU   $
0044 F4        1= 391         DB    ETNFQ1           ;TONE FREQUENCY FOR 500HZ
0045 F8        1= 392         DB    ETNFQ2           ;TONE FREQUENCY FOR 730HZ
0046 FA        1= 393         DB    ETNFQ3           ;TONE FREQUENCY FOR 960HZ
0047 FC        1= 394         DB    ETNFQ4           ;TONE FREQUENCY FOR 1370HZ
               1= 395 ;
                 396 $       INCLUDE(:F3:CK4HRS.SRC)
                = 397 ;******************************************************************
```

```
                    = 398 ; FILE: CK4HRS.SRC  7-07-86 15:05  BOB ACTIS
                    = 399 ; FUNCTION: CHECK SDATA FOR THE HORSE CONTROL BYTE
                    = 400 ; ENTRY: NO SETUP
                    = 401 ; EXIT: USES R0,A
                    = 402 ;        GOES INTO HORSE TEST IF CONTROL BYTE IS RECEIVED
                    = 403 ;
0048 864B           = 404 CK4HRS: JNI     CK4H20          ;JUMP IF FCA HAS DATA
004A 83             = 405 CK4H10: RET
                    = 406 ;
004B B801           = 407 CK4H20: MOV     R0,#ESRRD
004D 80             = 408         MOVX    A,@R0           ;READ BYTE
004E F252           = 409         JB7     CK4H30          ;JUMP IF SDATA
0050 90             = 410         MOVX    @R0,A           ;RESET FRAME CAPTURE
0051 83             = 411         RET
                    = 412 ;
0052 B802           = 413 CK4H30: MOV     R0,#EOCIA
0054 80             = 414         MOVX    A,@R0           ;GET SDATA
0055 D3D1           = 415         XRL     A,#EHCNTL
0057 964A           = 416         JNZ     CK4H10          ;JUMP IF NOT HORSE CONTROL BYTE
0059 E467           = 417         JMP     SDATAH          ;GO ENTER THE HORSE TEST
                      418 $       INCLUDE(:F2:FLGMTC.SRC)
                    = 419 ;*********************************************************************
                    = 420 ;**                      Subroutine FLGMTC                          **
                    = 421 ;** Function: Check label flag sets to match read label flags       **
                    = 422 ;** Date: 3-18-87                                                   **
                    = 423 ;** Subroutines Called: None                                        **
                    = 424 ;** Registers/Flags affected: R0, R1, *R0, R2, ACCUMULATOR          **
                    = 425 ;** Ports affected: None                                            **
                    = 426 ;** RAM locations affected: None                                    **
                    = 427 ;*********************************************************************
                    = 428 ;ON ENTRY IF R3=0 THEN WE HAVE EAN13-EAN8 OTHERWISE WE HAVE EAN13-EAN13 PAIR
                    = 429 FLGMTC:
005B D5             = 430         SEL     RB1             ;SELECT REGISTER BANK 1
005C B861           = 431         MOV     R0,#TWOLAB      ;SET RAM POINTER TO RAM FLAGS
005E C5             = 432         SEL     RB0             ;SELECT REGISTER BANK 0
005F BA08           = 433         MOV     R2,#8           ;LABEL SET COUNTER
                    = 434 ;GET LABEL FLAGS READ FROM SCANNER
                    = 435 GTSFLG:
0061 D5             = 436         SEL     RB1             ;SELECT REGISTER BANK 1
0062 F0             = 437         MOV     A,@R0           ;CHECK RAM FOR FLAGS TO CHECK AGAINST
0063 C5             = 438         SEL     RB0             ;SELECT REGISTER BANK 0
0064 37             = 439         CPL     A               ;CHECK ACCUMULATOR FOR FF
0065 C690           = 440         JZ      NFLGMC          ;JUMP IF RAM HAD FF
                    = 441 ;
0067 B824           = 442         MOV     R0,#L6S1        ;SET RAM POINTER TO LEFT HALF OF FIRST LABEL
0069 F5             = 443         SEL     MB1
006A 349C           = 444         CALL    GETFLG          ;GET LABEL 1 FLAGS
006C E5             = 445         SEL     MB0
006D D5             = 446         SEL     RB1             ;SELECT REGISTER BANK 1
006E D0             = 447         XRL     A,@R0           ;COMPARE FLAG SETS
006F C5             = 448         SEL     RB0             ;SELECT REGISTER BANK 0
0070 968B           = 449         JNZ     NXTSET          ;JUMP IF NOT LABEL 1 FLAG MATCH
0072 D5             = 450         SEL     RB1             ;SELECT REGISTER BANK 1
0073 18             = 451         INC     R0              ;CHECK LABEL 2 FLAGS
0074 C5             = 452         SEL     RB0             ;SELECT REGISTER BANK 0
0075 FB             = 453         MOV     A,R3            ;CHECK IF WHAT TYPE 2ND LABEL
0076 C680           = 454         JZ      E82NDL          ;JUMP IF EAN8 SECOND LABEL
0078 B828           = 455         MOV     R0,#L6S2        ;SET RAM POINTER TO LEFT HALF OF SECOND LABEL
007A F5             = 456         SEL     MB1
007B 349C           = 457         CALL    GETFLG          ;GET LABEL 2 FLAGS
007D E5             = 458         SEL     MB0
007E 0483           = 459         JMP     CMPFLG
0080 B836           = 460 E82NDL: MOV     R0,#L4S1        ;SET RAM POINTER TO LEFT HALF OF 4 SEG. BUFFER
0082 F0             = 461         MOV     A,@R0           ;GET LABEL 2 FLAGS
0083 D5             = 462 CMPFLG: SEL     RB1             ;SELECT REGISTER BANK 1
0084 D0             = 463         XRL     A,@R0           ;COMPARE FLAG SETS
0085 C5             = 464         SEL     RB0             ;SELECT REGISTER BANK 0
0086 968B           = 465         JNZ     NXTSET          ;JUMP IF NOT LABEL 2 MATCH
                    = 466 ;WE HAVE A MATCH.
0088 27             = 467         CLR     A               ;SET ACCUMULATOR TO SHOW GOOD READ
0089 0492           = 468         JMP     RTNFLG          ;JUMP TO RETURN
008B D5             = 469 NXTSET: SEL     RB1             ;SELECT REGISTER BANK 1
008C 18             = 470         INC     R0              ;INCREMENT RAM POINTER
008D C5             = 471         SEL     RB0             ;SELECT REGISTER BANK 0
008E EA61           = 472         DJNZ    R2,GTSFLG       ;DECREMENT LABEL COUNTER AND CHECK FOR ZERO
                    = 473 ;
0090 2302           = 474 NFLGMC: MOV     A,#2            ;SIGNIFY BAD READ
0092 83             = 475 RTNFLG: RET
                      476 $       INCLUDE(:F3:TREPRM.SRC)
                    = 477 ;*********************************************************************
                    = 478 ;**                      Subroutine TREPRM                          **
                    = 479 ;** Function: Transmit EEPROM contents to Host or transmit Ram contents **
                    = 480 ;** Date: 3-4-87                                                    **
                    = 481 ;** Subroutines Called: RDEPRM, SOCIA, PARITY                       **
                    = 482 ;** Registers/Flags affected: *R2, ACCUMULATOR, R0, F0, CARRY, R1, R2, R3,*R1* **
                    = 483 ;** Ports affected: P2, P1                                          **
                    = 484 ;** RAM locations affected: EXT. RAM EOCIA(VLSI), @*R1 TO @*R1+16   **
                    = 485 ;*********************************************************************
                    = 486 TREPRM:
                    = 487 ;READ EEPROM TO SCRATCH PAD RAM (16 BYTES PACKED)
                    = 488         ;SET RAM POINTER TO TRANSFER EEPROM DATA TO.
```

```
0093 D5            = 489            SEL     RB1                     ;SELECT REGISTER BANK 1
0094 F9            = 490            MOV     A,R1                    ;RETRIEVE RAM POINTER FROM *R1
0095 C5            = 491            SEL     RB0                     ;SELECT REGISTER BANK 0
0096 A9            = 492            MOV     R1,A                    ;SET RAM POINTER
                   = 493 ;
0097 54B0          = 494            CALL    RDEPRM                  ;TRANSFER EEPROM DATA TO RAM.
                   = 495 ;CHECK THAT EEPROM HAS BEEN PROGRAMMED.   ;SET UP HEADER CHARACTER.
                   = 496            ;SET RAM POINTER TO TRANSFER EEPROM DATA TO.
                   = 497 TRRAM:
0099 D5            = 498            SEL     RB1                     ;SELECT REGISTER BANK 1
009A F9            = 499            MOV     A,R1                    ;RETRIEVE RAM POINTER FROM *R1
009B C5            = 500            SEL     RB0                     ;SELECT REGISTER BANK 0
009C A9            = 501            MOV     R1,A                    ;SET RAM POINTER
                   = 502 ;
009D F1            = 503            MOV     A,@R1                   ;READ RAM
009E 37            = 504            CPL     A
009F 96A7          = 505            JNZ     PDATA                   ;IF NOT ZERO, WE HAVE DATA IN RAM.  JUMP SEND DATA.
                   = 506 ;NO DATA IS IN EEPROM.  SEND HEADER CHARACTER WITH LAST BYTE BIT SET HIGH.
00A1 23C7          = 507            MOV     A,#0C7H                 ;HEADER CHAR. 'G' WITH LAST BYTE BIT SET.
00A3 34EB          = 508            CALL    SOCIA                   ;TRANSFER ACCUMULATOR TO VLSI CHIP OCIA BUFFER.
00A5 04E3          = 509            JMP     TXRET                   ;JUMP TO RETURN.  EXIT ROUTINE.
                   = 510 ;LABEL FLAGS ARE IN RAM.  SEND HEADER CHARACTER.
00A7 2307          = 511 PDATA:    MOV     A,#07H                  ;HEADER CHAR. 'G'
00A9 34EB          = 512            CALL    SOCIA                   ;TRANSFER ACCUMULATOR TO VLSI CHIP OCIA BUFFER.
                   = 513 ;
                   = 514 ;BEGIN UNPACKING RAM DATA AND SEND OVER OCIA
                   = 515 ;SET RAM POINTER TO TRANSFER EEPROM DATA TO.
                   = 516 UNPACK:
00AB D5            = 517            SEL     RB1                     ;SELECT REGISTER BANK 1
00AC F9            = 518            MOV     A,R1                    ;RETRIEVE RAM POINTER FROM *R1
00AD C5            = 519            SEL     RB0                     ;SELECT REGISTER BANK 0
00AE A9            = 520            MOV     R1,A                    ;SET RAM POINTER
                   = 521 ;
                   = 522 UNPAK1:
00AF F1            = 523            MOV     A,@R1                   ;RETRIEVE ONE BYTE FROM RAM
00B0 530F          = 524            ANL     A,#0FH                  ;MASK MS DIGIT OFF.
00B2 4330          = 525            ORL     A,#30H                  ;CONVERT LS DIGIT TO ASCII.
00B4 A8            = 526            MOV     R0,A                    ;STORE LS DIGIT IN R0.
00B5 F1            = 527            MOV     A,@R1                   ;RETRIEVE SAME BYTE AGAIN TO GET MS DIGIT.
00B6 47            = 528            SWAP    A                       ;SWAP NIBBLES AROUND
00B7 530F          = 529            ANL     A,#0FH                  ;MASK LS DIGIT OFF.
00B9 4330          = 530            ORL     A,#30H                  ;CONVERT MS DIGIT TO ASCII.
00BB AA            = 531            MOV     R2,A                    ;SAVE MS DIGIT IN R2.
                   = 532 ;LOOK AT NEXT BYTE IN RAM TO CHECK FOR LAST BYTE.
00BC 19            = 533            INC     R1                      ;INCREMENT RAM POINTER
00BD F1            = 534            MOV     A,@R1                   ;RETRIEVE NEXT BYTE
00BE 37            = 535            CPL     A
00BF C6D7          = 536            JZ      LSTBYT                  ;IF ZERO, PREVIOUS RAM LOCATION HAD LAST BYTE.
                   = 537 ;CHECK RAM POINTER IN THAT IT DOES NOT EXCEED 16.  (16 BYTES TRANSMITTED)
00C1 D5            = 538            SEL     RB1
00C2 F9            = 539            MOV     A,R1                    ;SET RAM POINTER TO FIRST BYTE OF DATA
00C3 C5            = 540            SEL     RB0
00C4 37            = 541            CPL     A                       ;SUBTRACT BEGINNING OF RAM TO PRESENT POINTER
00C5 69            = 542            ADD     A,R1
00C6 17            = 543            INC     A                       ;RESULT OF SUBTRACTION IN ACCUMULATOR
00C7 D310          = 544            XRL     A,#16D                  ;CHECK FOR 16.
00C9 C6D7          = 545            JZ      LSTBYT                  ;IF ZERO, PREVIOUS RAM LOCATION HAD LAST BYTE.
                   = 546 ;MORE DATA TO SEND.  NOT 17TH BYTE NOR IS NEXT BYTE LAST BYTE.
00CB FA            = 547            MOV     A,R2                    ;GET MS BYTE TO SEND
00CC 3490          = 548            CALL    PARITY                  ;CALCULATE PARITY
00CE 34EB          =-549            CALL    SOCIA                   ;SEND MS BYTE TO HOST
00D0 F8            = 550            MOV     A,R0                    ;GET LS BYTE TO SEND
00D1 3490          = 551            CALL    PARITY                  ;CALCULATE PARITY
00D3 34EB          = 552            CALL    SOCIA                   ;SEND LS BYTE TO HOST
                   = 553 ;MORE DATA TO RETRIEVE, LOOP BACK.
00D5 04AF          = 554            JMP     UNPAK1
                   = 555 ;
                   = 556 ;LAST BYTE COMMING UP.  SEND MS BYTE AND LS BYTE WITH LAST BYTE BIT SET.
00D7 FA            = 557 LSTBYT: MOV    A,R2                    ;GET MS BYTE.
00D8 3490          = 558            CALL    PARITY                  ;CALCULATE PARITY
00DA 34EB          = 559            CALL    SOCIA                   ;SEND MS BYTE TO HOST
00DC F8            = 560            MOV     A,R0                    ;GET LS BYTE.
00DD 4340          = 561            ORL     A,#40H                  ;SET LAST BYTE BIT
00DF 3490          = 562            CALL    PARITY                  ;CALCULATE PARITY
00E1 34EB          = 563            CALL    SOCIA                   ;SEND LS BYTE WITH LAST BYTE BIT SET.
                   = 564 ;
                   = 565 ;ALL DONE.  RETURN TO MAIN ROUTINE.
00E3 83            = 566 TXRET:  RET
                   = 567 ;*************************************
00E4 A3            = 568 TROPG0: MOVP   A,@A
00E5 83            = 569         RET
0100               = 570         ORG    100H
                   = 571 ;***********************************************************************
                   = 572 $      INCLUDE(:F3:TROMSM.SRC)
                   = 573 ;
                   = 574 ; ROUTINE: TROMSM   11-22-82 10:15  BOB ACTIS
                   = 575 ;
                   = 576 ; FUNCTION - SUM ALL BYTES IN BOTH MEMORY BANKS
                   = 577 ;            ASSUMES THAT EACH OF THE SIXTEEN PAGES CONTAINS THE
                   = 578 ;            SEQUENCE "TROPGX: MOVP A,@A ; RET" FOR PAGE X.
                   = 579 ;
0100 B908          = 580 TROMSM: MOV    R1,#STACK+3       ; R1 POINTS TO SECOND STACK ENTRY
                   = 581 ;
                   = 582 ; DO SIXTEEN PAGES WITH 256 BYTES PER PAGE
                   = 583 ;
```

```
0102 27      = 584          CLR    A
0103 A1      = 585          MOV    @R1,A         ; STACK+3 = PAGE 0 TO START
0104 AA      = 586          MOV    R2,A          ; R2 = BYTE ADDRESS
0105 BB10    = 587          MOV    R3,#16        ; R3 = PAGES TO DO
0107 A8      = 588          MOV    R0,A          ; R0 = SUM OF BYTES
0108 D7      = 589          MOV    PSW,A         ; INSURE STACK IS EMPTY
             = 590 ;
             = 591 ; PUT PAGE ACCESS ADDRESS IN STACK
             = 592 ;
0109 F1      = 593 TRO10:   MOV    A,@R1
010A 0321    = 594          ADD    A,#LOW TROTAB
010C A3      = 595          MOVP   A,@A
010D C9      = 596          DEC    R1
010E A1      = 597          MOV    @R1,A
010F 19      = 598          INC    R1
             = 599 ;
             = 600 ; DO A PAGE
             = 601 ;
0110 341C    = 602 TRO20:   CALL   TRO50         ; FETCH BYTE
0112 68      = 603          ADD    A,R0          ; ADD TO SUM
0113 A8      = 604          MOV    R0,A
0114 EA10    = 605          DJNZ   R2,TRO20      ; JMP = NOT DONE WITH PAGE
0116 11      = 606          INC    @R1           ; PAGE NUMBER INCREMENTED
0117 EB09    = 607          DJNZ   R3,TRO10      ; JMP = NOT THRU WITH PAGES
0119 17      = 608          INC    A             ; (A) = ZERO FOR CORRECT SUM
011A 6453    = 609          JMP    TRORET
             = 610 ;
             = 611 ; LINK TO EACH PAGE
             = 612 ;
011C 2302    = 613 TRO50:   MOV    A,#02
011E D7      = 614          MOV    PSW,A         ; SET STACK POINTER AHEAD
011F FA      = 615          MOV    A,R2          ; A = ADDRESS OF BYTE TO FETCH
0120 83      = 616          RET                  ; JMP TO SELECTED PAGE
             = 617 ;
             = 618 ; TABLE FOR ADDRESS OF FETCH ROUTINE IN EACH PAGE
             = 619 ;
0121 E4      = 620 TROTAB:  DB     LOW TROPG0
0122 F6      = 621          DB     LOW TROPG1
0123 E9      = 622          DB     LOW TROPG2
0124 F7      = 623          DB     LOW TROPG3
0125 FA      = 624          DB     LOW TROPG4
0126 E3      = 625          DB     LOW TROPG5
0127 EA      = 626          DB     LOW TROPG6
0128 E9      = 627          DB     LOW TROPG7
0129 EF      = 628          DB     LOW TROPG8
012A D1      = 629          DB     LOW TROPG9
012B F0      = 630          DB     LOW TROPGA
012C F8      = 631          DB     LOW TROPGB
012D F2      = 632          DB     LOW TROPGC
012E F8      = 633          DB     LOW TROPGD
012F F4      = 634          DB     LOW TROPGE
0130 E0      = 635          DB     LOW TROPGF
               636 $        INCLUDE(:F3:TRAM.SRC)
             = 637 ;************************************************************
             = 638 ; FILE:  TRAM.SRC  6-19-86 11:20  BOB ACTIS
             = 639 ; FUNCTION:  TEST THE 8039 RAM LOCATIONS 0 TO 7FH
             = 640 ; ENTRY:  NO SETUP
             = 641 ; EXIT:  RAM HAS GARBAGE (TEST PATTERN)
             = 642 ;
             = 643 ; START BY WRITTING EACH RAM ADDRESS INTO ITSELF
0131 B87F    = 644 TRAM:    MOV    R0,#7FH       ;SIZE OF 8039 RAM
0133 F8      = 645 TRAM10:  MOV    A,R0          ;GET RAM ADDRESS
0134 A0      = 646          MOV    @R0,A         ;STORE RAM ADDRESS IN IT'S LOCATION
0135 E833    = 647          DJNZ   R0,TRAM10     ;DO ALL LOCATIONS
             = 648 ;
             = 649 ; CHECK IF EACH LOCATION HAS IT'S OWN ADDRESS
0137 B87F    = 650          MOV    R0,#7FH
0139 F8      = 651 TRAM20:  MOV    A,R0          ;GET RAM ADRESS
013A D0      = 652          XRL    A,@R0         ;COMPARE ADDRESS TO CONTENTS
013B 9674    = 653          JNZ    TRAMER        ;JUMP IF ERROR
013D E839    = 654          DJNZ   R0,TRAM20     ;DO ALL LOCATIONS
             = 655 ;
             = 656 ; TRY A 055H/0AAH CHECKER BOARD PATTERN
013F B802    = 657          MOV    R0,#2         ;POINTER WILL GO FROM 2 TO 7FH
0141 2355    = 658 TRAM30:  MOV    A,#055H
0143 A0      = 659          MOV    @R0,A         ;WRITE EVEN LOCATION
0144 37      = 660          CPL    A             ;PATTERN IS NOW 0AAH
0145 18      = 661          INC    R0
0146 A0      = 662          MOV    @R0,A         ;WRITE ODD LOCATION
0147 18      = 663          INC    R0
0148 F8      = 664          MOV    A,R0          ;GET NEXT ADDRESS
0149 37      = 665          CPL    A
014A F241    = 666          JB7    TRAM30        ;JUMP IF NOT DONE YET, R0 < 80H
             = 667 ;
             = 668 ; CHECK THE 055H/0AAH TEST PATTERN
014C B902    = 669          MOV    R1,#2         ;USE R1 AS POINTER IN THIS SECTION
014E F1      = 670 TRAM40:  MOV    A,@R1         ;GET EVEN BYTE DATA, 055H
014F 19      = 671          INC    R1
0150 61      = 672          ADD    A,@R1         ;ADD ODD BYTE DATA, 0AAH
0151 17      = 673          INC    A             ;055H+0AAH+1=000H
0152 9674    = 674          JNZ    TRAMER        ;JUMP IF ERROR
0154 19      = 675          INC    R1
```

```
0155 F9        = 676           MOV     A,R1            ;GET NEXT ADDRESS
0156 37        = 677           CPL     A
0157 F24E      = 678           JB7     TRAM40          ;JUMP IF NOT DONE YET
               = 679 ;
               = 680 ; TRY A 0AAH/055H CHECKER BOARD PATTERN
0159 B902      = 681           MOV     R1,#2           ;POINTER WILL GO FROM 2 TO 7FH
015B 23AA      = 682 TRAM50:   MOV     A,#0AAH
015D A1        = 683           MOV     @R1,A           ;WRITE EVEN LOCATION
015E 37        = 684           CPL     A               ;PATTERN IS NOW 055H
015F 19        = 685           INC     R1
0160 A1        = 686           MOV     @R1,A           ;WRITE ODD LOCATION
0161 19        = 687           INC     R1
0162 F9        = 688           MOV     A,R1            ;GET NEXT ADDRESS
0163 37        = 689           CPL     A
0164 F25B      = 690           JB7     TRAM50          ;JUMP IF NOT DONE YET, R1 < 80H
               = 691 ;
               = 692 ; CHECK THE 0AAH/055H TEST PATTERN
0166 B802      = 693           MOV     R0,#2           ;USE R0 AS POINTER IN THIS SECTION
0168 F0        = 694 TRAM60:   MOV     A,@R0           ;GET EVEN BYTE DATA, 0AAH
0169 18        = 695           INC     R0
016A 60        = 696           ADD     A,@R0           ;ADD ODD BYTE DATA, 055H
016B 17        = 697           INC     A
016C 9674      = 698           JNZ     TRAMER          ;0AAH+055H+1=000H
016E 18        = 699           INC     R0              ;JUMP IF ERROR
016F F8        = 700           MOV     A,R0            ;GET NEXT ADDRESS
0170 37        = 701           CPL     A
0171 F268      = 702           JB7     TRAM60          ;JUMP IF NOT DONE YET
               = 703 ;
0173 27        = 704           CLR     A               ;A=0 INDICATES TEST PASSED
0174 6458      = 705 TRAMER:   JMP     TRARET          ;RETURN FROM RAM TEST
                 706 $         INCLUDE(:F3:TOCIA.SRC)
               = 707 ;************************************************************
               = 708 ; ROUTINE: TOCIA    07-03-86 10:40  BOB ACTIS
               = 709 ;
               = 710 ; FUNCTION: SEND BYTE TO HOST, THEN CHECK RDATA
               = 711 ;
0176 8901      = 712 TOCIA:    ORL     P1,#ETEST       ;TEST CONTROL ACTIVE
0178 B803      = 713           MOV     R0,#EFCRST
017A 90        = 714           MOVX    @R0,A           ;RESET FCA
               = 715 ;
017B B802      = 716           MOV     R0,#EOCIA
017D 23AA      = 717           MOV     A,#0AAH
017F 90        = 718           MOVX    @R0,A           ;WRITE BYTE TO FCA SR
               = 719 ;
0180 27        = 720           CLR     A
0181 B809      = 721           MOV     R0,#09H         ;LOOP COUNTER
0183 468C      = 722           JNT1    TOC50           ;JUMP IF RDATA NOT HIGH TO START WITH
               = 723 ;
0185 3C        = 724 TOC10:    MOVD    P4,A            ;GENERATE A CLKIN*
0186 E7        = 725           RL      A
0187 468A      = 726           JNT1    TOC20           ;JUMP IF RDATA NOT IN ONE STATE
0189 17        = 727           INC     A
018A E885      = 728 TOC20:    DJNZ    R0,TOC10        ;JUMP TO GENERATE 9 CLKIN* PULSES
               = 729 ;
018C D3AA      = 730 TOC50:    XRL     A,#0AAH         ;COMPARE RECEIVED BYTE
018E 6463      = 731           JMP     TOCRET          ;A=0 IF CHECK WAS GOOD
                 732 $         INCLUDE(:F3:PARITY.SRC)
               = 733 ;********************************************************************
               = 734 ;**                       Subroutine Parity                        **
               = 735 ;** Function: From Accumulator, calculate parity bit (7), and place in acc. **
               = 736 ;** Date: 3-4-87                                                   **
               = 737 ;** Subroutines Called: None                                       **
               = 738 ;** Registers/Flags affected: *R3,*R0, Accumulator                 **
               = 739 ;** Ports affected: None                                           **
               = 740 ;** RAM locations affected: None                                   **
               = 741 ;********************************************************************
               = 742 PARITY:
0190 537F      = 743           ANL     A,#7FH          ;CLEAR BIT 7 (PARITY BIT)
0192 D5        = 744           SEL     RB1
0193 B807      = 745           MOV     R0,#7D          ;SET BIT COUNTER
0195 AB        = 746           MOV     R3,A            ;SAVE ACCUMULATOR
0196 E7        = 747 SFTLFT:   RL      A               ;ROTATE LEFT ACCUMULATOR 1 BIT
0197 DB        = 748           XRL     A,R3            ;EXCUSIVE-OR R3 AND ACCUMULATOR
0198 E896      = 749           DJNZ    R0,SFTLFT       ;IF ALL 7 BITS DONE, EXIT ROUTINE
019A 37        = 750           CPL     A
019B 5380      = 751           ANL     A,#80H          ;MASK BITS 6-0.  BIT 7 HAS PARITY.
019D 4B        = 752           ORL     A,R3            ;RESTORE BYTE TO ACCUMULATOR.
               = 753 ;BIT 7 IN ACCUMULATOR NOW REPRESENTS EVEN PARITY OVER BITS 6-0.
019E C5        = 754           SEL     RB0
019F 83        = 755           RET
                 756 $         INCLUDE(:F3:SWSET.SRC)
               = 757 ;********************************************************************
               = 758 ;**                    Subroutine SWSET.SRC                        **
               = 759 ;** Function: Read current scanner configuration from ram to host. **
               = 760 ;**           B5 will show if switch or ram bit is set.            **
               = 761 ;** Date: 3-15-87                                                  **
               = 762 ;** Subroutines Called: SOCIA, PARITY                              **
               = 763 ;** Registers/Flags affected: *R0, *R2, ACCUMULATOR, R0, R3        **
               = 764 ;** Ports affected: None                                           **
               = 765 ;** RAM locations affected: None                                   **
               = 766 ;********************************************************************
               = 767 SWSET:
               = 768 ;SEND HEADER 'G' FIRST
```

```
01A0 2307    = 769           MOV    A,#07H          ;'G' HEADER
01A2 34EB    = 770           CALL   SOCIA           ;SEND BYTE TO HOST
01A4 B908    = 771           MOV    R1,#SWLATC      ;CHECK B5 OF SWITCHES
01A6 81      = 772           MOVX   A,@R1           ; RETRIEVE SWITCH SETTINGS
01A7 5320    = 773           ANL    A,#00100000B    ; MASK OUT ALL BUT BIT 5
01A9 B95F    = 774           MOV    R1,#SWISET      ;SET RAM POINTER TO SWITCH SETTING STORAGE
01AB 41      = 775           ORL    A,@R1           ;RETRIEVE SWITCH SETTING FROM RAM
01AC 4340    = 776           ORL    A,#40H          ;SET LAST BYTE BIT
01AE 3490    = 777           CALL   PARITY          ;SET PARITY BIT (B7)
01B0 34EB    = 778           CALL   SOCIA           ;SEND BYTE TO HOST
01B2 83      = 779           RET
             780 $           INCLUDE(:F3:CKEPRM.SRC)
           = 781 ;***********************************************************************
           = 782 ;**                      Subroutine CKEPRM                            **
           = 783 ;** Function: Clock 8 bits from EEPROM. Result stored in Accumulator  **
           = 784 ;** Date: 3-2-87                                                      **
           = 785 ;** Subroutines Called: None                                          **
           = 786 ;** Registers/Flags affected: R0, Accumulator                         **
           = 787 ;** Ports affected: P1                                                **
           = 788 ;** RAM locations affected: None                                      **
           = 789 ;***********************************************************************
           = 790 CKEPRM:
01B3 8808  = 791             MOV    R0,#8D          ;SET BIT COUNTER
01B5 27    = 792             CLR    A               ;INITIALIZE ACCUMULATOR TO 0
01B6 268A  = 793 CKEPD0: JNT0  RLACC              ;IF EEPROM_DO IS 0, DO NOT SET BIT 7. JUMP TO ROTATE AC
01B8 4380  = 794             ORL    A,#80H          ;EEPROM_DO IS HIGH. SET BIT 7.
01BA E7    = 795 RLACC: RL    A                     ;SHIFT ACCUMULATOR LEFT ONE BIT. (B7-B0)
01BB 8908  = 796             ORL    P1,#EPRMSK      ;CLOCK EEPROM_SK. SET HIGH.
01BD 99F7  = 797             ANL    P1,#255-EPRMSK  ; SET EEPROM_SK LOW.
01BF E886  = 798             DJNZ   R0,CKEPD0       ;DECREMENT BIT COUNTER (R0); WHEN ALL 8 BITS ARE IN ACC.
01C1 83    = 799             RET
             800 $           INCLUDE(:F3:WRACC.SRC)
           = 801 ;***********************************************************************
           = 802 ;**                      Subroutine WRACC                             **
           = 803 ;** Function: Write accumulator to EEPROM                             **
           = 804 ;** Date: 2-26-87                                                     **
           = 805 ;** Subroutines Called: None                                          **
           = 806 ;** Registers/Flags affected: R0, Accumulator, F0, Carry              **
           = 807 ;** Ports affected: P1                                                **
           = 808 ;** RAM locations affected: None                                      **
           = 809 ;***********************************************************************
           = 810 ;F0=0 WHEN ROUTINE IS USED FOR SENDING OP CODE (9 BITS)
           = 811 ;F0=1 WHEN ROUTINE IS USED OFR SENDING DATA BITS (8 BITS)
           = 812 WRACC:
01C2 B6CE  = 813             JF0    DATA            ;IF F0=1 CLOCK OUT 8 DATA BITS
01C4 8809  = 814             MOV    R0,#9D          ;ROUTINE SET TO SEND OP CODE (9 BITS)
01C6 8908  = 815             ORL    P1,#EPRMSK      ;CLOCK EEPROM_SK (SET HIGH)
01C8 99F7  = 816             ANL    P1,#255-EPRMSK  ; SET EEPROM_SK LOW
01CA 97    = 817             CLR    C               ;SET START BIT
01CB A7    = 818             CPL    C               ; STORED IN CARRY FLAG
01CC 24D1  = 819             JMP    SETDI
01CE B808  * 820 DATA:  MOV   R0,#8D                ;ROUTINE SET TO SEND DATA. SET COUNTER TO 8 BITS
01D0 F7    = 821             RLC    A               ;GET MSB INTO CARRY
01D1 F6D7  = 822 SETDI: JC    SETDI1               ;IF CARRY, JUMP TO SET EEPROM_CS
01D3 99FB  = 823             ANL    P1,#255-EPRMDI  ;CARRY NOT SET. SET EEPROM_DI TO '0'
01D5 24D9  = 824             JMP    CLKEPM          ;JUMP TO CLOCK EEPROM_SK
01D7 8904  = 825 SETDI1: ORL  P1,#EPRMDI            ;CARRY SET. SET EEPROM_DI TO '1'
01D9 8908  = 826 CLKEPM: ORL  P1,#EPRMSK            ;CLOCK EEPROM_SK. SET EEPROM_SK HIGH
01DB 99F3  * 827             ANL    P1,#255-EPRMSK-EPRMDI  ;RESET EEPROM_SK AND EEPROM_IN
           = 828 ;
01DD F7    = 829             RLC    A               ;ROTATE LEFT THROUGH CARRY TO GET NEXT BIT
01DE E8D1  * 830             DJNZ   R0,SETDI        ;DECREMENT R0 BIT COUNTER AND JUMP IF NOT 0
01E0 83    = 831             RET
             832 $           INCLUDE(:F3:WAIT.SRC)
           = 833 ;***********************************************************************
           = 834 ;**                      Subroutine WAIT                              **
           = 835 ;** Function: Wait 'A' milli-seconds                                  **
           = 836 ;** Date: 2-26-87                                                     **
           = 837 ;** Subroutines Called: None                                          **
           = 838 ;** Registers/Flags affected: *R1, *R2, ACCUMULATOR                   **
           = 839 ;** Ports affected: None                                              **
           = 840 ;** RAM locations affected: None                                      **
           = 841 ;***********************************************************************
           = 842 Wait:
01E1 D5    = 843             SEL    RB1
01E2 AA    = 844             MOV    R2,A            ;SAVE ACCUMULATOR
01E3 B9C8  = 845 WAIT0: MOV   R1,#200D              ;SET R1 TO EQUAL 1 MILLI-SECOND DELAY
01E5 E9E5  = 846 WAIT1: DJNZ  R1,WAIT1              ;LOOP FOR 1 MILLI-SECOND
01E7 EAE3  * 847             DJNZ   R2,WAIT0        ;LOOP FOR 'A' MILLI-SECONDS
01E9 C5    = 848             SEL    RB0
01EA 83    = 849             RET
             850 $           INCLUDE(:F3:SOCIA.SRC)
           = 851 ;***********************************************************************
           = 852 ;**                      Subroutine SOCIA                             **
           * 853 ;** Function: Send Accumulator to VLSI ocia buffer to be transmitted to host**
           * 854 ;** Date: 3-4-87                                                      **
           = 855 ;** Subroutines Called: None                                          **
           = 856 ;** Registers/Flags affected: *R0, *R2, ACCUMULATOR                   **
           * 857 ;** Ports affected: None                                              **
           = 858 ;** RAM locations affected: None                                      **
           = 859 ;***********************************************************************
           * 860 SOCIA:
```

```
01EB D5         = 861         SEL     RB1             ;SELECT REGISTER BANK 1
01EC AA         = 862         MOV     R2,A            ;SAVE ACCUMULATOR
01ED 0A         = 863 CKSENT: IN      A,P2            ;CHECK VLSI SENTB LINE
01EE 92ED       = 864         JB4     CKSENT          ;IF NOT READY, RE-CHECK VLSI CHIP.
                = 865 ;READY TO SEND BYTE.
01F0 B802       = 866         MOV     R0,#EOCIA       ;SET EXTERNAL ADDRESS POINTER TO VLSI CHIP'S OCIA BUFFER
01F2 FA         = 867         MOV     A,R2            ;RETRIEVE DATA TO BE SENT.
01F3 90         = 868         MOVX    @R0,A           ;SEND DATA TO VLSI CHIP.
01F4 C5         = 869         SEL     RB0
01F5 83         = 870         RET
                  871 ;*************************************
01F6 A3           872 TROPG1: MOVP    A,@A
01F7 83           873         RET
0200              874         ORG     200H
                  875 $       INCLUDE(:F3:TTAG.SRC)
                = 876 ;****************************************************************
                = 877 ; ROUTINE: TTAG  06-19-86 15:30  BOB ACT1S
                = 878 ; UPDATES: MODIFIED 3-17-87 FOR TEC BY RANDY ELLIOTT
                = 879 ; FUNCTION: CHECK DIGITAL LOGIC FOR CAPTURE OF 6 INCREASINGLY
                = 880 ;          LARGER TAGS - 012345 678912 . THE SYMBOL CAPTURE
                = 881 ;          PROCESSING IS USED TO COLLECT THE SEGMENTS FROM THE FCA.
                = 882 ;
0200 FE         = 883 TTATAB: DB      0FEH,9AH,64H,16H,0B7H,0DDH,0ABH
0201 9A         =
0202 64         =
0203 16         =
0204 B7         =
0205 DD         =
0206 AB         =
0207 3A         = 884         DB      3AH,0B9H,42H,0B6H,59H,2EH,03EH
0208 B9         =
0209 42         =
020A B6         =
020B 59         =
020C 2E         =
020D 3E         =
020E B803       = 885 TTAG:   MOV     R0,#EFCRST
0210 90         = 886         MOVX    @R0,A           ;RESET FCA
0211 8901       = 887         ORL     P1,#ETEST       ;TEST CONTROL ACTIVE
0213 B800       = 888         MOV     R0,#LOW TTATAB  ; R0 POINTS TO CHAR GEN TABLE
0215 BE06       = 889         MOV     R6,#06H ;THIS ROUTINE CHECKS DIGITAL LOGIC
0217 BF06       = 890         MOV     R7,#06H ;FOR CAPTURE OF 6 INCREASINGLY LARGER
0219 B908       = 891         MOV     R1,#08H ;TAGS 012345 678912..................
021B BB0E       = 892         MOV     R3,#0EH ;UNPACK DATA CONSTANT
021D F8         = 893 UNPK1:  MOV     A,R0
021E BA04       = 894         MOV     R2,#04H ;UNPACK DATA CONSTANT
0220 A3         = 895         MOVP    A,@A
0221 AC         = 896         MOV     R4,A    ;TEMP STORE
0222 5301       = 897 UNPK2:  ANL     A,#01H  ;STRIP OUT ONE BIT
0224 E7         = 898         RL      A
0225 17         = 899         INC     A
0226 47         = 900         SWAP    A
0227 AD         = 901         MOV     R5,A
0228 FC         = 902         MOV     A,R4
0229 77         = 903         RR      A
022A AC         = 904         MOV     R4,A
022B 5301       = 905         ANL     A,#01H
022D E7         = 906         RL      A
022E 17         = 907         INC     A
022F 6D         = 908         ADD     A,R5
0230 A1         = 909         MOV     @R1,A
0231 19         = 910         INC     R1
0232 FC         = 911         MOV     A,R4
0233 77         = 912         RR      A
0234 AC         = 913         MOV     R4,A
0235 EA22       = 914         DJNZ    R2,UNPK2
0237 18         = 915         INC     R0
0238 EB1D       = 916         DJNZ    R3,UNPK1
                = 917 ;
                = 918 ;   SETUP TEST BIT ON PORT 1
                = 919 ;
023A 2391       = 920         MOV     A,#ETEST+ELASDB+ETONE
023C 39         = 921         OUTL    P1,A
                = 922 ;
023D BB02       = 923         MOV     R3,#02H
023F BD06       = 924         MOV     R5,#06H
0241 BA38       = 925 TEST1:  MOV     R2,#38H ;START TAG POINTER
0243 B83F       = 926         MOV     R0,#3FH
0245 FD         = 927 TEST2:  MOV     A,R5    ;START TAG OUTPUT
0246 68         = 928         ADD     A,R3
0247 AC         = 929         MOV     R4,A
0248 EC48       = 930 TEST3:  DJNZ    R4,TEST3
024A F0         = 931         MOV     A,@R0
                = 932 ;
024B 3251       = 933         JB1     TST31   ;JUMP = SEND SPACE
024D 99FD       = 934         ANL     P1,#0FFH-ETMARK
024F 4455       = 935         JMP     TST32
0251 8902       = 936 TST31:  ORL     P1,#ETMARK
0253 00         = 937         NOP
0254 00         = 938         NOP
                = 939 ;
0255 FD         = 940 TST32:  MOV     A,R5
```

```
0256 6B       = 941           ADD    A,R3
0257 AC       = 942           MOV    R4,A
0258 EC58     = 943 TEST4:    DJNZ   R4,TEST4
025A F0       = 944           MOV    A,@R0
              = 945 ;
025B 47       = 946           SWAP   A
025C 3262     = 947           JB1    TST41     ;JUMP = SEND SPACE
025E 99FD     = 948           ANL    P1,#0FFH-ETMARK
0260 4466     = 949           JMP    TST42
0262 8902     = 950 TST41:    ORL    P1,#ETMARK
0264 00       = 951           NOP
0265 00       = 952           NOP
              = 953 ;
0266 C8       = 954 TST42:    DEC    R0
0267 EA45     = 955           DJNZ   R2,TEST2   ;END OF TAG
0269 ED41     = 956           DJNZ   R5,TEST1   ;END OF ALL TAGS
              = 957 ;
026B F5       = 958           SEL    MB1
026C 1400     = 959           CALL   CLR6SG     ;CLEAR 6 CHAR SEG BUFFS & COUNTERS
026E E5       = 960           SEL    MB0
              = 961 ;
026F BE18     = 962           MOV    R6,#24     ;SHOULD BE ONLY 12 SEGS, TRY FOR MORE
0271 FC       = 963           MOV    A,R4
0272 4301     = 964           ORL    A,#ESCNG   ;SET SCAN FLAG SO CKFCA WILL
0274 AC       = 965           MOV    R4,A       ;PUT SEGMENTS INTO THE SCAN BUFF
0275 F5       = 966 GETLUP:   SEL    MB1
0276 14AF     = 967           CALL   CKFCA      ;GET SEG, IF ANY, FROM FCA
0278 5433     = 968           CALL   PROCSG     ;PUT SEG, IF ANY, INTO SEG BUFF
027A E5       = 969           SEL    MB0
027B EE75     = 970           DJNZ   R6,GETLUP  ;GO CHECK FOR MORE SEGMENTS
              = 971 ;
027D 85       = 972           CLR    F0         ;SETUP FOR RIGHT HALF LOOP
027E B82C     = 973           MOV    R0,#L6SCNT
0280 F0       = 974 TCKCNT:   MOV    A,@R0      ;GET L OR R COUNT
0281 18       = 975           INC    R0
0282 60       = 976           ADD    A,@R0      ;GET L OR R TOTAL
0283 03F4     = 977           ADD    A,#-12
0285 96A7     = 978           JNZ    TTA90      ;JUMP IF X6SCNT+X6STOT<>12
              = 979 ;
0287 B834     = 980           MOV    R0,#R6SCNT
0289 95       = 981           CPL    F0
028A B680     = 982           JF0    TCKCNT     ;JUMP TO DO RIGHT HALF
              = 983 ;
028C BA04     = 984           MOV    R2,#4      ;4 BYTES TO COMPARE
028E B824     = 985           MOV    R0,#L6S1
0290 B9A9     = 986           MOV    R1,#LOW TTACHK ;DATA CHECK TABLE
0292 F9       = 987 LOOPCK:   MOV    A,R1
0293 A3       = 988           MOVP   A,@A
0294 D0       = 989           XRL    A,@R0
0295 96A7     = 990           JNZ    TTA90      ;JMP IF BAD CHECK OF DATA
              = 991 ;
0297 18       = 992           INC    R0
0298 19       = 993           INC    R1
0299 EA92     = 994           DJNZ   R2,LOOPCK
              = 995 ;
029B B82E     = 996           MOV    R0,#R6S1
029D BA03     = 997           MOV    R2,#3      ;3 BYTES TO COMPARE
029F 95       = 998           CPL    F0
02A0 B692     = 999           JF0    LOOPCK     ;JUMP TO DO RIGHT HALF
              =1000 ;
02A2 B87F     =1001           MOV    R0,#7FH    ;LOOP COUNTER, RAM SIZE
02A4 A0       =1002 CLRRAM:   MOV    @R0,A      ;A=0 AT THIS POINT, TEST PASSED
02A5 E8A4     =1003           DJNZ   R0,CLRRAM  ;CLEAR ALL RAM AFTER TESTING
              =1004 ;
02A7 646B     =1005 TTA90:    JMP    TTARET     ;A=0 FOR SUCCESFUL COMPLETION
              =1006 ;
02A9 01       =1007 TTACHK:   DB     01H,23H,45H,0CH
02AA 23       =
02AB 45       =
02AC 0C       =
02AD 67       =1008           DB     67H,89H,12H
02AE 89       =
02AF 12       =
              1009 $    INCLUDE(:F3:RDEPRM.SRC)
              =1010 ;*********************************************************************
              =1011 ;**              Subroutine RDEPRM                                   **
              =1012 ;** Function: Read EEPROM and store at starting address @R1 (Packed Data) **
              =1013 ;** Date: 3-3-87                                                     **
              =1014 ;** Subroutines Called: WRACC, CKEPRM                                **
              =1015 ;** Registers/Flags affected: R0, Accumulator, F0, Carry, R1, R2, R3 **
              =1016 ;** Ports affected: P1, P2                                           **
              =1017 ;** RAM locations affected: @R1 to @R1+16                            **
              =1018 ;*********************************************************************
              =1019 ;R1 stores Ram location to start writing to upon entry into this routine.
              =1020 RDEPRM:
              =1021 ;INITIALIZE REGISTERS AND PORTS
02B0 BB08     =1022           MOV    R3,#8      ;SET 'LABEL SET' COUNTER TO 8
02B2 BA80     =1023           MOV    R2,#OPREAD ;SET OPCODE TO READ
02B4 8A80     =1024 SETCS:    ORL    P2,#EPRMCS ;SET EEPROM_CS HIGH
              =1025 ;SEND OPCODE TO READ DATA
02B6 85       =1026           CLR    F0         ;SET F0=0 FOR OPCODE TO WRITE
02B7 FA       =1027           MOV    A,R2       ;PUT OPCODE AND ADDRESS IN ACCUMULATOR
```

```
0288 34C2    =1028          CALL   WRACC              ;SEND OPCODE/ADDRESS TO EEPROM
             =1029 ;GET RID OF START BIT. CLOCK SK.
028A 8908    =1030          ORL    P1,#EPRMSK         ;SET EEPROM_SK HIGH
028C 99F7    =1031          ANL    P1,#255-EPRMSK     ;SET EEPROM_SK LOW
             =1032 ;RETRIEVE BITS 15-8 FROM EEPROM (LABEL 1)
028E 3483    =1033          CALL   CKEPRM             ;CLOCK MOST SIGNIFICANT 8 BITS FROM EEPROM
             =1034 ;STORE BITS 15-8 TO RAM @R1 (LABEL 1)
02C0 A1      =1035          MOV    @R1,A              ;STORE ACCUMULATOR TO RAM @R1
02C1 19      =1036          INC    R1                 ;INCREMENT RAM POINTER TO NEXT LOCATION
             =1037 ;RETRIEVE BITS 7-0 FROM EEPROM (LABEL 2)
02C2 3483    =1038          CALL   CKEPRM             ;CLOCK LEAST SIGNIFICANT 8 BITS FROM EEPROM
02C4 A1      =1039          MOV    @R1,A              ;STORE ACCUMULATOR TO RAM @R1
             =1040 ;SET EEPROM_CS LOW AND ADJUST COUNTERS AND POINTERS
02C5 9A7F    =1041          ANL    P2,#255-EPRMCS     ;SET EEPROM_CS LOW
02C7 19      =1042          INC    R1                 ;INCREMENT RAM POINTER
02C8 1A      =1043          INC    R2                 ;INCREMENT EEPROM POINTER
02C9 EBB4    =1044          DJNZ   R3,SETCS           ;DECREMENT LABEL SET COUNTER. IF ZERO, RETURN.
02CB 83      =1045          RET
              1046 $        INCLUDE(:F3:DISLAS.SRC)
             =1047 ;*************************************************************
             =1048 ;**              Subroutine DISLAS                          **
             =1049 ;** Function: Clear scan buffer ram and reset VLSI          **
             =1050 ;** Date: 3-14-87                                           **
             =1051 ;** Subroutines Called: None                                **
             =1052 ;** Registers/Flags affected: R4, R1, Accumulator           **
             =1053 ;** Ports affected: P1                                      **
             =1054 ;** RAM locations affected: Version flags and scan buffers  **
             =1055 ;*************************************************************
             =1056 DISLAS:
02CC 999F    =1057          ANL    P1,#255-EGDLT-EBDLT ;TURN OFF GDLT AND BDLT
02CE FC      =1058          MOV    A,R4               ;RETRIEVE SCANNING STATUS
02CF 5304    =1059          ANL    A,#EAMBMS          ;MASK ALL BUT AMBIGUITY ENABLE BIT
02D1 AC      =1060          MOV    R4,A               ;DISABLE SCANNING
             =1061 ;CLEAR VLSI CHIP (GET RID OF LEFT OVER DATA FROM HOST)
02D2 8903    =1062          MOV    R1,#EFCRST         ;VLSI RESET ADDRESS
02D4 91      =1063          MOVX   @R1,A              ; RESET VLSI CHIP
02D5 44E6    =1064          JMP    RAMRT
             =1065 ENLAS:
02D7 999F    =1066          ANL    P1,#255-EGDLT-EBDLT ;TURN OFF GDLT AND BDLT
02D9 8901    =1067          MOV    R1,#EFRRST         ;RESET FRAME CONTROL (SDATA REGISTER)
02DB 91      =1068          MOVX   @R1,A
02DC FC      =1069          MOV    A,R4               ;RETRIEVE SCANNING STATUS
02DD 4301    =1070          ORL    A,#ESCNG           ;ENABLE SCANNING
02DF AC      =1071          MOV    R4,A               ;SAVE SCANNING STATUS
02E0 F5      =1072          SEL    MB1
02E1 B412    =1073          CALL   CLRVER             ;CLEAR VERSION FLAGS AND DATA
02E3 1420    =1074          CALL   CLRSNB             ;CLEAR SCANNER BUFFERS
02E5 E5      =1075          SEL    MB0
             =1076 ;ALL SCANNER BUFFER RAM CLEARED ALONG WITH SCANNER FLAGS. RETURN.
02E6 8920    =1077 RAMRT:   ORL    P1,#EGDLT          ;TURN ON GDLT FOR .5 SECONDS
02E8 83      =1078          RET
              1079 ;****************************************
02E9 A3       1080 TROPG2:  MOVP   A,@A
02EA 83       1081          RET
              1082          ORG    300H
0300          1083 $        INCLUDE(:F3:TMOTOR.SRC)
             =1084 ;*************************************************************
             =1085 ; FILE: TMOTOR.SRC 2-18-87 10:50  BOB ACTIS
             =1086 ; FUNCTION: TEST THE MOTOR AND UP2SPD SIGNAL
             =1087 ; ENTRY: NO SETUP
             =1088 ; EXIT:  USES R3,R7
             =1089 ;
0300 8912    =1090 TMOTOR:  ORL    P1,#ELASDB+EMTREB  ;LASER OFF, MOTOR ON
0302 55      =1091          STRT   T
0303 25      =1092          EN     TCNTI              ;ENABLE THE TIMER
             =1093 ;
0304 BF0A    =1094          MOV    R7,#(5*FACTOR)     ;SET TIMER FOR 100MSEC
0306 FF      =1095 TMOT10:  MOV    A,R7
0307 9606    =1096          JNZ    TMOT10             ;WAIT FOR MOTOR CIRCUIT TO POWER UP
             =1097 ;
0309 0A      =1098          IN     A,P2
030A 37      =1099          CPL    A
030B B231    =1100          JB5    TMOT50             ;JUMP IF NOT UP2SPD
             =1101 ;
             =1102 ; MOTOR OFF AND WAIT FOR IT TO SLOW. FLASH BOTH LIGHTS.
030D 99FD    =1103          ANL    P1,#255-EMTREB     ;MOTOR OFF
030F BB32    =1104 TMOT20:  MOV    R3,#50             ;SET LOOP COUNTER
0311 BF0A    =1105 TMOT22:  MOV    R7,#(5*FACTOR)     ;SET TIMER FOR 100MSEC
0313 1448    =1106 TMOT24:  CALL   CK4HRS             ;CHECK FOR HORSE CONTROL BYTE
0315 FF      =1107          MOV    A,R7               ;10MSEC*10*50=5SEC
0316 9613    =1108          JNZ    TMOT24             ;WAIT BETWEEN LIGHT TOGGLES
             =1109 ;
0318 CB      =1110          DEC    R3                 ;DECREMENT LOOP COUNTER
0319 FB      =1111          MOV    A,R3
031A C625    =1112          JZ     TMOT28             ;JUMP IF FINISHED WAITING
             =1113 ;
031C 09      =1114          IN     A,P1
031D 999F    =1115          ANL    P1,#255-(EGDLT+EBDLT) ;LIGHTS OFF
031F B211    =1116          JB5    TMOT22             ;JUMP IF GDLT WAS ON
             =1117 ;
0321 8960    =1118          ORL    P1,#EGDLT+EBDLT    ;LIGHTS ON
```

```
0323 6411      =1119         JMP     TMOT22
               =1120 ;
0325 999F      =1121 TMOT28: ANL     P1,#255-(EGDLT+EBDLT)  ;LIGHTS OFF
               =1122 ;
0327 8902      =1123         ORL     P1,#EMTREB      ;MOTOR ON
0329 BF0A      =1124         MOV     R7,#(5*FACTOR)          ;SET TIMER FOR 100 MSEC
032B FF        =1125 TMOT40: MOV     A,R7
032C 962B      =1126         JNZ     TMOT40          ;WAIT FOR MOTOR CIRCUIT TO POWER UP
               =1127 ;
032E 0A        =1128         IN      A,P2
032F B24A      =1129         JB5     TMOT90          ;JUMP IF ALREADY UP2SPD ... FAILED
               =1130 ;
               =1131 ; WAIT 30 SECONDS FOR THE MOTOR TO GET UP2SPD.  FLASH GREEN LIGHT.
0331 BBFA      =1132 TMOT50: MOV     R3,#250         ;SET LOOP COUNTER
0333 BF0C      =1133 TMOT60: MOV     R7,#(6*FACTOR)          ;SET TIMER FOR 120 MSEC
0335 1448      =1134 TMOT80: CALL    CK4HRS          ;CHECK FOR HORSE CONTROL BYTE
0337 FF        =1135         MOV     A,R7            ;10MS*12*250=30SEC
0338 9635      =1136         JNZ     TMOT80          ;WAIT BETWEEN LIGHT TOGGLES
               =1137 ;
033A 0A        =1138         IN      A,P2
033B B24F      =1139         JB5     TMOT95          ;JUMP IF MOTOR IS UP2SPD ... PASSED
               =1140 ;
033D CB        =1141         DEC     R3              ;DECREMENT LOOP COUNTER
033E FB        =1142         MOV     A,R3
033F C64A      =1143         JZ      TMOT90          ;JUMP IF TIMED OUT ... FAILED
               =1144 ;
0341 09        =1145         IN      A,P1            ;TOGGLE GDLT WHILE WAITING FOR UP2SPD
0342 990F      =1146         ANL     P1,#255-EGDLT   ;GDLT OFF
0344 B233      =1147         JB5     TMOT60          ;JUMP IF GDLT WAS ON
               =1148 ;
0346 8920      =1149         ORL     P1,#EGDLT       ;GDLT ON
0348 6433      =1150         JMP     TMOT60          ;CONTINUE WAITING FOR UP2SPD
               =1151 ;
               =1152 ; COME HERE IF THE TEST FAILED
034A 99FD      =1153 TMOT90: ANL     P1,#255-EMTREB  ;MOTOR OFF
034C 27        =1154         CLR     A
034D 37        =1155         CPL     A               ;SET FAILED FLAG
034E 83        =1156         RET
               =1157 ;
               =1158 ; COME HERE IS THE TEST PASSED
034F 27        =1159 TMOT95: CLR     A               ;SET PASSED FLAG
0350 83        =1160         RET
                1161 $       INCLUDE(:F3:TPON.SRC)
               =1162 ;********************************************************
               =1163 ; FILE: TPON.SRC  7-03-86 10:45  BOB ACTIS
               =1164 ; FUNCTION: PERFORM SELF-TESTS
               =1165 ;
0351 2400      =1166 TPON:   JMP     TROMSM
               =1167 TRORET:
               =1168 ;******************CHECKSUM OF ROM CHECKED HERE******************
0353 C659      =1169         JZ      TPON20          ;JUMP IF THE CHECKSUM PASSED
0355 B800      =1170         MOV     R0,#0           ;NO BEEPS WITH THIS ERROR
0357 647D      =1171         JMP     TPON90
               =1172 ;****************************************************************
0359 2431      =1173 TPON20: JMP     TRAM
035B C661      =1174 TRARET: JZ      TPON30          ;JUMP IF THE RAM TEST PASSED
035D B801      =1175         MOV     R0,#1           ;ONE BEEP FOR THIS ERROR
035F 647D      =1176         JMP     TPON90
               =1177 ;
0361 2476      =1178 TPON30: JMP     TOCIA
0363 C669      =1179 TOCRET: JZ      TPON40          ;JUMP IF THE OCIA TEST PASSED
0365 B802      =1180         MOV     R0,#2           ;TWO BEEPS FOR THIS ERROR
0367 647D      =1181         JMP     TPON90
               =1182 ;
0369 440E      =1183 TPON40: JMP     TTAG
036B 99FC      =1184 TTARET: ANL     P1,#255-(ETEST+ETMARK)  ;CLEAR TEST AND TEST MARK LINES
036D C673      =1185         JZ      TPON50          ;JUMP IF THE TTAG TEST PASSED
036F B803      =1186         MOV     R0,#3           ;THREE BEEPS FOR THIS ERROR
0371 647D      =1187         JMP     TPON90
               =1188 ;
0373 7400      =1189 TPON50: CALL    TMOTOR
0375 C67B      =1190         JZ      TPON60          ;JUMP IF THE MOTOR TEST PASSED
0377 B804      =1191         MOV     R0,#4           ;FOUR BEEPS FOR THIS ERROR
0379 647D      =1192         JMP     TPON90
               =1193 ;
037B 6487      =1194 TPON60: JMP     TPORET          ;RETURN FROM THE POWER UP TESTS
               =1195 ;
037D 7481      =1196 TPON90: CALL    TERRWT          ;ERRORS COME HERE
037F 0400      =1197         JMP     RSTTRP          ;RESTART THE PROGRAM
                1198 $       INCLUDE(:F3:TERRWT.SRC)
               =1199 ;****************************************************************
               =1200 ; FILE: TERRWT.SRC  2-18-87 10:50  BOB ACTIS
               =1201 ; FUNCTION: SELFTEST ERROR ROUTINE
               =1202 ;           BEEP R0 TIMES AND WAIT 1 SECOND
               =1203 ; ENTRY: R0 = NUMBER OF BEEPS
               =1204 ; EXIT: USES R0, R7
               =1205 ;
0381 990F      =1206 TERRWT: ANL     P1,#255-EGDLT   ;GDLT OFF
0383 8940      =1207         ORL     P1,#EBDLT       ;BDLT ON
               =1208 ;
0385 55        =1209         STRT    T
0386 25        =1210         EN      TCNTI           ;ENABLE THE TIMER OPERATION
               =1211 ;
```

```
0387 F8      =1212 TERR02: MOV    A,R0
0388 C69A    =1213         JZ     TERR10          ;JUMP IF NO BEEPS
             =1214 ;
038A D5      =1215 TERR04: SEL    RB1
038B BD14    =1216         MOV    R5,#ETONCT      ;SET THE TONE CYCLE COUNTER
038D BE04    =1217         MOV    R6,#(2*FACTOR)            ;SET BEEP TIMER FOR 40 MSEC
038F FE      =1218 TERR06: MOV    A,R6
0390 968F    =1219         JNZ    TERR06          ;WAIT FOR BEEP TO END
0392 C5      =1220         SEL    RB0
             =1221 ;
0393 BF06    =1222         MOV    R7,#(3*FACTOR)            ;SET TIMER FOR 60 MSEC
0395 FF      =1223 TERR08: MOV    A,R7
0396 9695    =1224         JNZ    TERR08          ;WAIT BETWEEN BEEPS
             =1225 ;
0398 E88A    =1226         DJNZ   R0,TERR04       ;BEEP LOOP
             =1227 ;
039A BF64    =1228 TERR10: MOV    R7,#(E1000M*FACTOR)       ;SET TIMER FOR 1 SECOND
039C FF      =1229 TERR12: MOV    A,R7
039D 969C    =1230         JNZ    TERR12
             =1231 ;
039F B903    =1232         MOV    R1,#EFCRST                ;RESET VLSI CHIP TO GET RID OF GARBAGE.
03A1 91      =1233         MOVX   @R1,A
03A2 83      =1234         RET
             1235 $        INCLUDE(:F3:FPOWUP.SRC)
             =1236 ;**********************************************************************
             =1237 ; FILE:    FPOWUP.SRC   02-18-87 11:25  BOB ACTIS
             =1238 ; ROUTINE: POWUP
             =1239 ; FUNCTION: INITIALIZE SYSTEM
             =1240 ; UPDATES:  3-17-87 MODIFIED FOR TEC BY RANDY ELLIOTT
             =1241 ;
03A3 93      =1242 POW00:  RETR                   ;RESET THE IIP FLIP-FLOP
03A4         =1243 POWUP   EQU    $
03A4 15      =1244         DIS    I
03A5 35      =1245         DIS    TCNTI
03A6 27      =1246         CLR    A
03A7 D7      =1247         MOV    PSW,A
03A8 74A3    =1248         CALL   POW00           ;RESET IIP BIT
             =1249 ;
             =1250 ; SETUP PORTS
             =1251 ;
03AA 233F    =1252         MOV    A,#255-EVLSIR-EPRMCS      ;PWR RST THE VLSI AND CLEAR EEPROM_CS
03AC 3A      =1253         OUTL   P2,A
03AD 8A40    =1254         ORL    P2,#EVLSIR      ;ENABLE VLSI TO RUN
03AF 2390    =1255         MOV    A,#ETONE+ELASDB
03B1 39      =1256         OUTL   P1,A
             =1257 ;
             =1258 ; RESET THE FRAME CONTROL ARRAY
             =1259 ;
03B2 8803    =1260         MOV    R0,#EFCRST
03B4 90      =1261         MOVX   @R0,A
             =1262 ;
             =1263 ; GO PERFORM THE POWER UP TESTS.
             =1264 ; STICK IN TPON LOOP IF ANY FAILURES.
             =1265 ;
03B5 6451    =1266         JMP    TPON
03B7         =1267 TPORET  EQU    $
             =1268 ;
             =1269 ; CLEAR DATA MEMORY AND PSW
03B7 27      =1270         CLR    A
03B8 D7      =1271         MOV    PSW,A
03B9 887F    =1272         MOV    R0,#7FH
03BB A0      =1273 POW10:  MOV    @R0,A
03BC E8BB    =1274         DJNZ   R0,POW10
             =1275 ;
             =1276 ; START THE INTERNAL TIMER
             =1277 ;
03BE D5      =1278         SEL    RB1
             =1279 ;SET THE TONE CYCLE COUNTER
03BF B4AF    =1280         CALL   TON1CT          ;SET R5 ACCORDING TO SWITCH SETTINGS
03C1 C5      =1281         SEL    RB0
03C2 55      =1282         STRT   T
03C3 25      =1283         EN     TCNTI
             =1284 ;
             =1285 ; GOOD LIGHT, GOOD POWER UP TONE, LASER ON AND WAIT 1 SEC.
             =1286 ;
03C4 8920    =1287         ORL    P1,#EGDLT
03C6 D5      =1288         SEL    RB1
03C7 BE14    =1289         MOV    R6,#(10*FACTOR)           ;200MSEC TONE
03C9 C5      =1290         SEL    RB0
03CA 99EF    =1291         ANL    P1,#255-ELASDB  ;LASER ON, TIME TO START BEFORE RDTAG
03CC BF64    =1292         MOV    R7,#(E1000M*FACTOR)
03CE FF      =1293 TPON15: MOV    A,R7
03CF 96CE    =1294         JNZ    TPON15          ;WAIT
             =1295 ;
             =1296 ; REINITIALIZE AFTER TEST SEQUENCE
             =1297 ;
03D1 99CF    =1298 POW20:  ANL    P1,#255-(EGDLT+ELASDB)  ;GOOD LIGHT OFF & LASER ON
03D3 8942    =1299         ORL    P1,#EBDLT+EMTREB        ;BAD LIGHT ON & MOTOR ON
             =1300 ;
03D5 B803    =1301         MOV    R0,#EFCRST
03D7 90      =1302         MOVX   @R0,A           ;RESET THE FCA
03D8 BF04    =1303         MOV    R7,#(2*FACTOR)            ;SET TIMER FOR 40 MSEC
```

```
03DA FF      =1304 POW25:  MOV    A,R7
03DB 960A    =1305         JNZ    POW25          ;WAIT FOR FCA TO SEE SEGS IF ANY
             =1306 ;
             =1307 ; CLEAR DATA MEMORY AND PSW
03DD 27      =1308         CLR    A
03DE D7      =1309         MOV    PSW,A
03DF B87F    =1310         MOV    R0,#7FH
03E1 A0      =1311 POW30:  MOV    @R0,A
03E2 E8E1    =1312         DJNZ   R0,POW30
             =1313 ;
03E4 D5      =1314         SEL    RB1
             =1315 ;SET TONE CYCLE COUNTER
03E5 B4AF    =1316         CALL   TON1CT         ;SET R5 ACCORDING TO SWITCH SETTING
03E7 C5      =1317         SEL    RB0
             =1318 ;
             =1319 ;LOAD EEPROM TO RAM FOR TWO LABEL READ.
03E8 B961    =1320         MOV    R1,#TWOLAB     ;SET RAM POINTER
03EA 54B0    =1321         CALL   RDEPRM         ;TRANSFER EEPROM TO RAM
             =1322 ;LOAD SWITCH SETTINGS TO RAM
03EC B908    =1323         MOV    R1,#SWLATC     ;SET POINTER TO READ SWITCHES
03EE B85F    =1324         MOV    R0,#SWISET     ;SET RAM POINTER TO SWITCH SETTINGS
03F0 81      =1325         MOVX   A,@R1          ;READ SWITCHES
03F1 53DF    =1326         ANL    A,#11011111B   ;MASK OUT B5, FLAG PROGRAMMING VIA LABLE READ.
03F3 A0      =1327         MOV    @R0,A          ;STORE SWITCH SETTINGS IN RAM.
             =1328 ;INITIALIZATION DONE.  BEGIN READING TAGS.
03F4 F5      =1329         SEL    MB1
03F5 E400    =1330         JMP    RDTAG
             =1331 ;**************************************
03F7 A3      =1332 TROPG3: MOVP   A,@A
03F8 83      =1333         RET
0400         =1334         ORG    400H
             =1335 $       INCLUDE(:F3:HORSE1.SRC)
             =1336 ;********************************************************************
             =1337 ; FILE: HORSE1.SRC    HORSE TEST PART 1 OF 3.
             =1338 ; 07-03-86 09:05 BOB ACTIS
             =1339 ;
             =1340 ; ROUTINE: THORSE
             =1341 ;
             =1342 ;       HORSE TEST (HOST ORIGINATED SEGMENT EVALUATION) WILL RECEIVE
             =1343 ;       TEST TAG DEFINITION FROM HOST, COUNT THE NUMBER OF TIMES IT
             =1344 ;       'SEES' EACH SEGMENT OF THE TAG AND THEN SEND THE COUNT
             =1345 ;       INFORMATION TO THE HOST....REMAINS IN HORSE TEST UNTIL
             =1346 ;       DSATA=0, OR POWER RESET.
             =1347 ;
             =1348 ; BYTE DEFINITION
             =1349 ;
             =1350 ; TEST CONTROL BYTE = D1H
             =1351 ; THHDR = COUNT HEADER BYTE = 15H (AFTER PARITY INSERT = 95H)
             =1352 ; THTRLR = COUNT TRAILER BYTE = 2AH (AFTER PARITY INSERT = 6AH)
             =1353 ;
0400 85      =1354 THO00:  CLR    F0             ;F0 INDICATES CONTROL BYTE RECEIVED IF ON
0401 A5      =1355         CLR    F1             ;F1 ON INDICATES ODD BYTE RECEIVED
0402 B830    =1356         MOV    R0,#TSEG1      ;R0=SEG TABLE POINTER
0404 BB10    =1357         MOV    R3,#16         ;R3=LOOP COUNTER TO RECEIVE 16 DATA CHAR'S
0406 999F    =1358         ANL    P1,#255-(EGDLT+EBDLT)  ;LIGHTS OFF
0408 8910    =1359         ORL    P1,#ELASDB     ;LASER OFF
040A 860E    =1360 THO05:  JNI    THO10          ;JMP IF FCA HAS DATA
040C 840A    =1361         JMP    THO05
             =1362 ;
             =1363 ;       FETCH DATA FROM FCA, DO FRAME RESET TO FCA, FETCH COMM DATA
             =1364 ;       IF BIT 7 SET, JMP TO POWER UP RESET IF COMM DATA=0.
             =1365 ;
040E B901    =1366 THO10:  MOV    R1,#01H
0410 81      =1367         MOVX   A,@R1          ;READ FCA S.R.
0411 91      =1368         MOVX   @R1,A          ;DO FCA FRAME RESET
0412 37      =1369         CPL    A
0413 F20A    =1370         JB7    THO05          ;RETURN IF FCA DOES NOT HAVE COMMM DATA
             =1371 ;
             =1372 ;       OTHERWISE, FETCH COMM DATA
             =1373 ;
0415 19      =1374         INC    R1             ;TO 02H TO READ COMM REG
0416 81      =1375         MOVX   A,@R1          ;READ FCA COMM REG
0417 A9      =1376         MOV    R1,A           ;R1=COMM DATA
0418 961C    =1377         JNZ    THO14          ;JMP IF DATA NOT=0
041A 0400    =1378 THO12:  JMP    RSTTRP         ;JMP TO POWER UP RESET IF COMM DATA=0
             =1379 ;
041C B40E    =1380 THO14:  CALL   CPARTY         ;CPARTY WILL CHK FOR CORRECT PARITY
041E 17      =1381         INC    A
041F 9600    =1382         JNZ    THO00          ;JMP BACK TO START IF INCORRECT PARITY
0421 F9      =1383         MOV    A,R1           ;R1=COMM DATA
0422 B62D    =1384         JF0    THO15          ;JMP IF CONTROL BYTE ALREADY RECEIVED
             =1385                               ;OTHERWISE, CHECK FOR CONTROL BYTE=D1H
0424 D3D1    =1386         XRL    A,#0D1H
0426 9600    =1387         JNZ    THO00          ;JMP BACK TO START IF NOT CONTROL BYTE
0428 95      =1388         CPL    F0             ;SET F0=1 TO INDICATE CONTROL BYTE RCVD
0429 8940    =1389         ORL    P1,#EBDLT      ;BD-LT ON SAYS CNTL BYTE RCVD
042B 840A    =1390         JMP    THO05          ;BACK TO THO05 TO GET 16 DATA BYTES
             =1391 ;
             =1392 ;       PUT EVEN BYTES IN HIGH NIBBLE & ODD BYTES IN LOW NIBBLE
             =1393 ;
042D F9      =1394 THO15:  MOV    A,R1           ;R1=COMM DATA
042E 7634    =1395         JF1    THO20          ;JMP IF THIS IS ODD BYTE
```

```
0430 47       =1396            SWAP    A
0431 A0       =1397            MOV     @R0,A        ;PUT EVEN BYTE IN HIGH NIBBLE
0432 8436     =1398            JMP     THO29
0434 30       =1399 THO20:     XCHD    A,@R0        ;PUT ODD BYTE IN LOW NIBBLE
0435 18       =1400            INC     R0           ;INC R0 TO NEXT SEG TABLE ADDRESS
              =1401 ;
              =1402 ; CHECK FOR LAST BYTE OF CONTROL BYTE
              =1403 ;
0436 B5       =1404 THO29:     CPL     F1
0437 F9       =1405            MOV     A,R1
0438 9200     =1406            JB4     THO00        ;JMP = CONTROL BYTE
043A B240     =1407            JB5     THO30        ;JMP = LAST BYTE RCVD
043C EB0A     =1408            DJNZ    R3,THO05     ;JMP = MORE TO COME
043E 8400     =1409            JMP     THO00
              =1410 ;
              =1411 ; IF 16 BYTES RECEIVED, PERFORM TEST
              =1412 ;
0440 EB00     =1413 THO30:     DJNZ    R3,THO00     ;JMP = NOT 16 BYTES
0442 9462     =1414            CALL    TSCNT        ;GO COLLECT SEGMENTS
              =1415 ;
              =1416 ; SEND HEADER, COUNTS AND LAST BYTE TO COMPUTER
              =1417 ;
0444 B915     =1418            MOV     R1,#15H      ;SEND COUNT HEADER BYTE TO HOST
0446 B400     =1419            CALL    THSND        ;SEND HEADER
              =1420 ;
0448 BB08     =1421            MOV     R3,#8
044A B838     =1422            MOV     R0,#TCNT1    ;R0=COUNT POINTER
044C FB       =1423 THO50:     MOV     A,R3
044D 1253     =1424            JB0     THO55        ;JMP = ODD BYTE
044F F0       =1425            MOV     A,@R0
0450 47       =1426            SWAP    A
0451 8455     =1427            JMP     THO59
0453 30       =1428 THO55:     XCHD    A,@R0
0454 18       =1429            INC     R0
0455 530F     =1430 THO59:     ANL     A,#0FH
0457 A9       =1431            MOV     R1,A
0458 B400     =1432            CALL    THSND
045A EB4C     =1433            DJNZ    R3,THO50
              =1434 ;
045C B92A     =1435            MOV     R1,#2AH      ;2AH = COUNT TRAILER BYTE
045E B400     =1436            CALL    THSND        ;SEND TRAILER BYTE
0460 8400     =1437            JMP     THO00        ;FINISHED WITH THIS REQUEST, START OVER.
               1438 $          INCLUDE(:F3:HORSE2.SRC)
              =1439 ;****************************************************************
              =1440 ; FILE: HORSE2.SRC  HORSE TEST PART 2 OF 3.
              =1441 ; 11-18-86 13:50 BOB ACTIS
              =1442 ;
              =1443 ; ROUTINE: TSCNT - COUNT TEST SEGMENTS
              =1444 ;
              =1445 ; FUNCTION: COUNT THE NUMBER OF TIMES EACH OF TWO SEGMENTS ARE DETECTED
              =1446 ;           OVER A ONE SECOND PERIOD.  TURN THE LASER ON DURING THE TEST.
              =1447 ;           EXIT TO POWER ON ENTRY IF ANYTHING RECEIVED FROM HOST.
              =1448 ;           WILL COMPARE 1ST 2 CHAR'' OF SEGMENT CAPTURED WITH
              =1449 ;           TSEG1 & TSEG2 AND RESET FCA SHIFT REG IF NO COMPARE.
              =1450 ;           4 CHAR SEG'S MUST BE PRECEDED BY 00H IN THE SEG TABLE...
              =1451 ;
              =1452 ; ENTRY:
              =1453 ;           TSEG1 = SEGMENT 1 DEFINITION  (4 BYTES)
              =1454 ;           TSEG2 = SEGMENT 2 DEFINITION  (4 BYTES)
              =1455 ;
              =1456 ; EXIT:
              =1457 ;           TCNT1 = SEGMENT 1 COUNT (2 BYTES)
              =1458 ;           TCNT2 = SEGMENT 2 COUNT (2 BYTES)
              =1459 ;
              =1460 ; *( A)
              =1461 ; *(R0)
              =1462 ; *(R1)
              =1463 ; *(TSCBUF) TO (TSCBUF+3)
              =1464 ;   RB0 (R7) = SECOND TIMER = 0
              =1465 ;
              =1466 ; PARAMETERS:
              =1467 ;
              =1468 ;           SEGMENT DEFINITION TABLE
              =1469 ;
              =1470 ;           BYTE 0 - 1ST AND 2ND CHAR (AS DETECTED OR ZERO IF 4-CHAR)
              =1471 ;           BYTE 1 - 3RD AND 4TH CHAR (1ST & 2ND ON 4-CHAR)
              =1472 ;           BYTE 2 - 5TH AND 6TH CHAR (3RD & 4TH ON 4-CHAR)
              =1473 ;           BYTE 3 - DECODED PARITY WORD
              =1474 ;
0462 99EF     =1475 TSCNT:     ANL     P1,#0FFH-ELASDB ;LASER ON
0464 BF02     =1476            MOV     R7,#(1*FACTOR)
0466 B438     =1477            CALL    TMWAIT       ;WAIT FOR LASER TO TURN ON
0468 BF64     =1478            MOV     R7,#(E1000M*FACTOR)
046A 27       =1479            CLR     A
046B B838     =1480            MOV     R0,#TCNT1
046D B909     =1481            MOV     R1,#9
046F A0       =1482 TSC02:     MOV     @R0,A        ;CLEAR TCNT1 TO TCNT1+9
0470 18       =1483            INC     R0
0471 E96F     =1484            DJNZ    R1,TSC02
              =1485 ;
              =1486 ; RESET FCA TO CLEAR ANY SEGMENTS
              =1487 ;
```

```
0473 B803      =1488           MOV     R0,#EFCRST
0475 90        =1489           MOVX    @R0,A
               =1490 ;
               =1491 ; IF SYMCAP THEN READ THE SEGMENT; EXIT IF HOST BYTE RECEIVED.
               =1492 ;
0476 A5        =1493 TSC04:    CLR     F1              ;F1 REMEMBERS TO INC TCNT1 OR TCNT2
0477 B801      =1494           MOV     R0,#ESRRD
0479 868D      =1495 TSC05:    JNI     TSC08           ;JMP IF SYMCAP OR HOST COMM. OCCURED
047B FF        =1496 TSC06:    MOV     A,R7            ;CHECK FOR 1 SECOND TIMEOUT
047C 9676      =1497           JNZ     TSC04
               =1498 ;
               =1499 ;         TURN LASER OFF & RETURN TO CALLER
               =1500 ;
047E 8910      =1501 TSC20:    ORL     P1,#ELASDB
0480 83        =1502           RET
               =1503 ;
0481 90        =1504 TSC07:    MOVX    @R0,A           ;RESET FCA SHIFT REG
0482 847B      =1505           JMP     TSC06
               =1506 ;
0484 80        =1507 TSC12:    MOVX    A,@R0           ;SHIFT OUT 2ND CHAR FROM FCA
0485 27        =1508           CLR     A
0486 B950      =1509           MOV     R1,#TSCBUF
0488 A1        =1510           MOV     @R1,A           ;PUT 00 TO R4 FOR 1ST TWO CHAR'S
0489 8499      =1511           JMP     TSC09
048B 0400      =1512 TSC11:    JMP     RSTTRP
048D B950      =1513 TSC08:    MOV     R1,#TSCBUF      ;START OF DATA CAPTURE BUFFER
048F 80        =1514           MOVX    A,@R0           ;READ 1ST CHAR FROM FCA
0490 F28B      =1515           JB7     TSC11           ;JMP TO POWER UP SEQ IF COMM. FROM HOST
0492 9284      =1516           JB4     TSC12           ;JMP IF 4 CHAR SEG...1ST 2 CHARS=00
0494 47        =1517           SWAP    A
0495 A1        =1518           MOV     @R1,A
0496 80        =1519           MOVX    A,@R0           ;READ 2ND CHAR FROM FCA
0497 31        =1520           XCHD    A,@R1
0498 F1        =1521           MOV     A,@R1
0499 B930      =1522 TSC09:    MOV     R1,#TSEG1
049B D1        =1523           XRL     A,@R1           ;COMPARE 1ST 2 CHAR'S WITH TSEG1
049C C6A6      =1524           JZ      TSC10           ;JMP IF COMPARED
049E B934      =1525           MOV     R1,#TSEG2
04A0 F1        =1526           MOV     A,@R1
04A1 B950      =1527           MOV     R1,#TSCBUF
04A3 D1        =1528           XRL     A,@R1           ;COMPARE 1ST 2 CHAR'S WITH TSEG2
04A4 9681      =1529           JNZ     TSC07           ;JMP TO RESET FCA S.R. IF NO COMPARE
               =1530 ;
04A6 B951      =1531 TSC10:    MOV     R1,#TSCBUF+1    ;SET UP TO READ NEXT 4 CHAR'S
04A8 B416      =1532           CALL    NEXT4           ;READ 3RD-6TH CHAR'S
               =1533 ;
04AA B831      =1534           MOV     R0,#TSEG1+1     ;COMPARE COMPLETE SEG TO TSEG1 & 2
04AC B42A      =1535           CALL    SGMTCH          ;COMPARE LAST 4 CHAR'S OF CAPTURED SEG
               =1536                                   ;TO TSEG1
04AE C6BB      =1537           JZ      SEGONE          ;JMP IF SEG 1 COMPARED
04B0 B5        =1538           CPL     F1              ;F1=1 SAYS TSEG2 BEING COMPARED
04B1 B835      =1539           MOV     R0,#TSEG2+1
04B3 B42A      =1540           CALL    SGMTCH
04B5 967B      =1541           JNZ     TSC06           ;JMP IF NO MATCH
04B7 B83B      =1542           MOV     R0,#TCNT2+1
04B9 76BD      =1543           JF1     INCREM          ;JMP IF TSEG 2 MATCHED TO INCREMENT
04BB B839      =1544 SEGONE:   MOV     R0,#TCNT1+1     ;SET UP R0 TO INCREMENT TSEG 1 CNTR
04BD 17        =1545 INCREM:   INC     A               ;ACC NOW = 01
04BE 60        =1546           ADD     A,@R0           ;INC LOW BYTE
04BF A0        =1547           MOV     @R0,A
04C0 C8        =1548           DEC     R0
04C1 27        =1549           CLR     A
04C2 70        =1550           ADDC    A,@R0           ;INC HIGH BYTE IF CARRY
04C3 A0        =1551           MOV     @R0,A
04C4 847B      =1552           JMP     TSC06           ;JMP TO CHK FOR 1 SECOND TIMEOUT
                1553 $         INCLUDE(:F3:OVRSET.SRC)
               =1554 ;************************************************************************
               =1555 ;**                      Subroutine OVRSET                             **
               =1556 ;** Function: Overide Switch settings by changing RAM from host        **
               =1557 ;** Date:  3-15-87                                                     **
               =1558 ;** Subroutines Called: ROCIA                                          **
               =1559 ;** Registers/Flags affected: F0, CARRY, R2, R1, ACCUMULATOR           **
               =1560 ;** Ports affected: None                                               **
               =1561 ;** RAM locations affected: @SWISET                                    **
               =1562 ;************************************************************************
               =1563 OVRSET:
               =1564 ;GET COMMAND BYTE FROM HOST
04C6 B495      =1565           CALL    ROCIA           ;RECIEVE BYTE FROM HOST
04C8 E6CC      =1566           JNC     CHECLB          ;JUMP TO CHECK FOR LAST BYTE IF NO PARITY ERROR
               =1567 ;PARITY ERROR, GO TO ERROR ROUTINE. WE GOT GARBAGE.
04CA 84DC      =1568           JMP     OVRERR          ;JUMP TO ERROR ROUTINE
               =1569 ;PARITY BYTE CHECKS OK. CHECK FOR LAST BYTE BIT.
04CC D2D0      =1570 CHECLB:   JB6     SAVEBT          ;JUMP IF LAST BYTE BIT SET.
               =1571 ;LAST BYTE BIT NOT SET. SOMETHING IS WRONG.
04CE 84DC      =1572           JMP     OVRERR          ;JUMP TO ERROR ROUTINE
               =1573 ;LAST BYTE BIT SET AND PARITY CHECKED OK. SAVE SWITCH SETTINGS IN RAM.
04D0 530F      =1574 SAVEBT:   ANL     A,#0FH          ;MASK OUT UPPER 4 BITS.
04D2 AA        =1575           MOV     R2,A            ;TEMPORATILY STORE RECIEVED BYTE
04D3 B95F      =1576           MOV     R1,#SWISET      ;RAM POINTER
04D5 F1        =1577           MOV     A,@R1           ;SAVE SCANNER SETTINGS
04D6 5340      =1578           ANL     A,#40H          ;SAVE DOUBLE READ BIT
04D8 4A        =1579           ORL     A,R2            ;SET BITS 3-0 ACCORDING TO RECIEVED DATA
```

```
04D9 A1        =1580          MOV     @R1,A           ;SAVE RECIEVED BYTE IN RAM.
04DA 84E0      =1581          JMP     OVRRET          ;RETURN
               =1582 ;ERROR ROUTINE. BEEP 6 TIMES AND TURN ON RED LIGHT.
04DC B806      =1583 OVRERR:  MOV     R0,#6           ;SET BEEP COUNTER
04DE 7481      =1584          CALL    TERRWT          ;BEEP 6 TIMES
04E0 83        =1585 OVRRET:  RET
               1586 $         INCLUDE(:F3:TRNFLG.SRC)
               =1587 ;****************************************************************
               =1588 ;**                    Subroutine TRNFLG                        **
               =1589 ;** Function: Transfers label flags from UPC code to RAM        **
               =1590 ;** Date:  7-17-87                                              **
               =1591 ;** Subroutines Called: SHIFTL                                  **
               =1592 ;** Registers/Flags affected: R0, R2, R3, ACCUMULATOR, R1       **
               =1593 ;** Ports affected: None                                        **
               =1594 ;** RAM locations affected: @R1                                 **
               =1595 ;****************************************************************
               =1596 TRNFLG:
               =1597 ;GET FIRST FOUR BYTES OF LABEL (ABCD)
04E1 B824      =1598          MOV     R0,#L6S1        ;SOURCE RAM POINTER
04E3 8802      =1599          MOV     R3,#2           ;SET FLAG COUNTER
04E5 B4C9      =1600          CALL    SHIFTL          ;SHIFT NIBBLES LEFT ONE NIBBLE
               =1601 ;GET SECOND TWO BYTES OF LABEL (EF)
               =1602 ;TRICK WITH THIS ROUTINE IS THAT THE NIBBLES TO COMPRISE FLAG 'EF' IS SPLIT
               =1603 ;  BETWEEN LEFT AND RIGHT HALF OF LABEL.
04E7 F0        =1604          MOV     A,@R0           ;RETRIEVE DE NIBBLES
04E8 530F      =1605          ANL     A,#0FH          ;MASK OUT 'D' NIBBLE
04EA 47        =1606          SWAP    A               ;E0
04EB AA        =1607          MOV     R2,A            ;SAVE NIBBLE
04EC B82E      =1608          MOV     R0,#R6S1        ;GET RIGHT HALF OF LABEL
04EE F0        =1609          MOV     A,@R0           ;  (RIGHT HALF OF LABEL)
04EF 53F0      =1610          ANL     A,#0F0H         ;MASK LOWER NIBBLE (F0)
04F1 47        =1611          SWAP    A               ;0F
04F2 4A        =1612          ORL     A,R2            ;EF
04F3 A1        =1613          MOV     @R1,A           ;SAVE NIBBLES IN RAM
04F4 19        =1614          INC     R1              ;INCREMENT SOURCE POINTER
               =1615 ;GET BYTES GH INTO RAM.
04F5 BB01      =1616          MOV     R3,#1           ;SET FLAG COUNTER
04F7 B4C9      =1617          CALL    SHIFTL
04F9 83        =1618          RET
               1619 ;*******************************************
04FA A3        1620 TROPG4:   MOVP    A,@A
04FB 83        1621          RET
0500           1622          ORG     500H
               1623 $         INCLUDE(:F3:HORSE3.SRC)
               =1624 ;****************************************************************
               =1625 ; FILE: HORSE3.SRC   HORSE TEST FILE 3 OF 3.
               =1626 ; 07-03-86 09:30 BOB ACTIS
               =1627 ;****************************************************************
               =1628 ; ROUTINE: THSND
               =1629 ;
               =1630 ; FUNCTION: SEND A BYTE TO HOST. WAITS FOR TRANSMITTER READY.
               =1631 ;
               =1632 ; ENTRY:
               =1633 ;        (R1) = BYTE TO SEND (NO PARITY)
               =1634 ;
               =1635 ; EXIT:
               =1636 ;        *(A)
               =1637 ;        *(R1)
               =1638 ;        *(R4)
               =1639 ;
0500 0A        =1640 THSND:   IN      A,P2
0501 9200      =1641          JB4     THSND           ;JMP = HOST COMM. REG. NOT READY
0503 F9        =1642          MOV     A,R1            ;(A) = BYTE
0504 B40E      =1643          CALL    CPARTY
0506 37        =1644          CPL     A               ;SET FOR ODD PARITY
0507 53C0      =1645          ANL     A,#0C0H
0509 49        =1646          ORL     A,R1            ;(A) = FINAL BYTE WITH PARITY
050A B902      =1647          MOV     R1,#EOCIA
050C 91        =1648          MOVX    @R1,A
050D 83        =1649          RET
               =1650 ;****************************************************************
               =1651 ; ROUTINE: CPARTY
               =1652 ;
               =1653 ; FUNCTION: COMPUTE PARITY OF ALTERNATE BITS OF BYTE
               =1654 ;
               =1655 ; ENTRY:
               =1656 ;        (A) = BYTE
               =1657 ;
               =1658 ; EXIT:
               =1659 ;        (A) = PARITY
               =1660 ;              B7 = B5 = B3 = B1 = PARITY OF ODD BITS
               =1661 ;              B6 = B4 = B2 = B0 = PARITY OF EVEN BITS
               =1662 ;        *(R4)
               =1663 ;
050E AC        =1664 CPARTY:  MOV     R4,A
050F 47        =1665          SWAP    A
0510 DC        =1666          XRL     A,R4
0511 AC        =1667          MOV     R4,A
0512 E7        =1668          RL      A
0513 E7        =1669          RL      A
0514 DC        =1670          XRL     A,R4
0515 83        =1671          RET
```

```
              =1672 ;********************************************************************
              =1673 ; NEXT4: READ 3RD-6TH CHARACTERS
              =1674 ;
0516 80       =1675 NEXT4:  MOVX   A,@R0           ;READ 3RD CHAR FROM LSI3
0517 47       =1676         SWAP   A
0518 A1       =1677         MOV    @R1,A           ;PUT 3RD TO HI NIB. OF TSCBUF+1
0519 80       =1678         MOVX   A,@R0           ;READ 4TH CHAR
051A 31       =1679         XCHD   A,@R1           ;PUT 4TH TO LO TSCBUF+1
051B 19       =1680         INC    R1              ;POINTS TO TSCBUF+2 NOW
051C 80       =1681         MOVX   A,@R0           ;READ 5TH CHAR
051D 47       =1682         SWAP   A
051E A1       =1683         MOV    @R1,A           ;PUT 5TH TO HI TSCBUF+2
051F 80       =1684         MOVX   A,@R0           ;READ 6TH CHAR
0520 31       =1685         XCHD   A,@R1           ;PUT 6TH TO LO TSCBUF+2
0521 19       =1686         INC    R1
0522 B804     =1687         MOV    R0,#04H
0524 80       =1688         MOVX   A,@R0           ;R0=04H,@R0=PARITY DECODE READ OF LSI3
0525 A1       =1689         MOV    @R1,A           ;PUT PARITY DECODE TO TSCBUF+3
0526 B801     =1690         MOV    R0,#01H
0528 90       =1691         MOVX   @R0,A           ;FR.RST TO LSI 3
0529 83       =1692         RET
              =1693 ;********************************************************************
              =1694 ; ROUTINE: SGMTCH - MATCH SEGMENTS
              =1695 ;
              =1696 ; FUNCTION: DETERMINE IF TWO SEGMENTS HAVE IDENTICAL DATA AND PARITY
              =1697 ;           (LAST 4 CHARACTERS OF SEG AND PARITY)
              =1698 ;
              =1699 ; ENTRY:
              =1700 ;    (R0) = ADRS OF ONE SEGMENT - SAME FORMAT AS REG 4-7
              =1701 ;    (TSCBUF+1) = 3RD AND 4TH CHAR
              =1702 ;    (TSCBUF+2) = 5TH AND 6TH CHAR
              =1703 ;    (TSCBUF+3) = DECODED PARITY WORD
              =1704 ;
              =1705 ; EXIT:
              =1706 ;    (A) = 0 FOR MATCH
              =1707 ;    *(R0)
              =1708 ;
052A F0       =1709 SGMTCH: MOV    A,@R0
052B B951     =1710         MOV    R1,#TSCBUF+1
052D D1       =1711         XRL    A,@R1
052E 963A     =1712         JNZ    SGM90           ;JMP = 2ND BYTE NO MATCH
0530 18       =1713         INC    R0
0531 19       =1714         INC    R1
0532 F0       =1715         MOV    A,@R0
0533 D1       =1716         XRL    A,@R1
0534 963A     =1717         JNZ    SGM90           ;JMP = 3RD BYTE NO MATCH
0536 18       =1718         INC    R0
0537 19       =1719         INC    R1
0538 F0       =1720         MOV    A,@R0
0539 D1       =1721         XRL    A,@R1
053A 83       =1722 SGM90:  RET
              =1723 ;********************************************************************
              =1724 ; ROUTINE: TMWAIT
              =1725 ;
              =1726 ; FUNCTION: WAIT FOR 20MSEC TIMER TO EXHAUST
              =1727 ;
              =1728 ; ENTRY:
              =1729 ;    RB0 (R7) = TIMER (20MSEC RES)
              =1730 ;
              =1731 ; EXIT:
              =1732 ;    RB0 (R7) = 0
              =1733 ;
053B 27       =1734 TMWAIT: CLR    A
053C 62       =1735         MOV    T,A             ;CLEAR THE TIMER COUNTER
053D 25       =1736         EN     TCNTI           ;ENABLE TIMER INTERRUPT
053E 55       =1737         STRT   T               ;CLEAR TIMER PRESCALER
              =1738 ;
053F FF       =1739 TMWAI0: MOV    A,R7
0540 963F     =1740         JNZ    TMWAI0
0542 83       =1741         RET
              1742 $       INCLUDE(:F3:CHKSCN.SRC)
              =1743 ;********************************************************************
              =1744 ;**                    Subroutine CHKSCN                           **
              =1745 ;** Function: Check Switch RAM settings for two scan option and set R1 accor.*
              =1746 ;** Date: 3-18-87                                                  **
              =1747 ;** Subroutines Called: None                                       **
              =1748 ;** Registers/Flags affected: R1, Accumulator                      **
              =1749 ;** Ports affected: None                                           **
              =1750 ;** RAM locations affected: None                                   **
              =1751 ;********************************************************************
              =1752 ;THIS ROUTINE USED FOR UPCA, EAN8, AND EAN13
              =1753 CHKSCN:
0543 B95F     =1754         MOV    R1,#SWISET      ;SET RAM POINTER TO SWITCH SETTINGS
0545 F1       =1755         MOV    A,@R1           ;RETRIEVE SETTINGS
0546 530C     =1756         ANL    A,#0CH          ;MASK OUT ALL BUT TWO SCAN SETTINGS
0548 03F4     =1757         ADD    A,#0F4H         ;CHECK FOR B3,B2=11 (750F MODE)
054A F654     =1758         JC     STOC1A          ;JUMP IF B3,B2=11
054C 0304     =1759         ADD    A,#004H         ;CHECK FOR B3,B2=10 (MODIFIED 2-SCAN)
054E F658     =1760         JC     SP2SCN          ;JUMP IF B3,B2=10
0550 0304     =1761         ADD    A,#004H         ;CHECK FOR B3,B2=01 (750F-T 2 SCAN)
0552 F661     =1762         JC     ST2SCN          ;JUMP IF B3,B2=01
              =1763 ;MUST BE B3,B2=00 WHICH IS 750F MODE
```

```
0554 B9FF      =1764 STOCIA: MOV    R1,#-1           ;SET FOR 1 SCAN
0556 A463      =1765         JMP    CKSNRT           ;FINISHED, RETURN
0558 B9FE      =1766 SP2SCN: MOV    R1,#-2           ;SET FOR 2 SCAN
055A F8        =1767         MOV    A,R0             ;CHECK FOR EAN13, OF WHICH WE ONLY WANT 1 SCAN
055B C663      =1768         JZ     CKSNRT           ;JUMP IF NOT EAN13. OTHER LABELS ARE 2 SCAN
055D B9FF      =1769         MOV    R1,#-1           ;EAN13, REQUIRE 1 SCAN.
055F A463      =1770         JMP    CKSNRT           ;FINISHED, RETURN
0561 B9FE      =1771 ST2SCN: MOV    R1,#-2           ;SET FOR 2 SCAN
0563 83        =1772 CKSNRT: RET
               1773 $         INCLUDE(:F3:WREPRM.SRC)
               =1774 ;*********************************************************************
               =1775 ;**                    Subroutine WREPRM                            **
               =1776 ;** Function: Write packed RAM to EEPROM                            **
               =1777 ;** Date: 2-26-87                                                   **
               =1778 ;** Subroutines Called: WRACC, WAIT                                 **
               =1779 ;** Registers/Flags affected:  F0, R0, R1, R2, R3, *R1, *R2, Carry, Acc **
               =1780 ;** Ports affected:  P1, P2                                         **
               =1781 ;** RAM locations affected:  None                                   **
               =1782 ;*********************************************************************
               =1783 WREPRM:
               =1784 ;SEND OP CODE TO ENABLE EEPROM WRITE
0564 B4D9      =1785         CALL   SNDWRT
               =1786 ;SEND OP CODE TO ERASE ALL OF EEPROM
0566 2320      =1787         MOV    A,#ERAL          ;ERASE ALL OF EEPROM
0568 B4BD      =1788         CALL   ERASFL
               =1789 ;TRANSFER 16 BYTES FROM RAM TO EEPROM
056A B961      =1790         MOV    R1,#TWOLAB       ;INITIALIZE RAM POINTER
056C BA40      =1791         MOV    R2,#OWRITE       ;INITIALIZE EEPROM ADDRESS AND OP CODE
056E BB08      =1792         MOV    R3,#8D           ;INITIALIZE LABELSET COUNTER
               =1793 ;SEND OP CODE AND EEPROM ADDRESS
               =1794 TRNDTA:
0570 8A80      =1795         ORL    P2,#EPRMCS       ;SET EEPROM_CS HIGH
0572 85        =1796         CLR    F0               ;SET F0=0 TO SIGNIFY OP CODE
0573 FA        =1797         MOV    A,R2             ;OP CODE + EEPROM ADDRESS IN ACCUMULATOR
0574 34C2      =1798         CALL   WRACC            ;SEND OP CODE + EEPROM ADDRESS TO EEPROM
               =1799 ;SEND BITS 15-8 TO EEPROM (LABEL 1)
0576 F1        =1800         MOV    A,@R1            ;GET DATA FROM RAM (LABEL 1)
0577 85        =1801         CLR    F0               ;SET F0
0578 95        =1802         CPL    F0               ; TO '1' TO SIGNIFY DATA TRANSFER
0579 34C2      =1803         CALL   WRACC            ;WRITE DATA BITS 15-8 TO EEPROM
               =1804 ;SEND BITS 7-0 TO EEPROM (LABEL 2)
057B 19        =1805         INC    R1               ;INCREMENT RAM POINTER TO LABEL 2
057C F1        =1806         MOV    A,@R1            ;RETREIVE DATA (LABEL 2)
057D 85        =1807         CLR    F0               ;SET F0
057E 95        =1808         CPL    F0               ; TO '1' TO SIGNIFY DATA TRANSFER
057F 34C2      =1809         CALL   WRACC            ;WRITE DATA BITS 7-0
               =1810 ;SET EEPROM_CS LOW FOR 15MS
0581 9A7F      =1811         ANL    P2,#255-EPRMCS   ;SET EEPROM_CS LOW
0583 230F      =1812         MOV    A,#15D           ;WAIT FOR
0585 34E1      =1813         CALL   WAIT             ; 15 MILLI-SECONDS
               =1814 ;SET UP POINTERS FOR NEXT LABEL SET
0587 19        =1815         INC    R1               ;INCREMENT RAM POINTER TO LABEL 1 OF NEXT LABEL SET
0588 1A        =1816         INC    R2               ;INCREMENT EEPROM ADDRESS POINTER FOR NEXT 16 BITS
0589 EB70      =1817         DJNZ   R3,TRNDTA        ;IF R3 NOT ZERO, GO BACK TO TRANSFER ANOTHER 16 BITS TO
               =1818 ;DATA ALL TRANSFERRED. SEND OP CODE TO DISABLE ERASE/WRITE TO EEPROM.
058B 8A80      =1819         ORL    P2,#EPRMCS       ;SET EEPROM_CS HIGH
058D 2300      =1820         MOV    A,#EWDS          ;MOV OP CODE TO DISABLE ERASE/WRITE TO ACCUMULATOR
058F 85        =1821         CLR    F0               ;SET F0 LOW TO SIGNIFY 9 BITS TO SEND
0590 34C2      =1822         CALL   WRACC            ;WRITE OP CODE TO EEPROM
0592 9A7F      =1823         ANL    P2,#255-EPRMCS   ;SET EEPROM_CS LOW
               =1824 ;RETURN BACK
0594 83        =1825         RET
               1826 $         INCLUDE(:F3:ROCIA.SRC)
               =1827 ;*********************************************************************
               =1828 ;**                    Subroutine ROCIA                             **
               =1829 ;** Function: Recieve data from VLSI chip with output in accumulator. **
               =1830 ;** Date: 3-15-87                                                   **
               =1831 ;** Subroutines Called: PARITY                                      **
               =1832 ;** Registers/Flags affected: F0, *R3, *R0, CARRY, *R2, ACCUMULATOR **
               =1833 ;** Ports affected:  NONE                                           **
               =1834 ;** RAM locations affected:  NONE                                   **
               =1835 ;*********************************************************************
               =1836 ;F0=1 MEANS LAST BITE BIT SET IN B6
               =1837 ;F0=0 MEANS LAST BITE BIT NOT SET IN B6
               =1838 ;CARRY MEANS THAT PARITY ERROR HAS OCCURED
               =1839 ;NO CARRY MEANS THAT BYTE RECIEVED PASSED PARITY CHECK
0595 85        =1840 ROCIA:  CLR    F0               ;INITIALIZE B6 FLAG
0596 97        =1841         CLR    C                ;INITIALIZE PARITY FLAG
0597 869B      =1842 ROCIA1: JNI    ROCIA2           ;IF INTERUPT LINE LOW, VLSI HAS OCIA DATA.
0599 A497      =1843         JMP    ROCIA1           ;NO DATA. JUMP BACK TO CHECK ROCIA.
059B D5        =1844 ROCIA2: SEL    RB1
059C B802      =1845         MOV    R0,#EOCIA        ;SET POINTER TO WRITE TO VLSI CHIP.
059E 80        =1846         MOVX   A,@R0            ;GET BYTE FROM ACCUMULATOR
059F AA        =1847         MOV    R2,A             ;TEMPORARLY SAVE BYTE TO CHECK FOR PARITY
               =1848 ;CHECK FOR CORRECT PARITY
05A0 3490      =1849         CALL   PARITY           ;CALCULATE PARITY
05A2 D5        =1850         SEL    RB1
05A3 DA        =1851         XRL    A,R2             ;COMPARE TO RECIEVED BYTE
05A4 C6A7      =1852         JZ     LASTBT           ;IF ZERO, PARITY IS OK
05A6 A7        =1853         CPL    C                ;BAD PARITY. SET CARRY FLAG.
               =1854 ;PARITY CHECKED. RESTORE RECIEVED BYTE AND CHECK FOR LAST BYTE.
05A7 FA        =1855 LASTBT: MOV    A,R2             ;RESTORE RECIEVED BYTE
```

```
        05A8 37        =1856          CPL     A
        05A9 D2AC      =1857          JB6     OCIRET          ;JUMP IF NOT LAST BYTE
        05AB 95        =1858          CPL     F0              ;MUST BE LAST BYTE
                       =1859  ;BYTE RECIEVED AND CHECKED. RETURN TO ROUTINE.
                       =1860  OCIRET:
        05AC FA        =1861          MOV     A,R2            ;RESTORE RECEIVED DATA
        05AD C5        =1862          SEL     RB0
        05AE 83        =1863          RET
                        1864  $       INCLUDE(:F3:TON1CT.SRC)
                       =1865  ;****************************************************************
                       =1866  ;**              SUBROUTINE TON1CT                             **
                       =1867  ;** FUNCTION: SET R5 (RB1) ACCORDING TO SWITCH SETTINGS        **
                       =1868  ;** DATE: 3/15/87                                              **
                       =1869  ;** SUBROUTINES CALLED: NONE                                   **
                       =1870  ;** REGISTERS/FLAGS AFFECTED: R5 (RB1), R1 (RB1), ACCUMULATOR  **
                       =1871  ;** PORTS AFFECTED: NONE                                       **
                       =1872  ;** RAM LOCATIONS AFFECTED: NONE                               **
                       =1873  ;****************************************************************
                       =1874  TON1CT:
                       =1875  ;SET TONE CYCLE COUNTER ACCORDING TO RAM (SWITCH SETTINGS)
        05AF B95F      =1876          MOV     R1,#SWISET      ;SET RAM POINTER
        05B1 F1        =1877          MOV     A,@R1           ;RETRIEVE SWITCH SETTINGS FROM RAM
        05B2 5303      =1878          ANL     A,#03H          ;MASK ALL BUT TONE BITS
        05B4 03B9      =1879          ADD     A,#LOW TONADD   ;SET OF EPROM ADDRESS FETCH
        05B6 A3        =1880          MOVP    A,@A            ;GET TONE CYCLE SETTING
        05B7 AD        =1881          MOV     R5,A            ;SET TONE CYCLE COUNT IN R5
        05B8 83        =1882          RET
                       =1883  ;
        05B9           =1884  TONADD  EQU     $
        05B9 0A        =1885          DB      ETNCT1          ;TONE CYCLE COUNT FOR 500HZ
        05BA 0F        =1886          DB      ETNCT2          ;TONE CYCLE COUNT FOR 730HZ
        05BB 14        =1887          DB      ETNCT3          ;TONE CYCLE COUNT FOR 960HZ
        05BC 1C        =1888          DB      ETNCT4          ;TONE CYCLE COUNT FOR 1370HZ
                        1889  $       INCLUDE(:F3:ERASFL.SRC)
                       =1890  ;****************************************************************
                       =1891  ;**              Subroutine ERASFL                             **
                       =1892  ;** Function: Send OP code to enable EEPROM Write              **
                       =1893  ;** Date: 3-17-87                                              **
                       =1894  ;** Subroutines Called: WRACC, WAIT                            **
                       =1895  ;** Registers/Flags affected: F0, R0, Accumulator, Carry, *R1, *R2 **
                       =1896  ;** Ports affected: P2,P1                                      **
                       =1897  ;** RAM locations affected: None                               **
                       =1898  ;****************************************************************
                       =1899  ERASFL:
        05BD 85        =1900          CLR     F0              ;SET F0=0 TO SIGNIFY 9 BITS FOR OP CODE.
        05BE 8A80      =1901          ORL     P2,#EPRMCS      ;SET EEPROM_CS HIGH
        05C0 34C2      =1902          CALL    WRACC           ;WRITE OP CODE TO EEPROM
        05C2 9A7F      =1903          ANL     P2,#255-EPRMCS  ;SET EEPROM_CS LOW
        05C4 230F      =1904          MOV     A,#15D          ; FOR
        05C6 34E1      =1905          CALL    WAIT            ; 15 MS
        05C8 83        =1906          RET
                        1907  $       INCLUDE(:F3:SHIFTL.SRC)
                       =1908  ;****************************************************************
                       =1909  ;**              Subroutine SHIFTL                             **
                       =1910  ;** Function: Shifts characters one nible left from to inputs  **
                       =1911  ;** Date: 7-17-87                                              **
                       =1912  ;** Subroutines Called: None                                   **
                       =1913  ;** Registers/Flags affected: R0, R2, R3, ACCUMULATOR, R1      **
                       =1914  ;** Ports affected: None                                       **
                       =1915  ;**.RAM locations affected: @R1                                **
                       =1916  ;****************************************************************
                       =1917  SHIFTL:
        05C9 F0        =1918          MOV     A,@R0           ;RETRIEVE WX CHARACTERS
        05CA 530F      =1919          ANL     A,#0FH          ;MASK UPPER NIBBLE (0X)
        05CC 47        =1920          SWAP    A               ;X0
        05CD AA        =1921          MOV     R2,A            ;SAVE NIBBLE TEMPORARILY
        05CE 18        =1922          INC     R0              ;INCREMENT SOURCE POINTER
        05CF F0        =1923          MOV     A,@R0           ;RETRIEVE 'YZ' CHARACTERS
        05D0 53F0      =1924          ANL     A,#0F0H         ;MASK OUT 'C' CHARACTER (Y0)
        05D2 47        =1925          SWAP    A               ;0Y
        05D3 4A        =1926          ORL     A,R2            ;XY IS RESULT
        05D4 A1        =1927          MOV     @R1,A           ;SAVE XY IN RAM @R1 POINTER
        05D5 19        =1928          INC     R1              ;INC DESTINATION POINTER
        05D6 EBC9      =1929          DJNZ    R3,SHIFTL
        05D8 83        =1930          RET
                        1931  $       INCLUDE(:F3:SNDWRT.SRC)
                       =1932  ;****************************************************************
                       =1933  ;**              Subroutine SNDWRT                             **
                       =1934  ;** Function: Send OP code to enable EEPROM Write              **
                       =1935  ;** Date: 3-17-87                                              **
                       =1936  ;** Subroutines Called: WRACC                                  **
                       =1937  ;** Registers/Flags affected: F0, R0, Accumulator, Carry       **
                       =1938  ;** Ports affected: P2,P1                                      **
                       =1939  ;** RAM locations affected: None                               **
                       =1940  ;****************************************************************
                       =1941  SNDWRT:
        05D9 2330      =1942          MOV     A,#EWEN         ;SEND OP CODE TO ENABLE EEPROM
        05DB 85        =1943          CLR     F0              ;SET FLAG=0 TO SIGNIFY 9 BITS FOR OP CODE
        05DC 8A80      =1944          ORL     P2,#EPRMCS      ;SET EEPROM_CS HIGH
        05DE 34C2      =1945          CALL    WRACC           ;WRITE OPCODE TO EEPROM
        05E0 9A7F      =1946          ANL     P2,#255-EPRMCS  ;SET EEPROM_CS LOW
        05E2 83        =1947          RET
```

```
                1948 ;*****************************************
05E3 A3         1949 TROPG5: MOVP    A,@A
05E4 83         1950         RET
0600            1951         ORG     600H
                1952 $       INCLUDE(:F3:STRRAM.SRC)
               =1953 ;*******************************************************************
               =1954 ;**                      Subroutine STRRAM                        **
               =1955 ;** Function: Write two label settings to RAM from host.          **
               =1956 ;** Date:  3-15-87                                                **
               =1957 ;** Subroutines Called: ROCIA                                     **
               =1958 ;** Registers/Flags affected: CARRY, F0, R0, R1, R2, R3, ACCUMULATOR **
               =1959 ;** Ports affected: None                                          **
               =1960 ;** RAM locations affected:  @TWOLAB TO @TWOLABEL+8               **
               =1961 ;*******************************************************************
               =1962 STRRAM:
               =1963 ;INITIALIZE REGISTERS
0600 B808      =1964         MOV     R0,#8D          ;LABEL SET COUNTER
0602 B961      =1965         MOV     R1,#TWOLAB      ;SET RAM POINTER TO TWO LABEL READ LOCATIONS.
0604 85        =1966         CLR     F0              ;USE F0 TO STORE LAST BYTE BIT
               =1967 ;RETRIEVE 1ST LABEL, MS DIGIT
0605 B495      =1968 RTRLAB: CALL    ROCIA           ;RECIEVE DATA FROM VLSI CHIP
0607 B665      =1969         JF0     ELSTBT          ;IF LAST BYTE BIT SET WE HAVE ERROR.  JUMP TO FILL REMAINING RAM
0609 F665      =1970         JC      ELSTBT          ;IF CARRY FLAG SET, WE HAVE TRANSMISSION ERROR.  JUMP TO FILL RE
060B 530F      =1971         ANL     A,#0FH          ;MASK UPPER 4 BITS
060D 47        =1972         SWAP    A               ;MS NIBBLE MUST BE IN UPPER 4 BITS OF R2
060E A1        =1973         MOV     @R1,A           ;STORE MASKED BYTE IN R2.
               =1974 ;RETRIEVE 1ST LABEL, LS DIGIT
060F B495      =1975         CALL    ROCIA           ;RECIEVE DATA FROM VLSI CHIP
0611 B665      =1976         JF0     ELSTBT          ;IF LAST BYTE BIT SET WE HAVE ERROR.  JUMP TO FILL REMAINING RAM
0613 F665      =1977         JC      ELSTBT          ;IF CARRY FLAG SET, WE HAVE TRANSMISSION ERROR.  JUMP TO FILL RE
0615 530F      =1978         ANL     A,#0FH          ;MASK UPPER 4 BITS
0617 41        =1979         ORL     A,@R1           ;PACK MS AND LS DIGITS TOGETHER
0618 A1        =1980         MOV     @R1,A           ;SAVE 1ST LABEL IN R2 FOR TEMPORARY STORAGE.
               =1981 ;RAM POINTER STILL SET AT 1ST LABEL.
               =1982 ;GET 2ND LABEL, MS NIBBLE AND CHECK BEFORE STORING.
0619 B495      =1983         CALL    ROCIA           ;RECIEVE DATA FROM VLSI CHIP
061B B665      =1984         JF0     ELSTBT          ;IF LAST BYTE BIT SET WE HAVE ERROR.  JUMP TO FILL REMAINING RAM
061D F665      =1985         JC      ELSTBT          ;IF CARRY FLAG SET, WE HAVE TRANSMISSION ERROR.  JUMP TO FILL RE
061F 530F      =1986         ANL     A,#0FH          ;MASK UPPER 4 BITS
0621 47        =1987         SWAP    A               ;MS NIBBLE MUST BE IN UPPER 4 BITS.
0622 19        =1988         INC     R1              ;INCREMENT RAM POINTER
0623 A1        =1989         MOV     @R1,A           ;TEMPORARILY STORE LABEL 2, MS NIBBLE IN R3.
               =1990 ;GET 2ND LABEL, LS NIBBLE AND CHECK BEFORE STORING.
0624 B495      =1991         CALL    ROCIA           ;RECIEVE DATA FROM VLSI CHIP
               =1992 NOLSBT:
0626 F665      =1993         JC      ELSTBT          ;IF CARRY FLAG SET, WE HAVE TRANSMISSION ERROR.  JUMP TO FILL RE
0628 530F      =1994         ANL     A,#0FH          ;MASK UPPER 4 BITS
062A 41        =1995         ORL     A,@R1           ;PACK MS NIBBLE WITH LS NIBBLE TO FORM 1 BYTE
062B A1        =1996         MOV     @R1,A           ;STORE 2ND LABEL IN R3 TEMPORARILY.
062C 19        =1997         INC     R1              ;INCREMENT RAM POINTER.
               =1998 ;CHECK FOR LAST BYTE
062D B631      =1999         JF0     LBDET           ;JUMP IF NO LAST BYTE TO NEXT LABEL SET
062F C441      =2000         JMP     DECR0
               =2001 ;LAST BYTE DETECTED.  FILL IN THE REST OF RAM WITH FF'S.
0631 F8        =2002 LBDET:  MOV     A,R0            ;CHECK COUNTER FOR 8 BYTES RECIEVED
0632 D301      =2003         XRL     A,#01D          ;COUNTER SHOULD BE AT 1 IF 8 BYTES DONE
0634 C647      =2004         JZ      RTRCVR          ;IF ZERO, NO RAM TO FILL WITH FF'S.
               =2005 ;FILL REST OF RAM WITH FF'S
0636 C8        =2006         DEC     R0              ;ADJUST LABEL SET COUNTER TO BYTE COUNTER
0637 F8        =2007         MOV     A,R0
0638 E7        =2008         RL      A               ;MULTIPLY COUNT BY 2
0639 A8        =2009         MOV     R0,A
063A B1FF      =2010 FILFF:  MOV     @R1,#0FFH       ;STORE FF IN RAM TO SIGNIFY NO LABEL.
063C 19        =2011         INC     R1              ;INCREMENT RAM POINTER.
063D E83A      =2012         DJNZ    R0,FILFF        ;IF R0 NOT 0, GO TO NEXT RAM LOCATION.
063F C447      =2013         JMP     RTRCVR          ;REST OF RAM FILLED WITH FF'S.
               =2014 ;LABEL SET SAVED IN RAM.  REPEAT PROCESS UNTIL ALL BYTES ARE STORED.
               =2015 DECR0:
0641 E805      =2016         DJNZ    R0,RTRLAB       ;DECREMENT LABEL SET COUNTER AND JUMP TO BEGINNING OF ROUTINE IF
               =2017 ;F0 SHOULD BE SET DUE TO LAST BYTE BIT.  IF NOT, THERE IS AN ERROR.
0643 B647      =2018         JF0     RTRCVR          ;JUMP IF LAST BYTE BIT OK.
0645 C465      =2019         JMP     ELSTBT          ;JUMP TO ERROR ROUTINE IF NO FLAG.
               =2020 ;CHECK FOR LABEL 1 FLAGS BEING EQUAL TO LABEL 2 FLAGS.  IF ERROR OCCURS, BEEP 5 TIMES,
               =2021 ; AND THEN CLEAR RAM WITH FF'S.
0647 BB08      =2022 RTRCVR: MOV     R3,#8D          ;SET LABEL 1 FLAG SET COUNTER
0649 B861      =2023         MOV     R0,#TWOLAB      ;SET RAM POINTER #1 TO LABEL 1 FLAGS
064B BA08      =2024 RDLAB1: MOV     R2,#8D          ;SET LABEL 2 FLAG SET COUNTER
064D B962      =2025         MOV     R1,#TWOLAB+1    ;SET RAM POINTER #2 TO LABEL 2 FLAGS
064F F0        =2026 RDLAB2: MOV     A,@R0           ;READ LABEL 1 FLAG
0650 37        =2027         CPL     A
0651 C66F      =2028         JZ      FLCKRT          ;JUMP TO END OF CHECK ROUTINE.  NO MORE FLAGS TO CHECK.
0653 37        =2029         CPL     A               ;PUT ACCUMULATOR BACK TO LABEL 1 FLAG
0654 D1        =2030         XRL     A,@R1           ;COMPARE LABEL 1 FLAG TO LABEL 2 FLAG
0655 C665      =2031         JZ      ELSTBT          ;JUMP IF ERROR.  THERE IS A MATCH.
0657 D0        =2032         XRL     A,@R0           ;GET LABEL 2 FLAG BACK IN ACCUMULATOR
0658 37        =2033         CPL     A
0659 C65F      =2034         JZ      INLAB1          ;JUMP IF LABEL 2 FLAG IS FF
065B 19        =2035         INC     R1
065C 19        =2036         INC     R1              ;INCREMENT RAM POINTER FOR LABEL 2
065D EA4F      =2037         DJNZ    R2,RDLAB2       ;DECREMENT LABEL 2 FLAG COUNTER.  JUMP IF ZERO.
065F 18        =2038 INLAB1: INC     R0
0660 18        =2039         INC     R0              ;INCREMENT RAM POINTER FOR LABEL 1
0661 EB4B      =2040         DJNZ    R3,RDLAB1       ;DECREMENT LABEL 1 FLAG COUNTER.  JUMP IF ZERO.
0663 C46F      =2041         JMP     FLCKRT          ;TRANSMISSION CHECKS OK.  JUMP TO RETURN.
```

```
                =2042 ;ERROR.  TURN ON RED LIGHT AND BEEP 5 TIMES AFTER CLEARING RAM.
                =2043 ELSTBT:
0665 F4DF       =2044         CALL    ERS2RM         ;FILL FLAG RAM UP WITH FF'S
                =2045 ;
0667 B805       =2046         MOV     R0,#5          ;SET BEEP COUNT
0669 7481       =2047         CALL    TERRWT         ;BEEP 5 TIMES
                =2048 ;
066B FC         =2049         MOV     A,R4           ;RETRIEVE FLAGS
066C 4380       =2050         ORL     A,#80H         ;SET TWO LABEL ERROR FLAG
066E AC         =2051         MOV     R4,A           ;SAVE SET FLAG
                =2052 ;EVERYTHING IS DONE.  RETURN.
066F 83         =2053 FLCKRT: RET                    ;RAM IS FULL.  RETURN TO MAIN ROUTINE.
                =2054
                 2055 $     INCLUDE(:F3:FLGPR1.SRC)
                =2056 ;*******************************************************************
                =2057 ;**                      Routine FLGPRG                           **
                =2058 ;** Function: Read UPC codes and check if programming to EEPROM is required **
                =2059 ;** Date: 3-17-87                                                 **
                =2060 ;** Subroutines Called: SNDWRT, ERASFL, TRNFLG, SHIFTL, WRACC, WAIT, TRNDTA **
                =2061 ;*******************************************************************
                =2062 ;CHECK SWITCH SETTING FOR EEPROM PROGRAMMING.  DIP SWITCH 9, BIT 5 IS
                =2063 FLGPRG:
                =2064 ;RESET TWO LABEL ERROR FLAG
0670 FC         =2065         MOV     A,R4
0671 537F       =2066         ANL     A,#7FH         ;RESET ERROR FLAG
0673 AC         =2067         MOV     R4,A           ;RE-SAVE FLAGS
                =2068 ; ENABLE PROGRAMING SWITCH.
0674 895F       =2069         MOV     R1,#SWISET     ;SET RAM POINTER TO READ OPTIONS REG.
0676 F1         =2070         MOV     A,@R1          ;RETRIEVE RAM SWITCH SETTINGS
0677 B285       =2071         JB5     PROLAB         ;JUMP TO PROGRAM FLAGS
                =2072 ;CHECK SWITCH 9 FOR PROGRAM FLAGS OPTION
0679 B908       =2073         MOV     R1,#SWLATC     ;SET POINTER TO READ EXTERNAL SWITCHES.
067B 81         =2074         MOVX    A,@R1
067C B285       =2075         JB5     PROLAB
                =2076 ;PROGRAMING FLAGS BY READING LABELS IS NOT A CHOSEN OPTION.  CONTINUE TO READ
                =2077 ;  GOOD READ AND COMMUNICATE OUT OCIA PORT.
                =2078 ;SET FLAG POINTER TO 0.
067E FE         =2079         MOV     A,R6
067F 538F       =2080         ANL     A,#08FH        ;RESET FLAG POINTER
0681 AE         =2081         MOV     R6,A           ;SAVE POINTERS
0682 F5         =2082         SEL     MB1
0683 E47E       =2083         JMP     GOOD30
                =2084 ;IN 'PROGRAM FLAG' MODE.  CHECK FOR UPC A LABEL.
0685 FE         =2085 PROLAB: MOV     A,R6           ;CHECK VERSION FLAGS FOR UPC A
0686 5307       =2086         ANL     A,#07H         ;MASK ALL BUT VERSION POINTERS
0688 D301       =2087         XRL     A,#EVERA       ;CHECK AGAINST UPCA CODE
068A C68F       =2088         JZ      CHKLP1         ;JUMP TO CHECK WHICH LABEL PAIRS ARE ENCODED.
068C F5         =2089         SEL     MB1
068D E400       =2090         JMP     RDTAG          ;NOT A VALID FLAG LABEL, DO NOT TRANSMIT.
                =2091 ;
                =2092 ;CHECK FOR LABEL PAIRS TO LOAD INTO EEPROM.
                =2093 ;R6S1 REGISTER HOLDS RIGHT TAG WHICH COMPRISES 6 NIBBLES WITH CHECKSUM AS
                =2094 ; ONE OF THE 6 NIBBLES.  L6S1 REGISTER HOLDS LEFT TAG WHICH COMPRISES 6 NIBBLES.
                =2095 ; UPC A CODE HAS THE FOLLOWING ENCODED INFORMATION:
                =2096 ;   0ABCDE   FGHIJ(CHECK DIGIT)
                =2097 ;   L6S1     R6S1
                =2098 ; AB SIGNIFIES FIRST PAIR, FIRST LABEL FLAG DIGITS.
                =2099 ; CD SIGNIFIES FIRST PAIR, SECOND LABEL FLAG DIGITS.
                =2100 ; EF SIGNIFIES SECOND PAIR, FIRST LABEL FLAG DIGITS.
                =2101 ; GH SIGNIFIES SECOND PAIR, SECOND LABEL FLAG DIGITS.
                =2102 ; IJ HAS THE FOLLOWING DEFINITION:
                =2103 ;      IJ      DEFINITION
                =2104 ;      01      LABEL PAIRS 1 AND 2
                =2105 ;      02      LABEL PAIRS 3 AND 4
                =2106 ;      03      LABEL PAIRS 5 AND 6
                =2107 ;      04      LABEL PAIRS 7 AND 8
                =2108 ;
                =2109 CHKLP1:
068F B92F       =2110         MOV     R1,#R6S1+1     ;SET POINTER TO RETRIEVE HI NIBBLES
0691 F1         =2111         MOV     A,@R1          ;RETRIEVE HI NIBBLES
0692 530F       =2112         ANL     A,#0FH         ;MASK OUT H NIBBLE
0694 47         =2113         SWAP    A              ;I0
0695 AA         =2114         MOV     R2,A
0696 19         =2115         INC     R1             ;SET POINTER TO J (CHECK DIGIT) NIBBLES
0697 F1         =2116         MOV     A,@R1
0698 53F0       =2117         ANL     A,#0F0H        ;MASK OUT CHECK DIGIT
069A 47         =2118         SWAP    A              ;0J
069B 4A         =2119         ORL     A,R2           ;IJ NIBBLE RETRIEVED
069C AA         =2120         MOV     R2,A           ;SAVE IJ
                =2121 ;
                =2122 ;CHECK IJ FOR BEING 0
069D 96A1       =2123         JNZ     CHKIJ          ;JUMP ON IJ>00
069F C4E7       =2124         JMP     RTPRG          ;JUMP AND IGNORE LABEL.  IJ IS INVALID.
                =2125 ;CHECK IJ FOR BEING LESS THAN OR EQUAL TO 4
06A1 03FB       =2126 CHKIJ:  ADD     A,#0FBH
06A3 E6A7       =2127         JNC     VALFLG         ;JUMP TO READ LABEL INTO RAM.  TAG IS VALID.
06A5 C4E7       =2128         JMP     RTPRG          ;JUMP AND IGNORE LABEL.  IJ IS INVALID.
                =2129 ;
                =2130 ;VALID FLAG LABEL.  CHECK FLAG POINTER.
                =2131 VALFLG:
06A7 FE         =2132         MOV     A,R6           ;RETRIEVE FLAG POINTER
06A8 5370       =2133         ANL     A,#70H         ;MASK ALL BUT FLAG POINTER
```

```
06AA 9680      =2134           JNZ     FLGCHK           ;JUMP FLAG POINTER >0
               =2135  ;FLAG POINTER IS 0. FILL FLAG RAM WITH FF'S.
06AC F4DF      =2136           CALL    ERS2RM           ;FILL TWO LABEL RAM WITH FF'S
06AE C4C3      =2137           JMP     INCPNT           ;JUMP TO INC FLAG POINTER
               =2138  ;CHECK FLAG POINTER FOR BEING GREATER THAN 3. (TOTAL OF 4 UPC CODES)
06B0 FE        =2139  FLGCHK:  MOV     A,R6             ;RETRIEVE FLAG POINTER
06B1 5340      =2140           ANL     A,#40H           ;MASK ALL BUT FLAG POINTER (B2)
06B3 C6B7      =2141           JZ      RTRMRT           ;FLAG POINTER IS <= 3. ROTATE RAM.
               =2142  ;FOUR SETS OF LABEL FLAGS HAVE BEEN PROGRAMED. DO NOT ALLOW ANY MORE READS UNLESS SWITCH 9 IS C
06B5 C4E7      =2143           JMP     RTPRG            ;GO TO DISPLAY BAD READ.
               =2144  ;ROTATE RAM 4 BYTES RIGHT.
06B7 BA0C      =2145  RTRMRT:  MOV     R2,#12           ;SET LOOP COUNTER
06B9 B970      =2146           MOV     R1,#TWOLAB+15    ;SET DESTINATION POINTER
06BB B86C      =2147           MOV     R0,#TWOLAB+11    ;SET SOURCE POINTER
06BD F0        =2148  RTRM1:   MOV     A,@R0            ;RETRIEVE BYTE TO BE SHIFTED
06BE A1        =2149           MOV     @R1,A            ;SAVE BYTE TO NEW LOCATION
06BF C9        =2150           DEC     R1               ;DECREMENT DESTINATION POINTER
06C0 C8        =2151           DEC     R0               ;DECREMENT SOURCE POINTER
06C1 EABD      =2152           DJNZ    R2,RTRM1
               =2153  ;INCREMENT FLAG POINTER
               =2154  INCPNT:
06C3 FE        =2155           MOV     A,R6             ;RETRIEVE FLAG COUNTER
06C4 0310      =2156           ADD     A,#10H           ;INCREMENT FLAG COUNTER
06C6 AE        =2157           MOV     R6,A             ;SAVE FLAG COUNTER
               =2158  ;PLACE L6S1 AND R6S1 INTO RAM
06C7 B961      =2159           MOV     R1,#TWOLAB       ;DESTINATION POINTER
06C9 94E1      =2160           CALL    TRNFLG           ;TRANSFER UPC CODE TO TWO LABEL RAM
06CB D447      =2161           CALL    RTRCVR           ;CHECK TWO LABEL READ RAM
               =2162  ;CHECK TWO LABEL ERROR FLAG
06CD FC        =2163           MOV     A,R4             ;RETRIEVE ERROR FLAG
06CE 37        =2164           CPL     A
06CF F2DD      =2165           JB7     WRTPRM           ;NO ERROR FLAG. JUMP TO WRITE TO EEPROM.
               =2166  ;ERROR. ERASE RAM AND RESET POINTER.
06D1 F4DF      =2167           CALL    ERS2RM           ;ERASE RAM
06D3 FE        =2168           MOV     A,R6             ;RETRIEVE FLAG COUNTER
06D4 538F      =2169           ANL     A,#8FH           ;CLEAR FLAG COUNTER
06D6 AE        =2170           MOV     R6,A
               =2171  ;RETRIEVE AND CLEAR TWO LABEL FLAG ERROR
06D7 FC        =2172           MOV     A,R4             ;RETRIEVE FLAG
06D8 537F      =2173           ANL     A,#7FH           ;RESET FLAG
06DA AC        =2174           MOV     R4,A             ;SAVE FLAG
06DB C4E7      =2175           JMP     RTPRG            ;JUMP TO RDTAG ROUTINE.
               =2176  ;
               =2177  ;ERASE AND PROGRAM EEPROM CONTENTS ACCORDING TO RAM
06DD 8464      =2178  WRTPRM:  CALL    WREPRM           ;WRITE CONTENTS TO EEPROM
06DF 998F      =2179           ANL     P1,#255-EBDLT    ;BD-LT OFF
06E1 8920      =2180           ORL     P1,#EGDLT        ;GD-LT ON
06E3 D5        =2181           SEL     RB1
06E4 BE10      =2182           MOV     R6,#EGDTON*2     ;GOOD TONE LENGTH*2
06E6 C5        =2183           SEL     RB0
06E7 F5        =2184  RTPRG:   SEL     MB1
06E8 E400      =2185           JMP     RDTAG            ;GO READ ANOTHER LABEL
               2186   ;************************************
06EA A3        2187   TROPG6:  MOVP    A,@A
06EB 83        2188            RET
0700           2189            ORG     700H
               2190  $         INCLUDE(:F3:COPYRT.SRC)
               =2191  ;*************************************************************
               =2192  ;
0700 434F5059  =2193            DB     'COPYRIGHT (C)1987 '
0704 52494748
0708 54202843
070C 29313938
0710 3720
0712 53504543  =2194            DB     'SPECTRA-PHYSICS, INC. '
0716 5452412D
071A 50485953
071E 4943532C
0722 20494E43
0726 2E20
0728 414C4C20  =2195            DB     'ALL RIGHTS RESERVED'
072C 52494748
0730 54532052
0734 45534552
0738 564544
               =2196  ;
               =2197  ;*************************************************************
               2198  $         INCLUDE(:F3:FSDATA.SRC)
               =2199  ;*************************************************************
               =2200  ; FILE:  FSDATA.SRC  10-25-83 16:55  BOB ACTIS
               =2201  ;        MODIFIED    04-02-86        DREW TAUSSIG
               =2202  ;        MODIFIED    11-18-86 13:50  BOB ACTIS
               =2203  ;        MODIFIED    02-18-87 10:15  BOB ACTIS
               =2204  ;        MODIFIED    03-14-87 20:23  RANDY ELLIOTT
               =2205  ;
               =2206  ; ROUTINE: SDATA
               =2207  ; FUNCTION: CHECK SDATA FOR VALID COMMANDS.
               =2208  ;           IF VALID COMMAND, TAKE APPROPRIATE ACTION.
               =2209  ;           IF NOT VALID, RESET THE PROGRAM.
               =2210  ; ENTRY:  RB0
               =2211  ;         SDATA READY IN FCA
               =2212  ; EXIT:   USES R0,A
```

```
                    =2213 ;
                    =2214 ;
                    =2215 ;RETRIEVE COMMAND BYTE FROM VLSI CHIP AND STORE @STSDTA RAM
0738 B802           =2216 SDATA:  MOV    R0,#EOCIA       ;ENTERED FROM CKFCA ROUTINE
073D 80             =2217         MOVX   A,@R0           ;GET SDATA BYTE
073E B85E           =2218         MOV    R0,#STSDTA      ;SAVE SDATA IN @R0.
0740 A0             =2219         MOV    @R0,A           ;STORE SDATA IN RAM
                    =2220 ;CHECK COMMAND BYTE FOR ENABLE SCAN ('E') BY TURNING ON LASER.
0741 D345           =2221 SDATA1: XRL    A,#ESEN
0743 9648           =2222         JNZ    SDATA2          ;JUMP IF NOT ENABLE SCAN CHAR
0745 99EF           =2223         ANL    P1,#255-ELASDB  ;LASER ON
0747 83             =2224         RET
                    =2225 ;CHECK COMMAND BYTE FOR DISABLE SCAN ('D') BY TURNING OFF LASER.
0748 B85E           =2226 SDATA2: MOV    R0,#STSDTA
074A F0             =2227         MOV    A,@R0           ;GET COMMAND BYTE FROM RAM.
074B D3C4           =2228         XRL    A,#ESDIS
074D 9652           =2229         JNZ    SDATA3          ;JUMP IF NOT DISABLE SCAN CHAR
074F 8910           =2230         ORL    P1,#ELASDB      ;LASER OFF
0751 83             =2231         RET
                    =2232 ;CHECK COMMAND BYTE FOR WRITING TWO LABEL SETTINGS ('I') TO RAM FROM HOST.
0752 B85E           =2233 SDATA3: MOV    R0,#STSDTA
0754 F0             =2234         MOV    A,@R0           ;GET COMMAND BYTE FROM RAM.
0755 D389           =2235         XRL    A,#STRAM1       ; CHECK FOR 'I' CHARACTER.
0757 9660           =2236         JNZ    SDATA4          ;JUMP IF NOT 'I' CHARACTER.
0759 54CC           =2237         CALL   DISLAS          ;TURN LASER OFF AND CLEAR SCAN RAM.
075B D400           =2238         CALL   STRRAM          ;WRITE TWO LABEL SETTINGS FROM HOST TO SCANNER RAM.
075D 5407           =2239         CALL   ENLAS           ;TURN LASER ON AND CLEAR SCAN RAM.
075F 83             =2240         RET
                    =2241 ;CHECK COMMAND BYTE FOR HORSE TEST ('D1')
0760 B85E           =2242 SDATA4: MOV    R0,#STSDTA
0762 F0             =2243         MOV    A,@R0           ;GET COMMAND BYTE FROM RAM.
0763 D3D1           =2244         XRL    A,#EHCNTL
0765 9677           =2245         JNZ    SDATA5          ;JUMP IF NOT THE HORSE CONTROL BYTE
0767 27             =2246 SDATAH: CLR    A          ;CLEAR STACK POINTER/RETURN LINKAGE SINCE
0768 D7             =2247         MOV    PSW,A      ;WE WILL JUMP INTO HORSE TEST AND STAY THERE
0769 C5             =2248         SEL    RB0
076A 85             =2249         CLR    F0              ;SETUP FOR HORSE TEST ENTRY
076B 95             =2250         CPL    F0
076C A5             =2251         CLR    F1
076D B830           =2252         MOV    R0,#TSEG1
076F BB10           =2253         MOV    R3,#16
0771 990F           =2254         ANL    P1,#255-EGDLT
0773 8950           =2255         ORL    P1,#EBDLT+ELASDB        ;BDLT INDICATES CNTL BYTE RECVD
0775 840A           =2256         JMP    THO05
                    =2257 ;CHECK COMMAND BYTE FOR TO WRITE TWO LABLE SETTINGS IN RAM TO EEPROM ('G').
0777 B85E           =2258 SDATA5: MOV    R0,#STSDTA
0779 F0             =2259         MOV    A,@R0           ;RETRIEVE COMMAND BYTE FROM RAM
077A D3C7           =2260         XRL    A,#WRPRM1       ;COMPARE ACC. WITH 'G' CHARACTER
077C 9685           =2261         JNZ    SDATA6          ;JUMP - NOT WRITE SETTINGS TO EEPROM
077E 54CC           =2262         CALL   DISLAS          ;CLEAR SCAN RAM AND TURN OFF LASER
0780 B464           =2263         CALL   WREPRM          ;WRITE RAM DATA TO EEPROM
0782 5407           =2264         CALL   ENLAS           ;CLEAR SCAN RAM AND TURN ON LASER
0784 83             =2265         RET
                    =2266 ;CHECK COMMAND BYTE FOR TO READ EEPROM AND SEND DATA TO HOST ('H')
0785 B85E           =2267 SDATA6: MOV    R0,#STSDTA
0787 F0             =2268         MOV    A,@R0           ;RETRIEVE COMMAND BYTE FROM RAM
0788 D3C8           =2269         XRI    A,#TRPRM1       ;COMPARE ACC. WITH 'H' CHARACTER
078A 9697           =2270         JNZ    SDATA7          ;JUMP - NOT READ EEPROM AND SEND DATA TO HOST
078C 54CC           =2271         CALL   DISLAS          ;CLEAR SCAN RAM AND TURN OFF LASER
078E D5             =2272         SEL    RB1
078F B920           =2273         MOV    R1,#RCRAM       ;SET RAM POINTER TO SCRATCH PAD RAM
0791 C5             =2274         SEL    RB0
0792 1493           =2275         CALL   TREPRM          ;READ EEPROM AND SEND TO HOST.
0794 5407           =2276         CALL   ENLAS           ;CLEAR SCAN RAM AND TURN OFF LASER.
0796 83             =2277         RET
                    =2278 ;CHECK COMMAND BYTE FOR ENABLE AMB MESSAGE ('A')
0797 B85E           =2279 SDATA7: MOV    R0,#STSDTA
0799 F0             =2280         MOV    A,@R0           ;RETRIEVE COMMAND BYTE FROM RAM
079A D3C1           =2281         XRL    A,#EAMESE
079C 96A3           =2282         JNZ    SDATA8          ;JUMP IF NOT AMB MESSAGE ENABLE
079E FC             =2283         MOV    A,R4
079F 4304           =2284         ORL    A,#EAMBMS       ;ENABLE AMB LABEL MESSAGE
07A1 AC             =2285         MOV    R4,A
07A2 83             =2286         RET
                    =2287 ;CHECK COMMAND BYTE FOR DISABLE AMB MESSAGE ('B')
07A3 B85E           =2288 SDATA8: MOV    R0,#STSDTA
07A5 F0             =2289         MOV    A,@R0           ;RETRIEVE COMMAND BYTE FROM RAM
07A6 D3C2           =2290         XRL    A,#EAMESD
07A8 96AF           =2291         JNZ    SDATA9          ;JUMP IF NOT AMB MESSAGE DISABLE
07AA FC             =2292         MOV    A,R4
07AB 53FB           =2293         ANL    A,#255-EAMBMS   ;DISABLE AMB LABEL MESSAGE
07AD AC             =2294         MOV    R4,A
07AE 83             =2295         RET
                    =2296 ;CHECK COMMAND BYTE FOR READING TWO LABEL READ SETTINGS FROM RAM TO HOST ('J')
07AF B85E           =2297 SDATA9: MOV    R0,#STSDTA
07B1 F0             =2298         MOV    A,@R0           ;RETRIEVE COMMAND BYTE FROM RAM
07B2 D34A           =2299         XRL    A,#TRPRM2       ;CHECK FOR 'J' CHARACTER
07B4 96C1           =2300         JNZ    SDAT10          ;JUMP IF NOT 'J' CHARACTER
07B6 54CC           =2301         CALL   DISLAS          ;CLEAR SCAN RAM AND TURN LASER OFF
07B8 D5             =2302         SEL    RB1
07B9 B961           =2303         MOV    R1,#TWOLAB      ;SET RAM POINTER TO TWO LABEL READ SETTINGS
07BB C5             =2304         SEL    RB0
```

```
07BC 1499   =2305           CALL    TRRAM           ;TRANSMIT RAM TO HOST
07BE 5407   =2306           CALL    ENLAS           ;CLEAR SCAN RAM AND TURN LASER ON
07C0 83     =2307           RET
            =2308 ;CHECK COMMAND BYTE FOR READING SCANNER CONFIGURATION FROM RAM. ('K')
07C1 B85E   =2309 SDAT10:   MOV     R0,#STSDTA
07C3 F0     =2310           MOV     A,@R0           ;RETRIEVE COMMAND BYTE FROM RAM
07C4 D3CB   =2311           XRL     A,#SWSET1       ;CHECK FOR 'K' CHARACTER
07C6 96CF   =2312           JNZ     SDAT11          ;JUMP IF NOT 'K' CHARACTER
07C8 54CC   =2313           CALL    DISLAS          ;CLEAR SCAN RAM AND TURN LASER OFF
07CA 34A0   =2314           CALL    SWSET           ;READ SWITCH SETTING FROM RAM AND TRANSMIT TO HOST
07CC 5407   =2315           CALL    ENLAS           ;CLEAR SCAN RAM AND TURN LASER ON
07CE 83     =2316           RET
            =2317 ;CHECK COMMAND BYTE FOR OVERRIDING SCANNER SETTINGS. ('L')
07CF B85E   =2318 SDAT11:   MOV     R0,#STSDTA
07D1 F0     =2319           MOV     A,@R0           ;RETRIEVE COMMAND BYTE FROM RAM
07D2 D38C   =2320           XRL     A,#OVRSET       ;CHECK FOR 'L' CHARACTER
07D4 96DD   =2321           JNZ     SDAT12          ;JUMP IF NOT 'L' CHARACTER
07D6 54CC   =2322           CALL    DISLAS          ;CLEAR SCAN RAM AND TURN LASER OFF
07D8 94C6   =2323           CALL    OVRSET          ;OVERRIDE SWITCH SETTINGS VIA HOST
07DA 5407   =2324           CALL    ENLAS           ;CLEAR SCAN RAM AND TURN LASER ON
07DC 83     =2325           RET
            =2326 ;IF WE GET HERE, GOT RESET COMMAND OR NON-VALID COMMAND. JUMP TO RESET SCANNER.
07DD 0400   =2327 SDAT12:   JMP     RSTTRP
             2328 $         INCLUDE(:F3:ERS2RM.SRC)
            =2329 ;************************************************************
            =2330 ;**                 Subroutine ERS2RM                       **
            =2331 ;** Function: SET TWO LABEL FLAG RAM TO FF'S                **
            =2332 ;** Date: 7-22-87                                           **
            =2333 ;** Subroutines Called: None                                **
            =2334 ;** Registers/Flags affected: R0, R2, ACCUMULATOR           **
            =2335 ;** Ports affected: None                                    **
            =2336 ;** RAM locations affected: None                            **
            =2337 ;************************************************************
            =2338 ERS2RM:
07DF BA10   =2339           MOV     R2,#160         ;SET CYCLE COUNTER FOR LABEL FLAGS
07E1 B861   =2340           MOV     R0,#TWOLAB      ;SET RAM POINTER TO LABEL 1 FLAG 1
07E3 B0FF   =2341 ELST1:    MOV     @R0,#0FFH       ;FILL RAM WITH FF'S
07E5 18     =2342           INC     R0
07E6 EAE3   =2343           DJNZ    R2,ELST1
07E8 83     =2344           RET
             2345 ;********************************************
07E9 A3      2346 TROPG7:   MOVP    A,@A
07EA 83      2347           RET
0800         2348           ORG     800H            ;START OF MEMORY BANK 1
             2349 $         INCLUDE(:F2:VERDLB.SRC)
            =2350 ;************************************************************
            =2351 ; FILE:  VERDLB.SRC  11-18-86 12:15  BOB ACTIS
            =2352 ;        MODIFIED   03-25-86         DREW TAUSSIG
            =2353 ;        VERSION "D" FIRMWARE LIBRARY.
            =2354 ;************************************************************
            =2355 ; ROUTINE: CLR6SG
            =2356 ; FUNCTION: CLEAR 6-CHAR SEGMENTS AND COUNTERS.
            =2357 ; ENTRY: START ADDRESS AND COUNT IN DEFS TABLE.
            =2358 ; EXIT:  A = 0
            =2359 ;        R0 = END OF 6-CHAR BUFFER/COUNTER SPACE PLUS 1.
            =2360 ;        R2 = 0
            =2361 ;        6-CHAR BUFFER/COUNTER SPACE = 0'S.
            =2362 ;        ALSO RESETS 2-LABEL ERROR BYTE AND STATUS BYTES
            =2363 ;
0800 B844   =2364 CLR6SG:   MOV     R0,#ERRTL
0802 B000   =2365           MOV     @R0,#0          ;RESET TWO LABEL ERROR INDICATOR
0804 B842   =2366           MOV     R0,#STTL13
0806 B0FF   =2367           MOV     @R0,#0FFH       ;RESET JAN13-JAN13 TWO LABEL STATUS
0808 B843   =2368           MOV     R0,#STTL8
080A 23CC   =2369           MOV     A,#0CCH
080C 40     =2370           ORL     A,@R0           ;RESET JAN13-JAN8 LABEL STATUS
080D A0     =2371           MOV     @R0,A           ;(ONLY JAN13 PART)
            =2372 ;
080E B824   =2373           MOV     R0,#BF6CST      ;START OF 6-CHAR BUFFER AREA
0810 BA12   =2374           MOV     R2,#BF6CNT      ;NUMBER OF BYTES IN BUFFER
0812 0424   =2375           JMP     CLRT00          ;JUMP TO THE CLEAR LOOP
            =2376 ;************************************************************
            =2377 ; ROUTINE: CLR4SG
            =2378 ; FUNCTION: CLEAR 4-CHAR SEGMENTS AND COUNTERS.
            =2379 ; ENTRY: START ADDRESS AND COUNT IN DEFS TABLE.
            =2380 ; EXIT:  A = 0
            =2381 ;        R0 = END OF 4-CHAR BUFFER/COUNTER SPACE PLUS 1.
            =2382 ;        R2 = 0
            =2383 ;        4-CHAR BUFFER/COUNTER SPACE = 0'S.
            =2384 ;        ALSO RESETS 2-LABEL STATUS BYTE (STTL8)
            =2385 ;
0814 B843   =2386 CLR4SG:   MOV     R0,#STTL8
0816 2333   =2387           MOV     A,#033H         ;DO ONLY THE JAN8 PART OF LABEL
0818 40     =2388           ORL     A,@R0
0819 A0     =2389           MOV     @R0,A
            =2390 ;
081A B836   =2391           MOV     R0,#BF4CST      ;START OF 4-CHAR BUFFER AREA
081C BA0C   =2392           MOV     R2,#BF4CNT      ;NUMBER OF BYTES IN BUFFER
081E 0424   =2393           JMP     CLRT00          ;JUMP TO THE CLEAR LOOP
            =2394 ;************************************************************
            =2395 ; ROUTINE: CLRSNB
            =2396 ; FUNCTION: CLEAR THE SCAN BUFFER.
```

```
                      =2397 ; ENTRY: START ADDRESS IN DEFS TABLE.
                      =2398 ; EXIT:    A = 0
                      =2399 ;          R0 = END OF SCAN BUFFER SPACE PLUS 1.
                      =2400 ;          R2 = 0
                      =2401 ;          SCAN BUFFER SPACE = 0'S.
                      =2402 ;
0820 B820             =2403 CLRSNB: MOV    R0,#SCNBUF     ;START OF SCAN BUFFER AREA
0822 BA04             =2404        MOV    R2,#4          ;NUMBER OF BYTES IN BUFFER
0824 27               =2405 CLRT00: CLR    A              ;CLEAR LOOP USED BY OTHER ROUTINES
0825 A0               =2406 CLRSN1: MOV    @R0,A
0826 18               =2407        INC    R0
0827 EA25             =2408        DJNZ   R2,CLRSN1
0829 83               =2409        RET
                      =2410 ;******************************************************
                      =2411 ; ROUTINE: CLRSBF
                      =2412 ; FUNCTION: CLEAR SEND BUFFER, POINTER AND FLAG.
                      =2413 ; ENTRY: START ADDRESS AND COUNT IN DEFS TABLE.
                      =2414 ;        RB0
                      =2415 ; EXIT:   A = 0
                      =2416 ;         R0 = END OF SEND BUFFER SPACE PLUS 1.
                      =2417 ;         R2 = 0
                      =2418 ;         SEND BUFFER SPACE = 0CCH'S. (TERMINATION BYTES)
                      =2419 ;         SEND BUFFER FULL FLAG CLEAR. RB0-R4-B3
                      =2420 ;         SEND BUFFER POINTER SET TO PACKED DATA START ADDRESS.
                      =2421 ;
082A FC               =2422 CLRSBF: MOV    A,R4
082B 53F7             =2423        ANL    A,#255-ESBFUL  ;CLEAR SEND BUFFER FULL FLAG
082D AC               =2424        MOV    R4,A
                      =2425 ;
082E B847             =2426        MOV    R0,#SBFPNT
0830 2390             =2427        MOV    A,#SBSTRT
0832 A0               =2428        MOV    @R0,A          ;SET POINTER TO PACKED START ADDRESS
                      =2429 ;
0833 B848             =2430        MOV    R0,#SBUF       ;START OF SEND BUFFER AREA
0835 BA12             =2431        MOV    R2,#SBUFSZ     ;NUMBER OF BYTES IN BUFFER
0837 23CC             =2432        MOV    A,#0CCH        ;LOAD TERMINATION BYTES
0839 0425             =2433        JMP    CLRSN1         ;JUMP TO THE CLEAR LOOP
                      =2434 ;******************************************************
                      =2435 ; ROUTINE: MOV2BY, MOV3BY, MOV4BY
                      =2436 ; FUNCTION: MOVE BYTES FROM ONE BUFFER TO ANOTHER BUFFER.
                      =2437 ; ENTRY: R0 = FIRST BYTE ADDRESS OF SOURCE BUFFER.
                      =2438 ;        R1 = FIRST AVAILABLE BYTE ADDRESS OF DESTINATION BUFFER.
                      =2439 ; EXIT: DATA MOVED FROM SOURCE BUFFER TO DESTINATION BUFFER.
                      =2440 ;       R0 = END OF SOURCE BUFFER ADDRESS PLUS 1.
                      =2441 ;       R1 = NEXT AVAILABLE BYTE ADDRESS OF DESTINATION BUFFER.
                      =2442 ;       R2 = 0
                      =2443 ;       A = LAST BYTE TRANSFERED
                      =2444 ;
083B BA02             =2445 MOV2BY: MOV    R2,#2
083D 0445             =2446        JMP    MOVXBY
083F BA03             =2447 MOV3BY: MOV    R2,#3
0841 0445             =2448        JMP    MOVXBY
0843 BA04             =2449 MOV4BY: MOV    R2,#4
0845 F0               =2450 MOVXBY: MOV    A,@R0
0846 A1               =2451        MOV    @R1,A
0847 18               =2452        INC    R0
0848 19               =2453        INC    R1
0849 EA45             =2454        DJNZ   R2,MOVXBY
084B 83               =2455        RET
                      =2456 ;******************************************************
                      =2457 ; ROUTINE: SGSUM4, SGSUM6
                      =2458 ; FUNCTION: SUM THE DIGITS OF A SEGMENT FOR THE MOD-10 TEST.
                      =2459 ;           ALL ARITHMETIC IS ASSUMED BCD AND ONLY THE UNITS DIGIT
                      =2460 ;           IS VALID IN THE SUMS.
                      =2461 ; ENTRY: R0 = FIRST BYTE ADDRESS OF SEGMENT TO BE SUMMED.
                      =2462 ; EXIT:  R0 = NOT CHANGED
                      =2463 ;        R2 = C1+C3+C5  [C1+C3]
                      =2464 ;        A  = C2+C4+C6  [C2+C4]
                      =2465 ;        F0 IS USED
                      =2466 ;
084C 85               =2467 SGSUM4: CLR    F0
084D 95               =2468        CPL    F0             ;SET F0 FOR 4-CHAR SUM
084E 0451             =2469        JMP    SGSUMX
                      =2470 ;
0850 85               =2471 SGSUM6: CLR    F0             ;CLEAR F0 FOR 6-CHAR SUM
0851 BAF0             =2472 SGSUMX: MOV    R2,#0F0H       ;MASK FOR ODD DIGITS
0853 F0               =2473        MOV    A,@R0          ;C1
0854 5A               =2474        ANL    A,R2
0855 18               =2475        INC    R0
0856 60               =2476        ADD    A,@R0          ;C1+C3
0857 57               =2477        DA     A
0858 5A               =2478        ANL    A,R2
0859 B65E             =2479        JF0    SGSUMY         ;JUMP IF 4-CHAR SUM
                      =2480 ;
085B 18               =2481        INC    R0
085C 60               =2482        ADD    A,@R0          ;C1+C3+C5
085D 57               =2483        DA     A
085E 47               =2484 SGSUMY: SWAP   A              ;PUT SUM IN LOW BYTE
085F AA               =2485        MOV    R2,A           ;SAVE C1+C3+C5  [C1+C3]
                      =2486 ;
0860 F0               =2487        MOV    A,@R0          ;C6 [C4]
0861 C8               =2488        DEC    R0
```

```
0862 60      =2489           ADD     A,@R0           ;C6+C4    [C4+C2]
0863 57      =2490           DA      A
0864 B669    =2491           JF0     SGSUMR          ;JUMP IF 4-CHAR SUM
             =2492 ;
0866 C8      =2493           DEC     R0
0867 60      =2494           ADD     A,@R0           ;C6+C4+C2
0868 57      =2495           DA      A
0869 83      =2496 SGSUMR:   RET
             =2497 ;****************************************************************
             =2498 ; ROUTINE:  APL3R2
             =2499 ; FUNCTION: ADD 3*R2 TO A.  (BCD)
             =2500 ; ENTRY:    NO SETUP
             =2501 ; EXIT:     A = A+(3*R2)
             =2502 ;           R2 = NOT CHANGED
             =2503 ;
086A 6A      =2504 APL3R2:   ADD     A,R2
086B 57      =2505           DA      A
086C 6A      =2506           ADD     A,R2
086D 57      =2507           DA      A
086E 6A      =2508           ADD     A,R2
086F 57      =2509           DA      A
0870 83      =2510           RET
             2511 $          INCLUDE(:F3:EMOD10.SRC)
             =2512 ;****************************************************************
             =2513 ; FILE: EMOD10.SRC   11-18-86 12:15   BOB ACTIS
             =2514 ; ROUTINE:  EMOD10
             =2515 ; FUNCTION: VERIFY THE EMOD10 CHECK CHARACTER
             =2516 ; ENTRY:    SEGMENT IN SCAN BUFFER
             =2517 ; EXIT:     USES R0,R2,A
             =2518 ;           A = 0 IF CHECK CHARACTER IS GOOD
             =2519 ;           A <> 0 IF CHECK CHARACTER IS BAD
             =2520 ;
0871 B820    =2521 EMOD10:   MOV     R0,#SCNBUF
0873 B95A    =2522           MOV     R1,#WRKBUF
0875 143F    =2523           CALL    MOV3BY          ;MOVE SCAN BUFFER DATA TO WORK BUFFER
             =2524 ;
0877 8822    =2525           MOV     R0,#SCNBUF+2
0879 F0      =2526           MOV     A,@R0           ;GET CHARACTER C6
087A 530F    =2527           ANL     A,#0FH
087C 03FD    =2528           ADD     A,#-3
087E F287    =2529           JB7     ECASE1          ;JUMP IF C6=0,1,2
0880 C690    =2530           JZ      ECASE2          ;JUMP IF C6=3
0882 07      =2531           DEC     A
0883 C698    =2532           JZ      ECASE3          ;JUMP IF C6=4
0885 04A1    =2533           JMP     ECASE4          ;JUMP IF C6=5,6,7,8,9
             =2534 ;
             =2535 ; FOR C6=0,1,2  COMPUTE 3*(C2+C3+C5)+C1+C4+C6
             =2536 ;
0887 B85A    =2537 ECASE1:   MOV     R0,#WRKBUF
0889 F0      =2538           MOV     A,@R0
088A 47      =2539           SWAP    A               ;SWAP C1 AND C2
088B A0      =2540           MOV     @R0,A
088C 1450    =2541           CALL    SGSUM6          ;C2,C1,C3,C4,C5,C6
088E 04A6    =2542           JMP     EMODSM
             =2543 ;
             =2544 ; FOR C6=3  COMPUTE 3*(C2+0+C5)+C1+C3+C4
             =2545 ;
0890 B85B    =2546 ECASE2:   MOV     R0,#WRKBUF+1
0892 27      =2547           CLR     A
0893 30      =2548           XCHD    A,@R0           ;C4=0
0894 18      =2549           INC     R0
0895 30      =2550           XCHD    A,@R0           ;C6=C4
0896 F0      =2551           MOV     A,@R0           ;A=C5,C4
0897 47      =2552           SWAP    A               ;A=C4,C5
0898 A0      =2553           MOV     @R0,A
0899 04A1    =2554           JMP     ECASE4          ;C1,C2,C3,0,C4,C5
             =2555 ; FOR C6=4  COMPUTE 3*(C2+C4+C5)+C1+C3+0
             =2556 ;
089B B85C    =2557 ECASE3:   MOV     R0,#WRKBUF+2
089D 27      =2558           CLR     A
089E 20      =2559           XCH     A,@R0           ;C5=C6=0
089F 47      =2560           SWAP    A
08A0 30      =2561           XCHD    A,@R0           ;C5=0, C6=C5
             =2562                                   ;C1,C2,C3,C4,0,C5
             =2563 ;
             =2564 ; FOR C6=5,6,7,8,9  COMPUTE 3*(C2+C4+C6)+C1+C3+C5
             =2565 ;
08A1 B85A    =2566 ECASE4:   MOV     R0,#WRKBUF      ;C1,C2,C3,C4,C5,C6
08A3 1450    =2567           CALL    SGSUM6
08A5 2A      =2568           XCH     A,R2
             =2569 ;
             =2570 ; FINAL SUM
             =2571 ;
08A6 146A    =2572 EMODSM:   CALL    APL3R2
             =2573 ;
             =2574 ; CHECK AGAINST THE CHECK CHARACTER
             =2575 ;
08A8 B823    =2576 EMODCK:   MOV     R0,#SCNBUF+3
08AA 60      =2577           ADD     A,@R0
08AB 57      =2578           DA      A
08AC 530F    =2579           ANL     A,#0FH
```

```
08AE 83        =2580           RET
               2581 $      INCLUDE(:F3:FCKFCA.SRC)
               =2582 ;***********************************************************
               =2583 ; FILE:  FCKFCA.SRC  10-25-83  17:10  BOB ACTIS
               =2584 ; ROUTINE:  CKFCA
               =2585 ; FUNCTION:  CHECK IF FRAME CONTROL ARRAY HAS DATA.
               =2586 ;            IF SDATA, PROCESS BYTE.
               =2587 ;            IF SEGMENT CAPTURE AND SCANNING BIT IS SET, PUT SEGMENT
               =2588 ;               INTO THE SCAN BUFFER.
               =2589 ;            IF SEGMENT CAPTURE AND NOT SCANNING, RESET THE FRAME.
               =2590 ;            IF A SEGMENT IS SEEN, SET R7.
               =2591 ; ENTRY: RB0
               =2592 ; EXIT:  USES R0,R1,A
               =2593 ;               R7 IS SET IF A SEGMENT IS SEEN.
               =2594 ;
08AF 8682      =2595 CKFCA:  JNI     CKFC10          ;JUMP IF FCA HAS DATA
08B1 83        =2596         RET
               =2597 ;
08B2 B801      =2598 CKFC10: MOV     R0,#ESRRD
08B4 FC        =2599         MOV     A,R4
08B5 12BE      =2600         JB0     CKFC20          ;JUMP IF SCANNING BIT IS SET
08B7 80        =2601         MOVX    A,@R0           ;READ BYTE
08B8 F2EA      =2602         JB7     CKFC95          ;JUMP IF HOST DATA
08BA 90        =2603         MOVX    @R0,A           ;RESET FRAME CAPTURE
08BB BF0E      =2604         MOV     R7,#EWAIT       ;SET THE "SEG SEEN" TIMER
08BD 83        =2605         RET
               =2606 ;
08BE 80        =2607 CKFC20: MOVX    A,@R0           ;READ 1ST CHAR OF SEGMENT
08BF F2EA      =2608         JB7     CKFC95          ;JUMP IF HOST DATA
08C1 D2E6      =2609         JB6     CKFC90          ;JUMP IF PERIODICAL CAPTURE
08C3 B920      =2610         MOV     R1,#SCNBUF
               =2611 ;
08C5 47        =2612         SWAP    A
08C6 A1        =2613         MOV     @R1,A           ;STORE 1ST CHAR
08C7 80        =2614         MOVX    A,@R0           ;READ 2ND CHAR OF SEGMENT
08C8 31        =2615         XCHD    A,@R1           ;1ST AND 2ND STORED
08C9 19        =2616         INC     R1
08CA 80        =2617         MOVX    A,@R0           ;READ 3RD CHAR
               =2618 ;
08CB 47        =2619         SWAP    A
08CC A1        =2620         MOV     @R1,A           ;STORE 3RD CHAR
08CD 80        =2621         MOVX    A,@R0           ;READ 4TH CHAR
08CE 31        =2622         XCHD    A,@R1           ;3RD AND 4TH STORED
08CF 19        =2623         INC     R1
08D0 80        =2624         MOVX    A,@R0           ;READ 5TH CHAR
               =2625 ;
08D1 47        =2626         SWAP    A
08D2 A1        =2627         MOV     @R1,A           ;STORE 5TH CHAR
08D3 80        =2628         MOVX    A,@R0
08D4 31        =2629         XCHD    A,@R1           ;5TH AND 6TH STORED
08D5 19        =2630         INC     R1
               =2631 ;
08D6 B804      =2632         MOV     R0,#EPRDEC
08D8 80        =2633         MOVX    A,@R0           ;READ PARITY DECODE BYTE
08D9 537F      =2634         ANL     A,#07FH         ;MASK OFF THE UNUSED BIT
08DB A1        =2635         MOV     @R1,A           ;STORE PARITY DECODE B0-B6
               =2636 ;
08DC D37F      =2637         XRL     A,#07FH         ;TEST FOR NO DECODE. (BAD PARITY MAP)
08DE 96E4      =2638         JNZ     CKFC80          ;JUMP IF DECODE IS OK.
08E0 1420      =2639         CALL    CLRSNB          ;CLEAR THE SCAN BUFFER
08E2 04E6      =2640         JMP     CKFC90
               =2641 ;
08E4 BF0E      =2642 CKFC80: MOV     R7,#EWAIT       ;SET THE "SEG SEEN" TIMER
               =2643 ;
08E6 B801      =2644 CKFC90: MOV     R0,#EFRRST
08E8 90        =2645         MOVX    @R0,A           ;RESET THE FRAME
08E9 83        =2646         RET
               =2647 ;
08EA E5        =2648 CKFC95: SEL     MB0
08EB F43B      =2649         CALL    SDATA
08ED F5        =2650         SEL     MB1
08EE 83        =2651         RET
               2652 ;****************************************
08EF A3        2653 TROPG8: MOVP    A,@A
08F0 83        2654         RET
0900           2655         ORG     0900H
               2656 $      INCLUDE(:F2:HCOMM.SRC)
               =2657 ;***********************************************************
               =2658 ; FILE:  HCOMM.SRC  11-18-86  12:15  BOB ACTIS
               =2659 ; ROUTINE:  HCOMM -- FOR THE OCIA INTERFACE
               =2660 ; FUNCTION:  SEND NEXT CHARACTER IN SEND BUFFER TO HOST.
               =2661 ; ENTRY: RB0
               =2662 ; EXIT:  USES R0,R1,R2,R3,A
               =2663 ;
0900 FC        =2664 HCOMM:  MOV     A,R4
0901 7209      =2665         JB3     HCOM10          ;JUMP IF SEND BUFFER HAS DATA
0903 37        =2666         CPL     A
0904 B256      =2667         JB5     HCOM90          ;JUMP IF BUFMAN REQUEST FLAG NOT SET
0906 D425      =2668         CALL    BUFMAN          ;PUT MESSAGE INTO THE COMM BUFFER
0908 83        =2669         RET
               =2670 ;
0909 0A        =2671 HCOM10: IN      A,P2
```

```
090A 9256    =2672         JB4    HCOM90       ;JUMP IF RDATA SR NOT READY
             =2673 ;
090C B947    =2674         MOV    R1,#SBFPNT   ;GET POINTER ADDRESS
090E F1      =2675         MOV    A,@R1        ;GET POINTER
090F 97      =2676         CLR    C
0910 67      =2677         RRC    A            ;PUT NIBBLE POINTER IN CARRY
0911 11      =2678         INC    @R1          ;INCREMENT POINTER
0912 A9      =2679         MOV    R1,A         ;BYTE ADDRESS
0913 17      =2680         INC    A
0914 A8      =2681         MOV    R0,A         ;NEXT BYTE ADDRESS
0915 F1      =2682         MOV    A,@R1        ;GET DATA
0916 D3DD    =2683         XRL    A,#EAMBBY
0918 C64F    =2684         JZ     HCOM70       ;JUMP IF 2-LABEL AMBIGUITY MESSAGE
             =2685 ;
091A F1      =2686         MOV    A,@R1        ;ONE MORE TIME...
091B F61E    =2687         JC     HCOM20       ;JUMP IF LOW NIBBLE IS NEXT
091D 47      =2688         SWAP   A
             =2689 ;
091E 530F    =2690 HCOM20: ANL    A,#0FH       ;MASK NIBBLE
0920 AB      =2691         MOV    R3,A         ;SAVE NIBBLE
0921 D30C    =2692         XRL    A,#0CH
0923 C656    =2693         JZ     HCOM90       ;JUMP IF FILLER CHARACTER (DON'T SEND)
0925 27      =2694         CLR    A
0926 A9      =2695         MOV    R1,A         ;CLEAR R1 FOR POSSIBLE LAST CHAR BIT
0927 E63F    =2696         JNC    HCOM30       ;JUMP IF NOT LOW (POSSIBLE LAST) NIBBLE
             =2697 ;
0929 F0      =2698         MOV    A,@R0        ;GET NEXT DATA BYTE
092A D3CC    =2699         XRL    A,#ETRMBY
092C C63B    =2700         JZ     HCOM25       ;JUMP IF TERMINATION BYTE
             =2701 ;
092E F0      =2702         MOV    A,@R0
092F D3AA    =2703         XRL    A,#ETL1BY
0931 963F    =2704         JNZ    HCOM30       ;JUMP IF NOT INTER-LABEL TERMINATION BYTE
             =2705 ;
0933 B847    =2706         MOV    R0,#SBFPNT
0935 10      =2707         INC    @R0
0936 10      =2708         INC    @R0          ;PAST INTER-LABEL TERMINATION BYTE
0937 B940    =2709         MOV    R1,#EBIT6    ;SET 'LAST CHAR' BIT
0939 243F    =2710         JMP    HCOM30
             =2711 ;
093B B940    =2712 HCOM25: MOV    R1,#EBIT6    ;PUT IN THE LAST CHAR BIT
093D 142A    =2713         CALL   CLRSBF       ;CLEAR SEND BUFFER, ETC.
             =2714 ;
093F FB      =2715 HCOM30: MOV    A,R3         ;GET NIBBLE
0940 0330    =2716         ADD    A,#00110000B
0942 57      =2717         DA     A
0943 B247    =2718         JB5    HCOM40       ;JUMP IF CHAR IS 0-9
0945 03C1    =2719         ADD    A,#11000001B ;FORMAT CHARACTERS A-F
             =2720 ;
0947 49      =2721 HCOM40: ORL    A,R1         ;ADD POSSIBLE LAST CHAR BIT
0948 AB      =2722         MOV    R3,A         ;SAVE DATA BYTE
0949 E5      =2723         SEL    MB0
094A 3490    =2724         CALL   PARITY
094C F5      =2725         SEL    MB1
094D 2453    =2726         JMP    HCOM80
             =2727 ;
094F 142A    =2728 HCOM70: CALL   CLRSBF
0951 2358    =2729         MOV    A,#EAMBIG    ;SEND AMBIGUITY MESSAGE BYTE
             =2730 ;
0953 B802    =2731 HCOM80: MOV    R0,#EOCIA
0955 90      =2732         MOVX   @R0,A        ;SEND CHARACTER
             =2733 ;
0956 83      =2734 HCOM90: RET
             2735 $        INCLUDE(:F2:FCKCTS.SRC)
             =2736 ;****************************************************************
             =2737 ; FILE:  FCKCNT.SRC   10-25-83 16:50   BOB ACTIS
             =2738 ;        MODIFIED     03-25-86         DREW TAUSSIG
             =2739 ;        MODIFIED     07-17-86         RANDY ELLIOTT
             =2740 ; ROUTINE:  CKCNTS
             =2741 ; FUNCTION: CHECK SEGMENT BUFFER TOTAL COUNTS FOR ENOUGH SEGMENTS FOR
             =2742 ;           A POSSIBLE VALID VERSION.
             =2743 ; ENTRY: NO SETUP
             =2744 ; EXIT:  A = 0 IF ENOUGH SEGMENTS
             =2745 ;        A <> 0 IF NOT ENOUGH SEGMENTS
             =2746 ;        USES R0
             =2747 ;
0957         =2748 CKCNTS  EQU    $
0957 34A9    =2749         CALL   CKTL         ;CHECK IF SEEN ANY TWO LABEL LEFT HALVES
0959 C662    =2750         JZ     CKCN05       ;JUMP - NO 2-LABEL HALVES SEEN
             =2751 ;
             =2752 ; SEEN 2-LABEL LEFT HALVES - CHECK IF ENOUGH SEGS FOR VALID LABELS
             =2753 ;
095B B842    =2754         MOV    R0,#STTL13
095D F0      =2755         MOV    A,@R0
095E C697    =2756         JZ     CKCNOK       ;JUMP - SEEN JAN13-JAN13 LABEL PAIR
             =2757 ;****************************************************************
             =2758 ;DO NOT READ JAN13-JAN8 PAIRS (7-17-87) RDE
             =2759 ;        MOV    R0,#STTL8
             =2760 ;        MOV    A,@R0
             =2761 ;        JZ     CKCNOK       ;JUMP - SEEN JAN13-JAN8 LABEL PAIR
             =2762 ;****************************************************************
```

```
0960 2499      =2763          JMP     CKCNNG          ;NOT ENOUGH SEGS FOR 2-LABEL YET
               =2764 ;
               =2765 ; NO 2-LABEL, CHECK COUNTS FOR NORMAL SINGLE LABEL READ
               =2766 ;
0962 B835      =2767 CKCN05:  MOV     R0,#R6STOT
0964 F0        =2768          MOV     A,@R0
0965 03FE      =2769          ADD     A,#-2
0967 F682      =2770          JC      CKCN20          ;JUMP IF R6STOT >= 2
               =2771 ;
0969 B82D      =2772          MOV     R0,#L6STOT
096B F0        =2773          MOV     A,@R0
096C 03FE      =2774          ADD     A,#-2
096E F68B      =2775          JC      CKCN30          ;JUMP IF L6STOT >= 2
               =2776 ;
0970 B83B      =2777          MOV     R0,#L4STOT
0972 F0        =2778          MOV     A,@R0
0973 03FE      =2779          ADD     A,#-2
0975 F679      =2780          JC      CKCN10          ;JUMP IF L4STOT >= 2
0977 2499      =2781          JMP     CKCNNG          ;JUMP IF NO POSSIBLE VERSION YET
               =2782 ;
0979 B841      =2783 CKCN10:  MOV     R0,#R4STOT
097B F0        =2784          MOV     A,@R0
097C 03FE      =2785          ADD     A,#-2
097E F697      =2786          JC      CKCNOK          ;JUMP IF POSSIBLE EAN-8 VERSION
0980 2499      =2787          JMP     CKCNNG          ;JUMP IF NO POSSIBLE VERSION YET
               =2788 ;
0982 B82D      =2789 CKCN20:  MOV     R0,#L6STOT
0984 F0        =2790          MOV     A,@R0
0985 03FE      =2791          ADD     A,#-2
0987 F697      =2792          JC      CKCNOK          ;JUMP IF POSSIBLE UPC-A, OR EAN-13
0989 2499      =2793          JMP     CKCNNG          ;JUMP IF NO POSSIBLE VERSION YET
               =2794 ;
098B B827      =2795 CKCN30:  MOV     R0,#L6S1+3
098D F0        =2796          MOV     A,@R0
098E 9297      =2797          JB4     CKCNOK          ;JUMP IF BUFFER 1 IS A UPC-E
               =2798 ;
0990 B82B      =2799          MOV     R0,#L6S2+3
0992 F0        =2800          MOV     A,@R0
0993 9297      =2801          JB4     CKCNOK          ;JUMP IF BUFFER 2 IS A UPC-E
0995 2499      =2802          JMP     CKCNNG
               =2803 ;
0997 27        =2804 CKCNOK:  CLR     A
0998 83        =2805          RET
               =2806 ;
0999 27        =2807 CKCNNG:  CLR     A
099A 37        =2808          CPL     A
099B 83        =2809          RET
               2810 $         INCLUDE(:F2:TLRUT.SRC)
               =2811 ;****************************************************************
               =2812 ; FILE: TLRUT.SRC   11-18-86 12:15  DREW TAUSSIG, BOB ACTIS
               =2813 ;       TWO LABEL READ SCANNER UTILITIES
               =2814 ; UPDATES: MODIFIED 3-17-87 FOR TEC BY RANDY ELLIOTT
               =2815 ;          MODIFIED 7-17-87 FOR TEC BY RANDY ELLIOTT
               =2816 ;****************************************************************
               =2817 ; ROUTINE: GETFLG
               =2818 ; FUNCTION: GET THE F1,F2 CHARACTERS FROM AN EAN(JAN)13 LEFT HALF
               =2819 ;           SEGMENT
               =2820 ; ENTRY: R0 POINTS TO FIRST BYTE OF BUFFER
               =2821 ; EXIT: USES R0,R1
               =2822 ;       A-PACKED BCD BYTE CONTAINING F1,F2 CHARACTERS (F1 IN HIGH NIB)
               =2823 ;
099C           =2824 GETFLG   EQU     $
099C F0        =2825          MOV     A,@R0           ;GET BYTE CONTAINING F2 CHAR (HIGH NIB)
099D 53F0      =2826          ANL     A,#0F0H         ;MASK LOW NIBBLE
099F A9        =2827          MOV     R1,A
09A0 18        =2828          INC     R0
09A1 18        =2829          INC     R0
09A2 18        =2830          INC     R0              ;R0 POINTS TO PARITY DECODE (F1)
09A3 F0        =2831          MOV     A,@R0           ;F1 CHARACTER IN LOW NIBBLE
09A4 530F      =2832          ANL     A,#0FH          ;MASK OFF HIGH NIBBLE
09A6 49        =2833          ORL     A,R1            ;COMBINE THE TWO CHARS
09A7 47        =2834          SWAP    A               ;PUT IN RIGHT ORDER
09A8 83        =2835          RET
               =2836 ;
               =2837 ;****************************************************************
               =2838 ; ROUTINE: CKTL
               =2839 ; FUNCTION:  CHECKS THE 2-LABEL READ STATUS BYTES FOR ANY SCANS OF
               =2840 ;            TWO LABEL LEFT HALVES
               =2841 ; ENTRY: NO SETUP REQUIRED
               =2842 ; EXIT: USES R0
               =2843 ;       A<>0 IF 2-LABEL LEFT HALVES HAVE BEEN SEEN
               =2844 ;       A=0 IF NO TWO LABEL LEFT HALVES HAVE BEEN SEEN
               =2845 ;           OR TWO LABEL SCANNING HAS BEEN DISABLED
               =2846 ;
09A9           =2847 CKTL     EQU     $
               =2848 ;
09A9 B842      =2849          MOV     R0,#STTL13      ;JAN13-JAN13 LABEL PAIR STATUS
09AB F0        =2850          MOV     A,@R0
               =2851 ;****************************************************************
               =2852 ;REMOVE RAD CAPABILITY FOR JAN13-JAN8 LABELS
               =2853 ;        MOV     R0,#STTL8       ;JAN13-JAN8 LABEL PAIR STATUS
               =2854 ;        ANL     A,@R0           ;COMBINE THE TWO
               =2855 ;****************************************************************
```

```
09AC 53F0      =2856           ANL     A,#0F0H         ;MASK OFF LOW NIBBLE (RIGHT HALF STATUS)
09AE D3F0      =2857           XRL     A,#0F0H         ;A<>0 IF ANY HIGH NIBBLE BITS ZERO
09B0 83        =2858           RET
               =2859 ;
09B1 27        =2860 CKTL90:   CLR     A
09B2 83        =2861           RET
               =2862 ;
               =2863 ;****************************************************************
               =2864 ;  ROUTINE: SUM13L
               =2865 ;  FUNCTION: CALCULATE PARTIAL CHECKSUM OF THE LEFT HALF OF AN EAN13
               =2866 ;                     LABEL
               =2867 ;  ENTRY: R0 POINTS TO FIRST BYTE OF SEGMENT BUFFER
               =2868 ;  EXIT: USES R0,R1,R2
               =2869 ;         A = PARTIAL CKECKSUM (LOW NIBBLE - HIGH NIBBLE UNDEFINED)
               =2870 ;
09B3           =2871 SUM13L EQU       $
09B3 1450      =2872           CALL    SGSUM6
09B5 146A      =2873           CALL    APL3R2
09B7 18        =2874           INC     R0
09B8 18        =2875           INC     R0
09B9 18        =2876           INC     R0              ;POINT TO PARITY DECODE (F1 CHAR)
09BA 60        =2877           ADD     A,@R0           ;ADD PARITY DIGIT
09BB 57        =2878           DA      A
09BC 83        =2879           RET
               =2880 ;
                2881 $         INCLUDE(:F2:INCHNB.SRC)
               =2882 ;****************************************************************
               =2883 ;  FILE: INCHNB.SRC 11-20-86 12:20  RANDY ELLIOTT  TEC 750SL
               =2884 ;****************************************************************
               =2885 ;****************************************************************
               =2886 ;  ROUTINE: INCHNB, INCLNB
               =2887 ;  FUNCTION: INCREMENT SEGMENT COUNTERS.
               =2888 ;            LOW NIBBLE IS SEGMENT ONE COUNTER.
               =2889 ;            HIGH NIBBLE IS SEGMENT TWO COUNTER.
               =2890 ;            TERMINAL COUNT IS 15. (0FH)
               =2891 ;            IF NOT ALREADY TERMINAL COUNT, INCREMENT THE SEGMENT
               =2892 ;            COUNTER AND TOTAL COUNTER.
               =2893 ;  ENTRY: R0 = PACKED SEGMENT COUNTER ADDRESS
               =2894 ;         R0+1 = SEGMENT TOTAL COUNTER ADDRESS
               =2895 ;  EXIT: IF NIBBLE WAS INCREMENTED:
               =2896 ;            R0 = SEGMENT TOTAL COUNTER ADDRESS
               =2897 ;            A = PACKED COUNTER
               =2898 ;            CARRY = CLEAR
               =2899 ;         IF NIBBLE WAS ALREADY 0FH:
               =2900 ;            R0 = PACKED SEGMENT COUNTER ADDRESS
               =2901 ;            A = NOT DEFINED
               =2902 ;            CARRY = SET
               =2903 ;
09BD F0        =2904 INCHNB:   MOV     A,@R0           ;GET PACKED COUNTER
09BE 97        =2905           CLR     C
09BF 0310      =2906           ADD     A,#10H          ;INCREMENT HIGH NIBBLE
09C1 F6D0      =2907           JC      INCXRT          ;JUMP IF ALREADY 0F0H
09C3 24CD      =2908           JMP     INCX90
               =2909 ;
09C5 F0        =2910 INCLNB:   MOV     A,@R0
09C6 47        =2911           SWAP    A
09C7 97        =2912           CLR     C
09C8 0310      =2913           ADD     A,#10H
09CA F6D0      =2914           JC      INCXRT          ;JUMP IF ALREADY 00FH
09CC 47        =2915           SWAP    A
               =2916 ;
09CD A0        =2917 INCX90:   MOV     @R0,A           ;UPDATE THE PACKED COUNTER
09CE 18        =2918           INC     R0
09CF 10        =2919           INC     @R0             ;INCREMENT TOTAL COUNTER
               =2920 ;
09D0 83        =2921 INCXRT:   RET
                2922 ;****************************************************
09D1 A3         2923 TROPG9:   MOVP    A,@A
09D2 83         2924           RET
0A00            2925           ORG     0A00H
                2926 $         INCLUDE(:F2:PROCSG.SRC)
               =2927 ;****************************************************************
               =2928 ;  FILE: PROCSG.SRC 11-20-86 14:15 BOB ACTIS
               =2929 ;        MODIFIED    03-25-86    DREW TAUSSIG
               =2930 ;        MODIFIED    08-21-86    CHANGE LABEL 2 FLAG CHECK
               =2931 ;        MODIFIED    03-17-87    TEC TWO LABEL READ ENHANCEMENT
               =2932 ;****************************************************************
               =2933 ;  ROUTINE: SWP4SN, SWP6SN
               =2934 ;  FUNCTION: SWAP (REVERSE) ORDER OF PACKED CHARACTERS IN SCAN BUFFER.
               =2935 ;            SWP4SN SWAPS CHARACTERS IN SCNBUF+1 AND SCNBUF+2.
               =2936 ;            SWP6SN SWAPS CHARACTERS IN SCNBUF, SCNBUF+1 AND SCNBUF+2.
               =2937 ;            CLEARS BACKWARD BIT IN THE PARITY DECODE BYTE SCNBUF+3.
               =2938 ;  ENTRY: NO SETUP
               =2939 ;  EXIT: CHARACTERS SWAPED.
               =2940 ;        R0 = SCNBUF+3 (PARITY DECODE BYTE ADDRESS)
               =2941 ;             BACKWARD BIT IS CLEARED.
               =2942 ;        A = PARITY DECODE BYTE
               =2943 ;
0A00 B822      =2944 SWP4SN:   MOV     R0,#SCNBUF+2
0A02 F0        =2945           MOV     A,@R0
0A03 47        =2946           SWAP    A
0A04 C8        =2947           DEC     R0
```

```
0A05 20      =2948          XCH     A,@R0
0A06 47      =2949          SWAP    A
0A07 18      =2950          INC     R0
0A08 A0      =2951          MOV     @R0,A
0A09 4419    =2952          JMP     SWPXEX
             *2953 ;
0A0B B822    =2954 SWP6SN:  MOV     R0,#SCNBUF+2
0A0D F0      =2955          MOV     A,@R0
0A0E 47      =2956          SWAP    A
0A0F C8      =2957          DEC     R0
0A10 20      =2958          XCH     A,@R0
0A11 47      =2959          SWAP    A
0A12 20      =2960          XCH     A,@R0
0A13 C8      =2961          DEC     R0
0A14 20      =2962          XCH     A,@R0
0A15 47      =2963          SWAP    A
0A16 18      =2964          INC     R0
0A17 18      =2965          INC     R0
0A18 A0      =2966          MOV     @R0,A
             =2967 ;
0A19 18      =2968 SWPXEX:  INC     R0
0A1A F0      =2969          MOV     A,@R0
0A1B 53BF    =2970          ANL     A,#255-EDECBK
0A1D A0      =2971          MOV     @R0,A
0A1E 4438    =2972          JMP     SWPXRT
             =2973 ;***********************************************************
             =2974 ; ROUTINE: MCH2BY, MCH3BY, MCH4BY
             =2975 ; FUNCTION: COMPARE BYTES IN ONE BUFFER WITH A SECOND BUFFER.
             =2976 ; ENTRY: R0 = FIRST BYTE ADDRESS OF FIRST BUFFER
             =2977 ;        R1 = FIRST BYTE ADDRESS OF SECOND BUFFER
             =2978 ; EXIT:  IF BUFFER ONE EQUALS BUFFER TWO:
             =2979 ;           R0 = END OF FIRST BUFFER ADDRESS PLUS 1.
             =2980 ;           R1 = END OF SECOND BUFFER ADDRESS PLUS 1.
             =2981 ;           R2 = 0
             =2982 ;           A = 0
             =2983 ;        IF BUFFER ONE DOESN'T EQUAL BUFFER TWO:
             =2984 ;           R0 = BUFFER ONE "NOT EQUAL" BYTE ADDRESS
             =2985 ;           R1 = BUFFER TWO "NOT EQUAL" BYTE ADDRESS
             =2986 ;           R2 <> 0
             =2987 ;           A <> 0
             =2988 ;
0A20 BA02    =2989 MCH2BY:  MOV     R2,#2
0A22 442A    =2990          JMP     MCHXBY
0A24 BA03    =2991 MCH3BY:  MOV     R2,#3
0A26 442A    =2992          JMP     MCHXBY
0A28 BA04    =2993 MCH4BY:  MOV     R2,#4
0A2A F0      =2994 MCHXBY:  MOV     A,@R0
0A2B D1      =2995          XRL     A,@R1
0A2C 9632    =2996          JNZ     MCHXRT      ;JUMP IF NOT EQUAL
0A2E 18      =2997          INC     R0
0A2F 19      =2998          INC     R1
0A30 EA2A    =2999          DJNZ    R2,MCHXBY
0A32 83      =3000 MCHXRT:  RET
             =3001 ;***********************************************************
             =3002 ; ROUTINE: PROCSG
             =3003 ; FUNCTION: CHECK FOR SCAN BUFFER DATA.
             =3004 ;           SWAP SCAN BUFFER DATA IF BACKWARDS.
             =3005 ;           CHECK FOR MISMATCHES.
             =3006 ;           MOVE SCAN BUFFER TO PROPER SEGMENT BUFFER.
             =3007 ;           INCREMENT SEGMENT AND TOTAL COUNTERS.
             =3008 ; ENTRY: NO SETUP
             =3009 ; EXIT:  USES R0,R1,R2,R3,A,F0
             =3010 ;
0A33 B823    =3011 PROCSG:  MOV     R0,#SCNBUF+3
0A35 F0      =3012          MOV     A,@R0
0A36 C66E    =3013          JZ      PROCRT      ;JUMP IF NO DATA
             =3014 ;
0A38 B26C    =3015 SWPXRT:  JB5     PROCEX      ;JUMP IF UPC-D BIT SET
0A3A 925B    =3016          JB4     PROCE       ;JUMP IF UPC-E BIT SET
0A3C 530F    =3017          ANL     A,#0FH
0A3E 0300    =3018          ADD     A,#0        ;SETS CARRY FLAGS FOR DA
0A40 57      =3019          DA      A
0A41 9248    =3020          JB4     PROC05      ;JUMP IF DECODE > 9 (UPC-A OR EAN8)
             =3021 ;
0A43         =3022 PROC3L   EQU     $           ;PROCESS AN EAN-13-L
0A43 F0      =3023          MOV     A,@R0
0A44 D20B    =3024          JB6     SWP6SN      ;JUMP IF BACKWARDS
0A46 6457    =3025          JMP     PRO7CH
             =3026 ;
0A48 5303    =3027 PROC05:  ANL     A,#03H
0A4A 3263    =3028          JB1     PROCA       ;JUMP IF UPC-A
0A4C F0      =3029 PROC8:   MOV     A,@R0       ;EAN-8 COMES HERE
0A4D 85      =3030          CLR     F0          ;CLEAR F0 TO INDICATE 8-L (DEFAULT)
0A4E D200    =3031          JB6     SWP4SN      ;JUMP IF BACKWARDS
0A50 1256    =3032          JB0     PROC8R      ;JUMP IF EAN-8-R
0A52 BB3A    =3033 PROC8L:  MOV     R3,#L4SCNT
0A54 446F    =3034          JMP     PRO4CH      ;GO PROCESS A 4-CHAR SEG
0A56 BB40    =3035 PROC8R:  MOV     R3,#R4SCNT
0A58 95      =3036          CPL     F0          ;SET F0 TO INDICATE 8-R
0A59 446F    =3037          JMP     PRO4CH
             =3038 ;
0A5B D20B    =3039 PROCE:   JB6     SWP6SN
```

```
0A5D 1471      =3040          CALL    EMOD10
0A5F 966C      =3041          JNZ     PROCEX        ;JUMP IF EMOD10 TEST FAILED
0A61 6457      =3042          JMP     PRO7CH
               =3043 ;
0A63 F0        =3044 PROCA:   MOV     A,@R0
0A64 D20B      =3045          JB6     SWP6SN
0A66 126A      =3046          JB0     PROCAR        ;JUMP IF UPC-A-R
0A68 6457      =3047 PROCAL:  JMP     PRO7CH
0A6A 6400      =3048 PROCAR:  JMP     PRO6CH
               =3049 ;
0A6C 1420      =3050 PROCEX:  CALL    CLRSNB        ;GO CLEAR THE SCAN BUFFER
0A6E 83        =3051 PROCRT:  RET                   ;RETURN FROM PROCESS SEGMENT ROUTINE
               =3052 ;****************************************************************
               =3053 ;  ROUTINE:  PRO4CH
               =3054 ;  FUNCTION: PROCESS 4-CHAR SEGMENTS (2 BYTES)
               =3055 ;            CHECKS FOR MISMATCHES.
               =3056 ;            MOVES SEGMENT FROM SCAN BUFFER TO SEGMENT BUFFER.
               =3057 ;            INCREMENTS SCAN AND TOTAL COUNTERS.
               =3058 ;  ENTRY:  R3 = PACKED SCAN COUNTER ADDRESS
               =3059 ;          R3-4 = SCAN 1 BUFFER ADDRESS
               =3060 ;          R3-2 = SCAN 2 BUFFER ADDRESS
               =3061 ;          R3+1 = TOTAL COUNTER ADDRESS
               =3062 ;          F0 = LEFT OR RIGHT HALF (SET=RIGHT, CLR=LEFT)
               =3063 ;  EXIT:   SEGMENT PROCESSED
               =3064 ;          SCAN BUFFER CLEARED
               =3065 ;          USES R0,R1,R2,R3,A
               =3066 ;
0A6F FB        =3067 PRO4CH:  MOV     A,R3
0A70 A8        =3068          MOV     R0,A
0A71 F0        =3069          MOV     A,@R0         ;GET S2/S1 PACKED COUNTS
0A72 530F      =3070          ANL     A,#0FH
0A74 B821      =3071          MOV     R0,#SCNBUF+1
0A76 9693      =3072          JNZ     PRO4C2        ;JUMP IF SCAN 1 COUNTER <> 0
               =3073 ;
0A78 FB        =3074          MOV     A,R3          ;SCAN 1 COUNTER = 0
0A79 03FC      =3075          ADD     A,#-4
0A7B A9        =3076          MOV     R1,A          ;SCAN 1 BUFFER ADDRESS
0A7C 143B      =3077          CALL    MOV2BY
               =3078 ;
0A7E FB        =3079          MOV     A,R3
0A7F A8        =3080          MOV     R0,A
0A80 34C5      =3081          CALL    INCLNB        ;INCREMENT SCAN 1 COUNTER AND TOTAL
               =3082 ;
               =3083 ;    SET 2-LABEL STATUS BYTE (JAN13-JAN8)
               =3084 ;
0A82 8943      =3085 PRO4C0:  MOV     R1,#STTL8
0A84 BAFD      =3086          MOV     R2,#SETR21    ;JAN8 IS ALWAYS LABEL 2
0A86 B6CC      =3087          JF0     PRO4C7        ;JUMP - RIGHT HALF (ALWAYS SET STATUS BYTE)
0A88 BADF      =3088          MOV     R2,#SETL21
               =3089 ;
               =3090 ;    CHECK IF VALID F1,F2 CHARS IN LEFT HALF BEFORE SETTING BYTE
               =3091 ;
0A8A B821      =3092 PRO4C1:  MOV     R0,#SCNBUF+1
0A8C F0        =3093          MOV     A,@R0         ;GET F1,F2 BYTE
0A8D 74C6      =3094          CALL    CKL2FG        ;CHECK IF LABEL 2 FLAG
0A8F 96CF      =3095          JNZ     PRO4CX        ;JUMP - NO, DONT SET STATUS BYTE
0A91 44CC      =3096          JMP     PRO4C7        ;YES, GO SET BYTE
               =3097 ;
               =3098 ;  SCAN-1 BUFFER HAS DATA, CHECK IF SCNBUF IS SAME
               =3099 ;
0A93 FB        =3100 PRO4C2:  MOV     A,R3          ;SCAN 1 COUNTER <> 0
0A94 03FC      =3101          ADD     A,#-4
0A96 A9        =3102          MOV     R1,A          ;SCAN 1 BUFFER ADDRESS
0A97 5420      =3103          CALL    MCH2BY
0A99 96A9      =3104          JNZ     PRO4C4        ;JUMP IF NO MATCH
               =3105 ;
0A9B FB        =3106          MOV     A,R3
0A9C A8        =3107          MOV     R0,A
0A9D 34C5      =3108          CALL    INCLNB        ;INCREMENT SCAN 1 COUNTER AND TOTAL
               =3109 ;
               =3110 ;    SET 2-LABEL READ STATUS BYTE
               =3111 ;
0A9F B943      =3112 PRO4C3:  MOV     R1,#STTL8
0AA1 BAFE      =3113          MOV     R2,#SETR22    ;SHOW SAW FOR SECOND TIME
0AA3 B6CC      =3114          JF0     PRO4C7        ;JUMP - RIGHT HALF (ALWAYS SET STATUS)
0AA5 BAEF      =3115          MOV     R2,#SETL22    ;LEFT HALF
0AA7 448A      =3116          JMP     PRO4C1        ;GO CHECK IF VALID F1,F2 CHARS
               =3117 ;
               =3118 ;   SCAN-1 FULL, SCNBUF DOESNT MATCH
               =3119 ;
0AA9 FB        =3120 PRO4C4:  MOV     A,R3          ;SCAN 1 BUFFER DOESN'T MATCH
0AAA A8        =3121          MOV     R0,A
0AAB F0        =3122          MOV     A,@R0
0AAC 53F0      =3123          ANL     A,#0F0H
0AAE B821      =3124          MOV     R0,#SCNBUF+1
0AB0 968E      =3125          JNZ     PRO4C6        ;JUMP IF SCAN 2 COUNTER <> 0
               =3126 ;
0AB2 FB        =3127          MOV     A,R3
0AB3 03FE      =3128          ADD     A,#-2
0AB5 A9        =3129          MOV     R1,A          ;SCAN 2 BUFFER ADDRESS
0AB6 143B      =3130          CALL    MOV2BY
               =3131 ;
```

```
OAB8 FB        =3132           MOV     A,R3
OAB9 A8        =3133           MOV     R0,A
OABA 34BD      =3134           CALL    INCHNB          ;INCREMENT SCAN 2 COUNTER AND TOTAL
OABC 4482      =3135           JMP     PRO4C0          ;GO CHECK AND SET 2-LABEL STATUS
               =3136 ;
OABE FB        =3137 PRO4C6:   MOV     A,R3            ;SCAN 2 COUNT <> 0
OABF 03FE      =3138           ADD     A,#-2
OAC1 A9        =3139           MOV     R1,A            ;SCAN 2 BUFFER ADDRESS
OAC2 5420      =3140           CALL    MCH2BY
OAC4 96D1      =3141           JNZ     PRO4C8          ;JUMP IF NO MATCH
               =3142 ;
OAC6 FB        =3143           MOV     A,R3
OAC7 A8        =3144           MOV     R0,A
OAC8 34BD      =3145           CALL    INCHNB          ;INCREMENT SCAN 2 COUNT AND TOTAL
OACA 449F      =3146           JMP     PRO4C3          ;GO CHECK AND SET 2-LABEL STATUS
               =3147 ;
               =3148 ;   SET STATUS BYTE (@R1) WITH MASK STORED IN R2
               =3149 ;
OACC FA        =3150 PRO4C7:   MOV     A,R2
OACD 51        =3151           ANL     A,@R1           ;CLEAR PROPER BIT
OACE A1        =3152           MOV     @R1,A
OACF 446C      =3153 PRO4CX:   JMP     PROCEX          ;BACK TO MAIN ROUTINE
               =3154 ;
               =3155 ;   HERE IF NEITHER SCAN BUFFER MATCHED
               =3156 ;
OAD1 FB        =3157 PRO4C8:   MOV     A,R3            ;NEITHER SCAN BUFFER MATCHED
OAD2 17        =3158           INC     A
OAD3 A8        =3159           MOV     R0,A            ;TOTAL COUNTER ADDRESS
OAD4 10        =3160           INC     @R0             ;INCREMENT TOTAL COUNTER
OAD5 446C      =3161           JMP     PROCEX
               =3162 ;********************************************************
               =3163 ;   03-20-87 12:30  RANDY ELLIOTT (TEC 750SL)
               =3164 ;   PUT HERE BECAUSE PAGE 2 IS SHORT ON MEMORY
               =3165 ;********************************************************
               =3166 ;********************************************************
               =3167 ;   ROUTINE: EXSBF2, EXSBF3, EXSBF4
               =3168 ;   FUNCTION: EXCHANGE SEGMENT BUFFERS AND COUNTERS. (2,3 OR 4 BYTES)
               =3169 ;             (I.E. EXCHANGE BUFFER 1 DATA WITH BUFFER 2 DATA)
               =3170 ;   ENTRY: R0 = SCAN 1 BUFFER ADDRESS
               =3171 ;          R0+2[3,4] = SCAN 2 BUFFER ADDRESS
               =3172 ;          R0+3[4,5] = SCAN2/SCAN1 PACKED COUNTER ADDRESS
               =3173 ;   EXIT:  USES R1,R2
               =3174 ;          SCAN 1 AND SCAN 2 DATA AND COUNTERS EXCHANGED.
               =3175 ;          R0 = SCAN2/SCAN1 COUNTER ADDRESS.
               =3176 ;          A = SCAN2/SCAN1 COUNTERS
               =3177 ;
OAD7 BA02      =3178 EXSBF2:   MOV     R2,#2
OAD9 44E1      =3179           JMP     EXSBFX
OADB BA03      =3180 EXSBF3:   MOV     R2,#3
OADD 44E1      =3181           JMP     EXSBFX
OADF BA04      =3182 EXSBF4:   MOV     R2,#4
OAE1 F8        =3183 EXSBFX:   MOV     A,R0            ;GET SCAN 1 BUFFER ADDRESS
OAE2 A9        =3184           MOV     R1,A            ;SAVE IT
OAE3 6A        =3185           ADD     A,R2            ;CALCULATE SCAN 2 BUFFER ADDRESS
OAE4 A8        =3186           MOV     R0,A            ;SAVE IT
               =3187 ;
OAE5 F0        =3188 EXSBFL:   MOV     A,@R0           ;GET SCAN 2 DATA
OAE6 21        =3189           XCH     A,@R1           ;EXCHANGE DATA
OAE7 A0        =3190           MOV     @R0,A           ;STORE SCAN 1 DATA
OAE8 18        =3191           INC     R0
OAE9 19        =3192           INC     R1
OAEA EAE5      =3193           DJNZ    R2,EXSBFL
               =3194 ;
OAEC F0        =3195           MOV     A,@R0           ;GET S2/S1 COUNTERS
OAED 47        =3196           SWAP    A               ;EXCHANGE COUNTERS
OAEE A0        =3197           MOV     @R0,A           ;SAVE COUNTERS
OAEF 83        =3198           RET
               =3199 ;
               =3200 ;********************************************************
OAF0 A3        =3201 TROPGA:   MOVP    A,@A
OAF1 83        =3202           RET
               =3203 ;********************************************************
               =3204 ;   ROUTINE: PRO6CH
               =3205 ;   FUNCTION: PROCESS 6-CHAR SEGMENTS (3 BYTES)
               =3206 ;             CHECKS FOR MISMATCHES.
               =3207 ;             MOVES SEGMENT FROM SCAN BUFFER TO SEGMENT BUFFER.
               =3208 ;             INCREMENTS SCAN AND TOTAL COUNTERS.
               =3209 ;   ENTRY: NO SETUP
               =3210 ;   EXIT:  SEGMENT IS PROCESSED
               =3211 ;          SCAN BUFFER CLEARED
               =3212 ;          USES R0,R1,R2,R3,A
               =3213 ;
0B00           =3214           ORG     ((($-2)/100H)+1)*100H
0B00 B834      =3215 PRO6CH:   MOV     R0,#R6SCNT
0B02 F0        =3216           MOV     A,@R0           ;GET S2/S1 PACKED COUNTS
0B03 530F      =3217           ANL     A,#0FH
0B05 B92E      =3218           MOV     R1,#R6S1
0B07 B820      =3219           MOV     R0,#SCNBUF
0B09 9615      =3220           JNZ     PRO6C2          ;JUMP IF SCAN 1 COUNTER <> 0
               =3221 ;
0B0B 143F      =3222           CALL    MOV3BY          ;SCAN 1 COUNTER = 0
               =3223 ;
```

```
080D B834      =3224            MOV     R0,#R6SCNT
080F 34C5      =3225            CALL    INCLNB          ;INCREMENT SCAN 1 COUNTER AND TOTAL
               =3226 ;
               =3227 ; SET 2-LABEL READ STATUS (BOTH TYPES)
               =3228 ;
0811 BAF7      =3229            MOV     R2,#SETR11      ;FIRST LABEL FIRST SCAN
0813 6442      =3230            JMP     PRO6C7
               =3231 ;
               =3232 ; SCAN-1 BUFFER FULL, CHECK IF MATCH
               =3233 ;
0815 5424      =3234 PRO6C2:    CALL    MCH3BY          ;SCAN 1 COUNTER <> 0
0817 9621      =3235            JNZ     PRO6C4          ;JUMP IF NO MATCH
               =3236 ;
               =3237 ; SCAN-1 MATCH, INCREMENT COUNTER AND SET 2-LABEL STATUS
               =3238 ;
0819 B834      =3239            MOV     R0,#R6SCNT
081B 34C5      =3240            CALL    INCLNB          ;INCREMENT SCAN 1 COUNTER AND TOTAL
081D BAFB      =3241            MOV     R2,#SETR12      ;FIRST LABEL - SECOND SCAN
081F 6442      =3242            JMP     PRO6C7          ;DO BOTH TYPES OF 2-LABEL READ
               =3243 ;
               =3244 ; SCAN-1 BUFFER NO MATCH - CHECK SCAN-2 BUFFER
               =3245 ;
               =3246
0821 B834      =3247 PRO6C4:    MOV     R0,#R6SCNT      ;SCAN 1 BUFFER DOESN'T MATCH
0823 F0        =3248            MOV     A,@R0
0824 53F0      =3249            ANL     A,#0F0H
0826 B931      =3250            MOV     R1,#R6S2
0828 B820      =3251            MOV     R0,#SCNBUF
082A 9636      =3252            JNZ     PRO6C6          ;JUMP IF SCAN 2 COUNTER <> 0
               =3253 ;
               =3254 ; SCAN-2 BUFFER EMPTY - FILL IT AND SET 2-LABEL READ STATUS
               =3255 ;
082C 143F      =3256            CALL    MOV3BY
               =3257 ;
082E B834      =3258            MOV     R0,#R6SCNT
0830 348D      =3259            CALL    INCHNB          ;INCREMENT SCAN 2 COUNTER AND TOTAL
0832 BAFD      =3260            MOV     R2,#SETR21      ;SECOND LABEL - FIRST SCAN
0834 6447      =3261            JMP     PRO6CX          ;DO ONLY JAN13-JAN13 PAIR TYPE
               =3262 ;
               =3263 ; SCAN-2 BUFFER FULL - CHECK FOR MATCH
               =3264 ;
0836 5424      =3265 PRO6C6:    CALL    MCH3BY          ;SCAN 2 COUNTER <> 0
0838 964E      =3266            JNZ     PRO6C8          ;JUMP IF NO MATCH
               =3267 ;
               =3268 ; SCAN-2 BUFFER MATCH - INC COUNT AND SET 2-LABEL READ STATUS
               =3269 ;
083A B834      =3270            MOV     R0,#R6SCNT
083C 348D      =3271            CALL    INCHNB          ;INCREMENT SCAN 2 COUNT AND TOTAL
083E BAFE      =3272            MOV     R2,#SETR22      ;SECOND LABEL - SECOND SCAN
0840 6447      =3273            JMP     PRO6CX          ;DO ONLY JAN13-JAN13 PAIR TYPE
               =3274 ;
               =3275 ; HERE TO SET JAN13-JAN8 LABEL PAIR STATUS
               =3276 ;
0842 B843      =3277 PRO6C7:    MOV     R0,#STTL8
0844 F0        =3278            MOV     A,@R0
0845 5A        =3279            ANL     A,R2            ;ZERO APPROPRIATE BIT
0846 A0        =3280            MOV     @R0,A
               =3281 ;
               =3282 ; HERE TO SET JAN13-JAN13 LABEL PAIR STATUS
               =3283 ;
0847 B842      =3284 PRO6CX:    MOV     R0,#STTL13
0849 F0        =3285            MOV     A,@R0
084A 5A        =3286            ANL     A,R2
084B A0        =3287            MOV     @R0,A
084C 446C      =3288            JMP     PROCEX          ;RETURN TO MAIN SECTION
               =3289 ;
               =3290 ; NEITHER SCAN BUFFER MATCHED - SET 2-LABEL READ (JAN13-JAN13) ERROR
               =3291 ;
084E B835      =3292 PRO6C8:    MOV     R0,#R6STOT      ;NEITHER SCAN BUFFER MATCHED
0850 10        =3293            INC     @R0             ;INCREMENT TOTAL COUNTER
0851 8844      =3294            MOV     R0,#ERRTL
0853 B0FF      =3295            MOV     @R0,#0FFH       ;SET ERROR CONDITION
0855 446C      =3296            JMP     PROCEX
               =3297 ;***********************************************************
               =3298 ; ROUTINE:  PRO7CH
               =3299 ; FUNCTION: PROCESS 7-CHAR SEGMENTS (4 BYTES)
               =3300 ;           CHECKS FOR MISMATCHES.
               =3301 ;           MOVES SEGMENT FROM SCAN BUFFER TO SEGMENT BUFFER.
               =3302 ;           INCREMENTS SCAN AND TOTAL COUNTERS.
               =3303 ; ENTRY: NO SETUP
               =3304 ; EXIT:  SEGMENT IS PROCESSED
               =3305 ;        SCAN BUFFER CLEARED
               =3306 ;        USES R0,R1,R2,R3,A,F0,F1
               =3307 ;
0857           =3308 PRO7CH     EQU     $
               =3309 ;
               =3310 ; CHECK FOR VALID 2-LABEL READ FLAGS
               =3311 ;     SETS F0 AND F1
               =3312 ;     IF JAN13 F1,F2 CHARS MATCH LABEL1 OR LABEL2 F1,F2 THEN F0 CLEARED
               =3313 ;             OTHERWISE F0 SET
               =3314 ;     IF JAN13 F1,F2 CHARS MATCH LABEL 1 THEN F1 CLEARED
               =3315 ;     IF JAN13 F1,F2 CHARS MATCH LABEL 2 THEN F1 SET
               =3316 ;
```

```
0B57 85      =3317         CLR   F0
0B58 A5      =3318         CLR   F1
0B59 B820    =3319         MOV   R0,#SCNBUF
0B5B 349C    =3320         CALL  GETFLG      ;F1,F2 (PACKED BCD) IN ACCUM
0B5D A9      =3321         MOV   R1,A        ;SAVE IN R1
0B5E 74C6    =3322         CALL  CKL2FG      ;CHECK IF LABEL 2 FLAG
0B60 C68E    =3323         JZ    PRO7C4      ;JUMP - MATCH LABEL2 (SCAN-2 BUFFER)
0B62 F9      =3324         MOV   A,R1        ;RESTORE FLAG CHARS
0B63 B5      =3325         CPL   F1
0B64 74DF    =3326         CALL  CKL1FG      ;CHECK IF LABEL 1 FLAG
0B66 C669    =3327         JZ    PRO7C0      ;JUMP - FLAGS MATCH LABEL1
0B68 95      =3328         CPL   F0          ;SET F0 - FLAGS DON'T MATCH
             =3329 ;
0B69 B82C    =3330 PRO7C0: MOV   R0,#L6SCNT
0B6B F0      =3331         MOV   A,@R0       ;GET S2/S1 PACKED COUNTS
0B6C 530F    =3332         ANL   A,#0FH
0B6E B924    =3333         MOV   R1,#L6S1
0B70 B820    =3334         MOV   R0,#SCNBUF
0B72 9680    =3335         JNZ   PRO7C2      ;JUMP IF SCAN 1 COUNTER <> 0
             =3336 ;
             =3337 ; SCAN-1 BUFFER EMPTY - FILL AND SET 2-LABEL READ STATUS
             =3338 ; (IF FLAGS MATCH)
             =3339 ;
0B74 1443    =3340         CALL  MOV4BY      ;SCAN 1 COUNTER = 0
             =3341 ;
0B76 B82C    =3342         MOV   R0,#L6SCNT
0B78 34C5    =3343         CALL  INCLNB      ;INCREMENT SCAN 1 COUNTER AND TOTAL
0B7A B6C4    =3344         JF0   PRO7CX      ;JUMP - NOT 2-LABEL READ
0B7C BA7F    =3345         MOV   R2,#SETL11  ;FIRST LABEL - FIRST SCAN
0B7E 6442    =3346         JMP   PRO6C7      ;GO SET STATUS AND RETURN
             =3347 ;
             =3348 ; SCAN-1 BUFFER FULL - CHECK FOR MATCH
             =3349 ;
0B80 5428    =3350 PRO7C2: CALL  MCH4BY      ;SCAN 1 COUNTER <> 0
0B82 968E    =3351         JNZ   PRO7C4      ;JUMP IF NO MATCH
             =3352 ;
             =3353 ; SCAN-1 BUFFER MATCH - INCREMENT COUNT AND SET 2-LAB STATUS (IF MATCH)
             =3354 ;
0B84 B82C    =3355         MOV   R0,#L6SCNT
0B86 34C5    =3356         CALL  INCLNB      ;INCREMENT SCAN 1 COUNTER AND TOTAL
0B88 B6C4    =3357         JF0   PRO7CX      ;JUMP - NOT 2-LABEL READ
0B8A BABF    =3358         MOV   R2,#SETL12  ;FIRST LABEL - SECOND SCAN
0B8C 6442    =3359         JMP   PRO6C7      ;GO SET STATUS AND RETURN
             =3360 ;
             =3361 ; SCAN-1 BUFFER DOESN'T MATCH - CHECK SCAN-2 BUFFER
             =3362 ;   ALSO GETS HERE IF FLAG CHARS INDICATE SECOND LABEL OF 2-LAB READ
             =3363 ;
0B8E B82C    =3364 PRO7C4: MOV   R0,#L6SCNT  ;SCAN 1 BUFFER DOESN'T MATCH
0B90 F0      =3365         MOV   A,@R0
0B91 53F0    =3366         ANL   A,#0F0H
0B93 B928    =3367         MOV   R1,#L6S2
0B95 B820    =3368         MOV   R0,#SCNBUF
0B97 96A7    =3369         JNZ   PRO7C6      ;JUMP IF SCAN 2 COUNTER <> 0
             =3370 ;
             =3371 ; SCAN-2 BUFFER EMPTY - FILL AND SET 2-LAB READ STATUS (IF FLAGS MATCH)
             =3372 ;
0B99 1443    =3373         CALL  MOV4BY
             =3374 ;
0B9B B82C    =3375         MOV   R0,#L6SCNT
0B9D 34BD    =3376         CALL  INCHNB      ;INCREMENT SCAN 2 COUNTER AND TOTAL
0B9F B6C4    =3377         JF0   PRO7CX  ;JUMP - FLAG CHARS DON'T MATCH 2-LABEL READ
0BA1 76C4    =3378         JF1   PRO7CX      ;JUMP - IS FLAG CHARS FOR LABEL1
0BA3 BADF    =3379         MOV   R2,#SETL21  ;SECOND LABEL - FIRST SCAN
0BA5 6447    =3380         JMP   PRO6CX      ;GO SET STATUS AND RETURN
             =3381 ;
             =3382 ; SCAN-2 BUFFER FULL - CHECK FOR MATCH
             =3383 ;
0BA7 5428    =3384 PRO7C6: CALL  MCH4BY      ;SCAN 2 COUNTER <> 0
0BA9 96B7    =3385         JNZ   PRO7C8      ;JUMP IF NO MATCH
             =3386 ;
             =3387 ; SCAN-2 BUFFER MATCHES - INC COUNT AND SET STATUS (IF 2-LAB READ)
             =3388 ;
0BAB B82C    =3389         MOV   R0,#L6SCNT
0BAD 34BD    =3390         CALL  INCHNB      ;INCREMENT SCAN 2 COUNT AND TOTAL
0BAF B6C4    =3391         JF0   PRO7CX  ;JUMP - FLAG CHARS DON'T MATCH 2-LABEL READ
0BB1 76C4    =3392         JF1   PRO7CX      ;JUMP - IS FLAG CHARS FOR LABEL1
0BB3 BAEF    =3393         MOV   R2,#SETL22  ;SECOND LABEL - SECOND SCAN
0BB5 6447    =3394         JMP   PRO6CX      ;GO SET STATUS AND RETURN
             =3395 ;
             =3396 ; NEITHER SCAN BUFFER MATCHED - SET 2-LABEL READ (JAN13-JAN13) ERROR
             =3397 ;
0BB7 B82D    =3398 PRO7C8: MOV   R0,#L6STOT  ;NEITHER SCAN BUFFER MATCHED
0BB9 10      =3399         INC   @R0         ;INCREMENT TOTAL COUNTER
0BBA B6C0    =3400         JF0   PRO7C9      ;JUMP - NOT 2-LAB READ FLAG CHARS
             =3401 ;
             =3402 ; FLAG CHARS FOR 2-LABEL READ SEEN, AND NO MATCH - CLEAR BUFFERS
             =3403 ;
0BBC 1400    =3404         CALL  CLR6SG
0BBE 446C    =3405         JMP   PROCEX      ;RETURN
             =3406 ;
             =3407 ; NO FLAG CHARS SEEN HERE, SO JUST SET 2-LAB READ ERROR
             =3408 ;
```

```
0BC0 B844      =3409 PRO7C9: MOV     R0,#ERRTL
0BC2 B0FF      =3410         MOV     @R0,#0FFH
               =3411 ;
0BC4 446C      =3412 PRO7CX: JMP     PROCEX          ;RETURN
               =3413 ;
               =3414 ;*********************************************************
               =3415 ;   ROUTINE:   CKL2FG
               =3416 ;   FUNCTION:  CHECK IF FLAG CHARACTERS MATCH A 2-LABEL READ SECOND
               =3417 ;              LABEL FLAG.
               =3418 ;   ENTRY:     ACCUM CONTAINS FLAG TO CHECK
               =3419 ;   EXIT:      A = 0  IF FLAG CHARACTERS MATCH
               =3420 ;              A <> 0 IF NO MATCH
               =3421 ;              USES NOTHING
               =3422 ;
0BC6           =3423 CKL2FG  EQU     $
0BC6 D5        =3424         SEL     RB1             ;USE REGISTER BANK 1
0BC7 AA        =3425         MOV     R2,A            ;SAVE SECOND LABEL FLAGS TO BE CHECKED
0BC8 BB08      =3426         MOV     R3,#80          ;INITIALIZE LOOP COUNTER
0BCA B862      =3427         MOV     R0,#TWOLAB+1    ;SET RAM POINTER
0BCC F0        =3428 GT2FG:  MOV     A,@R0           ;GET FLAGS TO COMPARE TO
0BCD D3FF      =3429         XRL     A,#0FFH         ;CHECK FOR ANY MORE FLAGS
0BCF C60C      =3430         JZ      CKL2ER          ;JUMP IF NO MORE FLAGS
0BD1 D3FF      =3431         XRL     A,#0FFH         ;RESTORE ACCUMULATOR
0BD3 DA        =3432         XRL     A,R2            ;COMPARE BYTE TO POTENTIAL LABEL 2 FLAGS
0BD4 C60A      =3433         JZ      CKL2RT          ;JUMP IF THERE IS A COMPARISON
0BD6 18        =3434         INC     R0              ;INCREMENT RAM POINTER TO NEXT LABEL 2 FLAGS
0BD7 18        =3435         INC     R0
0BD8 EBCC      =3436         DJNZ    R3,GT2FG
0BDA C5        =3437 CKL2RT: SEL     RB0             ;RESET REGISTER BANK TO 0
0BDB 83        =3438         RET                     ;A=0 IF SECOND LABEL F1F2 MATCH
0BDC 37        =3439 CKL2ER: CPL     A               ;FORCE THE ACCUMULATOR NOT TO HAVE 0
0BDD 64DA      =3440         JMP     CKL2RT          ;JUMP TO RETURN
               =3441 ;
               =3442 ;*********************************************************
               =3443 ;   ROUTINE:   CKL1FG
               =3444 ;   FUNCTION:  CHECK IF FLAG CHARACTERS MATCH A 2-LABEL READ FIRST
               =3445 ;              LABEL FLAG.
               =3446 ;   ENTRY:     ACCUM CONTAINS FLAG TO CHECK
               =3447 ;   EXIT:      A = 0  IF FLAG CHARACTERS MATCH
               =3448 ;              A <> 0 IF NO MATCH
               =3449 ;              USES NOTHING
               =3450 ;
0BDF           =3451 CKL1FG  EQU     $
0BDF D5        =3452         SEL     RB1             ;USE REGISTER BANK 1
0BE0 AA        =3453         MOV     R2,A            ;SAVE SECOND LABEL FLAGS TO BE CHECKED
0BE1 BB08      =3454         MOV     R3,#80          ;INITIALIZE LOOP COUNTER
0BE3 B861      =3455         MOV     R0,#TWOLAB      ;SET RAM POINTER
0BE5 F0        =3456 GT1FG:  MOV     A,@R0           ;GET FLAGS TO COMPARE TO
0BE6 D3FF      =3457         XRL     A,#0FFH         ;CHECK FOR ANY MORE FLAGS
0BE8 C6F5      =3458         JZ      CKL1ER          ;JUMP IF NO MORE FLAGS
0BEA D3FF      =3459         XRL     A,#0FFH         ;RESTORE ACCUMULATOR
0BEC DA        =3460         XRL     A,R2            ;COMPARE BYTE TO POTENTIAL LABEL 1 FLAGS
0BED C6F3      =3461         JZ      CKL1RT          ;JUMP IF THERE IS A COMPARISON
0BEF 18        =3462         INC     R0              ;INCREMENT RAM POINTER TO NEXT LABEL 1 FLAGS
0BF0 18        =3463         INC     R0
0BF1 EBE5      =3464         DJNZ    R3,GT1FG
0BF3 C5        =3465 CKL1RT: SEL     RB0             ;RESET REGISTER BANK TO 0
0BF4 83        =3466         RET                     ;A=0 IF SECOND LABEL F1F2 MATCH
0BF5 37        =3467 CKL1ER: CPL     A               ;FORCE ACCUMULATOR NOT TO BE 0
0BF6 64F3      =3468         JMP     CKL1RT          ;JUMP TO RETURN
               =3469 ;*********************************************************
0BF8 A3        3470 TROPGB:  MOVP    A,@A
0BF9 83        3471          RET
0C00           3472          ORG     0C00H
               3473 $        INCLUDE(:F2:VERTAG.SRC)
               =3474 ;*********************************************************
               =3475 ; FILE:  VERTAG.SRC  11-18-86 13:50  BOB ACTIS
               =3476 ;        MODIFIED 7-17-87 BY RANDY ELLIOTT FOR TEC
               =3477 ;*********************************************************
               =3478 ; ROUTINE:  CKMAJ
               =3479 ; FUNCTION: DETERMINE MAJORITY SEGMENT COUNTER
               =3480 ; ENTRY: R0 = PACKED COUNTER ADDRESS
               =3481 ; EXIT:  R0 = NOT CHANGED
               =3482 ;        USES R2,A
               =3483 ;        CARRY SET IF LOW>=HIGH NIBBLE  (S1CNT>=S2CNT)
               =3484 ;        CARRY CLEAR IF LOW<HIGH NIBBLE (S1CNT<S2CNT)
               =3485 ;
0C00 F0        =3486 CKMAJ:  MOV     A,@R0           ;GET PACKED COUNTER
0C01 530F      =3487         ANL     A,#0FH
0C03 AA        =3488         MOV     R2,A            ;S1CNT
0C04 F0        =3489         MOV     A,@R0
0C05 47        =3490         SWAP    A
0C06 530F      =3491         ANL     A,#0FH          ;MASK S2CNT
0C08 C60E      =3492         JZ      CKMAJ9          ;JUMP IF S2CNT=0
0C0A 37        =3493         CPL     A
0C0B 17        =3494         INC     A               ;2'S COMP S2CNT
0C0C 6A        =3495         ADD     A,R2            ;S1CNT-S2CNT
0C0D 83        =3496         RET
               =3497 ;
0C0E 97        =3498 CKMAJ9: CLR     C               ;S2CNT=0 IS A SPECIAL CASE
0C0F A7        =3499         CPL     C
```

```
0C10 83         =3500           RET
                =3501 ;****************************************************************
                =3502 ; ROUTINE: CKMISM
                =3503 ; FUNCTION: CHECK FOR EXCESS MISMATCHED SEGMENTS.
                =3504 ;           CLEAR COUNTERS IF EXCESS MISMATCHES.
                =3505 ; ENTRY: SCAN 1 COUNTER HAS THE MAJORITY SEGMENT COUNT.
                =3506 ;        R0 = PACKED SCAN2/SCAN1 SEGMENT COUNTER ADDRESS.
                =3507 ;        R0+1 = TOTAL SEGMENT COUNTER ADDRESS.
                =3508 ; EXIT: USES R1,R2,A
                =3509 ;       R0 = NOT CHANGED
                =3510 ;       IF TOTAL=MAJORITY (0 MISMATCHES)
                =3511 ;          OR TOTAL-1=MAJORITY (1 MISMATCH) AND MAJORITY>=3
                =3512 ;          OR TOTAL-2=MAJORITY (2 MISMATCH) AND MAJORITY>=15
                =3513 ;       THEN RETURN,
                =3514 ;       ELSE COUNTERS ARE CLEARED.
                =3515 ;
0C11 F0         =3516 CKMISM: MOV    A,@R0
0C12 C638       =3517         JZ     CKMS90          ;JUMP IF S2/S1 COUNTERS=0
                =3518 ;
0C14 F8         =3519         MOV    A,R0
0C15 17         =3520         INC    A
0C16 A9         =3521         MOV    R1,A            ;SCAN TOTAL COUNTER ADDRESS
                =3522 ;
0C17 F0         =3523         MOV    A,@R0
0C18 530F       =3524         ANL    A,#0FH          ;MASK S1 COUNT
0C1A AA         =3525         MOV    R2,A            ;SAVE MAJORITY COUNT
0C1B D1         =3526         XRL    A,@R1
0C1C C638       =3527         JZ     CKMS90          ;JUMP IF TOTAL=MAJORITY (0 MISMATCHES)
                =3528 ;
0C1E F1         =3529         MOV    A,@R1
0C1F 07         =3530         DEC    A
0C20 DA         =3531         XRL    A,R2
0C21 C62F       =3532         JZ     CKMS30          ;JUMP IF TOTAL-1=MAJORITY (1 MISMATCH)
                =3533 ;
0C23 F1         =3534         MOV    A,@R1
0C24 07         =3535         DEC    A
0C25 07         =3536         DEC    A
0C26 DA         =3537         XRL    A,R2
0C27 9635       =3538         JNZ    CKMS80          ;JUMP IF >2 MISMATCHES
                =3539 ;
                =3540 ; TOTAL-2=MAJORITY (2 MISMATCHES). CHECK FOR MAJORITY>=15.
                =3541 ;
0C29 FA         =3542         MOV    A,R2
0C2A 03F1       =3543         ADD    A,#-15
0C2C E635       =3544         JNC    CKMS80          ;JUMP IF <15
0C2E 83         =3545         RET
                =3546 ;
                =3547 ; TOTAL-1=MAJORITY (1 MISMATCH). CHECK FOR MAJORITY>=3.
                =3548 ;
0C2F FA         =3549 CKMS30: MOV    A,R2
0C30 03FD       =3550         ADD    A,#-3
0C32 E635       =3551         JNC    CKMS80          ;JUMP IF <3
0C34 83         =3552         RET
                =3553 ;
                =3554 ; FAILED TEST. CLEAR COUNTERS.
                =3555 ;
0C35 27         =3556 CKMS80: CLR    A
0C36 A0         =3557         MOV    @R0,A           ;CLEAR S2/S1 COUNTERS
0C37 A1         =3558         MOV    @R1,A           ;CLEAR TOTAL COUNTER
0C38 83         =3559 CKMS90: RET
                =3560 ;****************************************************************
                =3561 ; ROUTINE: SUM12C
                =3562 ; FUNCTION: CALCULATE L6S1 + R6S1 MOD-10 CHECKSUM.
                =3563 ; ENTRY: L6S1 AND R6S1 HAVE DATA TO USE.
                =3564 ; EXIT: A = MOD-10 CHECKSUM CALCULATION FOR 12 CHARACTERS.
                =3565 ;       USES R0,R2,R3
                =3566 ;
0C39 B824       =3567 SUM12C: MOV    R0,#L6S1
0C3B 1450       =3568         CALL   SGSUM6
0C3D 146A       =3569         CALL   APL3R2
0C3F AB         =3570         MOV    R3,A            ;SAVE LEFT HALF SUM
                =3571 ;
0C40 B82E       =3572         MOV    R0,#R6S1
0C42 1450       =3573         CALL   SGSUM6
0C44 146A       =3574         CALL   APL3R2
0C46 6B         =3575         ADD    A,R3            ;RIGHT SUM + LEFT SUM
0C47 57         =3576         DA     A
0C48 530F       =3577         ANL    A,#0FH          ;MASK SUM DIGIT
0C4A 83         =3578         RET
                =3579 ;****************************************************************
                =3580 ; ROUTINE: CK6TOT
                =3581 ; FUNCTION: CHECK L6STOT AND R6STOT FOR COUNTS.
                =3582 ; ENTRY: NO SETUP
                =3583 ; EXIT: A = 0 IF EITHER COUNTER < MINIMUM REQUIRED.
                =3584 ;       A <> 0 IF BOTH COUNTERS >= MINIMUM REQUIRED.
                =3585 ;       USES R0
                =3586 ;
                =3587 CK6TOT:
                =3588 ;
0C4B B82D       =3589 CK6T05: MOV    R0,#L6STOT
0C4D F0         =3590         MOV    A,@R0           ;GET LEFT SEGMENT TOTAL
```

```
0C4E 69       =3591           ADD     A,R1
0C4F F653     =3592           JC      CK6T20          ;JUMP IF L6STOT >= -R1
              =3593 ;
0C51 27       =3594 CK6T10:   CLR     A
0C52 83       =3595           RET                     ;EITHER L6 OR R6 HAD < MINIMUM
              =3596 ;
0C53 B835     =3597 CK6T20:   MOV     R0,#R6STOT
0C55 F0       =3598           MOV     A,@R0           ;GET RIGHT SEGMENT TOTAL
0C56 69       =3599           ADD     A,R1
0C57 E651     =3600           JNC     CK6T10          ;JUMP IF R6STOT < -R1
0C59 27       =3601           CLR     A
0C5A 37       =3602           CPL     A
0C5B 83       =3603           RET                     ;BOTH L6 AND R6 HAD >= MINIMUM
              =3604 ;****************************************************************
              =3605 ; ROUTINE: MAJSGS
              =3606 ; FUNCTION: DETERMINE MAJORITY SEGMENTS.
              =3607 ;           MOVE MAJORITY SEGMENT TO BUFFER #1 IF NECESSARY.
              =3608 ;           (I.E. EXCHANGE BUFFER 1 AND BUFFER 2 DATA AND COUNTERS.)
              =3609 ;           CHECK FOR EXCESS MISMATCHES.
              =3610 ;           IF EXCESS MISMATCHES, CLEAR COUNTERS.
              =3611 ; ENTRY: NO SETUP
              =3612 ; EXIT:  IF THE MISMATCH RATIO IS OK,
              =3613 ;           SEGMENT BUFFER 1 AND COUNTER 1 HAS MAJORITY.
              =3614 ;           SEGMENT BUFFER 2 AND COUNTER 2 HAS MINORITY.
              =3615 ;        IF EXCESS MISMATCHES, SEGMENT COUNTERS ARE CLEARED.
              =3616 ;
0C5C B82C     =3617 MAJSGS:   MOV     R0,#L6SCNT
0C5E 9400     =3618           CALL    CKMAJ
0C60 F666     =3619           JC      MAJSG0          ;JUMP IF S1 IS MAJORITY
0C62 B824     =3620           MOV     R0,#L6S1
0C64 54DF     =3621           CALL    EXSBF4          ;EXCHANGE S2/S1 DATA AND COUNTERS
0C66 9411     =3622 MAJSG0:   CALL    CKMISM
              =3623 ;
0C68 B834     =3624           MOV     R0,#R6SCNT
0C6A 9400     =3625           CALL    CKMAJ
0C6C F672     =3626           JC      MAJSG1
0C6E B82E     =3627           MOV     R0,#R6S1
0C70 54DB     =3628           CALL    EXSBF3
0C72 9411     =3629 MAJSG1:   CALL    CKMISM
              =3630 ;
0C74 BB02     =3631           MOV     R3,#2           ;NUMBER OF 4-CHAR SEGMENT BUFFERS
0C76 B83A     =3632           MOV     R0,#L4SCNT      ;FIRST S2/S1 COUNTER ADDRESS
              =3633 ;
0C78 9400     =3634 MAJSG4:   CALL    CKMAJ
0C7A F682     =3635           JC      MAJSG5          ;JUMP IF S1 IS THE MAJORITY
0C7C F8       =3636           MOV     A,R0
0C7D 03FC     =3637           ADD     A,#-4           ;CALCULATE THE S1 DATA BUFFER ADDRESS
0C7F A8       =3638           MOV     R0,A
0C80 54D7     =3639           CALL    EXSBF2          ;EXCHANGE S2/S1 DATA AND COUNTS
              =3640 ;
0C82 9411     =3641 MAJSG5:   CALL    CKMISM          ;CHECK MISMATCHES
0C84 F8       =3642           MOV     A,R0
0C85 0306     =3643           ADD     A,#6            ;CALCULATE NEXT S2/S1 COUNTER ADDRESS
0C87 A8       =3644           MOV     R0,A
0C88 EB78     =3645           DJNZ    R3,MAJSG4
              =3646 ;
0C8A 83       =3647           RET
              =3648 ;****************************************************************
              =3649 ; ROUTINE: VERTAG
              =3650 ; FUNCTION: TRY TO BUILD 2-LABEL READ, IF NO 2-LABEL READ THEN
              =3651 ;           PERFORM MISMATCH TEST AND GET MAJORITY SEGMENT AND COUNT
              =3652 ;           INTO BUFFER AND COUNTER #1.  (MAJSGS)
              =3653 ;           TRY TO BUILD BLOCKS INTO VERSIONS.  (TBLKXX)
              =3654 ; ENTRY: NO SETUP
              =3655 ; EXIT:  A=0 IF ENOUGH BLOCKS FOR A VERSION ARE FOUND.
              =3656 ;        A=1 IF AMBIGUOUS 2-LABEL READ FOUND
              =3657 ;        A=2 IF NOT ENOUGH BLOCKS FOUND.
              =3658 ;        R6 SET TO INDICATE VALID VERSION IF ONE WAS FOUND.
              =3659 ;
0C8B          =3660 VERTAG    EQU     $
0C8B FE       =3661           MOV     A,R6
0C8C 53F0     =3662           ANL     A,#0F0H         ;CLEAR THE VERSION POINTER/FLAG.
0C8E AE       =3663           MOV     R6,A
              =3664 ;
              =3665 ; CHECK FOR TWO LABEL READ
              =3666 ;
0C8F 34A9     =3667           CALL    CKTL
0C91 C68F     =3668           JZ      VERT05          ;JUMP - NO TWO LABEL VERSIONS CAPTURED
              =3669 ;
              =3670 ; 2-LABEL STUFF FOUND - TRY TO BUILD INTO LABELS
              =3671 ;
              =3672 ;FROM SWITCH SETTINGS (RAM), DETERMINE R1 SETTINGS FOR # OF SCANS
0C93 B95F     =3673           MOV     R1,#SWISET      ;SET RAM POINTER TO SWITCH SETTINGS
0C95 F1       =3674           MOV     A,@R1           ;RETRIEVE SWITCH SETTING
0C96 530C     =3675           ANL     A,#0CH          ;MASK ALL BITS EXCEPT B3 AND B2
0C98 03F4     =3676           ADD     A,#0F4H         ;CHECK FOR OCIA SETTING B3,B2=11
0C9A F6A4     =3677           JC      VTOCIA          ;JUMP IF STANDARD 750F SCANNING
0C9C 0304     =3678           ADD     A,#04H          ;CHECK FOR OCIA SETTING B3,B2=10
0C9E F6A8     =3679           JC      VTSP2C          ;JUMP IF FASTER 2 SCAN
0CA0 0304     =3680           ADD     A,#04H          ;CHECK FOR OCIA SETTING B3,B2=01
0CA2 F6AC     =3681           JC      VTST2C          ;JUMP IF 750F-T PERFORMANCE
              =3682 ;IF WE GET HERE; B3,B2=00 WHICH IS STANDARD 750F OPERATION
```

```
OCA4 B9AA    =3683 VTOC1A: MOV    R1,#EN2SCN            ;SET R1 FOR 1 SCAN MATCH
OCA6 84AE    =3684         JMP    VERT01
OCA8 B9AF    =3685 VTSP2C: MOV    R1,#EN12SN            ;SET R1 FOR 1 SCAN EAN13, 2 SCANS FOR UPCE, UPCA, AND EA
OCAA 84AE    =3686         JMP    VERT01
OCAC B9FF    =3687 VTST2C: MOV    R1,#E2SCN             ;SET R1 FOR 2 SCAN ON ALL LABELS
             =3688 ;
             =3689 ;  CHECK STATUS BYTES FOR ENOUGH TWO LABEL READS
             =3690 ;
OCAE B842    =3691 VERT01: MOV    R0,#STTL13
OCB0 F0      =3692         MOV    A,@R0
OCB1 59      =3693         ANL    A,R1                  ;MASK WITH APPROPRIATE SCAN REQ. BYTE
OCB2 96E7    =3694         JNZ    VERT20                ;JUMP - NOT ENOUGH SEGS CAPTURED YET
             =3695 ;
             =3696 ;  ENOUGH CAPTURED - CONTINUE BUILDING
             =3697 ;
OCB4 B47F    =3698         CALL   TBTL13                ;TRY JAN13-JAN13 PAIR
OCB6 C6EA    =3699         JZ     VER213                ;JUMP - SUCCESSFUL
OCB8 83      =3700         RET                          ;NOT A GOOD JAN13-JAN13 (OR AMBIGUOUS)
             =3701 ;
             =3702 ;  HERE TO TRY FOR A JAN13-JAN8 PAIR
             =3703 ;
             =3704 VERT02:
             =3705 ;****************************************************************
             =3706 ;REMOVE CAPABILITY TO READ JAN13-JAN8 PAIRS
             =3707 ;        MOV    R0,#STTL8
             =3708 ;        MOV    A,@R0
             =3709 ;        ANL    A,R1
             =3710 ;        JNZ    VERT20               ;JUMP - NOT ENOUGH FOR LABEL YET
             =3711 ;****************************************************************
             =3712 ;
             =3713 ;  ENOUGH CAPTURED - CONTINUE BUILDING
             =3714 ;
OCB9 B4C8    =3715         CALL   TBTL8                 ;TRY FOR JAN13-JAN8 PAIR
OCBB C6EB    =3716         JZ     VER2L8                ;JUMP - GOOD LABEL FOUND
OCBD 84E7    =3717         JMP    VERT20
             =3718 ;
             =3719 ;
             =3720 ;  NO 2-LABEL STUFF FOUND - ATTEMPT BUILD OF NORMAL UPC/EAN LABELS
             =3721 ;
OCBF 945C    =3722 VERT05: CALL   MAJSGS                ;MAJORITY/MISMATCH SEGMENT TEST
OCC1 3400    =3723         CALL   HCOMM                 ;CHECK COMM. MAJSGS TAKES A WHILE.
             =3724 ;
OCC3 B800    =3725 TRYBLK: MOV    R0,#00H               ;SET TYPE FLAG TO UPCA/EAN8
OCC5 E5      =3726         SEL    MB0
OCC6 B443    =3727         CALL   CHKSCN                ;SET R1 TO # OF SCANS
OCC8 F5      =3728         SEL    MB1
OCC9 B400    =3729         CALL   TBLKA
OCCB C6EF    =3730         JZ     VERA                  ;JUMP IF A GOOD UPC-A BLOCK
             =3731 ;
OCCD B8FF    =3732         MOV    R0,#0FFH              ;SET TYPE FLAG TO EAN13
OCCF E5      =3733         SEL    MB0
OCD0 B443    =3734         CALL   CHKSCN                ;SET R1 TO # OF SCANS
OCD2 F5      =3735         SEL    MB1
OCD3 B41D    =3736         CALL   TBLK13
OCD5 C6EE    =3737         JZ     VER13                 ;JUMP IF A GOOD EAN-13 BLOCK
             =3738 ;
OCD7 B9FE    =3739         MOV    R1,#-2                ;UPC-E IS ALWAYS 2 SCANS
OCD9 B43C    =3740         CALL   TBLKE
OCDB C6ED    =3741         JZ     VERE                  ;JUMP IF A GOOD UPC-E BLOCK
             =3742 ;
OCDD B800    =3743         MOV    R0,#00H               ;SET TYPE FLAG TO UPCA/EAN8
OCDF E5      =3744         SEL    MB0
OCE0 B443    =3745         CALL   CHKSCN                ;SET R1 TO # OF SCANS
OCE2 F5      =3746         SEL    MB1
OCE3 B44F    =3747         CALL   TBLK8
OCE5 C6EC    =3748         JZ     VER8                  ;JUMP IF A GOOD EAN-8 BLOCK
             =3749 ;
OCE7 2302    =3750 VERT20: MOV    A,#2
OCE9 83      =3751         RET                          ;RETURN IF NOT ENOUGH BLOCKS
             =3752 ;
OCEA 1E      =3753 VER213: INC    R6                    ;SET R6=6
OCEB 1E      =3754 VER2L8: INC    R6                    ;SET R6=5
OCEC 1E      =3755 VER8:   INC    R6                    ;SET R6=4
OCED 1E      =3756 VERE:   INC    R6                    ;SET R6=3
OCEE 1E      =3757 VER13:  INC    R6                    ;SET R6=2
OCEF 1E      =3758 VERA:   INC    R6                    ;SET R6=1
             =3759 ;
OCF0 27      =3760 VERT90: CLR    A
OCF1 83      =3761         RET
              3762 ;*****************************************
OCF2 A3       3763 TROPGC: MOVP   A,@A
OCF3 83       3764         RET
              3765 $       INCLUDE(:F2:TBLKXX.SRC)
             =3766 ;********************************************************************
             =3767 ;  FILE: TBLKXX.SRC  11-18-86 14:50  BOB ACTIS
             =3768 ;        MODIFIED   03-26-86         DREW TAUSSIG
             =3769 ;        MODIFIED   08-21-86         ADD SECOND 2-LABEL CHOICE
             =3770 ;        MODIFIED   03-18-87         RANDY ELLIOTT (TEC MODIFICATION)
             =3771 ;        MODIFIED   06-30-87         RANDY ELLIOTT (CHECKSUM PROBLEM)
             =3772 ;********************************************************************
             =3773 ;  ROUTINE: TBLKA
             =3774 ;  FUNCTION: TRY FOR A VALID UPC-A BLOCK.
```

```
                    =3775 ;          CHECK THAT L6 AND R6 HAVE ENOUGH DATA.
                    =3776 ;          CHECK THAT L6 IS AN A-L.
                    =3777 ;          IF OK SO FAR, CALCULATE MOD-10 CHECK CHARACTER.
                    =3778 ;          IF STILL OK, RETURN WITH A=0.
                    =3779 ;          IF MOD-10 ERROR, CLEAR 4&6-CHAR SEGMENT COUNTERS AND
                    =3780 ;                 CLEAR VERSION POINTER/FLAG.
                    =3781 ; ENTRY: SCAN 1 BUFFER IS MAJORITY SCAN.
                    =3782 ; EXIT:  USES R0,R1,R2,R3,A
                    =3783 ;        A=0 IF GOOD BLOCK
                    =3784 ;        A<>0 IF NO BLOCK
                    =3785 ;
0000                =3786          ORG    (((S-2)/100H)+1)*100H
                    =3787 ;
0000 944B           =3788 TBLKA:   CALL   CK6TOT
0002 C61A           =3789          JZ     TBNONE          ;JUMP IF NO LEFT AND RIGHT SEGMENTS
                    =3790 ;
0004 B827           =3791          MOV    R0,#L6S1+3
0006 F0             =3792          MOV    A,@R0           ;GET PARITY DECODE BYTE
0007 530C           =3793          ANL    A,#0CH
0009 D30C           =3794          XRL    A,#0CH
000B 961A           =3795          JNZ    TBNONE          ;JUMP IF NOT AND AL
                    =3796 ;
000D 9439           =3797          CALL   SUM12C          ;GO CALCULATE LEFT + RIGHT CHECKSUM
000F 9612           =3798          JNZ    TBERR6          ;JUMP IF MOD-10 IS BAD
0011 83             =3799          RET
                    =3800 ;
                    =3801 ; THE FOLLOWING ARE USED BY OTHER TBLKXX ROUTINES, BUFMAN, AND RDTAG.
                    =3802 ;
0012                =3803 CLRVER   EQU    S               ;ENTRY POINT TO CLEAR VERSION FLAGS & DATA
0012 1400           =3804 TBERR6:  CALL   CLR6SG          ;CLEAR 6-CHAR SEGMENTS AND COUNTERS
0014 1414           =3805 TBERR4:  CALL   CLR4SG          ;CLEAR 4-CHAR SEGMENTS AND COUNTERS
0016 FE             =3806          MOV    A,R6
0017 53F0           =3807          ANL    A,#0F0H         ;CLEAR VERSION POINTER/FLAG
0019 AE             =3808          MOV    R6,A
                    =3809 TBNONE:
001A 2302           =3810          MOV    A,#2
001C 83             =3811          RET
                    =3812 ;****************************************************************
                    =3813 ; ROUTINE: TBLK13
                    =3814 ; FUNCTION: TRY FOR A VALID EAN-13 BLOCK.
                    =3815 ;           CHECK THAT L6 AND R6 HAVE ENOUGH DATA.
                    =3816 ;           CHECK THAT L6 IS AN EAN-13-L.
                    =3817 ;           IF OK SO FAR, CALCULATE MOD-10 CHECK CHARACTER.
                    =3818 ;           IF STILL OK, RETURN WITH A=0.
                    =3819 ;           IF MOD-10 FAILS, CLEAR 4&6-CHAR SEGMENT COUNTER AND
                    =3820 ;                CLEAR VERSION POINTER/FLAG.
                    =3821 ; ENTRY: SCAN 1 BUFFER IS MAJORITY SCAN.
                    =3822 ; EXIT:  USES R0,R1,R2,R3,A
                    =3823 ;        A=0 IF GOOD BLOCK.
                    =3824 ;        A<>0 IF NO BLOCK FOUND.
                    =3825 ;
001D 944B           =3826 TBLK13:  CALL   CK6TOT
001F C61A           =3827          JZ     TBNONE          ;JUMP IF NO LEFT AND RIGHT SEGMENTS
                    =3828 ;
0021 B827           =3829          MOV    R0,#L6S1+3
0023 F0             =3830          MOV    A,@R0           ;GET PARITY DECODE BYTE
0024 5330           =3831          ANL    A,#EDECE+EDECD  ;MASK D AND E SEG BITS
0026 961A           =3832          JNZ    TBNONE          ;JUMP IF D OR E SEGMENT
                    =3833 ;
0028 F0             =3834          MOV    A,@R0
0029 530F           =3835          ANL    A,#0FH          ;MASK THE DECODED CHARACTER
002B 03F6           =3836          ADD    A,#-10          ;A>9 IS AN A OR 8 SEGMENT
002D F61A           =3837          JC     TBNONE          ;JUMP IS A OR 8 SEGMENT
                    =3838 ;
002F 9439           =3839          CALL   SUM12C
0031 AB             =3840          MOV    R3,A            ;SAVE 12 CHARACTER SUM
                    =3841 ;
0032 B827           =3842          MOV    R0,#L6S1+3
0034 F0             =3843          MOV    A,@R0           ;GET PARITY DECODE CHARACTER
0035 6B             =3844          ADD    A,R3            ;ADD 13TH CHARACTER
0036 57             =3845          DA     A
0037 530F           =3846          ANL    A,#0FH
0039 9612           =3847          JNZ    TBERR6          ;JUMP IF MOD-10 IS BAD
003B 83             =3848          RET
                    =3849 ;****************************************************************
                    =3850 ; ROUTINE: TBLKE
                    =3851 ; FUNCTION: TRY FOR A VALID UPC-E BLOCK.
                    =3852 ;           CHECK THAT L6 HAS ENOUGH DATA.
                    =3853 ;           CHECK THAT L6 IS AN E-TAG.
                    =3854 ;           CHECK THAT R6 HAS NO DATA.
                    =3855 ;           CHECK THE MAJORITY (S1) >= 2.
                    =3856 ;           IF OK, RETURN WITH A=0.
                    =3857 ;           ELSE, CLEAR 4&6-CHAR SEGMENT COUNTERS AND
                    =3858 ;                CLEAR THE VERSION POINTER/FLAG.
                    =3859 ; ENTRY: SCAN 1 BUFFER IS THE MAJORITY SCAN.
                    =3860 ; EXIT:  USES R0,A
                    =3861 ;        A=0 IF GOOD BLOCK.
                    =3862 ;        A<>0 IF NO BLOCK.
                    =3863 ;
003C B82D           =3864 TBLKE:   MOV    R0,#L6STOT
003E F0             =3865          MOV    A,@R0
```

```
003F 69       =3866          ADD    A,R1           ;ADD NUMBER OF SCANS REQUIRED
0040 E61A     =3867          JNC    TBNONE         ;JUMP IF < 2 LEFT SEGMENTS
              =3868 ;
0042 B827     =3869          MOV    R0,#L6S1+3
0044 F0       =3870          MOV    A,@R0          ;GET PARITY DECODE BYTE
0045 5310     =3871          ANL    A,#EDECE
0047 C61A     =3872          JZ     TBNONE         ;JUMP IF NOT AN E-SEG.
              =3873 ;
0049 B835     =3874          MOV    R0,#R6STOT
004B F0       =3875          MOV    A,@R0
004C 9612     =3876          JNZ    TBERR6         ;JUMP IF R6 SEGMENTS ARE PRESENT
              =3877 ;
004E 83       =3878          RET
              =3879 ;****************************************************************
              =3880 ; ROUTINE: TBLK8
              =3881 ; FUNCTION: TRY FOR A VALID EAN-8 BLOCK.
              =3882 ;              IF ANY 6-CHAR SEGMENTS ARE PRESENT, CLEAR 4-CHAR
              =3883 ;                 SEGMENT COUNTERS AND VERSION POINTER/FLAG.
              =3884 ;              CHECK THAT L4 AND R4 HAVE ENOUGH DATA.
              =3885 ;              IF OK SO FAR, CALCULATE THE MOD-10 CHECK CHARACTER.
              =3886 ;              IF STILL OK, RETURN WITH A=0.
              =3887 ;              IF MOD-10 ERROR, CLEAR 4-CHAR SEGMENT COUNTERS AND
              =3888 ;                 CLEAR VERSION POINTER/FLAG.
              =3889 ; ENTRY: SCAN 1 BUFFER IS THE MAJORITY SCAN.
              =3890 ; EXIT: USES R0,R1,R2,R3,A
              =3891 ;        A=0 IF GOOD BLOCK
              =3892 ;        A<>0 IF NO BLOCK
              =3893 ;
004F B82D     =3894 TBLK8:   MOV    R0,#L6STOT
0051 F0       =3895          MOV    A,@R0
0052 9614     =3896          JNZ    TBERR4         ;JUMP IF ANY 6L SEGMENTS
              =3897 ;
0054 B835     =3898          MOV    R0,#R6STOT
0056 F0       =3899          MOV    A,@R0
0057 9614     =3900          JNZ    TBERR4         ;JUMP IF ANY 6R SEGMENTS
              =3901 ;
              =3902 ; HERE IS ENTRY POINT IF DONT WANT TO THROW AWAY 4-CHAR IF CAPTURED
              =3903 ; 6-CHAR SEGMENTS (AS IN JAN13-JAN8 TWO LABEL READ)
              =3904 ;
              =3905 TBLK8C:
0059 B800     =3906          MOV    R0,#00         ;SET FLAG FOR EAN8/UPCA/UPCE LABELS
005B E5       =3907          SEL    MB0
005C B443     =3908          CALL   CHKSCN         ;SET R1 FOR NUMBER OF SCANS FROM SWITCHES
005E F5       =3909          SEL    MB1
005F B83B     =3910 TBLK8D:  MOV    R0,#L4STOT
0061 F0       =3911          MOV    A,@R0
0062 69       =3912          ADD    A,R1
0063 E61A     =3913          JNC    TBNONE         ;JUMP IF < -R1 LEFT HALF SEGMENTS
              =3914 ;
0065 B841     =3915          MOV    R0,#R4STOT
0067 F0       =3916          MOV    A,@R0
0068 69       =3917          ADD    A,R1
0069 E61A     =3918          JNC    TBNONE         ;JUMP IF < -R1 RIGHT HALF SEGMENTS
              =3919 ;
006B B836     =3920          MOV    R0,#L4S1
006D 144C     =3921          CALL   SGSUM4
006F 146A     =3922          CALL   APL3R2
0071 AB       =3923          MOV    R3,A           ;SAVE LEFT SUM
0072 B83C     =3924          MOV    R0,#R4S1
0074 144C     =3925          CALL   SGSUM4
0076 146A     =3926          CALL   APL3R2
0078 6B       =3927          ADD    A,R3           ;RIGHT SUM + LEFT SUM
0079 57       =3928          DA     A
007A 530F     =3929          ANL    A,#0FH
007C 9614     =3930          JNZ    TBERR4         ;JUMP IF MOD-10 IS BAD
007E 83       =3931          RET
              =3932 ;****************************************************************
              =3933 ; ROUTINE: TBTL13
              =3934 ; FUNCTION: TRY FOR A VALID 2-LABEL READ OF JAN13-JAN13
              =3935 ;              CHECK THAT NO ERROR SEGMENTS CAPTURES
              =3936 ;              TRY TO MATCH LEFT AND RIGHT HALVES
              =3937 ;              CHECK FOR MATCHING AMBIGUITY
              =3938 ;              IF OK THEN CHECK MOD-10 OF EACH LABEL
              =3939 ;              IF STILL OK, THEN RETURN, ELSE CLEAR 6-CHAR SEGMENTS
              =3940 ; ENTRY: 2-LABEL READ STATUS CHECKED AND ENOUGH SEGS CAPTURED
              =3941 ;        SCAN 1 LEFT CONTAINS LABEL 1 LEFT HALF
              =3942 ;        SCAN 2 LEFT CONTAINS LABEL 2 LEFT HALF
              =3943 ; EXIT: USES R0,R1,R2
              =3944 ;        A=0 IF GOOD BLOCK (HALVES MATCH, NO AMBIGUITY)
              =3945 ;        A=1 IF CHECKSUM AMBIGUITY
              =3946 ;        A=2 IF NO GOOD BLOCK FOUND
              =3947 ;
007F          =3948 TBTL13 EQU   $
007F B844     =3949          MOV    R0,#ERRTL      ;ERROR BYTE (EXTRA SEGS)
0081 F0       =3950          MOV    A,@R0
0082 96C1     =3951          JNZ    TTL13E         ;JUMP - EXCESS MISMATCH
              =3952 ;
              =3953 ; NOT MISMATCHES - TRY TO MATCH HALVES
              =3954 ;
0084 B824     =3955          MOV    R0,#L6S1
0086 3483     =3956          CALL   SUM13L         ;LOW NIB OF A CONTAINS HALF CKSUM
0088 47       =3957          SWAP   A
```

```
0089 B945    =3958           MOV     R1,#CKSUML
008B A1      =3959           MOV     @R1,A           ;SAVE IT AWAY (HIGH NIB NOW)
008C B828    =3960           MOV     R0,#L6S2
008E 3483    =3961           CALL    SUM13L
0090 31      =3962           XCHD    A,@R1           ;(CKSUML) HAS 2 LEFT HALF CKSUMS
0091 F1      =3963           MOV     A,@R1
0092 47      =3964           SWAP    A
0093 D1      =3965           XRL     A,@R1           ;CHECK IF THE SAME (AMBIGUOUS)
0094 C6C5    =3966           JZ      TTL13A          ;JUMP - AMBIGUOUS CKSUMS
             =3967 ;
             =3968 ; CHECK SUMS DIFFERENT - GET RIGHT HALVES AND TRY TO MATCH
             =3969 ;
0096 B82E    =3970           MOV     R0,#R6S1
0098 1450    =3971           CALL    SGSUM6
009A 146A    =3972           CALL    APL3R2          ;LOW NIB OF A CONTAINS HALF CKSUM
009C B946    =3973           MOV     R1,#CKSUMR
009E 47      =3974           SWAP    A
009F A1      =3975           MOV     @R1,A           ;SAVE IT (HIGH NIB)
             =3976 ;
00A0 B831    =3977           MOV     R0,#R6S2
00A2 1450    =3978           CALL    SGSUM6
00A4 146A    =3979           CALL    APL3R2
00A6 31      =3980           XCHD    A,@R1           ;(CKSUMR) HAS 2 RIGHT HALF CKSUMS
00A7 F1      =3981           MOV     A,@R1           ;MOVE TO A
00A8 B845    =3982           MOV     R0,#CKSUML
00AA B4E7    =3983           CALL    CKMTCH          ;GO CHECK MOD-10 PAIRS
00AC C688    =3984           JZ      TTL13G          ;JUMP - MATCH (GOOD LABEL)
             =3985 ;
             =3986 ; NO MATCH - TRY SWAPPING HALVES
             =3987 ;
00AE F1      =3988           MOV     A,@R1
00AF 47      =3989           SWAP    A
00B0 B4E7    =3990           CALL    CKMTCH          ;GO CHECK MOD-10 PAIRS
00B2 96C1    =3991           JNZ     TTL13E          ;JUMP - NO MATCH (ERROR)
             =3992 ;
             =3993 ; MATCH BUT BACKWARDS - SWAP
             =3994 ;
00B4 B82E    =3995           MOV     R0,#R6S1
00B6 54DB    =3996           CALL    EXSBF3          ;EXCHANGE SCAN BUFFERS
             =3997 ;
             =3998 ; HERE IF GOOD READ
             =3999 ;
00B8 BBFF    =4000 TTL13G:   MOV     R3,#0FFH        ;SET R3 AS FLAG FOR 13-13 READ
00BA E5      =4001           SEL     MB0
00BB 145B    =4002           CALL    FLGMTC
00BD F5      =4003           SEL     MB1             ;COMPARE LABEL FLAGS
00BE 96C1    =4004           JNZ     TTL13E          ;JUMP IF NO COMPARISON
00C0 83      =4005           RET
             =4006 ;
             =4007 ; HERE IF BAD READ
             =4008 ;
00C1 2302    =4009 TTL13E:   MOV     A,#2
00C3 A412    =4010           JMP     TBERR6          ;GO CLEAR SEGS AND RETURN
             =4011 ;
             =4012 ; HERE IF AMBIGUOUS READ
             =4013 ;
00C5 2301    =4014 TTL13A:   MOV     A,#1
00C7 83      =4015           RET
             =4016 ;
             =4017 ;********************************************************************
             =4018 ; ROUTINE: TBTL8
             =4019 ; FUNCTION: TRY FOR A VALID JAN13-JAN8 LABEL PAIR
             =4020 ;                   GET MAJORITY SEGMENTS
             =4021 ;                   LOOK FOR VALID JAN13 LABEL (TBLK13)
             =4022 ;                   IF OK - CHECK THAT IT HAS VALID F1,F2 CHARS
             =4023 ;                   IF STILL OK TRY FOR VALID JAN8 (TBLK8)
             =4024 ;                   CHECK FOR VALID LABEL 2 F1,F2 CHARS
             =4025 ; ENTRY: 2-LABEL READ STATUS CHECKED AND ENOUGH SEGS CAPTURED
             =4026 ; EXIT: USES R0,R1,R2,R3
             =4027 ;       A=0 IF GOOD PAIR
             =4028 ;       A<>0 IF NO VALID PAIR FOUND
             =4029 ;
00C8         =4030 TBTL8     EQU     $
00C8 945C    =4031           CALL    MAJSGS          ;SORT OUT MAJORITY SEGS
00CA 3400    =4032           CALL    HCOMM           ;MAJSGS TAKES A WHILE
00CC B8FF    =4033           MOV     R0,#0FFH        ;SET FLAG FOR 2 SCAN CHECK OF EAN13 LABELS
00CE E5      =4034           SEL     MB0
00CF B443    =4035           CALL    CHKSCN          ;SET R1 FOR NUMBER OF SCANS NEEDS
00D1 F5      =4036           SEL     MB1
00D2 B41D    =4037           CALL    TBLK13          ;TRY FOR VALID JAN13 LABEL
00D4 96E6    =4038           JNZ     TTL8E           ;JUMP - NO VALID LABEL FOUND
             =4039 ;
             =4040 ;
00D6 B800    =4041           MOV     R0,#00          ;SET LABEL TYPE FLAG TO EAN8
00D8 E5      =4042           SEL     MB0
00D9 B443    =4043           CALL    CHKSCN          ;CHECK SWITCH SETTINGS FOR # OF SCANS
00DB F5      =4044           SEL     MB1
00DC B459    =4045           CALL    TBLK8C          ;TRY FOR VALID JAN8
00DE 96E6    =4046           JNZ     TTL8E           ;JUMP - NO VALID JAN8 FOUND
             =4047 ;
             =4048 ;CHECK LABEL FLAGS FOR MATCH
```

```
00E0 B800     =4049           MOV     R3,#00H         ;SET FLAG FOR 13-8 FLAG COMPARISON
00E2 E5       =4050           SEL     MB0
00E3 1458     =4051           CALL    FLGMTC          ;COMPARE FLAGS
00E5 F5       =4052           SEL     MB1
00E6 83       =4053 TTL8E:    RET
              =4054 ;
              =4055 ;****************************************************************
              =4056 ;   ROUTINE: CKMTCH
              =4057 ;   FUNCTION: CHECK MOD-10 LABEL PAIR BYTES FOR MATCHING VALID CHECKSUM
              =4058 ;             IN TWO LABEL READ PAIRS.
              =4059 ;   ENTRY: R0 POINTS TO 2 LEFT HALF CHECKSUMS
              =4060 ;          A CONTAINS RIGHT HALF CHECKSUMS
              =4061 ;   EXIT:  A = 0 IF MATCH GOOD
              =4062 ;             <> 0 IF MATCH BAD
              =4063 ;   USES:  A,R2
              =4064 ;
00E7 60       =4065 CKMTCH:   ADD     A,@R0           ;ADD LEFT AND RIGHT HALF PAIRS
00E8 AA       =4066           MOV     R2,A            ;SAVE RESULT
00E9 C6F7     =4067           JZ      CKMTRT          ;JMP IF GOOD
              =4068 ;
00EB D3AA     =4069           XRL     A,#0AAH
00ED C6F7     =4070           JZ      CKMTRT
              =4071 ;
00EF FA       =4072           MOV     A,R2
00F0 D30A     =4073           XRL     A,#00AH
00F2 C6F7     =4074           JZ      CKMTRT
              =4075 ;
00F4 FA       =4076           MOV     A,R2
00F5 D3A0     =4077           XRL     A,#0A0H
              =4078 ;
00F7 83       =4079 CKMTRT:   RET                     ;A=0 IF GOOD MATCH
              4080 ;*****************************************
TR 00F8 A3    4081 TROPGD:    MOVP    A,@A
00F9 83       4082            RET
0E00          4083            ORG     0E00H
              4084 $  INCLUDE(:F2:BUFMAN.SRC)
              =4085 ;****************************************************************
              =4086 ;   FILE: BUFMAN.SRC 11-18-86 14:45  BOB ACTIS
              =4087 ;         MODIFIED  03-27-86        DREW TAUSSIG
              =4088 ;         MODIFIED  02-18-87 08:50  BOB ACTIS FOR THE 750SL
              =4089 ;         MODIFIED  03-18-87        RANDY ELLIOTT FOR THE TEC 750SL
              =4090 ;****************************************************************
              =4091 ;   ROUTINE: BUF8C
              =4092 ;   FUNCTION: LOAD 8 CHARACTERS INTO THE COMMUNICATIONS BUFFER.
              =4093 ;             (LOAD L4 AND R4 DATA)
              =4094 ;   ENTRY: R1 = NEXT AVAILABLE COMM BUFFER BYTE.
              =4095 ;   EXIT:  R1 = NEXT AVAILABLE COMM BUFFER BYTE.
              =4096 ;          L6 AND R6 DATA MOVED TO COMM BUFFER.
              =4097 ;
0E00 B1FF     =4098 BUF8C:    MOV     @R1,#0FFH       ;8-CHAR HEADER BYTE
0E02 19       =4099           INC     R1              ;INCREMENT TO NEXT AVAILABLE BYTE
0E03 B836     =4100           MOV     R0,#L4S1
0E05 143B     =4101           CALL    MOV2BY
0E07 B83C     =4102           MOV     R0,#R4S1
0E09 143B     =4103           CALL    MOV2BY
0E0B 83       =4104           RET
              =4105 ;****************************************************************
              =4106 ;   ROUTINE: BUF13C
              =4107 ;   FUNCTION: LOAD 13 CHARACTERS INTO THE COMMUNICATIONS BUFFER.
              =4108 ;             (LOAD L6,R6 AND L6 PARITY DECODE DATA )
              =4109 ;   ENTRY: R1 = NEXT AVAILABLE COMM BUFFER BYTE.
              =4110 ;          F0 = BUFFER TO USE SET = BUFFER 2, CLR = BUFFER 1
              =4111 ;   EXIT:  R1 = NEXT AVAILABLE COMM BUFFER BYTE.
              =4112 ;          L6, R6 AND PARITY DATA MOVED TO COMM BUFFER.
              =4113 ;
0E0C B82B     =4114 BUF13C:   MOV     R0,#L6S2+3
0E0E B612     =4115           JF0     BU13C1          ;JUMP - BUFFER 2
0E10 B827     =4116           MOV     R0,#L6S1+3
0E12 23F0     =4117 BU13C1:   MOV     A,#0F0H         ;HEADER FOR 13 CHARACTER LABEL
0E14 30       =4118           XCHD    A,@R0           ;MOVE PARITY DIGIT TO ACCUM
0E15 A1       =4119           MOV     @R1,A
0E16 19       =4120           INC     R1              ;INCREMENT TO NEXT AVAILABLE BYTE
0E17 C8       =4121           DEC     R0
0E18 C8       =4122           DEC     R0
0E19 C8       =4123           DEC     R0              ;GET TO BEGINNING OF BUFFER (1 OR 2)
0E1A 143F     =4124           CALL    MOV3BY
0E1C B831     =4125           MOV     R0,#R6S2
0E1E B622     =4126           JF0     BU13C2          ;JUMP - BUFFER 2
0E20 B82E     =4127           MOV     R0,#R6S1
0E22 143F     =4128 BU13C2:   CALL    MOV3BY
0E24 83       =4129           RET
              =4130 ;
              =4131 ;****************************************************************
              =4132 ;   ROUTINE: BUFMAN
              =4133 ;   FUNCTION: IF BUFMAN REQUEST FLAG IS NOT SET,
              =4134 ;                   THEN RETURN,
              =4135 ;                   ELSE IF COMM BUF IS BUSY
              =4136 ;                           THEN IF NO VALID VERSIONS, CLR REQ FLAG. RETURN
              =4137 ;                           ELSE PROCESS MESSAGE BUFFER REQUEST.
              =4138 ;   ENTRY: RB0
              =4139 ;          R6 VERSION FLAGS SETUP
              =4140 ;   EXIT:  USES R0,R1,A
```

```
                    =4141 ;         SPECIAL CHARACTERS
                    =4142 ;               BYTE 0BBH = MISSCAN MESSAGE  (EMSNBY)
                    =4143 ;               BYTE 0DDH = AMBIGUOUS 2-LABLE READ MESSAGE (EAMBBY)
                    =4144 ;               DATA "C"  = FILLER CHARACTER
                    =4145 ;               BYTE 0CCH = TERMINATION  (ETRMBY)
                    =4146 ;
0E25 FC             =4147 BUFMAN: MOV    A,R4
0E26 B229           =4148         JB5    BUFM10             ;JUMP IF BUFMAN REQUEST FLAG IS SET
0E28 83             =4149         RET
0E29 7299           =4150 BUFM10: JB3    BUFM93             ;JUMP IF COMM BUFFER IS BUSY
                    =4151 ;
0E2B FE             =4152         MOV    A,R6
0E2C 530F           =4153         ANL    A,#0FH
0E2E C69E           =4154         JZ     BUFM94             ;JUMP IF NOT A VALID VERSION
                    =4155 ;
                    =4156 ;
0E30 B948           =4157 BUFM20: MOV    R1,#SBUF           ;SEND BUFFER START ADDRESS
0E32 FE             =4158         MOV    A,R6               ;GET VERSION FLAGS
0E33 530F           =4159         ANL    A,#0FH             ;MASK VERSION POINTER
0E35 AE             =4160         MOV    R6,A
0E36 03F8           =4161         ADD    A,#-(EVERAM+1)
0E38 F69E           =4162         JC     BUFM94             ;JUMP - POINTER IS ILLEGAL VERSION
                    =4163 ;
                    =4164 ; LEGAL VERSION - BUILD ROUTINE ADDRESS AND JUMP TO IT
                    =4165 ;
0E3A FE             =4166         MOV    A,R6
0E3B 033E           =4167         ADD    A,#LOW BUFTBL
0E3D B3             =4168         JMPP   @A
0E3E 7A             =4169 BUFTBL: DB     LOW MISSCN
0E3F 46             =4170         DB     LOW BUFMA
0E40 53             =4171         DB     LOW BUFM13
0E41 58             =4172         DB     LOW BUFME
0E42 61             =4173         DB     LOW BUFM8
0E43 65             =4174         DB     LOW BUFT8
0E44 6F             =4175         DB     LOW BUFT13
0E45 7F             =4176         DB     LOW BUFAMB
                    =4177 ;
                    =4178 ; UPC-A TAG
                    =4179 ;
0E46 B1AC           =4180 BUFMA:  MOV    @R1,#0ACH          ;UPC-A HEADER AND FILLER
0E48 19             =4181         INC    R1                 ;INCREMENT TO NEXT AVAILABLE BYTE
0E49 B824           =4182         MOV    R0,#L6S1
0E4B 143F           =4183         CALL   MOV3BY
0E4D B82E           =4184         MOV    R0,#R6S1
0E4F 143F           =4185         CALL   MOV3BY
0E51 C48A           =4186         JMP    BUFM90
                    =4187 ;
                    =4188 ; EAN(JAN) 13 TAG
                    =4189 ;
0E53 85             =4190 BUFM13: CLR    F0                 ;USE BUFFER 1
0E54 D40C           =4191         CALL   BUF13C
0E56 C48A           =4192         JMP    BUFM90
                    =4193 ;
                    =4194 ; UPC-E TAG
                    =4195 ;
0E58 B1E0           =4196 BUFME:  MOV    @R1,#0E0H          ;UPC-E HEADER AND N/S 0
0E5A 19             =4197         INC    R1
0E5B B824           =4198         MOV    R0,#L6S1
0E5D 143F           =4199         CALL   MOV3BY
0E5F C48A           =4200         JMP    BUFM90
                    =4201 ;
                    =4202 ; EAN(JAN) 8 TAG
                    =4203 ;
0E61 D400           =4204 BUFM8:  CALL   BUF8C              ;LOAD BUFFER
0E63 C48A           =4205         JMP    BUFM90
                    =4206 ;
                    =4207 ; TWO LABEL READ (JAN13-JAN8)
                    =4208 ;
0E65 85             =4209 BUFT8:  CLR    F0                 ;BUFFER 1
0E66 D40C           =4210         CALL   BUF13C
0E68 B1AA           =4211         MOV    @R1,#ETL1BY        ;PUT INTER LABEL TERM BYTE IN BUFFER
0E6A 19             =4212         INC    R1
0E6B D400           =4213         CALL   BUF8C
0E6D C48A           =4214         JMP    BUFM90
                    =4215 ;
                    =4216 ; TWO LABEL READ (JAN13-JAN13)
                    =4217 ;
0E6F 85             =4218 BUFT13: CLR    F0                 ;START WITH BUFFER 1
0E70 D40C           =4219         CALL   BUF13C
0E72 B1AA           =4220         MOV    @R1,#ETL1BY        ;INTER LABEL TERMINATION BYTE
0E74 19             =4221         INC    R1
0E75 95             =4222         CPL    F0                 ;THEN BUFFER 2
0E76 D40C           =4223         CALL   BUF13C
0E78 C48A           =4224         JMP    BUFM90
                    =4225 ;
                    =4226 ; MIS-SCAN MESSAGE
                    =4227 ;
0E7A B1BB           =4228 MISSCN: MOV    @R1,#EMSNBY        ;MISSCAN BYTE
0E7C 19             =4229         INC    R1
0E7D C48A           =4230         JMP    BUFM90
                    =4231 ;
                    =4232 ; AMBIGUOUS 2-LABEL READ - CHECK STATUS BIT
```

```
                  =4233 ; IF SET, THEN SEND IN BUFFER, ELSE CLEAR VERSION AND EXIT
                  =4234 ;
0E7F FC           =4235 BUFAMB: MOV    A,R4
0E80 37           =4236         CPL    A
0E81 529E         =4237         JB2    BUFM94          ;JUMP - NO AMBIGUITY MESSAGE
                  =4238 ;
0E83 B1DD         =4239         MOV    @R1,#EAMBBY
0E85 19           =4240         INC    R1
0E86 B1CC         =4241         MOV    @R1,#ETRMBY
0E88 C48E         =4242         JMP    BUFM91          ;DON'T CLEAR VERSION POINTER
                  =4243 ;
                  =4244 ;, SET TERMINATING CHAR AND BUSY FLAG (CLEAR REQUEST FLAG)
                  =4245 ;
0E8A B1CC         =4246 BUFM90: MOV    @R1,#ETRMBY     ;LOAD THE DATA TERMINATION CHARACTER
0E8C B412         =4247         CALL   CLRVER          ;CLEAR THE VERSION POINTER/FLAG & DATA
0E8E 8947         =4248 BUFM91: MOV    R1,#SBFPNT      ;SEND BUFFER POINTER ADDRESS
0E90 B190         =4249         MOV    @R1,#SBSTRT     ;PUT PACKED DATA START ADRS IN POINTER
0E92 FC           =4250         MOV    A,R4
0E93 53DF         =4251         ANL    A,#255-EBFREQ   ;CLEAR THE BUFMAN REQUEST FLAG
0E95 4308         =4252         ORL    A,#ESBFUL       ;SET THE SEND BUFFER FULL BIT
0E97 AC           =4253         MOV    R4,A
0E98 83           =4254         RET
                  =4255 ;
0E99 FE           =4256 BUFM93: MOV    A,R6
0E9A 530F         =4257         ANL    A,#0FH          ;MASK THE VERSION POINTER/FLAG
0E9C 96A2         =4258         JNZ    BUFM95          ;JUMP IF A VALID VERSION
                  =4259 ;
                  =4260
0E9E FC           =4261 BUFM94: MOV    A,R4
0E9F 53DF         =4262         ANL    A,#255-EBFREQ   ;CLEAR THE BUFMAN REQUEST FLAG
0EA1 AC           =4263         MOV    R4,A
                  =4264 ;
0EA2 83           =4265 BUFM95: RET
                   4266 $       INCLUDE(:F2:DRSUMT.SRC)
                  =4267 ;************************************************************
                  =4268 ; FILE:  DRSUMT.SRC  10-27-83 15:00  BOB ACTIS
                  =4269 ;        MODIFIED   03-27-86         DREW TAUSSIG
                  =4270 ;************************************************************
                  =4271 ; ROUTINE: SUM4BY, SUM3BY, SUM2BY
                  =4272 ; FUNCTION: ADD 4,3 OR 2 BYTE SEGMENT DATA TO ACCUMULATOR
                  =4273 ; ENTRY: R0 = START ADDRESS OF SEGMENT BUFFER TO SUM
                  =4274 ; EXIT:  R0 = END ADDRESS OF SEGMENT BUFFER
                  =4275 ;        A = RUNNING SUM (BASE 16) OF SEGMENT BUFFER DATA
                  =4276 ;
0EA3 60           =4277 SUM4BY: ADD    A,@R0
0EA4 18           =4278         INC    R0
0EA5 60           =4279 SUM3BY: ADD    A,@R0
0EA6 18           =4280         INC    R0
0EA7 60           =4281 SUM2BY: ADD    A,@R0
0EA8 18           =4282         INC    R0
0EA9 60           =4283         ADD    A,@R0
0EAA 83           =4284         RET
                  =4285 ;************************************************************
                  =4286 ; ROUTINE: DRSUMT  DOUBLE READ SUM TEST
                  =4287 ; FUNCTION: CALCULATE THE LABEL DATA SUM (BASE 16)
                  =4288 ;           COMPARE IT TO THE PREVIOUS LABEL SUM
                  =4289 ;           SAVE THE NEW SUM
                  =4290 ; ENTRY: A VALID LABEL VERSION HAS BEEN FOUND
                  =4291 ; EXIT:  USES R0
                  =4292 ;        LABEL DATA SUM STORED IN DRSUM
                  =4293 ;        A=0 IF OLD=NEW (CONSECUTIVE LABELS ARE THE SAME)
                  =4294 ;        A<>0 IF OLD<>NEW (CONSECUTIVE LABELS ARE DIFFERENT)
                  =4295 ;
0EAB FE           =4296 DRSUMT: MOV    A,R6            ;GET VERSION FLAG
0EAC 530F         =4297         ANL    A,#0FH          ;MASK VERSION POINTER
0EAE A8           =4298         MOV    R0,A
0EAF 03F9         =4299         ADD    A,#-(EVTL13+1)
0EB1 F6F2         =4300         JC     DRVRNG          ;JUMP - ILLEGAL VERSION
                  =4301 ;
                  =4302 ; LEGAL VERSION - JUMP TO PROPER SUM ROUTINE
                  =4303 ;
0EB3 F8           =4304         MOV    A,R0
0EB4 03B7         =4305         ADD    A,#LOW DRSTBL   ;ADD OFFSET TO TABEL ADDRESS
0EB6 83           =4306         JMPP   @A              ;JUMP TO VERSION ROUTINE
0EB7 F2           =4307 DRSTBL: DB     LOW DRVRNG      ;NO VALID VERSION. POINTER=0.
0EB8 BE           =4308         DB     LOW DRSMA
0EB9 BE           =4309         DB     LOW DRSM13
0EBA C1           =4310         DB     LOW DRSME
0EBB CE           =4311         DB     LOW DRSM8
0EBC D7           =4312         DB     LOW DRST8
0EBD E2           =4313         DB     LOW DRST13
                  =4314 ;
0EBE              =4315 DRSMA   EQU    $
0EBE 27           =4316 DRSM13: CLR    A
0EBF C4C4         =4317         JMP    DRSM7B          ;GO SUM 7 BYTES
                  =4318 ;
0EC1 27           =4319 DRSME:  CLR    A
0EC2 C4C8         =4320         JMP    DRSM7C          ;GO SUM 7 CHARACTERS
                  =4321 ;
0EC4 B82E         =4322 DRSM7B: MOV    R0,#R6S1        ;SUM 7 BYTES
0EC6 D4A5         =4323         CALL   SUM3BY
0EC8 B824         =4324 DRSM7C: MOV    R0,#L6S1        ;SUM 7 CHARACTERS
```

```
OECA D4A3        =4325           CALL    SUM4BY
OECC C4ED        =4326           JMP     DRSMDN          ;JUMP - THE SUM IS FINISHED
                 =4327 ;
OECE 27          =4328 DRSM8:    CLR     A
OECF B836        =4329           MOV     RO,#L4S1
OED1 D4A7        =4330           CALL    SUM2BY
OED3 B83C        =4331           MOV     RO,#R4S1
OED5 D4A7        =4332           CALL    SUM2BY
                 =4333 ;
OED7 27          =4334 DRST8:    CLR     A
OED8 B836        =4335           MOV     RO,#L4S1
OEDA D4A7        =4336           CALL    SUM2BY
OEDC B83C        =4337           MOV     RO,#R4S1
OEDE D4A7        =4338           CALL    SUM2BY          ;SUM JAN8 LABEL
OEE0 C4C4        =4339           JMP     DRSM7B          ;GO SUM JAN13 LABEL
                 =4340 ;
OEE2 27          =4341 DRST13:   CLR     A
OEE3 B831        =4342           MOV     RO,#R6S2
OEE5 D4A5        =4343           CALL    SUM3BY
OEE7 B828        =4344           MOV     RO,#L6S2
OEE9 D4A3        =4345           CALL    SUM4BY          ;SUM SECOND JAN13 LABEL
OEEB C4C4        =4346           JMP     DRSM7B          ;GO SUM SECOND JAN13 LABEL
                 =4347 ;
OEED B85D        =4348 DRSMDN:   MOV     RO,#DRSUM
OEEF 20          =4349           XCH     A,@RO           ;SAVE THE NEW SUM IN DRSUM
OEF0 DO          =4350           XRL     A,@RO           ;COMPARE THE OLD AND NEW SUM
OEF1 83          =4351           RET
                 =4352 ;
OEF2 27          =4353 DRVRNG:   CLR     A               ;DOUBLE READ VERSION N/G
OEF3 83          =4354           RET
                 4355 ;***************************************
OEF4 A3          4356 TROPGE:   MOVP    A,@A
OEF5 83          4357           RET
OF00             4358           ORG     0F00H
                 4359 $         INCLUDE(:F2:FTRDTG.SRC)
                 =4360 ;******************************************************************
                 =4361 ;  FILE: FTRDTG.SRC  02-18-87  10:50  BOB ACTIS
                 =4362 ;  ROUTINE: RDTAG THIS IS THE MAIN PROGRAM
                 =4363 ;  MODIFIED 03-18-87 BY RANDY ELLIOTT FOR 750 TEC SL
                 =4364 ;  MODIFIED 07-20-87 BY RANDY ELLIOTT FOR 750 TEC SL (UPC LABEL PROG)
OF00 FC          =4365 RDTAG:    MOV     A,R4            ;CLEAR SCAN FLAGS EXCEPT SEND BUFFER
OF01 532C        =4366           ANL     A,#ESBFUL+EBFREQ+EAMBMS ;FULL,BUFMAN REQUEST,
OF03 AC          =4367           MOV     R4,A            ;2-LABEL READ, AND AMB MESS ENABLE.
OF04 8208        =4368           JB5     RDT05           ;JUMP IF THE BUFMAN REQUEST FLAG IS SET
                 =4369 ;
OF06 B412        =4370           CALL    CLRVER          ;CLEAR THE VERSION POINTER/FLAG & DATA
OF08 1420        =4371 RDT05:    CALL    CLRSNB          ;CLEAR THE SCAN BUFFER
                 =4372 ;
                 =4373 ;  WAIT FOR THE LABEL TO GO AWAY.  CHECK MOTOR SPEED
                 =4374 ;
OF0A F489        =4375 RDT10:    CALL    MTRCHK          ;CHECK MOTOR SPEED
OF0C 3400        =4376           CALL    HCOMM           ;SERVICE THE I/F AND BUFMAN
OF0E 8619        =4377           JNI     RDT20           ;JUMP IF SYMCAP (SEGMENT OR SDATA)
                 =4378 ;
OF10 FF          =4379           MOV     A,R7            ;GET THE "SEG SEEN" TIMER
OF11 960A        =4380           JNZ     RDT10           ;JUMP IF A SEG RECENTLY SEEN
                 =4381 ;
OF13 BD24        =4382           MOV     R5,#EDRDLY      ;SET THE DOUBLE READ TIMER
OF15 BF56        =4383           MOV     R7,#EGDLTW      ;SET THE GO-LT ON TIMER
OF17 E41F        =4384           JMP     RDT30           ;GO WAIT FOR A LABEL TO READ
                 =4385 ;
                 =4386 ;  RESET THE SYMCAP OR SERVICE SDATA
                 =4387 ;
OF19 14AF        =4388 RDT20:    CALL    CKFCA           ;RESET THE SEG, ALSO CHECK FOR SDATA
OF1B 3400        =4389           CALL    HCOMM           ;SERVICE THE I/F AND BUFMAN.  ALSO
OF1D E40A        =4390           JMP     RDT10           ;DELAY FOR FCA TO RESET
                 =4391 ;
                 =4392 ;  WAIT FOR A LABEL TO READ.  CHECK GD-LT ON TIME & CHECK MOTOR SPEED
                 =4393 ;
OF1F FC          =4394 RDT30:    MOV     A,R4
OF20 4301        =4395           ORL     A,#ESCNG        ;SET THE SCAN FLAG SO CKFCA WILL
OF22 AC          =4396           MOV     R4,A            ;PUT THE SEGMENT INTO THE SCAN BUFFER
                 =4397 ;
                 =4398 RDT35:
OF23 B808        =4399           MOV     RO,#SWLATC      ;CHECK SWITCHES (9) B5 FOR PROGRAM MODE
OF25 80          =4400           MOVX    A,@RO
OF26 8231        =4401           JB5     RDT37           ;JUMP IF IN PROGRAM MODE.
OF28 B85F        =4402           MOV     RO,#SWISET      ;CHECK PROGRAMED SWITCHES (B5) FOR PROGRAM MODE
OF2A F0          =4403           MOV     A,@RO
OF2B 8231        =4404           JB5     RDT37           ;JUMP IF IN PROGRAM MODE.
                 =4405 ;NOT IN PROGRAM MODE. CLEAR TWO LABEL  FLAG POINTER.
OF2D FE          =4406           MOV     A,R6
OF2E 538F        =4407           ANL     A,#8FH
OF30 AE          =4408           MOV     R6,A
                 =4409 ;
                 =4410 RDT37:
OF31 3400        =4411           CALL    HCOMM
OF33 14AF        =4412           CALL    CKFCA           ;SERVICE FCA.  POSSIBLE SEG OR SDATA.
OF35 B823        =4413           MOV     RO,#SCNBUF+3
OF37 F0          =4414           MOV     A,@RO           ;GET THE SCAN BUF PARITY DECOTE BYTE
OF38 9645        =4415           JNZ     RDT40           ;JUMP IF SCAN BUFFER HAS DATA
                 =4416 ;
```

```
OF3A F4B9   =4417           CALL    MTRCHK          ;CHECK MOTOR SPEED
            =4418 ;
OF3C FF     =4419           MOV     A,R7
OF3D 9623   =4420           JNZ     RDT35           ;JUMP IF GD-LT TIMER <> 0
OF3F 990F   =4421           ANL     P1,#255-EGDLT   ;GD-LT OFF
OF41 8940   =4422           ORL     P1,#EBDLT       ;BD-LT ON
OF43 E423   =4423           JMP     RDT35           ;STILL WAITING FOR A LABEL
            =4424 ;
            =4425 ;  START READING THE LABEL
            =4426 ;
OF45 3400   =4427 RDT40:    CALL    HCOMM
OF47 990F   =4428           ANL     P1,#255-EGDLT   ;GD-LT OFF
OF49 8940   =4429           ORL     P1,#EBDLT       ;BD-LT ON
OF4B FC     =4430           MOV     A,R4
OF4C B200   =4431           JB5     RDTAG           ;JUMP IF THE BUFMAN REQUEST FLAG IS SET
OF4E E456   =4432           JMP     RDT60           ;GO PROCESS THE FIRST SEGMENT
            =4433 ;
            =4434 ;  COLLECT AND PROCESS SEGMENTS.  CHECK MOTOR SPEED.
            =4435 ;
OF50 F4B9   =4436 RDT50:    CALL    MTRCHK          ;CHECK MOTOR SPEED
OF52 3400   =4437           CALL    HCOMM
OF54 14AF   =4438           CALL    CKFCA           ;GET SEGMENTS IF ANY
OF56 5433   =4439 RDT60:    CALL    PROCSG          ;PROCESS SEGMENTS IF ANY
OF58 3457   =4440           CALL    CKCNTS          ;CHK FOR ENOUGH SEGS FOR PSBL VERSION
OF5A C65F   =4441           JZ      RDT70           ;JUMP IF ENOUGH SEGMENTS
            =4442 ;
OF5C FF     =4443           MOV     A,R7
OF5D 9650   =4444           JNZ     RDT50           ;JUMP IF SEGMENTS RECENTLY SEEN
            =4445 ;
            =4446 ;  TRY FOR A VALID LABEL
            =4447 ;
OF5F 3400   =4448 RDT70:    CALL    HCOMM
OF61 948B   =4449           CALL    VERTAG
OF63 C66E   =4450           JZ      GOODRD          ;JUMP IF A GOOD VERSION WAS FOUND
OF65 128E   =4451           JB0     AMBRD           ;JUMP - AMBIGUOUS 2-LABEL READ
            =4452 ;
OF67 FF     =4453           MOV     A,R7
OF68 9650   =4454           JNZ     RDT50           ;JUMP IF SEGMENTS RECENTLY SEEN
            =4455 ;
OF6A 3400   =4456 BADRD:    CALL    HCOMM
OF6C E486   =4457           JMP     RDT90
            =4458 ;
OF6E 3400   =4459 GOODRD:   CALL    HCOMM
OF70 FD     =4460           MOV     A,R5            ;GET THE DOUBLE READ TIMER
OF71 C679   =4461           JZ      GOOD10          ;JUMP IF DR TIMER=0 (OK TO DOUBLE READ)
            =4462 ;
OF73 D4AB   =4463           CALL    DRSUMT          ;CALCULATE AND TEST THE DOUBLE READ SUM
OF75 967B   =4464           JNZ     GOOD20          ;JUMP IF OLD<>NEW (NO DOUBLE READ)
OF77 E400   =4465           JMP     RDTAG           ;JUMP IF DOUBLE READ TOO SOON
            =4466 ;
OF79 D4AB   =4467 GOOD10:   CALL    DRSUMT          ;CALCULATE AND SAVE THE LABEL SUM
            =4468 GOOD20:
OF7B E5     =4469           SEL     MB0
OF7C C470   =4470           JMP     FLGPRG          ;CHECK EEPROM PROG SEL SWITCH
            =4471 ;
            =4472 GOOD30:
OF7E 99BF   =4473           ANL     P1,#255-EBDLT   ;BD-LT OFF
OF80 8920   =4474           ORL     P1,#EGDLT       ;GD-LT ON
OF82 D5     =4475           SEL     RB1
OF83 BE08   =4476           MOV     R6,#EGDTON      ;GOOD TONE LENGTH
OF85 C5     =4477           SEL     RB0
            =4478 ;
            =4479 ;
OF86 FC     =4480 RDT90:    MOV     A,R4
OF87 4320   =4481           ORL     A,#EBFREQ       ;SET THE BUFMAN REQUEST FLAG
OF89 AC     =4482           MOV     R4,A
OF8A D425   =4483           CALL    BUFMAN
OF8C E400   =4484           JMP     RDTAG
            =4485 ;
            =4486 ;  AMBIGUOUS READ - FLASH BAD LIGHT AND LOCK OUT SCANNING FOR 3 SECONDS
            =4487 ;
OF8E BE07   =4488 AMBRD:    MOV     R6,#EVERAM      ;SET AMBIGUOUS READ VERSION
OF90 FC     =4489           MOV     A,R4
OF91 4320   =4490           ORL     A,#EBFREQ       ;SET THE BUFMAN REQUEST FLAG
OF93 AC     =4491           MOV     R4,A
OF94 D425   =4492           CALL    BUFMAN
            =4493 ;
            =4494 ;  FLASH BAD-LIGHT FOR AMBIGUITY INDICATION
            =4495 ;
OF96 B844   =4496           MOV     R0,#ERRTL       ;TEMP STORAGE
OF98 B00C   =4497           MOV     @R0,#EAMBCY     ;NUMBER OF FLASH CYLCES
OF9A 990F   =4498           ANL     P1,#0FFH-EGDLT  ;MAKE SURE GOOD LIGHT IS OFF
OF9C 8940   =4499 AMBRD1:   ORL     P1,#EBDLT       ;BAD LIGHT ON
OF9E BF0C   =4500           MOV     R7,#EAMBWT      ;ON TIME (IN 1/100 THS OF SECONDS)
OFA0 3400   =4501 AMBRD2:   CALL    HCOMM           ;CHECK WHILE WAITING
OFA2 FF     =4502           MOV     A,R7
OFA3 96A0   =4503           JNZ     AMBRD2          ;LOOP TILL TIMEOUT
            =4504 ;
OFA5 99BF   =4505           ANL     P1,#0FFH-EBDLT  ;BAD LIGHT OFF
OFA7 BF0C   =4506           MOV     R7,#EAMBWT
OFA9 3400   =4507 AMBRD3:   CALL    HCOMM
OFAB FF     =4508           MOV     A,R7
```

```
OFAC 96A9     =4509         JNZ     AMBRD3          ;LOOP TILL TIMEOUT AGAIN
              =4510 ;
OFAE B844     =4511         MOV     R0,#ERRTL
OFB0 F0       =4512         MOV     A,@R0
OFB1 07       =4513         DEC     A               ;DECREMENT CYCLE COUNTER
OFB2 A0       =4514         MOV     @R0,A
OFB3 969C     =4515         JNZ     AMBRD1          ;JUMP - STILL CYCLES LEFT
              =4516 ;
OFB5 8940     =4517         ORL     P1,#EBDLT       ;BAD LIGHT BACK ON
OFB7 E400     =4518         JMP     RDTAG           ;RESTART SCANNING
              =4519 ;
              =4520 ; CHECK MOTOR UP2SPD* SIGNAL  (UP TO SPEED & OVER SPEED)
              =4521 ;
OFB9 0A       =4522 MTRCHK: IN      A,P2
OFBA 37       =4523         CPL     A
OFBB 82BE     =4524         JB5     MTRC10          ;JUMP IF MOTOR SPEED PROBLEM
OFBD 83       =4525         RET                     ;RETURN IF OK
              =4526 ;
OFBE BFC8     =4527 MTRC10: MOV     R7,#200         ;SET TIMER FOR 2 SECONDS
OFC0 FF       =4528 MTRC20: MOV     A,R7
OFC1 96C0     =4529         JNZ     MTRC20          ;WAIT IN CASE OF SPURIOUS ERROR
              =4530 ;
OFC3 0A       =4531         IN      A,P2
OFC4 37       =4532         CPL     A
OFC5 82C8     =4533         JB5     MTRERR          ;JUMP IF STILL A PROBLEM AFTER WAIT
OFC7 83       =4534         RET                     ;REUTRN IF OK
              =4535 ;
              =4536 ; COME HERE IF THERE IS A MOTOR PROBLEM DURING RDTAG
OFC8 8910     =4537 MTRERR: ORL     P1,#ELASDB      ;LASER OFF
OFCA 99DD     =4538         ANL     P1,#255-(EMTREB+EGDLT) ;MOTOR OFF, GREEN LIGHT OFF
OFCC B804     =4539         MOV     R0,#4
OFCE E5       =4540         SEL     MB0
OFCF 7481     =4541         CALL    TERRWT          ;GIVE 4 BEEPS FOR A MOTOR ERROR
OFD1 F5       =4542         SEL     MB1
              =4543 ;
              =4544 ; STICK HERE WITH THE RED LIGHT FLASHING
OFD2 BF0A     =4545 MTRE20: MOV     R7,#10          ;SET TIMER FOR 100MS
OFD4 FF       =4546 MTRE30: MOV     A,R7
OFD5 96D4     =4547         JNZ     MTRE30          ;WAIT BETWEEN LIGHT TOGGLES
              =4548 ;
OFD7 09       =4549         IN      A,P1
OFD8 99BF     =4550         ANL     P1,#255-EBDLT   ;RED LIGHT OFF
OFDA D2D2     =4551         JB6     MTRE20          ;JUMP IF THE RED LIGHT WAS ON
OFDC 8940     =4552         ORL     P1,#EBDLT       ;RED LIGHT ON
OFDE E4D2     =4553         JMP     MTRE20
               4554 ;****************************************
OFE0 A3        4555 TROPGF: MOVP    A,@A
OFE1 83        4556         RET
               4557 ;****************************************
OFF7           4558         ORG     OFF7H
               4559 ;
               4560 ; CHECKSUM BYTE
               4561 ;
OFF7 FF        4562         DB      0FFH
               4563 ;
               4564 ; DATE
               4565 ;
OFF8 07        4566         DB      07H,22H,87H
OFF9 22
OFFA 87
               4567 ;
               4568 ; PART NUMBER
               4569 ;
OFFB 52        4570         DB      'R',096H,001H,030H
OFFC 96
OFFD 01
OFFE 30
               4571 ;
               4572 ; REVISION
               4573 ;
OFFF 30        4574         DB      '0'
               4575 ;****************************************
               4576         END
```

```
USER SYMBOLS
AMBRD   OF8E   AMBRD1 OF9C   AMBRD2 OFA0   AMBRD3 OFA9   APL3R2 086A   BADRD  OF6A   BF4CNT 000C   BF4CST 0036
BF6CNT  0012   BF6CST 0024   BU13C1 0E12   BU13C2 0E22   BUF13C 0E0C   BUF8C  0E00   BUFAMB 0E7F   BUFM10 0E29
BUFM13  0E53   BUFM20 0E30   BUFM8  0E61   BUFM90 0E8A   BUFM91 0E8E   BUFM93 0E99   BUFM94 0E9E   BUFM95 0EA2
BUFMA   0E46   BUFMAN 0E25   BUFME  0E58   BUFT13 0E6F   BUFT8  0E65   BUFTBL 0E3E   CHECLB 04CC   CHKIJ  06A1
CHKLP1  068F   CHKSCN 0543   CK4H10 004A   CK4H20 004B   CK4H30 0052   CK4HRS 0048   CK6T05 0C4B   CK6T10 0C51
CK6T20  0C53   CK6TOT 0C4B   CKCN05 0962   CKCN10 0979   CKCN20 0982   CKCN30 098B   CKCNNG 0999   CKCNOK 0997
CKCNTS  0957   CKEPOO 0186   CKEPRM 0183   CKFC10 0882   CKFC20 088E   CKFC80 08E4   CKFC90 08E6   CKFC95 08EA
CKFCA   08AF   CKL1ER 0BF5   CKL1FG 0BDF   CKL1RT 0BF3   CKL2ER 0BDC   CKL2FG 0BC6   CKL2RT 0BDA   CKMAJ  0C00
CKMAJ9  0C0E   CKMISM 0C11   CKMS30 0C2F   CKMS80 0C35   CKMS90 0C38   CKMTCH 0DE7   CKMTRT 0DF7   CKSENT 01ED
CKSNRT  0563   CKSUML 0045   CKSUMR 0046   CKTL   09A9   CKTL90 0981   CLEPM  01D9   CLR4SG 0814   CLR6SG 0800
CLRRAM  02A4   CLRSBF 082A   CLRSN1 0825   CLRSNB 0820   CLRTOO 0824   CLRVER 0012   CMPFLG 0083   CPARTY 050E
DATA    01CE   DECRO  0641   DISLAS 02CC   DRSM13 0EBE   DRSM7B 0EC4   DRSM7C 0EC8   DRSM8  0ECE   DRSMA  0EBE
DRSMDN  0EED   DRSME  0EC1   DRST13 0EE2   DRST8  0ED7   DRSTBL 0EB7   DRSUM  005D   DRSUMT 0EAB   DRTIMR 0005
DRVRNG  0EF2   E1000M 0032   E2SCN  00FF   E82NDL 0080   EAMBBY 000D   EAMBCY 000C   EAMBIG 0058   EAMBMS 0004
EAMBWT  000C   EAMESD 00C2   EAMESE 00C1   EBDLT  0040   EBDTON 0028   EBFREQ 0020   EBIT6  0040   ECASE1 0887
```

| | | | | | | | |
|---|---|---|---|---|---|---|---|
| ECASE2 0890 | ECASE3 089B | ECASE4 08A1 | EDEC8L 000A | EDEC8R 000B | EDECAL 000C | EDECAR 000D | EDECB7 0080 |
| EDECBE 000E | EDECBF 000F | EDECBK 0040 | EDECD 0020 | EDECE 0010 | EDECOD 000F | EDRDLY 0024 | EFCRST 0003 |
| EFRRST 0001 | EGDLT 0020 | EGDLTW 0056 | EGDTON 0008 | EHCNTL 0001 | ELASDB 0010 | ELST1 07E3 | ELSTBT 0665 |
| EMISCN 00A | EKO010 0871 | EMODCK 08A8 | EMODSM 08A6 | EMSNBY 00BB | EMTREB 0002 | EN12SN 00AF | EN2SCN 00AA |
| ENLAS 02D7 | EOCIA 0002 | EPARRD 0000 | EPRDEC 0004 | EPRMCS 0080 | EPRMDI 0004 | EPRMSK 0008 | ER4B4 0010 |
| ER486 0040 | ER4B7 0080 | ER684 0010 | ER685 0020 | ER686 0040 | ER687 0080 | ERAL 0020 | ERASE 00C0 |
| ERASFL 058D | ERRTL 0044 | ERS2RM 07DF | ESBFUL 0008 | ESCNG 0001 | ESDIS 00C4 | ESEN 0045 | ESENT 0010 |
| ESR4CH 0010 | ESRCHR 000F | ESRF13 0020 | ESRPER 0040 | ESRRD 0001 | ESRSDT 0080 | ETEST 0001 | ETL1BY 00AA |
| ETMARK 0002 | ETNCT1 000A | ETNCT2 000F | ETNCT3 0014 | ETNCT4 001C | ETNFQ1 00F | ETNFQ2 00F8 | ETNFQ3 00FA |
| ETNFQ4 00FC | ETONCT 0014 | ETONE 0080 | ETONFQ FFFA | ETRMBY 00CC | EUP2SP 0020 | EVER00 0000 | EVER13 0002 |
| EVER8 0004 | EVERA 0001 | EVERAM 0007 | EVERE 0003 | EVLSIR 0001 | EVTL13 0006 | EVTL8 0005 | EWAIT 000E |
| EWDS 0000 | EWEN 0030 | EXSBF2 0AD7 | EXSBF3 0ADB | EXSBF4 0ADF | EXSBFL 0AE5 | EXSBFX 0AE1 | FACTOR 0002 |
| FILFF 063A | FLCKRT 066F | FLGCHK 0680 | FLGMTC 005B | FLGPRG 0670 | FREQAD 0044 | GETFLG 099C | GETLUP 0275 |
| GOOD10 0F79 | GOOD20 0F7B | GOOD30 0F7E | GOODRD 0F6E | GT1FG 0BE5 | GT2FG 0BCC | GTSFLG 0061 | HCOM10 0909 |
| HCOM20 091E | HCOM25 093B | HCOM30 093F | HCOM40 0947 | HCOM70 094F | HCOM80 0953 | HCOM90 0956 | HCOMM 0900 |
| INCHNB 098D | INCLNB 09C5 | INCPNT 06C3 | INCREM 048D | INCX90 09CD | INCXRT 09D0 | INLAB1 065F | INTSTR 0060 |
| INTTRP 0003 | L4S1 0036 | L4S2 0038 | L4SCNT 003A | L4STOT 003B | L6S1 0024 | L6S2 0028 | L6SCNT 002C |
| L6STOT 002D | LASTBT 05A7 | LBDET 0631 | LOOPCK 0292 | LSTBYT 0007 | LSTUSD 0070 | MAJSG0 0C66 | MAJSG1 0C72 |
| MAJSG4 0C78 | MAJSG5 0C82 | MAJSGS 0C5C | MCH2BY 0A20 | MCH3BY 0A24 | MCH4BY 0A28 | MCHXBY 0A2A | MCHXRT 0A32 |
| MISSCN 0E7A | MOV2BY 083B | MOV3BY 083F | MOV4BY 0843 | MOVXBY 0845 | MRB0 0000 | MRB1 0018 | MRB1R4 001C |
| MTRC10 0FBE | MTRC20 0FC0 | MTRCHK 0FB9 | MTRE20 0FD2 | MTRE30 0FD4 | MTRERR 0FC8 | NEXT4 0516 | NFLGMC 0090 |
| NOLSBT 0626 | NXTSET 008B | OCIRET 05AC | OPREAD 0080 | OVRERR 04DC | OVRRET 04E0 | OVRSET 04C6 | OVRST1 008C |
| OWRITE 0040 | PARITY 0190 | PDATA 00A7 | POW00 03A3 | POW10 03B8 | POW20 03D1 | POW25 03DA | POW30 03E1 |
| POWUP 03A4 | PRO4C0 0A82 | PRO4C1 0A8A | PRO4C2 0A93 | PRO4C3 0A9F | PRO4C4 0AA9 | PRO4C6 0ABE | PRO4C7 0ACC |
| PRO4C8 0AD1 | PRO4CH 0A6F | PRO4CX 0ACF | PRO6C2 0B15 | PRO6C4 0B21 | PRO6C6 0B36 | PRO6C7 0B42 | PRO6C8 0B4E |
| PRO6CH 0B00 | PRO6CX 0B47 | PRO7C0 0B69 | PRO7C2 0B80 | PRO7C4 0B8E | PRO7C6 0BA7 | PRO7C8 0BB7 | PRO7C9 0BC0 |
| PRO7CH 0B57 | PRO7CX 0B69 | PROC05 0A48 | PROC3L 0A43 | PROC8 0A4C | PROC8L 0A52 | PROC8R 0A56 | PROCA 0A63 |
| PROCAL 0A68 | PROCAR 0A6A | PROCE 0A5B | PROCEX 0A6C | PROCRT 0A6E | PROCSG 0A33 | PROLAB 0685 | R4S1 003C |
| R4S2 003E | R4SCNT 0040 | R4STOT 0041 | R6S1 002E | R6S2 0031 | R6SCNT 0034 | R6STOT 0035 | RAMRT 02E6 |
| RCRAM 0020 | RDEPRM 0280 | RDLAB1 064B | RDLAB2 064F | RDT05 0F08 | RDT10 0F0A | RDT20 0F19 | RDT30 0F1F |
| RDT35 0F23 | RDT37 0F31 | RDT40 0F45 | RDT50 0F50 | RDT60 0F56 | RDT70 0F5F | RDT90 0F86 | RDTAG 0F00 |
| RLACC 01BA | ROCIA 0595 | ROCIA1 0597 | ROCIA2 0598 | RSTTRP 0000 | RTNFLG 0092 | RTPRG 06E7 | RTRCVR 0647 |
| RTRLAB 0605 | RTRM1 068D | RTRMRT 0687 | SAVEBT 04D0 | SBFEND 0059 | SBFPNT 0047 | SBSTRT 0090 | SBUF 0048 |
| SBUFAD 0048 | SBUFSZ 0012 | SCNBUF 0020 | SCNFLG 0006 | SDAT10 07C1 | SDAT12 07CF | SDATA 073B | |
| SDATA1 0741 | SDATA2 0748 | SDATA3 0752 | SDATA4 0760 | SDATA5 0777 | SDATA6 0785 | SDATA7 0797 | SDATA8 07A3 |
| SDATA9 07AF | SDATAH 0767 | SEGBUF 0020 | SEGONE 048B | SETCS 0284 | SETDI 01D1 | SETDI1 01D7 | SETL11 007F |
| SETL12 00BF | SETL21 00FF | SETL22 00FE | SETR11 00FB | SETR12 00FF | SETR21 00FD | SETR22 00FE | SFTLFT 0196 |
| SGM90 053A | SGMTCH 052A | SGSUM4 084C | SGSUM6 0850 | SGSUMR 0869 | SGSUMX 0851 | SGSUMY 085E | SHIFTL 05C9 |
| SNDWRT 05D9 | SOCIA 01EB | SP2SCN 0558 | ST2SCN 0561 | STACK 0008 | STOCIA 0554 | STRAM1 0089 | STRRAM 0600 |
| STSDTA 005E | STTL13 0042 | STTL8 0043 | SUM12C 0C39 | SUM13L 0983 | SUM2BY 0EA7 | SUM3BY 0EA5 | SUM4BY 0EA3 |
| SWISET 005F | SWLATC 0008 | SWP4SN 0A0B | SWP6SN 0A0B | SWPXEX 0A19 | SWPXRT 0A38 | SWSET 01A0 | SWSET1 0070 |
| T2LNOK 0002 | TASAVE 001F | TBERR4 0D14 | TBERR6 0D12 | TBLK13 0D1D | TBLK8 0D4F | TBLK8C 0D59 | TBLK8D 0D5F |
| TBLKA 0D00 | TBLKE 0D3C | TBNONE 0D1A | TBTL13 0D7F | TBTL8 0DC8 | TCKCNT 0280 | TCNT1 0038 | TCNT2 003A |
| TERR02 0387 | TEST3 038A | TERR06 038F | TERR08 038D | TERR10 0394 | TERR12 039C | TERRWT 0381 | TEST1 0241 |
| TEST2 0245 | TEST3 0248 | TEST4 0258 | TH000 0400 | TH005 040A | TH010 040E | TH012 041A | TH014 041C |
| TH015 042D | TH020 0434 | TH029 0436 | TH030 0440 | TH050 044C | TH055 0453 | TH059 0455 | THSND 0500 |
| TIME05 0015 | TIME10 0019 | TIME20 001B | TIME30 0023 | TIME50 002A | TIME50 0033 | TIME60 003A | TIMER 0007 |
| TIMREG 0007 | TIMTRP 0007 | TMOT10 0306 | TMOT20 030F | TMOT22 0311 | TMOT24 0313 | TMOT28 0325 | TMOT40 032B |
| TMOT50 0331 | TMOT60 0333 | TMOT80 0335 | TMOT90 034A | TMOT95 034F | TMOTOR 0300 | TMWAIO 053F | TMWAIT 053B |
| TOC10 0185 | TOC20 018A | TOC50 018C | TOCIA 0176 | TOCRET 0363 | TON1CT 05AF | TONADD 0589 | TONCNT 001D |
| TONLTH 001E | TPON 0351 | TPON15 03CE | TPON30 0359 | TPON40 0369 | TPON50 0373 | TPON60 037B | |
| TPON90 037D | TPORET 0387 | TRAM 0131 | TRAM10 0133 | TRAM20 0139 | TRAM30 0141 | TRAM40 014E | TRAM50 015B |
| TRAM60 0168 | TRAMER 0174 | TRARET 035B | TREPRM 0093 | TRNDTA 0570 | TRNFLG 04E1 | TRO10 0109 | TRO20 0110 |
| TRO50 011C | TROMSM 0100 | TROPG0 00E4 | TROPG1 01F6 | TROPG2 02E9 | TROPG3 03F7 | TROPG4 04FA | TROPG5 05E3 |
| TROPG6 06EA | TROPG7 07E9 | TROPG8 08EF | TROPG9 09D1 | TROPGA 0AF0 | TROPGB 0BF8 | TROPGC 0CF2 | TROPGD 0DF8 |
| TROPGE 0EF4 | TROPGF 0FE0 | TRORET 0353 | TROTAB 0121 | TRPRM1 00C8 | TRPRM2 004A | TRRAM 0099 | TRYBLK 0CC3 |
| TSC02 046F | TSC04 0476 | TSC05 0479 | TSC06 047B | TSC07 0481 | TSC08 048D | TSC09 0499 | TSC10 04A6 |
| TSC11 04B8 | TSC12 0484 | TSC20 047E | TSCBUF 0050 | TSCNT 0462 | TSEG1 0030 | TSEG2 0034 | TST31 0251 |
| TST32 0255 | TST41 0262 | TST42 0266 | TTA90 02A7 | TTACHK 02A9 | TTAG 020E | TTARET 036B | TTATAB 0200 |
| TTL13A 00C5 | TTL13E 00C1 | TTL13G 00B8 | TTL8E 00E6 | TWOLAB 0061 | TXRET 00E3 | UNPACK 00A8 | UNPAK1 00AF |
| UNPK1 021D | UNPK2 0222 | VALFLG 06A7 | VER13 0CEE | VER2L8 0CEB | VER8 0CEC | VERA 0CEF | VERTAG 0CB8 |
| VERE 0CED | VERFLG 0006 | VERT01 0CAE | VERT02 0CB9 | VERT05 0CBF | VERT20 0CE7 | VERT90 0CF0 | |
| VTOCIA 0CA4 | VTSP2C 0CA8 | VTST2C 0CAC | WAIT 01E1 | WAIT0 01E3 | WAIT1 01E5 | WRACC 01C2 | |
| WRKBUF 005A | WRPRM1 00C7 | WRTPRM 06DD | | | | | |

ASSEMBLY COMPLETE, NO ERRORS

ISIS-II ASSEMBLER SYMBOL CROSS REFERENCE, V2.1

```
AMBRD   4451   4488#
AMBRD1  4499#  4515
AMBRD2  4501#  4503
AMBRD3  4507#  4509
APL3R2  2504#  2572  2873  3569  3574  3922  3926  3972  3979
BADRD   4456#
BF4CNT  278#   2392
BF4CST  267#   278   2391
BF6CNT  265#   2374
BF6CST  255#   265   2373
BU13C1  4115   4117#
BU13C2  4126   4128#
BUF13C  4114#  4191  4210  4219  4223
BUF8C   4098#  4204  4213
BUFAMB  4176   4235#
BUFM10  4148   4150#
BUFM13  4171   4190#
BUFM20  4157#
BUFM8   4173   4204#
BUFM90  4186   4192  4200  4205  4214  4224  4230  4246#
BUFM91  4242   4248#
```

| | | | | | | |
|---|---|---|---|---|---|---|
| BUFM93 | 4150 | 4256# | | | | |
| BUFM94 | 4154 | 4162 | 4237 | 4261# | | |
| BUFM95 | 4258 | 4265# | | | | |
| BUFMA | 4170 | 4180# | | | | |
| BUFMAN | 2668 | 4147# | 4483 | 4492 | | |
| BUFME | 4172 | 4196# | | | | |
| BUFT13 | 4175 | 4218# | | | | |
| BUFT8 | 4174 | 4209# | | | | |
| BUFTBL | 4167 | 4169# | | | | |
| CHECLB | 1566 | 1570# | | | | |
| CHKIJ | 2123 | 2126# | | | | |
| CHKLP1 | 2088 | 2109# | | | | |
| CHKSCN | 1753# | 3727 | 3734 | 3745 | 3908 | 4035 | 4043 |
| CK4H10 | 405# | 416 | | | | |
| CK4H20 | 404 | 407# | | | | |
| CK4H30 | 409 | 413# | | | | |
| CK4HRS | 404# | 1106 | 1134 | | | |
| CK6T05 | 3589# | | | | | |
| CK6T10 | 3594# | 3600 | | | | |
| CK6T20 | 3592 | 3597# | | | | |
| CK6TOT | 3587# | 3788 | 3826 | | | |
| CKCN05 | 2750 | 2767# | | | | |
| CKCN10 | 2780 | 2783# | | | | |
| CKCN20 | 2770 | 2789# | | | | |
| CKCN30 | 2775 | 2795# | | | | |
| CKCNNG | 2763 | 2781 | 2787 | 2793 | 2802 | 2807# |
| CKCNOK | 2756 | 2786 | 2792 | 2797 | 2801 | 2804# |
| CKCNTS | 2748# | 4440 | | | | |
| CKEPDO | 793# | 798 | | | | |
| CKEPRM | 790# | 1033 | 1038 | | | |
| CKFC10 | 2595 | 2598# | | | | |
| CKFC20 | 2600 | 2607# | | | | |
| CKFC80 | 2638 | 2642# | | | | |
| CKFC90 | 2609 | 2640 | 2644# | | | |
| CKFC95 | 2602 | 2608 | 2648# | | | |
| CKFCA | 967 | 2595# | 4388 | 4412 | 4438 | |
| CKL1ER | 3458 | 3467# | | | | |
| CKL1FG | 3326 | 3451# | | | | |
| CKL1RT | 3461 | 3465# | 3468 | | | |
| CKL2ER | 3430 | 3439# | | | | |
| CKL2FG | 3094 | 3322 | 3423# | | | |
| CKL2RT | 3433 | 3437# | 3440 | | | |
| CKMAJ | 3486# | 3618 | 3625 | 3634 | | |
| CKMAJ9 | 3492 | 3498# | | | | |
| CKMISM | 3516# | 3622 | 3629 | 3641 | | |
| CKMS30 | 3532 | 3549# | | | | |
| CKMS80 | 3538 | 3544 | 3551 | 3556# | | |
| CKMS90 | 3517 | 3527 | 3559# | | | |
| CKMTCH | 3983 | 3990 | 4065# | | | |
| CKMTRT | 4067 | 4070 | 4074 | 4079# | | |
| CKSENT | 863# | 864 | | | | |
| CKSNRT | 1765 | 1768 | 1770 | 1772# | | |
| CKSUML | 285# | 3958 | 3982 | | | |
| CKSUMR | 286# | 3973 | | | | |
| CKTL | 2749 | 2847# | 3667 | | | |
| CKTL90 | 2860# | | | | | |
| CLKEPM | 824 | 826# | | | | |
| CLR4SG | 2386# | 3805 | | | | |
| CLR6SG | 959 | 2364# | 3404 | 3804 | | |
| CLRRAM | 1002# | 1003 | | | | |
| CLRSBF | 2422# | 2713 | 2728 | | | |
| CLRSN1 | 2406# | 2408 | 2433 | | | |
| CLRSNB | 1074 | 2403# | 2639 | 3050 | 4371 | |
| CLRTOO | 2375 | 2393 | 2405# | | | |
| CLRVER | 1073 | 3803# | 4247 | 4370 | | |
| CMPFLG | 459 | 462# | | | | |
| CPARTY | 1380 | 1643 | 1664# | | | |
| DATA | 813 | 820# | | | | |
| DECRO | 2000 | 2015# | | | | |
| DISLAS | 1056# | 2237 | 2262 | 2271 | 2301 | 2313 | 2322 |
| DRSM13 | 4309 | 4316# | | | | |
| DRSM7B | 4317 | 4322# | 4339 | 4346 | | |
| DRSM7C | 4320 | 4324# | | | | |
| DRSM8 | 4311 | 4328# | | | | |
| DRSMA | 4308 | 4315# | | | | |
| DRSMDN | 4326 | 4348# | | | | |
| DRSME | 4310 | 4319# | | | | |
| DRST13 | 4313 | 4341# | | | | |
| DRST8 | 4312 | 4334# | | | | |
| DRSTBL | 4305 | 4307# | | | | |
| DRSUM | 302# | 4348 | | | | |
| DRSUMT | 4296# | 4463 | 4467 | | | |
| DRTIMR | 234# | | | | | |
| DRVRNG | 4300 | 4307 | 4353# | | | |
| E1000M | 146# | 1228 | 1292 | 1478 | | |
| E2SCN | 193# | 3687 | | | | |
| E82NDL | 454 | 460# | | | | |
| EAMBBY | 170# | 2683 | 4239 | | | |
| EAMBCY | 202# | 4497 | | | | |
| EAMBIG | 169# | 2729 | | | | |
| EAMBMS | 112# | 1059 | 2284 | 2293 | 4366 | |
| EAMBWT | 201# | 4500 | 4506 | | | |

```
EAMESD    157#   2290
EAMESE    156#   2281
EBDLT      50#   1057   1066   1115   1118   1121   1207   1299   1358   1389   2179   2255   4422   4429   4473   4499   4
          4550   4552
EBDTON    149#
EBFREQ    115#   4251   4262   4366   4481   4490
EBIT6     165#   2709   2712
ECASE1   2529    2537#
ECASE2   2530    2546#
ECASE3   2532    2557#
ECASE4   2533    2554   2566#
EDEC8L     87#
EDEC8R     88#
EDECAL     89#
EDECAR     90#
EDECB7     96#
EDECBE     91#
EDECBF     92#
EDECBK     95#   2970
EDECD      94#   3831
EDECE      93#   3831   3871
EDECOD     86#
EDRDLY    177#   4382
EFCRST     69#    713    885   1062   1232   1260   1301   1488
EFRRST     67#   1067   2644
EGDLT      49#   1057   1066   1077   1115   1118   1121   1146   1149   1206   1287   1298   1358   2180   2254   4421   4
          4498   4538
EGDLTW    176#   4383
EGDTON    148#   2182   4476
EHCNTL    226#    415   2244
ELASDB     48#    920   1090   1255   1291   1298   1359   1475   1501   2223   2230   2255   4537
ELST1    2341#   2343
ELSTBT   1969    1970   1976   1977   1984   1985   1993   2019   2031   2043#
EMISCN    166#
EMOD10   2521#   3040
EMODCK   2576#
EMODSM   2542    2572#
EMSNBY    167#   4228
EMTREB     45#   1090   1103   1123   1153   1299   4538
EN12SN    195#   3685
EN2SCN    194#   3683
ENLAS    1065#   2239   2264   2276   2306   2315   2324
EOCIA      68#    413    716    866   1647   1845   2216   2731
EPARRD     65#
EPRDEC     70#   2632
EPRMCS     58#   1024   1041   1252   1795   1811   1819   1823   1901   1903   1944   1946
EPRMDI     46#    823    825    827
EPRMSK     47#    796    797    815    816    826    827   1030   1031
ER4B4     114#
ER4B6     116#
ER4B7     117#
ER6B4     131#
ER6B5     132#
ER6B6     133#
ER6B7     134#
ERAL      139#   1787
ERASE     142#
ERASFL   1788    1899#
ERRTL     284#   2364   3294   3409   3949   4496   4511
ERS2RM   2044    2136   2167   2338#
ESBFUL    113#   2423   4252   4366
ESCNG     110#    964   1070   4395
ESDIS     155#   2228
ESEN      154#   2221
ESENT      55#
ESR4CH    101#
ESRCHR    100#
ESRF13    102#
ESRPER    103#
ESRRD      66#    407   1494   2598
ESRSDT    104#
ETEST      43#    712    887    920   1184
ETL1BY    171#   2703   4211   4220
ETMARK     44#    934    936    948    950   1184
ETNCT1    207#   1885
ETNCT2    208#   1886
ETNCT3    209#   1887
ETNCT4    210#   1888
ETNFQ1    211#    391
ETNFQ2    212#    392
ETNFQ3    213#    393
ETNFQ4    214#    394
ETONCT    151#   1216
ETONE      51#    365    367    379    920   1255
ETONFQ    152#
ETRMBY    168#   2699   4241   4246
EUP2SP     56#
EVER00    121#
EVER13    123#
EVER8     125#
EVERA     122#   2087
EVERAM    128#   4161   4488
```

| | | | | | | | | | | | | | |
|---|---|---|---|---|---|---|---|---|---|---|---|---|---|
| EVERE | 124# | | | | | | | | | | | | |
| EVLSIR | 57# | 1252 | 1254 | | | | | | | | | | |
| EVTL13 | 127# | 4299 | | | | | | | | | | | |
| EVTL8 | 126# | | | | | | | | | | | | |
| EWAIT | 175# | 176 | 177 | 2604 | 2642 | | | | | | | | |
| EWDS | 141# | 1820 | | | | | | | | | | | |
| EWEN | 138# | 1942 | | | | | | | | | | | |
| EXSBF2 | 3178# | 3639 | | | | | | | | | | | |
| EXSBF3 | 3180# | 3628 | 3996 | | | | | | | | | | |
| EXSBF4 | 3182# | 3621 | | | | | | | | | | | |
| EXSBFL | 3188# | 3193 | | | | | | | | | | | |
| EXSBFX | 3179 | 3181 | 3183# | | | | | | | | | | |
| FACTOR | 178# | 355 | 1094 | 1105 | 1124 | 1133 | 1217 | 1222 | 1228 | 1289 | 1292 | 1303 | 1476 | 1478 |
| FILFF | 2010# | 2012 | | | | | | | | | | | |
| FLCKRT | 2028 | 2041 | 2053# | | | | | | | | | | |
| FLGCHK | 2134 | 2139# | | | | | | | | | | | |
| FLGMTC | 429# | 4002 | 4051 | | | | | | | | | | |
| FLGPRG | 2063# | 4470 | | | | | | | | | | | |
| FREQAD | 386 | 390# | | | | | | | | | | | |
| GETFLG | 444 | 457 | 2824# | 3320 | | | | | | | | | |
| GETLUP | 966# | 970 | | | | | | | | | | | |
| GOOD10 | 4461 | 4467# | | | | | | | | | | | |
| GOOD20 | 4464 | 4468# | | | | | | | | | | | |
| GOOD30 | 2083 | 4472# | | | | | | | | | | | |
| GOODRD | 4450 | 4459# | | | | | | | | | | | |
| GT1FG | 3456# | 3464 | | | | | | | | | | | |
| GT2FG | 3428# | 3436 | | | | | | | | | | | |
| GTSFLG | 435# | 472 | | | | | | | | | | | |
| HCOM10 | 2665 | 2671# | | | | | | | | | | | |
| HCOM20 | 2687 | 2690# | | | | | | | | | | | |
| HCOM25 | 2700 | 2712# | | | | | | | | | | | |
| HCOM30 | 2696 | 2704 | 2710 | 2715# | | | | | | | | | |
| HCOM40 | 2718 | 2721# | | | | | | | | | | | |
| HCOM70 | 2684 | 2728# | | | | | | | | | | | |
| HCOM80 | 2726 | 2731# | | | | | | | | | | | |
| HCOM90 | 2667 | 2672 | 2693 | 2734# | | | | | | | | | |
| HCOMM | 2664# | 3723 | 4032. | 4376 | 4389 | 4411 | 4427 | 4437 | 4448 | 4456 | 4459 | 4501 | 4507 |
| INCHNB | 2904# | 3134 | 3145 | 3259 | 3271 | 3376 | 3390 | | | | | | |
| INCLNB | 2910# | 3081 | 3108 | 3225 | 3240 | 3343 | 3356 | | | | | | |
| INCPNT | 2137 | 2154# | | | | | | | | | | | |
| INCREM | 1543 | 1545# | | | | | | | | | | | |
| INCX90 | 2908 | 2917# | | | | | | | | | | | |
| INCXRT | 2907 | 2914 | 2921# | | | | | | | | | | |
| INLAB1 | 2034 | 2038# | | | | | | | | | | | |
| INTSTR | 307# | 343 | 359 | | | | | | | | | | |
| INTTRP | 322# | | | | | | | | | | | | |
| L4S1 | 268# | 460 | 3920 | 4100 | 4329 | 4335 | | | | | | | |
| L4S2 | 269# | | | | | | | | | | | | |
| L4SCNT | 270# | 3033 | 3632 | | | | | | | | | | |
| L4STOT | 271# | 2777 | 3910 | | | | | | | | | | |
| L6S1 | 256# | 442 | 985 | 1598 | 2795 | 3333 | 3567 | 3620 | 3791 | 3829 | 3842 | 3869 | 3955 | 4116 | 4182 | 4198 | 4 |
| L6S2 | 257# | 455 | 2799 | 3367 | 3960 | 4114 | 4344 | | | | | | |
| L6SCNT | 258# | 973 | 3330 | 3342 | 3355 | 3364 | 3375 | 3389 | 3617 | | | | |
| L6STOT | 259# | 2772 | 2789 | 3398 | 3589 | 3864 | 3894 | | | | | | |
| LASTBT | 1852 | 1855# | | | | | | | | | | | |
| LBDET | 1999 | 2002# | | | | | | | | | | | |
| LOOPCK | 987# | 994 | 999 | | | | | | | | | | |
| LSTBYT | 536 | 545 | 557# | | | | | | | | | | |
| LSTUSD | 309# | | | | | | | | | | | | |
| MAJSG0 | 3619 | 3622# | | | | | | | | | | | |
| MAJSG1 | 3626 | 3629# | | | | | | | | | | | |
| MAJSG4 | 3634# | 3645 | | | | | | | | | | | |
| MAJSG5 | 3635 | 3641# | | | | | | | | | | | |
| MAJSGS | 3617# | 3722 | 4031 | | | | | | | | | | |
| MCH2BY | 2989# | 3103 | 3140 | | | | | | | | | | |
| MCH3BY | 2991# | 3234 | 3265 | | | | | | | | | | |
| MCH4BY | 2993# | 3350 | 3384 | | | | | | | | | | |
| MCHXBY | 2990 | 2992 | 2994# | 2999 | | | | | | | | | |
| MCHXRT | 2996 | 3000# | | | | | | | | | | | |
| MISSCN | 4169 | 4228# | | | | | | | | | | | |
| MOV2BY | 2445# | 3077 | 3130 | 4101 | 4103 | | | | | | | | |
| MOV3BY | 2447# | 2523 | 3222 | 3256 | 4124 | 4128 | 4183 | 4185 | 4199 | | | | |
| MOV4BY | 2449# | 3340 | 3373 | | | | | | | | | | |
| MOVXBY | 2446 | 2448 | 2450# | 2454 | | | | | | | | | |
| MRB0 | 232# | | | | | | | | | | | | |
| MRB1 | 242# | | | | | | | | | | | | |
| MRB1R4 | 243# | | | | | | | | | | | | |
| MTRC10 | 4524 | 4527# | | | | | | | | | | | |
| MTRC20 | 4528# | 4529 | | | | | | | | | | | |
| MTRCHK | 4375 | 4417 | 4436 | 4522# | | | | | | | | | |
| MTRE20 | 4545# | 4551 | 4553 | | | | | | | | | | |
| MTRE30 | 4546# | 4547 | | | | | | | | | | | |
| MTRERR | 4533 | 4537# | | | | | | | | | | | |
| NEXT4 | 1532 | 1675# | | | | | | | | | | | |
| NFLGMC | 440 | 474# | | | | | | | | | | | |
| NOLSBT | 1992# | | | | | | | | | | | | |
| NXTSET | 449 | 465 | 469# | | | | | | | | | | |
| OCIRET | 1857 | 1860# | | | | | | | | | | | |
| OPREAD | 137# | 1023 | | | | | | | | | | | |
| OVRERR | 1568 | 1572 | 1583# | | | | | | | | | | |
| OVRRET | 1581 | 1585# | | | | | | | | | | | |
| OVRSET | 1563# | 2323 | | | | | | | | | | | |

| | | | | | | | |
|---|---|---|---|---|---|---|---|
| OVRST1 | 163# | 2320 | | | | | |
| OWRITE | 140# | 1791 | | | | | |
| PARITY | 548 | 551 | 558 | 562 | 742# | 777 | 1849 | 2724 |
| PDATA | 505 | 511# | | | | | |
| POW00 | 1242# | 1248 | | | | | |
| POW10 | 1273# | 1274 | | | | | |
| POW20 | 1298# | | | | | | |
| POW25 | 1304# | 1305 | | | | | |
| POW30 | 1311# | 1312 | | | | | |
| POWUP | 319 | 1243# | | | | | |
| PRO4C0 | 3085# | 3135 | | | | | |
| PRO4C1 | 3092# | 3116 | | | | | |
| PRO4C2 | 3072 | 3100# | | | | | |
| PRO4C3 | 3112# | 3146 | | | | | |
| PRO4C4 | 3104 | 3120# | | | | | |
| PRO4C6 | 3125 | 3137# | | | | | |
| PRO4C7 | 3087 | 3096 | 3114 | 3150# | | | |
| PRO4C8 | 3141 | 3157# | | | | | |
| PRO4CH | 3034 | 3037 | 3067# | | | | |
| PRO4CX | 3095 | 3153# | | | | | |
| PRO6C2 | 3220 | 3234# | | | | | |
| PRO6C4 | 3235 | 3247# | | | | | |
| PRO6C6 | 3252 | 3265# | | | | | |
| PRO6C7 | 3230 | 3242 | 3277# | 3346 | 3359 | | |
| PRO6C8 | 3266 | 3292# | | | | | |
| PRO6CH | 3048 | 3215# | | | | | |
| PRO6CX | 3261 | 3273 | 3284# | 3380 | 3394 | | |
| PRO7C0 | 3327 | 3330# | | | | | |
| PRO7C2 | 3335 | 3350# | | | | | |
| PRO7C4 | 3323 | 3351 | 3364# | | | | |
| PRO7C6 | 3369 | 3384# | | | | | |
| PRO7C8 | 3385 | 3398# | | | | | |
| PRO7C9 | 3400 | 3409# | | | | | |
| PRO7CH | 3025 | 3042 | 3047 | 3308# | | | |
| PRO7CX | 3344 | 3357 | 3377 | 3378 | 3391 | 3392 | 3412# |
| PROC05 | 3020 | 3027# | | | | | |
| PROC3L | 3022# | | | | | | |
| PROC8 | 3029# | | | | | | |
| PROC8L | 3033# | | | | | | |
| PROC8R | 3032 | 3035# | | | | | |
| PROCA | 3028 | 3044# | | | | | |
| PROCAL | 3047# | | | | | | |
| PROCAR | 3046 | 3048# | | | | | |
| PROCE | 3016 | 3039# | | | | | |
| PROCEX | 3015 | 3041 | 3050# | 3153 | 3161 | 3288 | 3296 | 3405 | 3412 |
| PROCRT | 3013 | 3051# | | | | | |
| PROCSG | 968 | 3011# | 4439 | | | | |
| PROLAB | 2071 | 2075 | 2085# | | | | |
| R4S1 | 273# | 3924 | 4102 | 4331 | 4337 | | |
| R4S2 | 274# | | | | | | |
| R4SCNT | 275# | 3035 | | | | | |
| R4STOT | 276# | 2783 | 3915 | | | | |
| R6S1 | 261# | 996 | 1608 | 2110 | 3218 | 3572 | 3627 | 3970 | 3995 | 4127 | 4184 | 4322 |
| R6S2 | 262# | 3250 | 3977 | 4125 | 4342 | | |
| R6SCNT | 263# | 980 | 3215 | 3224 | 3239 | 3247 | 3258 | 3270 | 3624 |
| R6STOT | 264# | 2767 | 3292 | 3597 | 3874 | 3898 | |
| RAMRT | 1064 | 1077# | | | | | |
| RCRAM | 252# | 2273 | | | | | |
| RDEPRM | 494 | 1020# | 1321 | | | | |
| RDLAB1 | 2024# | 2040 | | | | | |
| RDLAB2 | 2026# | 2037 | | | | | |
| RDT05 | 4368 | 4371# | | | | | |
| RDT10 | 4375# | 4380 | 4390 | | | | |
| RDT20 | 4377 | 4388# | | | | | |
| RDT30 | 4384 | 4394# | | | | | |
| RDT35 | 4398# | 4420 | 4423 | | | | |
| RDT37 | 4401 | 4404 | 4410# | | | | |
| RDT40 | 4415 | 4427# | | | | | |
| RDT50 | 4436# | 4444 | 4454 | | | | |
| RDT60 | 4432 | 4439# | | | | | |
| RDT70 | 4441 | 4448# | | | | | |
| RDT90 | 4457 | 4480# | | | | | |
| RDTAG | 1330 | 2090 | 2185 | 4365# | 4431 | 4465 | 4484 | 4518 |
| RLACC | 793 | 795# | | | | | |
| ROCIA | 1565 | 1840# | 1968 | 1975 | 1983 | 1991 | |
| ROCIA1 | 1842# | 1843 | | | | | |
| ROCIA2 | 1842 | 1844# | | | | | |
| RSTTRP | 318# | 1197 | 1378 | 1512 | 2327 | | |
| RTNFLG | 468 | 475# | | | | | |
| RTPRG | 2124 | 2128 | 2143 | 2175 | 2184# | | |
| RTRCVR | 2004 | 2013 | 2018 | 2022# | 2161 | | |
| RTRLAB | 1968# | 2016 | | | | | |
| RTRM1 | 2148# | 2152 | | | | | |
| RTRMRT | 2141 | 2145# | | | | | |
| SAVEBT | 1570 | 1574# | | | | | |
| SBFEND | 296# | | | | | | |
| SBFPNT | 290# | 2426 | 2674 | 2706 | 4248 | | |
| SBSTRT | 294# | 2427 | 4249 | | | | |
| SBUF | 293# | 294 | 295 | 2430 | 4157 | | |
| SBUFAD | 292# | | | | | | |
| SBUFSZ | 295# | 2431 | | | | | |
| SCNBUF | 253# | 2403 | 2521 | 2525 | 2576 | 2610 | 2944 | 2954 | 3011 | 3071 | 3092 | 3124 | 3219 | 3251 | 3319 | 3334 | 3 |

```
SCNFLG   233#
SDAT10  2300   2309#
SDAT11  2312   2318#
SDAT12  2321   2327#
SDATA   2216#  2649
SDATA1  2221#
SDATA2  2222   2226#
SDATA3  2229   2233#
SDATA4  2236   2242#
SDATA5  2245   2258#
SDATA6  2261   2267#
SDATA7  2270   2279#
SDATA8  2282   2288#
SDATA9  2291   2297#
SDATAH   417   2246#
SEGBUF   251#
SEGONE  1537   1544#
SETCS   1024#  1044
SETDI    819    822#   830
SETDI1   822    825#
SETL11   184#  3345
SETL12   185#  3358
SETL21   186#  3088   3379
SETL22   187#  3115   3393
SETR11   188#  3229
SETR12   189#  3241
SETR21   190#  3086   3260
SETR22   191#  3113   3272
SFTLFT   747#   749
SGM90   1712   1717   1722#
SGMTCH  1535   1540   1709#
SGSUM4  2467#  3921   3925
SGSUM6  2471#  2541   2567   2872   3568   3573   3971   3978
SGSUMR  2491   2496#
SGSUMX  2469   2472#
SGSUMY  2479   2484#
SHIFTL  1600   1617   1917#  1929
SNDWRT  1785   1941#
SOCIA    508    512    549    552    559    563    770    778    860#
SP2SCN  1760   1766#
ST2SCN  1762   1771#
STACK    239#   580
STOCIA  1758   1764#
STRAM1   158#  2235
STRRAM  1962#  2238
STSDTA   305#  2218   2226   2233   2242   2258   2267   2279   2288   2297   2309   2318
STTL13   282#  2366   2754   2849   3284   3691
STTL8    283#  2368   2386   3085   3112   3277
SUM12C  3567#  3797   3839
SUM13L  2871#  3956   3961
SUM2BY  4281#  4330   4332   4336   4338
SUM3BY  4279#  4323   4343
SUM4BY  4277#  4325   4345
SWISET   306#   383    774   1324   1576   1754   1876   2069   3673   4402
SWLATC    71#   771   1323   2073   4399
SWP4SN  2944#  3031
SWP6SN  2954#  3024   3039   3045
SWPXEX  2952   2968#
SWPXRT  2972   3015#
SWSET    767#  2314
SWSET1   162#  2311
T2LNOK   111#
TASAVE   246#
TBERR4  3805#  3896   3900   3930
TBERR6  3798   3804#  3847   3876   4010
TBLK13  3736   3826#  4037
TBLK8   3747   3894#
TBLK8C  3905#  4045
TBLK8D  3910#
TBLKA   3729   3788#
TBLKE   3740   3864#
TBNONE  3789   3795   3809#  3827   3832   3837   3867   3872   3913   3918
TBTL13  3698   3948#
TBTL8   3715   4030#
TCKCNT   974#   982
TCNT1    222#  1422   1480   1544
TCNT2    223#  1542
TERR02  1212#
TERR04  1215#  1226
TERR06  1218#  1219
TERR08  1223#  1224
TERR10  1213   1228#
TERR12  1229#  1230
TERRWT  1196   1206#  1584   2047   4541
TEST1    925#   956
TEST2    927#   955
TEST3    930#   930
TEST4    943#   943
TH000   1354#  1382   1387   1406   1409   1413   1437
TH005   1360#  1361   1370   1390   1408   2256
TH010   1360   1366#
TH012   1378#
```

```
TH014    1377    1380#
TH015    1384    1394#
TH020    1395    1399#
TH029    1398    1404#
TH030    1407    1413#
TH050    1423#   1433
TH055    1424    1428#
TH059    1427    1430#
THSND    1419    1432    1436    1640#   1641
TIME05   350     352#
TIME10   353     355#    380
TIME20   356#    388
TIME30   347     364#
TIME40   366     368#
TIME50   375     377#
TIME60   369     378     381#
TIMER    339#
TIMREG   236#
TIMTRP   325#
TMOT10   1095#   1096
TMOT20   1104#
TMOT22   1105#   1116    1119
TMOT24   1106#   1108
TMOT28   1112    1121#
TMOT40   1125#   1126
TMOT50   1100    1132#
TMOT60   1133#   1147    1150
TMOT80   1134#   1136
TMOT90   1129    1143    1153#
TMOT95   1139    1159#
TMOTOR   1090#   1189
TMWAI0   1739#   1740
TMWAIT   1477    1734#
TOC10    724#    728
TOC20    726     728#
TOC50    722     730#
TOCIA    712#    1178
TOCRET   731     1179#
TON1CT   371     1280    1316    1874#
TONADD   1879    1884#
TONCNT   244#
TONLTH   245#
TPON     1166#   1266
TPON15   1293#   1294
TPON20   1169    1173#
TPON30   1174    1178#
TPON40   1179    1183#
TPON50   1185    1189#
TPON60   1190    1194#
TPON90   1171    1176    1181    1187    1192    1196#
TPORET   1194    1267#
TRAM     644#    1173
TRAM10   645#    647
TRAM20   651#    654
TRAM30   658#    666
TRAM40   670#    678
TRAM50   682#    690
TRAM60   694#    702
TRAMER   653     674     698     705#
TRARET   705     1174#
TREPRM   486#    2275
TRNDTA   1794#   1817
TRNFLG   1596#   2160
TRO10    593#    607
TRO20    602#    605
TRO50    602     613#
TROMSM   580#    1166
TROPG0   568#    620
TROPG1   621     872#
TROPG2   622     1080#
TROPG3   623     1332#
TROPG4   624     1620#
TROPG5   625     1949#
TROPG6   626     2187#
TROPG7   627     2346#
TROPG8   628     2653#
TROPG9   629     2923#
TROPGA   630     3201#
TROPGB   631     3470#
TROPGC   632     3763#
TROPGD   633     4081#
TROPGE   634     4356#
TROPGF   635     4555#
TRORET   609     1167#
TROTAB   594     620#
TRPRM1   160#    2269
TRPRM2   161#    2299
TRRAM    497#    2305
TRYBLK   3725#
TSC02    1482#   1484
TSC04    1493#   1497
TSC05    1495#
```

```
TSC06   1496#  1505   1541   1552
TSC07   1504#  1529
TSC08   1495   1513#
TSC09   1511   1522#
TSC10   1524   1531#
TSC11   1512#  1515
TSC12   1507#  1516
TSC20   1501#
TSCBUF  225#   1509   1513   1527   1531   1710
TSCNT   1414   1475#
TSEG1   219#   1356   1522   1534   2252
TSEG2   220#   1525   1539
TST31   933    936#
TST32   935    940#
TST41   947    950#
TST42   949    954#
TTA90   978    990    1005#
TTACHK  986    1007#
TTAG    885#   1183
TTARET  1005   1184#
TTATAB  883#   888
TTL13A  3966   4014#
TTL13E  3951   3991   4004   4009#
TTL13G  3984   4000#
TTL8E   4038   4046   4053#
TWOLAB  308#   431    1320   1790   1965   2023   2025   2146   2147   2159   2303   2340   3427   3455
TXRET   509    566#
UNPACK  516#
UNPAK1  522#   554
UNPK1   893#   916
UNPK2   897#   914
VALFLG  2127   2131#
VER13   3737   3757#
VER213  3699   3753#
VER2L8  3716   3754#
VER8    3748   3755#
VERA    3730   3758#
VERE    3741   3756#
VERFLG  235#
VERT01  3684   3686   3691#
VERT02  3704#
VERT05  3668   3722#
VERT20  3694   3717   3750#
VERT90  3760#
VERTAG  3660#  4449
VTOC1A  3677   3683#
VTSP2C  3679   3685#
VTST2C  3681   3687#
WAIT    842#   1813   1905
WAIT0   845#   847
WAIT1   846#   846
WRACC   812#   1028   1798   1803   1809   1822   1902   1945
WREPRM  1783#  2178   2263
WRKBUF  299#   2522   2537   2546   2557   2566
WRPRM1  159#   2260
WRTPRM  2165   2178#
```

CROSS REFERENCE COMPLETE

ISIS-II MCS-48/UPI-41 MACRO ASSEMBLER, V4.2
TEC 750SL BY RANDY ELLIOTT 7-23-87 07:00

```
  LOC  OBJ        LINE       SOURCE STATEMENT

1  ;************************************************************
                    2  ; FILE: TECSL1.SRC  07-20-87 19:00  RANDY ELLIOTT
                    3  ;       MODIFIED 3-28-87 FOR 750SL TEC MODIFICATION BY RANDY ELLIOTT
                    4  ;       MODIFIED 7-20-87 FOR 750SL TEC MODIFICATION BY RANDY ELLIOTT
                    5  ; FIRMWARE FOR THE GAMMA SCANNER
                    6  ; WILL READ UPC-A,E,D AND EAN/JAN8,13
                    7  ;
                    8  ; S-P PART NUMBER R96-0130  (FIRST 4K OF EPROM FOR 8K PROGRAM)
                    9  ; EPROM PART NUMBER 0438-0800
                   10  ;************************************************************
                   11 $       INCLUDE(:F3:HISTRY.SRC)
               =   12  ;************************************************************
               =   13  ; FILE: HISTRY.SRC  02-18-87 08:30  BOB ACTIS
               =   14  ;
               =   15  ; IVRD53 - 750F IG DEMO, SP-OC, VERSION D3 W/ 2ND CHECK    MAY 1983
               =   16  ;
               =   17  ; FVRD53 - 750F FT DEMO, SP-OC, VERSION D3 W/ 2ND CHECK    OCT 1983
               =   18  ;
               =   19  ; FTLR53 - 750F, TWO LABEL READ, JAN13-JAN13 OR JAN13-JAN-8 MAR 1986
               =   20  ;
               =   21  ; G2L053 - 750SL, TWO LABEL READ, AS ABOVE                 FEB 1987
               =   22  ;
               =   23  ; TEC093 - 750SL TEC VERSION, TWO LABEL READ WITH EEPROM   APR 1987
               =   24  ;
               =   25  ; TEC193 - 750SL TEC VERSION, VERSION D WITH EEPROM        APR 1987
               =   26  ;************************************************************
                   27 $       INCLUDE(:F4:FTDEFS.SRC)
               =   28  ;************************************************************
```

```
        = 29 ; FILE: FTDEFS.SRC  09-11-86 08:40  BOB ACTIS
        = 30 ; MODIFIED 3-21-87 18:00 BY RANDY ELLIOTT FOR 750SL TEC SCANNER
        = 31 ; MODIFIED 7-17-87 10:40 BY RANDY ELLIOTT FOR 750SL TEC SCANNER
        = 32 ;     -CHANGE TO DELETE EAN13-EAN8 TWO LABEL READS
        = 33 ;     -PROGRAM EEPROM VIA ENCODED UPC A CODE
        = 34 ; *** SYSTEM DEFINITION ***
        = 35 ;
        = 36 ;  PORT 1 DEFINITION:
        = 37 ;
0001    = 38 ETEST    EQU    00000001B       ;P10-O-ENABLE TEST MODE
0002    = 39 ETMARK   EQU    00000010B       ;P11-O-TEST MARK
0002    = 40 EMTREB   EQU    00000010B       ;P11-O-ENABLE MOTOR
0004    = 41 EPRMDI   EQU    00000100B       ;P12-O-EEPROM_IN OUTPUT
0008    = 42 EPRMSK   EQU    00001000B       ;P13-O-EEPROM_SK OUTPUT
0010    = 43 ELASDB   EQU    00010000B       ;P14-O-DISABLE LASER
0020    = 44 EGDLT    EQU    00100000B       ;P15-O-ENABLE GOOD LIGHT
0040    = 45 EBDLT    EQU    01000000B       ;P16-O-ENABLE BAD LIGHT
0080    = 46 ETONE    EQU    10000000B       ;P17-O-TONE BIT (AC COUPLED)
        = 47 ;
        = 48 ;  PORT 2 DEFINITION:
        = 49 ;
0010    = 50 ESENT    EQU    00010000B       ;P24-I-VLSI DATA SENT* SIGNAL
0020    = 51 EUP2SP   EQU    00100000B       ;P25-I-MOTOR UP2SPD SIGNAL
0040    = 52 EVLSIR   EQU    01000000B       ;P26-O-VLSI POWER RESET*
0080    = 53 EPRMCS   EQU    10000000B       ;P27-O-EEPROM_CS OUTPUT
        = 54 ;
        = 55 ;*****************************************************************
        = 56 ;  FRAME CONTROL ARRAY:
        = 57 ;
        = 58 ;      EXTERNAL MEMORY ADDRESSES
        = 59 ;
0000    = 60 EPARRD   EQU    00H             ;R - PARITY BYTE
0001    = 61 ESRRD    EQU    01H             ;R - SEGMENT REGISTER
0001    = 62 EFRRST   EQU    01H             ;W - FRAME RESET (CLEARS SEGMENT)
0002    = 63 EOCIA    EQU    02H             ;R/W - OCIA REGISTERS
0003    = 64 EFCRST   EQU    03H             ;W - RESET FCA
0004    = 65 EPRDEC   EQU    04H             ;R - DECODED PARITY BYTE
0008    = 66 SWLATC   EQU    08H             ;R - DIP SWITCH LATCH
        = 67 ;
        = 68 ;DIPSWITCH DEFINITION
        = 69 ;      DIPSW1-DIPSW2           VOLUME CONTROL
        = 70 ;      DIPSW3                  INTERNAL/EXTERNAL SPEAKER
        = 71 ;      DIPSW4          B0      TONE CONTROL
        = 72 ;      DIPSW5          B1      TONE CONTROL
        = 73 ;      DIPSW6          B6      SPARE
        = 74 ;      DIPSW7          B2      TWO SCAN
        = 75 ;      DIPSW8          B3      TWO SCAN
        = 76 ;      DIPSW9          B5      EEPROM PROGRAM ENABLE VIA UPC CODE
        = 77 ;      DIPSW10         B4      VERSION D/2-SCAN*
        = 78 ;      JUMPER          B7      SPARE
        = 79 ;
        = 80 ;      PARITY DECODE BYTE
        = 81 ;
000F    = 82 EDECOD   EQU    00001111B       ;0-9 IS DECODED DIGIT
000A    = 83 EDEC8L   EQU    00001010B       ;A IS 8L
000B    = 84 EDEC8R   EQU    00001011B       ;B IS 8R
000C    = 85 EDECAL   EQU    00001100B       ;C IS AL
000D    = 86 EDECAR   EQU    00001101B       ;D IS AR
000E    = 87 EDECBE   EQU    00001110B       ;E IS NOT USED
000F    = 88 EDECBF   EQU    00001111B       ;F IS "NO DECODE" (ERROR)
0010    = 89 EDECE    EQU    00010000B       ;E-TAG
0020    = 90 EDECD    EQU    00100000B       ;D-TAG
0040    = 91 EDECBK   EQU    01000000B       ;BACKWARD CAPTURE
0080    = 92 EDECB7   EQU    10000000B       ;NOT USED. ALWAYS=1.
        = 93 ;
        = 94 ;      SHIFT REGISTER READ
        = 95 ;
000F    = 96 ESRCHR   EQU    00001111B       ;BCD CHARACTER
0010    = 97 ESR4CH   EQU    00010000B       ;4-CHAR CAPTURE
0020    = 98 ESRF13   EQU    00100000B       ;FRAME 1 OR 3 CAPTURE
0040    = 99 ESRPER   EQU    01000000B       ;PERIODICAL CAPTURE
0080    = 100 ESRSDT  EQU    10000000B       ;SDATA BYTE AVAILABLE
        = 101 ;*****************************************************************
        = 102 ; FLAG REGISTERS:
        = 103 ;
        = 104 ;     RB0-R4  SCAN FLAGS
        = 105 ;
0001    = 106 ESCNG   EQU    00000001B       ;SCANNING (FLAG CKFCA TO GET SEGMENTS)
0002    = 107 ER4B1   EQU    00000010B       ;NOT USED
0004    = 108 EAMBMS  EQU    00000100B       ;NOT USED
0008    = 109 ESBFUL  EQU    00001000B       ;SEND BUFFER HAS DATA TO SEND
0010    = 110 ER4B4   EQU    00010000B       ;NOT USED
0020    = 111 EBFREQ  EQU    00100000B       ;BUFMAN REQUEST FLAG
0040    = 112 ER4B6   EQU    01000000B       ;NOT USED
0080    = 113 ER4B7   EQU    10000000B       ;TWO LABEL ERROR FLAG
        = 114 ;
        = 115 ;     RB0-R6  VERSION POINTER/FLAG
        = 116 ;
0000    = 117 EVER00  EQU    00H             ;NO VALID VERSIONS
0001    = 118 EVERA   EQU    01H             ;UPC-A
0002    = 119 EVER13  EQU    02H             ;EAN-13
0003    = 120 EVERE   EQU    03H             ;UPC-E
```

```
0004            = 121 EVER8    EQU     04H             ;EAN-8
0005            = 122 EVERD1   EQU     05H             ;UPC-D1
0006            = 123 EVERD2   EQU     06H             ;UPC-D2
0007            = 124 EVERD3   EQU     07H             ;UPC-D3
0008            = 125 EVERD4   EQU     08H             ;UPC-D4
0009            = 126 EVERD5   EQU     09H             ;UPC-D5
                = 127 ;
0010            = 128 ER6B4    EQU     00010000B       ;FLAG COUNTER (B0-TWO LABEL)
0020            = 129 ER6B5    EQU     00100000B       ;FLAG COUNTER (B1-TWO LABEL)
0040            = 130 ER6B6    EQU     01000000B       ;FLAG COUNTER (B2-TWO LABEL)
0080            = 131 ER6B7    EQU     10000000B       ;NOT USED
                = 132 ;
                = 133 ;EEPROM OP CODES
0080            = 134 OPREAD   EQU     80H             ;READ REGISTER
0030            = 135 EWEN     EQU     30H             ;ERASE/WRITE ENABLE
0020            = 136 ERAL     EQU     20H             ;ERASE ALL
0040            = 137 OWRITE   EQU     40H             ;WRITE REGISTER
0000            = 138 EWDS     EQU     00H             ;ERASE/WRITE DISABLE
00C0            = 139 ERASE    EQU     0C0H            ;EEPROM PROGRAM ENABLE VIA UPC CODE
                = 140 ;****************************************************************
                = 141 ; TIMER CONSTANTS:
                = 142 ;
0032            = 143 E1000M   EQU     50              ;1.00 SEC (1000 MILLISECONDS)
                = 144 ;
0004            = 145 EGDTON   EQU     4               ;GOOD TONE ON TIME
0014            = 146 EBDTON   EQU     20              ;BAD TONE ON TIME
                = 147 ;
0028            = 148 ETONCT   EQU     40              ;TONE COUNT (CYCLES/20MS)
FFFA            = 149 ETONFQ   EQU     -6              ;TONE FREQUENCY CONSTANT (500US)
                = 150 ;
                = 151 ; SP-OC INTERFACE CONSTANTS
00C2            = 152 EAMESD   EQU     0C2H            ;DISABLE AMB LABEL MESS (LAST CHAR B)
00C1            = 153 EAMESE   EQU     0C1H            ;ENABLE AMB LABEL MESS (LAST CHAR A)
0045            = 154 ESEN     EQU     045H            ;SCAN ENABLE CHAR (LAST CHAR E)
00C4            = 155 ESDIS    EQU     0C4H            ;SCAN DISABLE CHAR (LAST CHAR D)
0040            = 156 EBIT6    EQU     01000000B       ;LAST CHAR BIT FOR HOST DATA, SP-OC I/F
00C7            = 157 WRPRM1   EQU     0C7H            ;WRITE 'TWO LABEL' SETTINGS TO EEPROM ('G')
00C8            = 158 TRPRM1   EQU     0C8H            ;READ EEPROM 'TWO LABEL' SETTINGS ('H')
00CB            = 159 SWSET1   EQU     0CBH            ;READ CURRENT SCANNER CONFIGURATION FROM RAM ('K')
008C            = 160 OVRST1   EQU     08CH            ;OVERIDE SCANNER SETTINGS ('L')
0089            = 161 STRAM1   EQU     089H            ;WRITE 'TWO LABEL' SETTINGS TO RAM ('I')
004A            = 162 TRPRM2   EQU     04AH            ;READ 'TWO LABEL' SETTINGS FROM RAM ('J')
                = 163 ;
                = 164 ;
                = 165 ; COMMUNICATIONS ROUTINE CONSTANTS
00BB            = 166 EAMBBY   EQU     0BBH            ;AMBIGUOUS READ BYTE FOR SEND BUFFER
00CC            = 167 ETRMBY   EQU     0CCH            ;TERMINATION BYTE FOR SEND BUFFER
                = 168 ;
                = 169 ;AMBIGUITY (2 LABEL PROGRAM) CONSTANTS)
                = 170
                = 171
                = 172 ; FLATTOP TIME CONSTANTS
0008            = 173 EWAIT    EQU     8               ;VALUE FOR "NO SEGS" WAIT
002A            = 174 EGDLTW   EQU     50-EWAIT        ;GD-LT ON WAIT CONSTANT
0016            = 175 EDRDLY   EQU     30-EWAIT        ;DOUBLE READ WAIT CONSTANT
0001            = 176 FACTOR   EQU     1               ;TIMER FACTOR (FOR 10/20 MS DIFFERENCES BETWEEN SOFTWARES)
                = 177 ;
                = 178 ; RAM POINTERS AND CONSTANTS USED IN THE HORSE TEST
0030            = 179 TSEG1    EQU     30H             ;SEGMENT BUFFER
0034            = 180 TSEG2    EQU     34H
0038            = 181 TCNT1    EQU     38H             ;SEGMENT COUNTER
003A            = 182 TCNT2    EQU     3AH
0050            = 183 TSCBUF   EQU     50H             ;FCA READ BUFFER
0001            = 184 EHCNTL   EQU     001H            ;HORSE CONTROL BYTE
                = 185 ;TONE CONSTANTS
0014            = 186 ETNCT1   EQU     014H            ;CYCLE COUNT FOR 500HZ
001E            = 187 ETNCT2   EQU     01EH            ;CYCLE COUNT FOR 730HZ
0028            = 188 ETNCT3   EQU     028H            ;CYCLE COUNT FOR 960HZ
0038            = 189 ETNCT4   EQU     038H            ;CYCLE COUNT FOR 1370HZ
00F4            = 190 ETNFQ1   EQU     0F4H            ;FREQUENCY FOR 500HZ
00F8            = 191 ETNFQ2   EQU     0F8H            ;FREQUENCY FOR 730HZ
00FA            = 192 ETNFQ3   EQU     0FAH            ;FREQUENCY FOR 960HZ
00FC            = 193 ETNFQ4   EQU     0FCH            ;FREQUENCY FOR 1370HZ
                = 194 ;****************************************************************
                = 195 ; DATA MEMORY MAP - RAM - 8039 NEEDED
                = 196 ;
                = 197 ;     REGISTER BANK 0   (NON-INTERRUPT USEAGE)
0000            = 198         ORG     000H
0000            = 199 MRB0:   DS      4               ;R0 TO R3 - SCRATCH
0004            = 200 SCNFLG: DS      1               ;R4 - SCAN FLAGS
0005            = 201 DRTIMR: DS      1               ;R5 - DOUBLE READ TIMER
0006            = 202 VERFLG: DS      1               ;R6 - VERSION POINTER/FLAG
0007            = 203 TIMREG: DS      1               ;R7 - GENERAL PURPOSE TIMER/COUNTER
                = 204 ;
                = 205 ;     STACK AREA
0008            = 206 STACK:  DS      16              ;8 LEVELS OF SUBROUTINES ALLOWED
                = 207 ;
                = 208 ;     REGISTER BANK 1 (INTERRUPT USEAGE)
0018            = 209 MRB1:   DS      4               ;R0 TO R3 - SCRATCH (NOT USED)
001C            = 210 MRB1R4: DS      1               ;R4 - NOT USED
001D            = 211 TONCNT: DS      1               ;R5 - TONE CYCLE COUNTER (CYCLES/20MS)
001E            = 212 TONLTH: DS      1               ;R6 - TONE LENGTH COUNTER
```

```
001F         = 213 TASAVE: DS    1              ;R7 - TIMER "A" SAVE REGISTER
             = 214 ;
             = 215 ;     FREE MEMORY AREA
             = 216 ;
             = 217 ;     SEGMENT BUFFERS
0020         = 218 RCRAM   EQU   $
0020         = 219 SEGBUF  EQU   $
0020         = 220 SCNBUF: DS    4              ;SCAN BUFFER
             = 221 ;
0024         = 222 BF6CST  EQU   $
0024         = 223 L6S1:   DS    4              ;SCAN 1 BUFFER
0028         = 224 L6S2:   DS    4              ;SCAN 2 BUFFER
002C         = 225 L6SCNT: DS    1              ;PACKED SCAN COUNTER (SCAN2/SCAN1)
002D         = 226 L6STOT: DS    1              ;TOTAL COUNTER
             = 227 ;
002E         = 228 R6S1:   DS    3
0031         = 229 R6S2:   DS    3
0034         = 230 R6SCNT: DS    1
0035         = 231 R6STOT: DS    1
0012         = 232 BF6CNT  EQU   $-BF6CST
             = 233 ;
0036         = 234 BF4CST  EQU   $
0036         = 235 L4S1:   DS    2
0038         = 236 L4S2:   DS    2
003A         = 237 L4SCNT: DS    1
003B         = 238 L4STOT: DS    1
             = 239 ;
003C         = 240 R4S1:   DS    2
003E         = 241 R4S2:   DS    2
0040         = 242 R4SCNT: DS    1
0041         = 243 R4STOT: DS    1
             = 244 ;
0042         = 245 N1S1:   DS    2
0044         = 246 N1S2:   DS    2
0046         = 247 N1SCNT: DS    1
0047         = 248 N1STOT: DS    1
             = 249 ;
0048         = 250 N2S1:   DS    2
004A         = 251 N2S2:   DS    2
004C         = 252 N2SCNT: DS    1
004D         = 253 N2STOT: DS    1
             = 254 ;
004E         = 255 N3S1:   DS    2
0050         = 256 N3S2:   DS    2
0052         = 257 N3SCNT: DS    1
0053         = 258 N3STOT: DS    1
             = 259 ;
0054         = 260 N4S1:   DS    2
0056         = 261 N4S2:   DS    2
0058         = 262 N4SCNT: DS    1
0059         = 263 N4STOT: DS    1
             = 264 ;
005A         = 265 N5S1:   DS    2
005C         = 266 N5S2:   DS    2
005E         = 267 N5SCNT: DS    1
005F         = 268 N5STOT: DS    1
             = 269 ;
0060         = 270 N6S1:   DS    2
0062         = 271 N6S2:   DS    2
0064         = 272 N6SCNT: DS    1
0065         = 273 N6STOT: DS    1
0030         = 274 BF4CNT  EQU   $-BF4CST
             = 275 ;
             = 276 ;     SEND BUFFER
0066         = 277 SBFPNT: DS    1              ;POINTER
             = 278 ;
0067         = 279 TWOLAB  EQU   $              ;16 BYTES FOR RAM TO EEPROM
0067         = 280 SBUFAD  EQU   $              ;FIRST DATA BYTE ADDRESS
0067         = 281 SBUF:   DS    18             ;DATA BUFFER
00CE         = 282 SBSTRT  EQU   2*SBUF         ;PACKED BUFFER START POINTER
0012         = 283 SBUFSZ  EQU   $-SBUF         ;BYTES IN SEND BUFFER
0078         = 284 SBFEND  EQU   $-1            ;LAST RAM LOCATION IN BUFFER
             = 285 ;
             = 286 ;  WORK AREA USED BY EM0010 ROUTINE
0079         = 287 WRKBUF: DS    3
             = 288 ;
             = 289 ;  DOUBLE READ LABEL DATA SUM LOCATION
007C         = 290 DRSUM:  DS    1
             = 291 ;
             = 292 ;  SCANNER CONFIGURATION STORAGE
007D         = 293 SWISET: DS    1              ;SWITCH SETTINGS
007E         = 294 STSDTA: DS    1              ;COMMAND BYTE
007F         = 295 INTSTR: DS    1              ;SCRATCH PAD STORAGE FOR R1 (TIMER INTERUPT)
             = 296 ;
007F         = 297 LSTUSD  EQU   $-1            ;LAST USED RAM LOCATION
               298 ; FVECTR.SRC INCLUDES FTIMER.SRC
               299 $       INCLUDE(:F3:FVECTR.SRC)
             = 300 ;************************************************************
             = 301 ; FILE:  FVECTR.SRC  11-18-86 12:00  BOB ACTIS
             = 302 ;
             = 303 ;  RESET AND INTERRUPT VECTORS
             = 304 ;
```

```
0000              = 305           ORG     000H            ;RESET TRAP
0000 E5           = 306 RSTTRP:   SEL     MB0
0001 64A4         = 307           JMP     POWUP           ;GO START PROGRAM
                  = 308 ;
0003              = 309           ORG     003H            ;EXTERNAL INTERRUPT TRAP
0003 93           = 310 INTTRP:   RETR                    ;RETURN FROM SPURIOUS INTERRUPTS
                  = 311 ;
0007              = 312           ORG     007H            ;INTERNAL TIMER INTERRUPT TRAP
0007              = 313 TIMTRP    EQU     $               ;GO TO TIMER ROUTINE
                  = 314 $         INCLUDE(:F3:FTIMER.SRC)
                 1= 315 ;********************************************************************
                 1= 316 ;  FILE: FTIMER.SRC  03-15-87 24:00  RANDY ELLIOTT  (TEC MOD.)
                 1= 317 ;  FUNCTION: IF NO TONE IN PROGRESS, DECREMENT RB0-R7 UNTIL 0.
                 1= 318 ;            IF TONE IN PROGRESS, DECREMENT RB1-R6 UNTIL 0.
                 1= 319 ;  ENTRY:  RB1-R6 = TONE LENGTH IN 10'S OF MS.
                 1= 320 ;          RB0-R5 = DOUBLE READ TIMER COUNTER
                 1= 321 ;          RB0-R7 = GENERAL PURPOSE TIMER COUNTER
                 1= 322 ;  EXIT:   RB1-R7 = ACCUMULATOR SAVE
                 1= 323 ;          RB1-R5 = TONE CYCLE COUNTER
                 1= 324 ;          RB1-R6 = DECREMENTED UNTIL 0
                 1= 325 ;          RB0-R5 = DECREMENTED UNTIL 0
                 1= 326 ;          RB0-R7 = DECREMENTED UNTIL 0
0007 D5          1= 327 TIMER:    SEL     RB1
0008 AF          1= 328           MOV     R7,A            ;SAVE A
                 1= 329 ;SAVE R1 IN RAM SO AS TO RESTORE WHEN EXITING INTERUPT.
0009 F9          1= 330           MOV     A,R1
000A B97F        1= 331           MOV     R1,#INTSTR      ;SET RAM POINTER
000C A1          1= 332           MOV     @R1,A           ;SAVE R1 (RB1)
                 1= 333 ;
000D FE          1= 334           MOV     A,R6            ;GET TONE COUNTER
000E 9623        1= 335           JNZ     TIME30          ;JUMP IF TONE IN PROGRESS
0010 C5          1= 336           SEL     RB0
0011 FF          1= 337           MOV     A,R7
0012 C615        1= 338           JZ      TIME05          ;JUMP IF TIMER COUNTER IS 0
0014 CF          1= 339           DEC     R7
0015 FD          1= 340 TIME05:   MOV     A,R5
0016 C619        1= 341           JZ      TIME10          ;JUMP IF DOUBLE READ TIMER IS 0
0018 CD          1= 342           DEC     R5
0019 2306        1= 343 TIME10:   MOV     A,#-(250/FACTOR)      ;10MS/8OUS = 125
001B 62          1= 344 TIME20:   MOV     T,A             ;SET TIMER COUNTER
001C D5          1= 345           SEL     RB1
                 1= 346 ;RESTORE ACCUMULATOR AND R1 (RB1) BEFORE RETURNING.
001D B97F        1= 347           MOV     R1,#INTSTR      ;SET RAM POINTER
001F F1          1= 348           MOV     A,@R1           ;RETRIEVE R1 (RB1) FROM RAM
0020 A9          1= 349           MOV     R1,A            ;RESTORE R1
0021 FF          1= 350           MOV     A,R7            ;RESTORE A
0022 93          1= 351           RETR
0023 09          1= 352 TIME30:   IN      A,P1            ;GET TONE BIT
0024 997F        1= 353           ANL     P1,#255-ETONE   ;SET TONE BIT LOW
0026 F22A        1= 354           JB7     TIME40          ;JUMP IF TONE BIT WAS HIGH
0028 8980        1= 355           ORL     P1,#ETONE       ;SET TONE BIT HIGH
                 1= 356 TIME40:
002A ED3A        1= 357           DJNZ    R5,TIME60       ;JUMP IF NOT 10MS YET
                 1= 358 ;SET TONE CYCLE COUNTER ACCORDING TO RAM (SWITCH SETTINGS)
002C B46C        1= 359           CALL    TON1CT          ;SET TONE CYCLE COUNTER (R5)
                 1= 360 ;
002E C5          1= 361           SEL     RB0
002F FF          1= 362           MOV     A,R7
0030 C633        1= 363           JZ      TIME50
0032 CF          1= 364           DEC     R7
0033 D5          1= 365 TIME50:   SEL     RB1
0034 EE3A        1= 366           DJNZ    R6,TIME60       ;JUMP IF TONE NOT FINISHED
0036 8980        1= 367           ORL     P1,#ETONE       ;LEAVE TONE LINE HIGH
0038 0419        1= 368           JMP     TIME10
                 1= 369 TIME60:
                 1= 370 ;SET TONE FREQUENCY CONSTANT ACCORDING TO SWITCH SETTING
003A B97D        1= 371           MOV     R1,#SWISET      ;SET RAM POINTER
003C F1          1= 372           MOV     A,@R1           ;RETRIEVE SWITCH SETTING
003D 5303        1= 373           ANL     A,#03H          ;MASK ALL BUT TONE BITS
003F 0344        1= 374           ADD     A,#LOW FREQAD   ;SET EPROM ADDRESS FETCH
0041 A3          1= 375           MOVP    A,@A            ;GET TONE FREQUENCY
0042 041B        1= 376           JMP     TIME20
                 1= 377 ;
0044             1= 378 FREQAD    EQU     $
0044 F4          1= 379           DB      ETNFQ1          ;TONE FREQUENCY FOR 500HZ
0045 F8          1= 380           DB      ETNFQ2          ;TONE FREQUENCY FOR 730HZ
0046 FA          1= 381           DB      ETNFQ3          ;TONE FREQUENCY FOR 960HZ
0047 FC          1= 382           DB      ETNFQ4          ;TONE FREQUENCY FOR 1370HZ
                 1= 383 ;
                   384 $         INCLUDE(:F3:CK4HRS.SRC)
                 = 385 ;********************************************************************
                 = 386 ;  FILE: CK4HRS.SRC  7-07-86 15:05  BOB ACTIS
                 = 387 ;  FUNCTION: CHECK SDATA FOR THE HORSE CONTROL BYTE
                 = 388 ;  ENTRY:  NO SETUP
                 = 389 ;  EXIT:   USES R0,A
                 = 390 ;          GOES INTO HORSE TEST IF CONTROL BYTE IS RECEIVED
                 = 391 ;
0048 864B        = 392 CK4HRS:   JNI     CK4H20          ;JUMP IF FCA HAS DATA
004A 83          = 393 CK4H10:   RET
                 = 394 ;
004B B801        = 395 CK4H20:   MOV     R0,#ESRRD
004D 80          = 396           MOVX    A,@R0           ;READ BYTE
```

```
004E F252    = 397         JB7    CK4H30       ;JUMP IF SDATA
0050 90      = 398         MOVX   @R0,A        ;RESET FRAME CAPTURE
0051 83      = 399         RET
             = 400 ;
0052 B802    = 401 CK4H30: MOV    R0,#EOCIA
0054 80      = 402         MOVX   A,@R0        ;GET SDATA
0055 D3D1    = 403         XRL    A,#EHCNTL
0057 964A    = 404         JNZ    CK4H10       ;JUMP IF NOT HORSE CONTROL BYTE
0059 842C    = 405         JMP    SDATAH       ;GO ENTER THE HORSE TEST
             = 406 $       INCLUDE(:F3:TREPRM.SRC)
             = 407 ;****************************************************************
             = 408 ;**                  Subroutine TREPRM                         **
             = 409 ;** Function:  Transmit EEPROM contents to Host or transmit Ram contents **
             = 410 ;** Date: 3-4-87                                               **
             = 411 ;** Subroutines Called: RDEPRM, SOCIA, PARITY                  **
             = 412 ;** Registers/Flags affected: *R2, ACCUMULATOR, R0, F0, CARRY, R1, R2, R3,*R1*
             = 413 ;** Ports affected: P2, P1                                     **
             = 414 ;** RAM locations affected: EXT. RAM EOCIA(VLSI), @*R1 TO @*R1+16 **
             = 415 ;****************************************************************
             = 416 TREPRM:
             = 417 ;READ EEPROM TO SCRATCH PAD RAM (16 BYTES PACKED)
             = 418       ;SET RAM POINTER TO TRANSFER EEPROM DATA TO.
005B D5      = 419         SEL    RB1          ;SELECT REGISTER BANK 1
005C F9      = 420         MOV    A,R1         ;RETRIEVE RAM POINTER FROM *R1
005D C5      = 421         SEL    RB0          ;SELECT REGISTER BANK 0
005E A9      = 422         MOV    R1,A         ;SET RAM POINTER
             = 423 ;
005F 54B0    = 424         CALL   RDEPRM       ;TRANSFER EEPROM DATA TO RAM.
             = 425 ;CHECK THAT EEPROM HAS BEEN PROGRAMMED. ;SET UP HEADER CHARACTER.
             = 426       ;SET RAM POINTER TO TRANSFER EEPROM DATA TO.
             = 427 TRRAM:
0061 D5      = 428         SEL    RB1          ;SELECT REGISTER BANK 1
0062 F9      = 429         MOV    A,R1         ;RETRIEVE RAM POINTER FROM *R1
0063 C5      = 430         SEL    RB0          ;SELECT REGISTER BANK 0
0064 A9      = 431         MOV    R1,A         ;SET RAM POINTER
             = 432 ;
0065 F1      = 433         MOV    A,@R1        ;READ RAM
0066 37      = 434         CPL    A
0067 966F    = 435         JNZ    PDATA        ;IF NOT ZERO, WE HAVE DATA IN RAM.  JUMP SEND DATA.
             = 436 ;NO DATA IS IN EEPROM.  SEND HEADER CHARACTER WITH LAST BYTE BIT SET HIGH.
0069 23C7    = 437         MOV    A,#0C7H      ;HEADER CHAR. 'G' WITH LAST BYTE BIT SET.
006B 34EB    = 438         CALL   SOCIA        ;TRANSFER ACCUMULATOR TO VLSI CHIP OCIA BUFFER.
006D 04AB    = 439         JMP    TXRET        ;JUMP TO RETURN. EXIT ROUTINE.
             = 440 ;LABEL FLAGS ARE IN RAM.  SEND HEADER CHARACTER.
006F 2307    = 441 PDATA:  MOV    A,#07H       ;HEADER CHAR. 'G'
0071 34EB    = 442         CALL   SOCIA        ;TRANSFER ACCUMULATOR TO VLSI CHIP OCIA BUFFER.
             = 443 ;
             = 444 ;BEGIN UNPACKING RAM DATA AND SEND OVER OCIA.
             = 445 ;SET RAM POINTER TO TRANSFER EEPROM DATA TO.
             = 446 UNPACK:
0073 D5      = 447         SEL    RB1          ;SELECT REGISTER BANK 1
0074 F9      = 448         MOV    A,R1         ;RETRIEVE RAM POINTER FROM *R1
0075 C5      = 449         SEL    RB0          ;SELECT REGISTER BANK 0
0076 A9      = 450         MOV    R1,A         ;SET RAM POINTER
             = 451 ;
             = 452 UNPAK1:
0077 F1      = 453         MOV    A,@R1        ;RETRIEVE ONE BYTE FROM RAM
0078 530F    = 454         ANL    A,#0FH       ;MASK MS DIGIT OFF.
007A 4330    = 455         ORL    A,#30H       ;CONVERT LS DIGIT TO ASCII.
007C A8      = 456         MOV    R0,A         ;STORE LS DIGIT IN R0.
007D F1      = 457         MOV    A,@R1        ;RETRIEVE SAME BYTE AGAIN TO GET MS DIGIT.
007E 47      = 458         SWAP   A            ;SWAP NIBBLES AROUND
007F 530F    = 459         ANL    A,#0FH       ;MASK LS DIGIT OFF.
0081 4330    = 460         ORL    A,#30H       ;CONVERT MS DIGIT TO ASCII.
0083 AA      = 461         MOV    R2,A         ;SAVE MS DIGIT IN R2.
             = 462 ;LOOK AT NEXT BYTE IN RAM TO CHECK FOR LAST BYTE.
0084 19      = 463         INC    R1           ;INCREMENT RAM POINTER
0085 F1      = 464         MOV    A,@R1        ;RETRIEVE NEXT BYTE
0086 37      = 465         CPL    A
0087 C69F    = 466         JZ     LSTBYT       ;IF ZERO, PREVIOUS RAM LOCATION HAD LAST BYTE.
             = 467 ;CHECK RAM POINTER IN THAT IT DOES NOT EXCEED 16.  (16 BYTES TRANSMITTED)
0089 D5      = 468         SEL    RB1
008A F9      = 469         MOV    A,R1         ;SET RAM POINTER TO FIRST BYTE OF DATA
008B C5      = 470         SEL    RB0
008C 37      = 471         CPL    A            ;SUBTRACT BEGINNING OF RAM TO PRESENT POINTER
008D 69      = 472         ADD    A,R1
008E 17      = 473         INC    A            ;RESULT OF SUBTRACTION IN ACCUMULATOR
008F D310    = 474         XRL    A,#16D       ;CHECK FOR 16.
0091 C69F    = 475         JZ     LSTBYT       ;IF ZERO, PREVIOUS RAM LOCATION HAD LAST BYTE.
             = 476 ;MORE DATA TO SEND.  NOT 17TH BYTE NOR IS NEXT BYTE LAST BYTE.
0093 FA      = 477         MOV    A,R2         ;GET MS BYTE TO SEND
0094 3490    = 478         CALL   PARITY       ;CALCULATE PARITY
0096 34EB    = 479         CALL   SOCIA        ;SEND MS BYTE TO HOST
0098 F8      = 480         MOV    A,R0         ;GET LS BYTE TO SEND
0099 3490    = 481         CALL   PARITY       ;CALCULATE PARITY
009B 34EB    = 482         CALL   SOCIA        ;SEND LS BYTE TO HOST
             = 483 ;MORE DATA TO RETRIEVE, LOOP BACK.
009D 0477    = 484         JMP    UNPAK1
             = 485 ;
             = 486 ;LAST BYTE COMMING UP.  SEND MS BYTE AND LS BYTE WITH LAST BYTE BIT SET.
009F FA      = 487 LSTBYT: MOV    A,R2         ;GET MS BYTE.
00A0 3490    = 488         CALL   PARITY       ;CALCULATE PARITY
```

```
                                       ;SEND MS BYTE TO HOST
00A2 34EB    = 489        CALL  SOCIA
00A4 F8      = 490        MOV   A,R0           ;GET LS BYTE.
00A5 4340    = 491        ORL   A,#40H         ;SET LAST BYTE BIT
00A7 3490    = 492        CALL  PARITY         ;CALCULATE PARITY
00A9 34EB    = 493        CALL  SOCIA          ;SEND LS BYTE WITH LAST BYTE BIT SET.
             = 494 ;
             = 495 ;ALL DONE.  RETURN TO MAIN ROUTINE.
00AB 83      = 496 TXRET: RET
             497 ;************************************
00AC A3      498 TROPG0: MOVP  A,@A
00AD 83      499        RET
0100         500        ORG   100H
             501 $      INCLUDE(:F3:TROMSM.SRC)
             = 502 ;
             = 503 ; ROUTINE: TROMSM   11-22-82 10:15  BOB ACTIS
             = 504 ;
             = 505 ; FUNCTION - SUM ALL BYTES IN BOTH MEMORY BANKS
             = 506 ;       ASSUMES THAT EACH OF THE SIXTEEN PAGES CONTAINS THE
             = 507 ;       SEQUENCE "TROPGX: MOVP A,@A ; RET" FOR PAGE X.
             = 508 ;
0100 B90B    = 509 TROMSM: MOV  R1,#STACK+3    ; R1 POINTS TO SECOND STACK ENTRY
             = 510 ;
             = 511 ; DO SIXTEEN PAGES WITH 256 BYTES PER PAGE
             = 512 ;
0102 27      = 513        CLR   A
0103 A1      = 514        MOV   @R1,A          ; STACK+3 = PAGE 0 TO START
0104 AA      = 515        MOV   R2,A           ; R2 = BYTE ADDRESS
0105 BB10    = 516        MOV   R3,#16         ; R3 = PAGES TO DO
0107 A8      = 517        MOV   R0,A           ; R0 = SUM OF BYTES
0108 D7      = 518        MOV   PSW,A          ; INSURE STACK IS EMPTY
             = 519 ;
             = 520 ; PUT PAGE ACCESS ADDRESS IN STACK
             = 521 ;
0109 F1      = 522 TRO10: MOV   A,@R1
010A 0321    = 523        ADD   A,#LOW TROTAB
010C A3      = 524        MOVP  A,@A
010D C9      = 525        DEC   R1
010E A1      = 526        MOV   @R1,A
010F 19      = 527        INC   R1
             = 528 ;
             = 529 ; DO A PAGE
             = 530 ;
0110 341C    = 531 TRO20: CALL  TRO50          ; FETCH BYTE
0112 68      = 532        ADD   A,R0           ; ADD TO SUM
0113 A8      = 533        MOV   R0,A
0114 EA10    = 534        DJNZ  R2,TRO20       ; JMP = NOT DONE WITH PAGE
0116 11      = 535        INC   @R1            ; PAGE NUMBER INCREMENTED
0117 E809    = 536        DJNZ  R3,TRO10       ; JMP = NOT THRU WITH PAGES
0119 17      = 537        INC   A              ; (A) = ZERO FOR CORRECT SUM
011A 6453    = 538        JMP   TRORET
             = 539 ;
             = 540 ; LINK TO EACH PAGE
             = 541 ;
011C 2302    = 542 TRO50: MOV   A,#02
011E D7      = 543        MOV   PSW,A          ; SET STACK POINTER AHEAD
011F FA      = 544        MOV   A,R2           ; A = ADDRESS OF BYTE TO FETCH
0120 83      = 545        RET                  ; JMP TO SELECTED PAGE
             = 546 ;
             = 547 ; TABLE FOR ADDRESS OF FETCH ROUTINE IN EACH PAGE
             = 548 ;
0121 AC      = 549 TROTAB: DB   LOW TROPG0
0122 F6      = 550        DB    LOW TROPG1
0123 E9      = 551        DB    LOW TROPG2
0124 F7      = 552        DB    LOW TROPG3
0125 E4      = 553        DB    LOW TROPG4
0126 DB      = 554        DB    LOW TROPG5
0127 EA      = 555        DB    LOW TROPG6
0128 F6      = 556        DB    LOW TROPG7
0129 E4      = 557        DB    LOW TROPG8
012A 90      = 558        DB    LOW TROPG9
012B CC      = 559        DB    LOW TROPGA
012C D8      = 560        DB    LOW TROPGB
012D D4      = 561        DB    LOW TROPGC
012E E3      = 562        DB    LOW TROPGD
012F B9      = 563        DB    LOW TROPGE
0130 87      = 564        DB    LOW TROPGF
             565 $       INCLUDE(:F3:TRAM.SRC)
             = 566 ;*********************************************
             = 567 ; FILE: TRAM.SRC  6-19-86 11:20  BOB ACTIS
             = 568 ; FUNCTION: TEST THE 8039 RAM LOCATIONS 0 TO 7FH
             = 569 ; ENTRY: NO SETUP
             = 570 ; EXIT: RAM HAS GARBAGE (TEST PATTERN)
             = 571 ;
             = 572 ; START BY WRITTING EACH RAM ADDRESS INTO ITSELF
0131 887F    = 573 TRAM:  MOV   R0,#7FH        ;SIZE OF 8039 RAM
0133 F8      = 574 TRAM10: MOV  A,R0           ;GET RAM ADDRESS
0134 A0      = 575        MOV   @R0,A          ;STORE RAM ADDRESS IN IT'S LOCATION
0135 E833    = 576        DJNZ  R0,TRAM10      ;DO ALL LOCATIONS
             = 577 ;
             = 578 ; CHECK IF EACH LOCATION HAS IT'S OWN ADDRESS
0137 B87F    = 579        MOV   R0,#7FH
0139 F8      = 580 TRAM20: MOV  A,R0           ;GET RAM ADRESS
```

```
013A D0        = 581           XRL     A,@R0          ;COMPARE ADDRESS TO CONTENTS
013B 9674      = 582           JNZ     TRAMER         ;JUMP IF ERROR
013D E839      = 583           DJNZ    R0,TRAM20      ;DO ALL LOCATIONS
               = 584 ;
               = 585 ; TRY A 055H/0AAH CHECKER BOARD PATTERN
013F B802      = 586           MOV     R0,#2          ;POINTER WILL GO FROM 2 TO 7FH
0141 2355      = 587 TRAM30:   MOV     A,#055H
0143 A0        = 588           MOV     @R0,A          ;WRITE EVEN LOCATION
0144 37        = 589           CPL     A              ;PATTERN IS NOW 0AAH
0145 18        = 590           INC     R0
0146 A0        = 591           MOV     @R0,A          ;WRITE ODD LOCATION
0147 18        = 592           INC     R0
0148 F8        = 593           MOV     A,R0           ;GET NEXT ADDRESS
0149 37        = 594           CPL     A
014A F241      = 595           JB7     TRAM30         ;JUMP IF NOT DONE YET, R0 < 80H
               = 596 ;
               = 597 ; CHECK THE 055H/0AAH TEST PATTERN
014C B902      = 598           MOV     R1,#2          ;USE R1 AS POINTER IN THIS SECTION
014E F1        = 599 TRAM40:   MOV     A,@R1          ;GET EVEN BYTE DATA, 055H
014F 19        = 600           INC     R1
0150 61        = 601           ADD     A,@R1          ;ADD ODD BYTE DATA, 0AAH
0151 17        = 602           INC     A              ;055H+0AAH+1=000H
0152 9674      = 603           JNZ     TRAMER         ;JUMP IF ERROR
0154 19        = 604           INC     R1
0155 F9        = 605           MOV     A,R1           ;GET NEXT ADDRESS
0156 37        = 606           CPL     A
0157 F24E      = 607           JB7     TRAM40         ;JUMP IF NOT DONE YET
               = 608 ;
               = 609 ; TRY A 0AAH/055H CHECKER BOARD PATTERN
0159 B902      = 610           MOV     R1,#2          ;POINTER WILL GO FROM 2 TO 7FH
015B 23AA      = 611 TRAM50:   MOV     A,#0AAH
015D A1        = 612           MOV     @R1,A          ;WRITE EVEN LOCATION
015E 37        = 613           CPL     A              ;PATTERN IS NOW 055H
015F 19        = 614           INC     R1
0160 A1        = 615           MOV     @R1,A          ;WRITE ODD LOCATION
0161 19        = 616           INC     R1
0162 F9        = 617           MOV     A,R1           ;GET NEXT ADDRESS
0163 37        = 618           CPL     A
0164 F25B      = 619           JB7     TRAM50         ;JUMP IF NOT DONE YET, R1 < 80H
               = 620 ;
               = 621 ; CHECK THE 0AAH/055H TEST PATTERN
0166 B802      = 622           MOV     R0,#2          ;USE R0 AS POINTER IN THIS SECTION
0168 F0        = 623 TRAM60:   MOV     A,@R0          ;GET EVEN BYTE DATA, 0AAH
0169 18        = 624           INC     R0
016A 60        = 625           ADD     A,@R0          ;ADD ODD BYTE DATA, 055H
016B 17        = 626           INC     A              ;0AAH+055H+1=000H
016C 9674      = 627           JNZ     TRAMER         ;JUMP IF ERROR
016E 18        = 628           INC     R0
016F F8        = 629           MOV     A,R0           ;GET NEXT ADDRESS
0170 37        = 630           CPL     A
0171 F268      = 631           JB7     TRAM60         ;JUMP IF NOT DONE YET
               = 632 ;
0173 27        = 633           CLR     A              ;A=0 INDICATES TEST PASSED
0174 645B      = 634 TRAMER:   JMP     TRARET         ;RETURN FROM RAM TEST
                 635 $         INCLUDE(:F3:TOCIA.SRC)
               = 636 ;****************************************************************
               = 637 ; ROUTINE: TOCIA   07-03-86 10:40  BOB ACTIS
               = 638 ;
               = 639 ; FUNCTION: SEND BYTE TO HOST, THEN CHECK RDATA
               = 640 ;
0176 8901      = 641 TOCIA:    ORL     P1,#ETEST      ;TEST CONTROL ACTIVE
0178 B803      = 642           MOV     R0,#EFCRST
017A 90        = 643           MOVX    @R0,A          ;RESET FCA
               = 644 ;
017B B802      = 645           MOV     R0,#EOCIA
017D 23AA      = 646           MOV     A,#0AAH
017F 90        = 647           MOVX    @R0,A          ;WRITE BYTE TO FCA SR
               = 648 ;
0180 27        = 649           CLR     A
0181 B809      = 650           MOV     R0,#09H        ;LOOP COUNTER
0183 468C      = 651           JNT1    TOC50          ;JUMP IF RDATA NOT HIGH TO START WITH
               = 652 ;
0185 3C        = 653 TOC10:    MOVD    P4,A           ;GENERATE A CLKIN*
0186 E7        = 654           RL      A
0187 468A      = 655           JNT1    TOC20          ;JUMP IF RDATA NOT IN ONE STATE
0189 17        = 656           INC     A
018A E885      = 657 TOC20:    DJNZ    R0,TOC10       ;JUMP TO GENERATE 9 CLKIN* PULSES
               = 658 ;
018C D3AA      = 659 TOC50:    XRL     A,#0AAH        ;COMPARE RECEIVED BYTE
018E 6463      = 660           JMP     TOCRET         ;A=0 IF CHECK WAS GOOD
                 661 $         INCLUDE(:F3:PARITY.SRC)
               = 662 ;****************************************************************
               = 663 ;**              Subroutine Parity                             **
               = 664 ;** Function: From Accumulator, calculate parity bit (7), and place in acc. **
               = 665 ;** Date: 3-4-87                                               **
               = 666 ;** Subroutines Called: None                                   **
               = 667 ;** Registers/Flags affected: *R3,*R0, Accumulator             **
               = 668 ;** Ports affected: None                                       **
               = 669 ;** RAM locations affected: None                               **
               = 670 ;****************************************************************
               = 671 PARITY:
0190 537F      = 672           ANL     A,#7FH         ;CLEAR BIT 7 (PARITY BIT)
```

```
0192 D5       = 673           SEL     RB1
0193 B807     = 674           MOV     R0,#7D              ;SET BIT COUNTER
0195 AB       = 675           MOV     R3,A                ;SAVE ACCUMULATOR
0196 E7       = 676 SFTLFT:   RL      A                   ;ROTATE LEFT ACCUMULATOR 1 BIT
0197 DB       = 677           XRL     A,R3                ;EXCUSIVE-OR R3 AND ACCUMULATOR
0198 E896     = 678           DJNZ    R0,SFTLFT           ;IF ALL 7 BITS DONE, EXIT ROUTINE
019A 37       = 679           CPL     A
019B 5380     = 680           ANL     A,#80H              ;MASK BITS 6-0.  BIT 7 HAS PARITY.
019D 4B       = 681           ORL     A,R3                ;RESTORE BYTE TO ACCUMULATOR.
              = 682 ;BIT 7 IN ACCUMULATOR NOW REPRESENTS EVEN PARITY OVER BITS 6-0.
019E C5       = 683           SEL     RB0
019F 83       = 684           RET
              = 685 $         INCLUDE(:F3:SWSET.SRC)
              = 686 ;*********************************************************************
              = 687 ;**                      Subroutine SWSET.SRC                       **
              = 688 ;** Function: Read current scanner configuration from ram to host.  **
              = 689 ;**           B5 will show if switch or ram bit is set.             **
              = 690 ;** Date: 3-15-87                                                   **
              = 691 ;** Subroutines Called: SOCIA, PARITY                               **
              = 692 ;** Registers/Flags affected: *R0, *R2, ACCUMULATOR, R0, R3         **
              = 693 ;** Ports affected: None                                            **
              = 694 ;** RAM locations affected: None                                    **
              = 695 ;*********************************************************************
              = 696 SWSET:
              = 697 ;SEND HEADER 'G' FIRST
01A0 2307     = 698           MOV     A,#07H              ;'G' HEADER
01A2 34EB     = 699           CALL    SOCIA               ;SEND BYTE TO HOST
01A4 B908     = 700           MOV     R1,#SWLATC          ;CHECK B5 OF SWITCHES
01A6 81       = 701           MOVX    A,@R1               ; RETRIEVE SWITCH SETTINGS
01A7 5320     = 702           ANL     A,#00100000B        ; MASK OUT ALL BUT BIT 5
01A9 B97D     = 703           MOV     R1,#SWISET          ;SET RAM POINTER TO SWITCH SETTING STORAGE
01AB 41       = 704           ORL     A,@R1               ;RETRIEVE SWITCH SETTING FROM RAM
01AC 4340     = 705           ORL     A,#40H              ;SET LAST BYTE BIT
01AE 3490     = 706           CALL    PARITY              ;SET PARITY BIT (B7)
01B0 34EB     = 707           CALL    SOCIA               ;SEND BYTE TO HOST
01B2 83       = 708           RET
              = 709 $         INCLUDE(:F3:CKEPRM.SRC)
              = 710 ;*********************************************************************
              = 711 ;**                      Subroutine CKEPRM                          **
              = 712 ;** Function: Clock 8 bits from EEPROM.  Result stored in Accumulator **
              = 713 ;** Date: 3-2-87                                                    **
              = 714 ;** Subroutines Called: None                                        **
              = 715 ;** Registers/Flags affected: R0, Accumulator                       **
              = 716 ;** Ports affected: P1                                              **
              = 717 ;** RAM locations affected: None                                    **
              = 718 ;*********************************************************************
              = 719 CKEPRM:
01B3 8808     = 720           MOV     R0,#80              ;SET BIT COUNTER
01B5 27       = 721           CLR     A                   ;INITIALIZE ACCUMULATOR TO 0
01B6 268A     = 722 CKEPD0:   JNT0    RLACC               ;IF EEPROM_DO IS 0, DO NOT SET BIT 7.  JUMP TO ROTATE AC
01B8 4380     = 723           ORL     A,#80H              ;EEPROM_DO IS HIGH.  SET BIT 7.
01BA E7       = 724 RLACC:    RL      A                   ;SHIFT ACCUMULATOR LEFT ONE BIT.  (B7-B0)
01BB 8908     = 725           ORL     P1,#EPRMSK          ;CLOCK EEPROM_SK.  SET HIGH.
01BD 99F7     = 726           ANL     P1,#255-EPRMSK      ; SET EEPROM_SK LOW.
01BF E886     = 727           DJNZ    R0,CKEPD0           ;DECREMENT BIT COUNTER (R0); WHEN ALL 8 BITS ARE IN ACC.
01C1 83       = 728           RET
              = 729 $         INCLUDE(:F3:WRACC.SRC)
              = 730 ;*********************************************************************
              = 731 ;**                      Subroutine WRACC                           **
              = 732 ;** Function: Write accumulator to EEPROM                           **
              = 733 ;** Date: 2-26-87                                                   **
              = 734 ;** Subroutines Called: None                                        **
              = 735 ;** Registers/Flags affected: R0, Accumulator, F0, Carry            **
              = 736 ;** Ports affected: P1                                              **
              = 737 ;** RAM locations affected: None                                    **
              = 738 ;*********************************************************************
              = 739 ;F0=0 WHEN ROUTINE IS USED FOR SENDING OP CODE (9 BITS)
              = 740 ;F0=1 WHEN ROUTINE IS USED OFR SENDING DATA BITS (8 BITS)
              = 741 WRACC:
01C2 B6CE     = 742           JF0     DATA                ;IF F0=1 CLOCK OUT 8 DATA BITS
01C4 B809     = 743           MOV     R0,#90              ;ROUTINE SET TO SEND OP CODE (9 BITS)
01C6 8908     = 744           ORL     P1,#EPRMSK          ;CLOCK EEPROM_SK (SET HIGH)
01C8 99F7     = 745           ANL     P1,#255-EPRMSK      ; SET EEPROM_SK LOW
01CA 97       = 746           CLR     C                   ;SET START BIT
01CB A7       = 747           CPL     C                   ; STORED IN CARRY FLAG
01CC 24D1     = 748           JMP     SETDI
01CE B808     = 749 DATA:     MOV     R0,#80              ;ROUTINE SET TO SEND DATA. SET COUNTER TO 8 BITS
01D0 F7       = 750           RLC     A                   ;GET MSB INTO CARRY
01D1 F607     = 751 SETDI:    JC      SETDI1              ;IF CARRY, JUMP TO SET EEPROM_CS
01D3 99FB     = 752           ANL     P1,#255-EPRMDI      ;CARRY NOT SET.  SET EEPROM_DI TO '0'
01D5 24D9     = 753           JMP     CLKEPM              ;JUMP TO CLOCK EEPROM_SK
01D7 8904     = 754 SETDI1:   ORL     P1,#EPRMDI          ;CARRY SET.  SET EEPROM_DI TO '1'
01D9 8908     = 755 CLKEPM:   ORL     P1,#EPRMSK          ;CLOCK EEPROM_SK.  SET EEPROM_SK HIGH
01DB 99F3     = 756           ANL     P1,#255-EPRMSK-EPRMDI   ;RESET EEPROM_SK AND EEPROM_IN
              = 757 ;
01DD F7       = 758           RLC     A                   ;ROTATE LEFT THROUGH CARRY TO GET NEXT BIT
01DE E8D1     = 759           DJNZ    R0,SETDI            ;DECREMENT R0 BIT COUNTER AND JUMP IF NOT 0
01E0 83       = 760           RET
              = 761 $         INCLUDE(:F3:WAIT.SRC)
              = 762 ;*********************************************************************
              = 763 ;**                      Subroutine WAIT                            **
              = 764 ;** Function: Wait 'A' milli-seconds                                **
```

```
                = 765 ;** Date: 2-26-87                                                              **
                = 766 ;** Subroutines Called: None                                                   **
                = 767 ;** Registers/Flags affected:  *R1, *R2, ACCUMULATOR                           **
                = 768 ;** Ports affected: None                                                       **
                = 769 ;** RAM locations affected: None                                               **
                = 770 ;*********************************************************************
                = 771 Wait:
01E1 D5         = 772         SEL     RB1
01E2 AA         = 773         MOV     R2,A                    ;SAVE ACCUMULATOR
01E3 B9C8       = 774 WAIT0:  MOV     R1,#200D                ;SET R1 TO EQUAL 1 MILLI-SECOND DELAY
01E5 E9E5       = 775 WAIT1:  DJNZ    R1,WAIT1                ;LOOP FOR 1 MILLI-SECOND
01E7 EAE3       = 776         DJNZ    R2,WAIT0                ;LOOP FOR 'A' MILLI-SECONDS
01E9 C5         = 777         SEL     RB0
01EA 83         = 778         RET
                  779 $       INCLUDE(:F3:SOCIA.SRC)
                = 780 ;*********************************************************************
                * 781 ;**                     Subroutine SOC1A                                       **
                * 782 ;** Function: Send Accumulator to VLSI ocia buffer to be transmitted to host**
                * 783 ;** Date: 3-4-87                                                              **
                * 784 ;** Subroutines Called: None                                                   **
                = 785 ;** Registers/Flags affected:  *R0, *R2, ACCUMULATOR                           **
                = 786 ;** Ports affected: None                                                       **
                = 787 ;** RAM locations affected: None                                               **
                = 788 ;*********************************************************************
                = 789 SOCIA:
01EB D5         = 790         SEL     RB1                     ;SELECT REGISTER BANK 1
01EC AA         = 791         MOV     R2,A                    ;SAVE ACCUMULATOR
01ED 0A         = 792 CKSENT: IN      A,P2                    ;CHECK VLSI SENTB LINE
01EE 92ED       = 793         JB4     CKSENT                  ;IF NOT READY, RE-CHECK VLSI CHIP.
                = 794 ;READY TO SEND BYTE.
01F0 B802       = 795         MOV     R0,#EOCIA               ;SET EXTERNAL ADDRESS POINTER TO VLSI CHIP'S OCIA BUFFER
01F2 FA         = 796         MOV     A,R2                    ;RETRIEVE DATA TO BE SENT.
01F3 90         = 797         MOVX    @R0,A                   ;SEND DATA TO VLSI CHIP.
01F4 C5         = 798         SEL     RB0
01F5 83         = 799         RET
                  800 ;*************************************************
01F6 A3           801 TROPG1: MOVP    A,@A
01F7 83           802         RET
0200              803         ORG     200H
                  804 $       INCLUDE(:F3:TTAG.SRC)
                = 805 ;*********************************************************************
                = 806 ; ROUTINE: TTAG  06-19-86 15:30  BOB ACTIS
                = 807 ; UPDATES: MODIFIED 3-17-87 FOR TEC BY RANDY ELLIOTT
                = 808 ; FUNCTION: CHECK DIGITAL LOGIC FOR CAPTURE OF 6 INCREASINGLY
                = 809 ;           LARGER TAGS - 012345 678912 .  THE SYMBOL CAPTURE
                = 810 ;           PROCESSING IS USED TO COLLECT THE SEGMENTS FROM THE FCA.
                = 811 ;
0200 FE         = 812 TTATAB: DB      0FEH,9AH,64H,16H,0B7H,0DDH,0ABH
0201 9A         =
0202 64         =
0203 16         =
0204 B7         =
0205 DD         =
0206 AB         =
0207 3A         = 813         DB      3AH,0B9H,42H,0B6H,59H,2EH,03EH
0208 B9         =
0209 42         =
020A B6         =
020B 59         =
020C 2E         =
020D 3E         =
020E B803       = 814 TTAG:   MOV     R0,#EFCRST
0210 90         = 815         MOVX    @R0,A           ;RESET FCA
0211 8901       = 816         ORL     P1,#ETEST       ;TEST CONTROL ACTIVE
0213 B800       = 817         MOV     R0,#LOW TTATAB          ; R0 POINTS TO CHAR GEN TABLE
0215 BE06       = 818         MOV     R6,#06H ;THIS ROUTINE CHECKS DIGITAL LOGIC
0217 BF06       = 819         MOV     R7,#06H ;FOR CAPTURE OF 6 INCREASINGLY LARGER
0219 B908       = 820         MOV     R1,#08H ;TAGS 012345 678912..................
021B BB0E       = 821         MOV     R3,#0EH ;UNPACK DATA CONSTANT
021D F8         = 822 UNPK1:  MOV     A,R0
021E BA04       = 823         MOV     R2,#04H ;UNPACK DATA CONSTANT
0220 A3         = 824         MOVP    A,@A
0221 AC         = 825         MOV     R4,A    ;TEMP STORE
0222 5301       = 826 UNPK2:  ANL     A,#01H  ;STRIP OUT ONE BIT
0224 E7         = 827         RL      A
0225 17         = 828         INC     A
0226 47         = 829         SWAP    A
0227 AD         = 830         MOV     R5,A
0228 FC         = 831         MOV     A,R4
0229 77         = 832         RR      A
022A AC         = 833         MOV     R4,A
022B 5301       = 834         ANL     A,#01H
022D E7         = 835         RL      A
022E 17         = 836         INC     A
022F 6D         = 837         ADD     A,R5
0230 A1         = 838         MOV     @R1,A
0231 19         = 839         INC     R1
0232 FC         * 840         MOV     A,R4
0233 77         * 841         RR      A
0234 AC         * 842         MOV     R4,A
0235 EA22       * 843         DJNZ    R2,UNPK2
0237 18         * 844         INC     R0
```

```
0238 EB1D      = 845            DJNZ    R3,UNPK1
               = 846 ;
               = 847 ; SETUP TEST BIT ON PORT 1
               = 848 ;
023A 2391      = 849            MOV     A,#ETEST+ELASDB+ETONE
023C 39        = 850            OUTL    P1,A
               = 851 ;
023D BB02      = 852            MOV     R3,#02H
023F BD06      = 853            MOV     R5,#06H
0241 BA38      = 854 TEST1:     MOV     R2,#38H    ;START TAG POINTER
0243 B83F      = 855            MOV     R0,#3FH
0245 FD        = 856 TEST2:     MOV     A,R5       ;START TAG OUTPUT
0246 68        = 857            ADD     A,R3
0247 AC        = 858            MOV     R4,A
0248 EC48      = 859 TEST3:     DJNZ    R4,TEST3
024A F0        = 860            MOV     A,@R0
               = 861 ;
024B 3251      = 862            JB1     TST31      ;JUMP = SEND SPACE
024D 99FD      = 863            ANL     P1,#0FFH-ETMARK
024F 4455      = 864            JMP     TST32
0251 8902      = 865 TST31:     ORL     P1,#ETMARK
0253 00        = 866            NOP
0254 00        = 867            NOP
               = 868 ;
0255 FD        = 869 TST32:     MOV     A,R5
0256 68        = 870            ADD     A,R3
0257 AC        = 871            MOV     R4,A
0258 EC58      = 872 TEST4:     DJNZ    R4,TEST4
025A F0        = 873            MOV     A,@R0
               = 874 ;
025B 47        = 875            SWAP    A
025C 3262      = 876            JB1     TST41      ;JUMP = SEND SPACE
025E 99FD      = 877            ANL     P1,#0FFH-ETMARK
0260 4466      = 878            JMP     TST42
0262 8902      = 879 TST41:     ORL     P1,#ETMARK
0264 00        = 880            NOP
0265 00        = 881            NOP
               = 882 ;
0266 C8        = 883 TST42:     DEC     R0
0267 EA45      = 884            DJNZ    R2,TEST2   ;END OF TAG
0269 ED41      = 885            DJNZ    R5,TEST1   ;END OF ALL TAGS
               = 886 ;
026B F5        = 887            SEL     MB1
026C 1400      = 888            CALL    CLR6SG     ;CLEAR 6 CHAR SEG BUFFS & COUNTERS
026E E5        = 889            SEL     MB0
               = 890 ;
026F BE18      = 891            MOV     R6,#24     ;SHOULD BE ONLY 12 SEGS, TRY FOR MORE
0271 FC        = 892            MOV     A,R4
0272 4301      = 893            ORL     A,#ESCNG   ;SET SCAN FLAG SO CKFCA WILL
0274 AC        = 894            MOV     R4,A       ;PUT SEGMENTS INTO THE SCAN BUFF
0275 F5        = 895 GETLUP:    SEL     MB1
0276 14A4      = 896            CALL    CKFCA      ;GET SEG, IF ANY, FROM FCA
0278 5404      = 897            CALL    PROCSG     ;PUT SEG, IF ANY, INTO SEG BUFF
027A E5        = 898            SEL     MB0
027B EE75      = 899            DJNZ    R6,GETLUP  ;GO CHECK FOR MORE SEGMENTS
               = 900 ;
027D 85        = 901            CLR     F0         ;SETUP FOR RIGHT HALF LOOP
027E B82C      = 902            MOV     R0,#L6SCNT
0280 F0        = 903 TCKCNT:    MOV     A,@R0      ;GET L OR R COUNT
0281 18        = 904            INC     R0
0282 60        = 905            ADD     A,@R0      ;GET L OR R TOTAL
0283 03F4      = 906            ADD     A,#-12
0285 96A7      = 907            JNZ     TTA90      ;JUMP IF X6SCNT+X6STOT<>12
               = 908 ;
0287 B834      = 909            MOV     R0,#R6SCNT
0289 95        = 910            CPL     F0
028A B680      = 911            JF0     TCKCNT     ;JUMP TO DO RIGHT HALF
               = 912 ;
028C BA04      = 913            MOV     R2,#4      ;4 BYTES TO COMPARE
028E B824      = 914            MOV     R0,#L6S1
0290 B9A9      = 915            MOV     R1,#LOW TTACHK  ;DATA CHECK TABLE
0292 F9        = 916 LOOPCK:    MOV     A,R1
0293 A3        = 917            MOVP    A,@A
0294 D0        = 918            XRL     A,@R0
0295 96A7      = 919            JNZ     TTA90      ;JMP IF BAD CHECK OF DATA
               = 920 ;
0297 18        = 921            INC     R0
0298 19        = 922            INC     R1
0299 EA92      = 923            DJNZ    R2,LOOPCK
               = 924 ;
029B B82E      = 925            MOV     R0,#R6S1
029D BA03      = 926            MOV     R2,#3      ;3 BYTES TO COMPARE
029F 95        = 927            CPL     F0
02A0 B692      = 928            JF0     LOOPCK     ;JUMP TO DO RIGHT HALF
               = 929 ;
02A2 B87F      = 930            MOV     R0,#7FH    ;LOOP COUNTER, RAM SIZE
02A4 A0        = 931 CLRRAM:    MOV     @R0,A      ;A=0 AT THIS POINT, TEST PASSED
02A5 E8A4      = 932            DJNZ    R0,CLRRAM  ;CLEAR ALL RAM AFTER TESTING
               = 933 ;
02A7 6468      = 934 TTA90:     JMP     TTARET     ;A=0 FOR SUCCESFUL COMPLETION
               = 935 ;
02A9 01        = 936 TTACHK:    DB      01H,23H,45H,0CH
```

```
02AA 23         =
02AB 45         =
02AC 0C         =
02AD 67         = 937        DB       67H,89H,12H
02AE 89         =
02AF 12         =
                 938 $       INCLUDE(:F3:RDEPRM.SRC)
                = 939 ;*************************************************************
                = 940 ;**                     Subroutine RDEPRM                    **
                = 941 ;** Function: Read EEPROM and store at starting address @R1 (Packed Data) **
                = 942 ;** Date: 3-3-87                                              **
                = 943 ;** Subroutines Called: WRACC, CKEPRM                         **
                = 944 ;** Registers/Flags affected: R0, Accumulator, F0, Carry, R1, R2, R3 **
                = 945 ;** Ports affected: P1, P2                                    **
                = 946 ;** RAM locations affected: @R1 to @R1+16                     **
                = 947 ;*************************************************************
                = 948 ;R1 stores Ram location to start writing to upon entry into this routine.
                = 949 RDEPRM:
                = 950 ;INITIALIZE REGISTERS AND PORTS
02B0 BB08       = 951        MOV      R3,#8D              ;SET 'LABEL SET' COUNTER TO 8
02B2 BA80       = 952        MOV      R2,#OPREAD          ;SET OPCODE TO READ
02B4 8A80       = 953 SETCS: ORL      P2,#EPRMCS          ;SET EEPROM_CS HIGH
                = 954 ;SEND OPCODE TO READ DATA
02B6 85         = 955        CLR      F0                  ;SET F0=0 FOR OPCODE TO WRITE
02B7 FA         = 956        MOV      A,R2                ;PUT OPCODE AND ADDRESS IN ACCUMULATOR
02B8 34C2       = 957        CALL     WRACC               ;SEND OPCODE/ADDRESS TO EEPROM
                = 958 ;GET RID OF START BIT.  CLOCK SK.
02BA 8908       = 959        ORL      P1,#EPRMSK          ;SET EEPROM_SK HIGH
02BC 99F7       = 960        ANL      P1,#255-EPRMSK      ;SET EEPROM_SK LOW
                = 961 ;RETRIEVE BITS 15-8 FROM EEPROM (LABEL 1)
02BE 34B3       = 962        CALL     CKEPRM              ;CLOCK MOST SIGNIFICANT 8 BITS FROM EEPROM
                = 963 ;STORE BITS 15-8 TO RAM @R1 (LABEL 1)
02C0 A1         = 964        MOV      @R1,A               ;STORE ACCUMULATOR TO RAM @R1
02C1 19         = 965        INC      R1                  ;INCREMENT RAM POINTER TO NEXT LOCATION
                = 966 ;RETRIEVE BITS 7-0 FROM EEPROM (LABEL 2)
02C2 34B3       = 967        CALL     CKEPRM              ;CLOCK LEAST SIGNIFICANT 8 BITS FROM EEPROM
02C4 A1         = 968        MOV      @R1,A               ;STORE ACCUMULATOR TO RAM @R1
                = 969 ;SET EEPROM_CS LOW AND ADJUST COUNTERS AND POINTERS
02C5 9A7F       = 970        ANL      P2,#255-EPRMCS      ;SET EEPROM_CS LOW
02C7 19         = 971        INC      R1                  ;INCREMENT RAM POINTER
02C8 1A         = 972        INC      R2                  ;INCREMENT EEPROM POINTER
02C9 EBB4       = 973        DJNZ     R3,SETCS            ;DECREMENT LABEL SET COUNTER. IF ZERO, RETURN.
02CB 83         = 974        RET
                  975 $      INCLUDE(:F3:DISLAS.SRC)
                = 976 ;*************************************************************
                = 977 ;**                     Subroutine DISLAS                    **
                = 978 ;** Function: Clear scan buffer ram and reset VLSI           **
                = 979 ;** Date: 3-14-87                                            **
                = 980 ;** Subroutines Called: None                                 **
                = 981 ;** Registers/Flags affected: R4, R1, Accumulator            **
                = 982 ;** Ports affected: P1                                       **
                = 983 ;** RAM locations affected: Version flags and scan buffers   **
                = 984 ;*************************************************************
                = 985 DISLAS:
02CC 999F       = 986        ANL      P1,#255-EGDLT-EBDLT ;TURN OFF GDLT AND BDLT
02CE FC         = 987        MOV      A,R4                ;RETRIEVE SCANNING STATUS
02CF 5304       = 988        ANL      A,#EAMBMS           ;MASK ALL BUT AMBIGUITY ENABLE BIT
02D1 AC         = 989        MOV      R4,A                ;DISABLE SCANNING
                = 990 ;CLEAR VLSI CHIP (GET RID OF LEFT OVER DATA FROM HOST)
02D2 B903       = 991        MOV      R1,#EFCRST          ;VLSI RESET ADDRESS
02D4 91         = 992        MOVX     @R1,A               ; RESET VLSI CHIP
02D5 44E6       = 993        JMP      RAMRT
                = 994 ENLAS:
02D7 999F       = 995        ANL      P1,#255-EGDLT-EBDLT ;TURN OFF GDLT AND BDLT
02D9 B901       = 996        MOV      R1,#EFRRST          ;RESET FRAME CONTROL (SDATA REGISTER)
02DB 91         = 997        MOVX     @R1,A
02DC FC         = 998        MOV      A,R4                ;RETRIEVE SCANNING STATUS
02DD 4301       = 999        ORL      A,#ESCNG            ;ENABLE SCANNING
02DF AC         =1000        MOV      R4,A                ;SAVE SCANNING STATUS
02E0 F5         =1001        SEL      MB1
02E1 9461       =1002        CALL     CLRVER              ;CLEAR VERSION FLAGS AND DATA
02E3 140C       =1003        CALL     CLRSNB              ;CLEAR SCANNER BUFFERS
02E5 E5         =1004        SEL      MB0
                =1005 ;ALL SCANNER BUFFER RAM CLEARED ALONG WITH SCANNER FLAGS. RETURN.
02E6 8920       =1006 RAMRT: ORL      P1,#EGDLT           ;TURN ON GDLT FOR .5 SECONDS
02E8 83         =1007        RET
                 1008 ;*******************************************
02E9 A3          1009 TROPG2: MOVP    A,@A
02EA 83          1010        RET
0300             1011        ORG      300H
                 1012 $      INCLUDE(:F3:TMOTOR.SRC)
                =1013 ;*******************************************
                =1014 ; FILE: TMOTOR.SRC  2-18-87 10:50  BOB ACTIS
                =1015 ; FUNCTION: TEST THE MOTOR AND UP2SPD SIGNAL
                =1016 ; ENTRY: NO SETUP
                =1017 ; EXIT: USES R3,R7
                =1018 ;
0300 8912       =1019 TMOTOR: ORL     P1,#ELASDB+EMTREB   ;LASER OFF, MOTOR ON
0302 55         =1020        STRT     T
0303 25         =1021        EN       TCNTI               ;ENABLE THE TIMER
                =1022 ;
0304 BF05       =1023        MOV      R7,#(5*FACTOR)      ;SET TIMER FOR 100MSEC
```

```
0306 FF      =1024 TMOT10: MOV    A,R7
0307 9606    =1025         JNZ    TMOT10          ;WAIT FOR MOTOR CIRCUIT TO POWER UP
             =1026 ;
0309 0A      =1027         IN     A,P2
030A 37      =1028         CPL    A
030B B231    =1029         JB5    TMOT50          ;JUMP IF NOT UP2SPD
             =1030 ;
             =1031 ; MOTOR OFF AND WAIT FOR IT TO SLOW.  FLASH BOTH LIGHTS.
030D 99FD    =1032         ANL    P1,#255-EMTREB  ;MOTOR OFF
030F BB32    =1033 TMOT20: MOV    R3,#50          ;SET LOOP COUNTER
0311 BF05    =1034 TMOT22: MOV    R7,#(5*FACTOR)           ;SET TIMER FOR 100MSEC
0313 1448    =1035 TMOT24: CALL   CK4HRS          ;CHECK FOR HORSE CONTROL BYTE
0315 FF      =1036         MOV    A,R7            ;10MSEC*10*50=5SEC
0316 9613    =1037         JNZ    TMOT24          ;WAIT BETWEEN LIGHT TOGGLES
             =1038 ;
0318 CB      =1039         DEC    R3              ;DECREMENT LOOP COUNTER
0319 FB      =1040         MOV    A,R3
031A C625    =1041         JZ     TMOT28          ;JUMP IF FINISHED WAITING
             =1042 ;
031C 09      =1043         IN     A,P1
031D 999F    =1044         ANL    P1,#255-(EGDLT+EBDLT)   ;LIGHTS OFF
031F B211    =1045         JB5    TMOT22          ;JUMP IF GDLT WAS ON
             =1046 ;
0321 8960    =1047         ORL    P1,#EGDLT+EBDLT ;LIGHTS ON
0323 6411    =1048         JMP    TMOT22
             =1049 ;
0325 999F    =1050 TMOT28: ANL    P1,#255-(EGDLT+EBDLT)   ;LIGHTS OFF
             =1051 ;
0327 8902    =1052         ORL    P1,#EMTREB      ;MOTOR ON
0329 BF05    =1053         MOV    R7,#(5*FACTOR)           ;SET TIMER FOR 100 MSEC
032B FF      =1054 TMOT40: MOV    A,R7
032C 962B    =1055         JNZ    TMOT40          ;WAIT FOR MOTOR CIRCUIT TO POWER UP
             =1056 ;
032E 0A      =1057         IN     A,P2
032F B24A    =1058         JB5    TMOT90          ;JUMP IF ALREADY UP2SPD ... FAILED
             =1059 ;
             =1060 ; WAIT 30 SECONDS FOR THE MOTOR TO GET UP2SPD.  FLASH GREEN LIGHT.
0331 BBFA    =1061 TMOT50: MOV    R3,#250         ;SET LOOP COUNTER
0333 BF06    =1062 TMOT60: MOV    R7,#(6*FACTOR)           ;SET TIMER FOR 120 MSEC
0335 1448    =1063 TMOT80: CALL   CK4HRS          ;CHECK FOR HORSE CONTROL BYTE
0337 FF      =1064         MOV    A,R7            ;10MS*12*250=30SEC
0338 9635    =1065         JNZ    TMOT80          ;WAIT BETWEEN LIGHT TOGGLES
             =1066 ;
033A 0A      =1067         IN     A,P2
033B B24F    =1068         JB5    TMOT95          ;JUMP IF MOTOR IS UP2SPD ... PASSED
             =1069 ;
033D CB      =1070         DEC    R3              ;DECREMENT LOOP COUNTER
033E FB      =1071         MOV    A,R3
033F C64A    =1072         JZ     TMOT90          ;JUMP IF TIMED OUT ... FAILED
             =1073 ;
0341 09      =1074         IN     A,P1            ;TOGGLE GDLT WHILE WAITING FOR UP2SPD
0342 990F    =1075         ANL    P1,#255-EGDLT   ;GDLT OFF
0344 B233    =1076         JB5    TMOT60          ;JUMP IF GDLT WAS ON
             =1077 ;
0346 8920    =1078         ORL    P1,#EGDLT       ;GDLT ON
0348 6433    =1079         JMP    TMOT60          ;CONTINUE WAITING FOR UP2SPD
             =1080 ;
             =1081 ; COME HERE IF THE TEST FAILED
034A 99FD    =1082 TMOT90: ANL    P1,#255-EMTREB  ;MOTOR OFF
034C 27      =1083         CLR    A
034D 37      =1084         CPL    A               ;SET FAILED FLAG
034E 83      =1085         RET
             =1086 ;
             =1087 ; COME HERE IS THE TEST PASSED
034F 27      =1088 TMOT95: CLR    A               ;SET PASSED FLAG
0350 83      =1089         RET
              1090 $       INCLUDE(:F3:TPON.SRC)
             =1091 ;**********************************************************
             =1092 ; FILE: TPON.SRC  7-03-86 10:45  BOB ACTIS
             =1093 ; FUNCTION:  PERFORM SELF-TESTS
             =1094 ;
0351 2400    =1095 TPON:   JMP    TROMSM
             =1096 TRORET:
             =1097 ;*******************CHECKSUM OF ROM CHECKED HERE*****************
0353 C659    =1098         JZ     TPON20          ;JUMP IF THE CHECKSUM PASSED
0355 B800    =1099         MOV    R0,#0           ;NO BEEPS WITH THIS ERROR
0357 647D    =1100         JMP    TPON90
             =1101 ;**********************************************************
0359 2431    =1102 TPON20: JMP    TRAM
035B C661    =1103 TRARET: JZ     TPON30          ;JUMP IF THE RAM TEST PASSED
035D B801    =1104         MOV    R0,#1           ;ONE BEEP FOR THIS ERROR
035F 647D    =1105         JMP    TPON90
             =1106 ;
0361 2476    =1107 TPON30: JMP    TOCIA
0363 C669    =1108 TOCRET: JZ     TPON40          ;JUMP IF THE OCIA TEST PASSED
0365 B802    =1109         MOV    R0,#2           ;TWO BEEPS FOR THIS ERROR
0367 647D    =1110         JMP    TPON90
             =1111 ;
0369 440E    =1112 TPON40: JMP    TTAG
036B 99FC    =1113 TTARET: ANL    P1,#255-(ETEST+ETMARK)  ;CLEAR TEST AND TEST MARK LINES
036D C673    =1114         JZ     TPON50          ;JUMP IF THE TTAG TEST PASSED
036F B803    =1115         MOV    R0,#3           ;THREE BEEPS FOR THIS ERROR
```

```
0371 647D    =1116        JMP     TPON90
             =1117 ;
0373 7400    =1118 TPON50: CALL   TMOTOR
0375 C67B    =1119        JZ      TPON60      ;JUMP IF THE MOTOR TEST PASSED
0377 B804    =1120        MOV     R0,#4       ;FOUR BEEPS FOR THIS ERROR
0379 647D    =1121        JMP     TPON90
             =1122 ;
037B 6487    =1123 TPON60: JMP    TPORET      ;RETURN FROM THE POWER UP TESTS
             =1124 ;
037D 7481    =1125 TPON90: CALL   TERRWT      ;ERRORS COME HERE
037F 0400    =1126        JMP     RSTTRP      ;RESTART THE PROGRAM
             1127 $       INCLUDE(:F3:TERRWT.SRC)
             =1128 ;****************************************************
             =1129 ; FILE:  TERRWT.SRC  2-18-87 10:50  BOB ACTIS
             =1130 ; FUNCTION:  SELFTEST ERROR ROUTINE
             =1131 ;            BEEP R0 TIMES AND WAIT 1 SECOND
             =1132 ; ENTRY: R0 = NUMBER OF BEEPS
             =1133 ; EXIT:  USES R0, R7
             =1134 ;
0381 99DF    =1135 TERRWT: ANL    P1,#255-EGDLT  ;GDLT OFF
0383 8940    =1136        ORL     P1,#EBDLT      ;BDLT ON
             =1137 ;
0385 55      =1138        STRT    T
0386 25      =1139        EN      TCNTI          ;ENABLE THE TIMER OPERATION
             =1140 ;
0387 F8      =1141 TERR02: MOV    A,R0
0388 C69A    =1142        JZ      TERR10         ;JUMP IF NO BEEPS
             =1143 ;
038A D5      =1144 TERR04: SEL    RB1
038B BD28    =1145        MOV     R5,#ETONCT     ;SET THE TONE CYCLE COUNTER
038D BE02    =1146        MOV     R6,#(2*FACTOR) ;SET BEEP TIMER FOR 40 MSEC
038F FE      =1147 TERR06: MOV    A,R6
0390 968F    =1148        JNZ     TERR06         ;WAIT FOR BEEP TO END
0392 C5      =1149        SEL     RB0
             =1150 ;
0393 BF03    =1151        MOV     R7,#(3*FACTOR) ;SET TIMER FOR 60 MSEC
0395 FF      =1152 TERR08: MOV    A,R7
0396 9695    =1153        JNZ     TERR08         ;WAIT BETWEEN BEEPS
             =1154 ;
0398 E88A    =1155        DJNZ    R0,TERR04      ;BEEP LOOP
             =1156 ;
039A BF32    =1157 TERR10: MOV    R7,#(E1000M*FACTOR)  ;SET TIMER FOR 1 SECOND
039C FF      =1158 TERR12: MOV    A,R7
039D 969C    =1159        JNZ     TERR12
             =1160 ;
039F B903    =1161        MOV     R1,#EFCRST     ;RESET VLSI CHIP TO GET RID OF GARBAGE.
03A1 91      =1162        MOVX    @R1,A
03A2 83      =1163        RET
             1164 $       INCLUDE(:F3:FPOWUP.SRC)
             =1165 ;****************************************************
             =1166 ; FILE: FPOWUP.SRC  02-18-87 11:25  BOB ACTIS
             =1167 ; ROUTINE: POWUP
             =1168 ; FUNCTION: INITIALIZE SYSTEM
             =1169 ; UPDATES: 3-17-87 MODIFIED FOR TEC BY RANDY ELLIOTT
             =1170 ;
03A3 93      =1171 POW00: RETR                   ;RESET THE IIP FLIP-FLOP
03A4         =1172 POWUP  EQU     $
03A4 15      =1173        DIS     I
03A5 35      =1174        DIS     TCNTI
03A6 27      =1175        CLR     A
03A7 D7      =1176        MOV     PSW,A
03A8 74A3    =1177        CALL    POW00          ;RESET IIP BIT
             =1178 ;
             =1179 ; SETUP PORTS
             =1180 ;
03AA 233F    =1181        MOV     A,#255-EVLSIR-EPRMCS  ;PWR RST THE VLSI AND CLEAR EEPROM_CS
03AC 3A      =1182        OUTL    P2,A
03AD 8A40    =1183        ORL     P2,#EVLSIR     ;ENABLE VLSI TO RUN
03AF 2390    =1184        MOV     A,#ETONE+ELASDB
03B1 39      =1185        OUTL    P1,A
             =1186 ;
             =1187 ; RESET THE FRAME CONTROL ARRAY
             =1188 ;
03B2 B803    =1189        MOV     R0,#EFCRST
03B4 90      =1190        MOVX    @R0,A
             =1191 ;
             =1192 ; GO PERFORM THE POWER UP TESTS.
             =1193 ; STICK IN TPON LOOP IF ANY FAILURES.
             =1194 ;
03B5 6451    =1195        JMP     TPON
03B7         =1196 TPORET EQU     $
             =1197 ;
             =1198 ; CLEAR DATA MEMORY AND PSW
03B7 27      =1199        CLR     A
03B8 D7      =1200        MOV     PSW,A
03B9 B87F    =1201        MOV     R0,#7FH
03BB A0      =1202 POW10: MOV     @R0,A
03BC EBBB    =1203        DJNZ    R0,POW10
             =1204 ;
             =1205 ; START THE INTERNAL TIMER
             =1206 ;
03BE D5      =1207        SEL     RB1
             =1208 ;SET THE TONE CYCLE COUNTER
```

```
03BF B46C    =1209           CALL    TON1CT          ;SET R5 ACCORDING TO SWITCH SETTINGS
03C1 C5      =1210           SEL     RB0
03C2 55      =1211           STRT    T
03C3 25      =1212           EN      TCNTI
             =1213 ;
             =1214 ; GOOD LIGHT, GOOD POWER UP TONE, LASER ON AND WAIT 1 SEC.
             =1215 ;
03C4 8920    =1216           ORL     P1,#EGDLT
03C6 D5      =1217           SEL     RB1
03C7 BE0A    =1218           MOV     R6,#(10*FACTOR)     ;200MSEC TONE
03C9 C5      =1219           SEL     RB0
03CA 99EF    =1220           ANL     P1,#255-ELASDB      ;LASER ON, TIME TO START BEFORE RDTAG
03CC BF32    =1221           MOV     R7,#(E1000M*FACTOR)
03CE FF      =1222 TPON15:   MOV     A,R7
03CF 96CE    =1223           JNZ     TPON15              ;WAIT
             =1224 ;
             =1225 ; REINITIALIZE AFTER TEST SEQUENCE
             =1226 ;
03D1 99CF    =1227 POW20:    ANL     P1,#255-(EGDLT+ELASDB) ;GOOD LIGHT OFF & LASER ON
03D3 8942    =1228           ORL     P1,#EBDLT+EMTREB    ;BAD LIGHT ON & MOTOR ON
             =1229 ;
03D5 B803    =1230           MOV     R0,#EFCRST
03D7 90      =1231           MOVX    @R0,A               ;RESET THE FCA
03D8 BF02    =1232           MOV     R7,#(2*FACTOR)      ;SET TIMER FOR 40 MSEC
03DA FF      =1233 POW25:    MOV     A,R7
03DB 960A    =1234           JNZ     POW25               ;WAIT FOR FCA TO SEE SEGS IF ANY
             =1235 ;
             =1236 ; CLEAR DATA MEMORY AND PSW
03DD 27      =1237           CLR     A
03DE D7      =1238           MOV     PSW,A
03DF B87F    =1239           MOV     R0,#7FH
03E1 A0      =1240 POW30:    MOV     @R0,A
03E2 E8E1    =1241           DJNZ    R0,POW30
             =1242 ;
03E4 D5      =1243           SEL     RB1
             =1244 ;SET TONE CYCLE COUNTER
03E5 B46C    =1245           CALL    TON1CT              ;SET R5 ACCORDING TO SWITCH SETTING
03E7 C5      =1246           SEL     RB0
             =1247 ;
             =1248 ;LOAD EEPROM TO RAM FOR TWO LABEL READ.
03E8 B967    =1249           MOV     R1,#TWOLAB          ;SET RAM POINTER
03EA 54B0    =1250           CALL    RDEPRM              ;TRANSFER EEPROM TO RAM
             =1251 ;LOAD SWITCH SETTINGS TO RAM
03EC B908    =1252           MOV     R1,#SWLATC          ;SET POINTER TO READ SWITCHES
03EE B87D    =1253           MOV     R0,#SWISET          ;SET RAM POINTER TO SWITCH SETTINGS
03F0 81      =1254           MOVX    A,@R1               ;READ SWITCHES
03F1 53DF    =1255           ANL     A,#11011111B        ;MASK OUT B5, FLAG PROGRAMMING VIA LABLE READ.
03F3 A0      =1256           MOV     @R0,A               ;STORE SWITCH SETTINGS IN RAM.
             =1257 ;INITIALIZATION DONE. BEGIN READING TAGS.
03F4 F5      =1258           SEL     MB1
03F5 C400    =1259           JMP     RDTAG
             1260 ;************************************
03F7 A3      1261 TROPG3:    MOVP    A,@A
03F8 83      1262           RET
0400         1263           ORG     400H
             1264 $         INCLUDE(:F3:FSDATA.SRC)
             =1265 ;**********************************************************************
             =1266 ; FILE:  FSDATA.SRC   10-25-83 16:55  BOB ACTIS
             =1267 ;        MODIFIED     04-02-86        DREW TAUSSIG
             =1268 ;        MODIFIED     11-18-86 13:50  BOB ACTIS
             =1269 ;        MODIFIED     02-18-87 10:15  BOB ACTIS
             =1270 ;        MODIFIED     03-14-87 20:23  RANDY ELLIOTT
             =1271 ;
             =1272 ; ROUTINE: SDATA
             =1273 ; FUNCTION: CHECK SDATA FOR VALID COMMANDS.
             =1274 ;           IF VALID COMMAND, TAKE APPROPRIATE ACTION.
             =1275 ;           IF NOT VALID, RESET THE PROGRAM.
             =1276 ; ENTRY: RB0
             =1277 ;         SDATA READY IN FCA
             =1278 ; EXIT:  USES R0,A
             =1279 ;
             =1280 ;
             =1281 ;RETRIEVE COMMAND BYTE FROM VLSI CHIP AND STORE @STSDTA RAM
0400 B802    =1282 SDATA:    MOV     R0,#EOCIA           ;ENTERED FROM CKFCA ROUTINE
0402 80      =1283           MOVX    A,@R0               ;GET SDATA BYTE
0403 B87E    =1284           MOV     R0,#STSDTA          ;SAVE SDATA IN @R0.
0405 A0      =1285           MOV     @R0,A               ;STORE SDATA IN RAM
             =1286 ;CHECK COMMAND BYTE FOR ENABLE SCAN ('E') BY TURNING ON LASER.
0406 D345    =1287 SDATA1:   XRL     A,#ESEN
0408 960D    =1288           JNZ     SDATA2              ;JUMP IF NOT ENABLE SCAN CHAR
040A 99EF    =1289           ANL     P1,#255-ELASDB      ;LASER ON
040C 83      =1290           RET
             =1291 ;CHECK COMMAND BYTE FOR DISABLE SCAN ('D') BY TURNING OFF LASER.
040D B87E    =1292 SDATA2:   MOV     R0,#STSDTA
040F F0      =1293           MOV     A,@R0               ;GET COMMAND BYTE FROM RAM.
0410 D3C4    =1294           XRL     A,#ESDIS
0412 9617    =1295           JNZ     SDATA3              ;JUMP IF NOT DISABLE SCAN CHAR
0414 8910    =1296           ORL     P1,#ELASDB          ;LASER OFF
0416 83      =1297           RET
             =1298 ;CHECK COMMAND BYTE FOR WRITING TWO LABEL SETTINGS ('I') TO RAM FROM HOST.
0417 B87E    =1299 SDATA3:   MOV     R0,#STSDTA
0419 F0      =1300           MOV     A,@R0               ;GET COMMAND BYTE FROM RAM.
```

```
041A D389     =1301           XRL     A,#STRAM1       ; CHECK FOR 'I' CHARACTER.
041C 9625     =1302           JNZ     SDATA4          ;JUMP IF NOT 'I' CHARACTER.
041E 54CC     =1303           CALL    DISLAS          ;TURN LASER OFF AND CLEAR SCAN RAM.
0420 D400     =1304           CALL    STRRAM          ;WRITE TWO LABEL SETTINGS FROM HOST TO SCANNER RAM.
0422 54D7     =1305           CALL    ENLAS           ;TURN LASER ON AND CLEAR SCAN RAM.
0424 83       =1306           RET
              =1307 ;CHECK COMMAND BYTE FOR HORSE TEST ('D1')
0425 B87E     =1308 SDATA4:   MOV     R0,#STSDTA
0427 F0       =1309           MOV     A,@R0           ;GET COMMAND BYTE FROM RAM.
0428 D3D1     =1310           XRL     A,#EHCNTL
042A 963C     =1311           JNZ     SDATA5          ;JUMP IF NOT THE HORSE CONTROL BYTE
042C 27       =1312 SDATAH:   CLR     A         ;CLEAR STACK POINTER/RETURN LINKAGE SINCE
042D D7       =1313           MOV     PSW,A     ;WE WILL JUMP INTO HORSE TEST AND STAY THERE
042E C5       =1314           SEL     RB0
042F 85       =1315           CLR     F0              ;SETUP FOR HORSE TEST ENTRY
0430 95       =1316           CPL     F0
0431 A5       =1317           CLR     F1
0432 B830     =1318           MOV     R0,#TSEG1
0434 BB10     =1319           MOV     R3,#16
0436 99DF     =1320           ANL     P1,#255-EGDLT
0438 8950     =1321           ORL     P1,#EBDLT+ELASDB          ;BDLT INDICATES CNTL BYTE RECVD
043A 84A4     =1322           JMP     TH005
              =1323 ;CHECK COMMAND BYTE FOR TO WRITE TWO LABLE SETTINGS IN RAM TO EEPROM ('G').
043C B87E     =1324 SDATA5:   MOV     R0,#STSDTA
043E F0       =1325           MOV     A,@R0           ;RETRIEVE COMMAND BYTE FROM RAM
043F D3C7     =1326           XRL     A,#WRPRM1       ;COMPARE ACC. WITH 'G' CHARACTER
0441 964A     =1327           JNZ     SDATA6          ;JUMP - NOT WRITE SETTINGS TO EEPROM
0443 54CC     =1328           CALL    DISLAS          ;CLEAR SCAN RAM AND TURN OFF LASER
0445 B421     =1329           CALL    WREPRM          ;WRITE RAM DATA TO EEPROM
0447 54D7     =1330           CALL    ENLAS           ;CLEAR SCAN RAM AND TURN ON LASER
0449 83       =1331           RET
              =1332 ;CHECK COMMAND BYTE FOR TO READ EEPROM AND SEND DATA TO HOST ('H')
044A B87E     =1333 SDATA6:   MOV     R0,#STSDTA
044C F0       =1334           MOV     A,@R0           ;RETRIEVE COMMAND BYTE FROM RAM
044D D3C8     =1335           XRL     A,#TRPRM1       ;COMPARE ACC. WITH 'H' CHARACTER
044F 965C     =1336           JNZ     SDATA7          ;JUMP - NOT READ EEPROM AND SEND DATA TO HOST
0451 54CC     =1337           CALL    DISLAS          ;CLEAR SCAN RAM AND TURN OFF LASER
0453 D5       =1338           SEL     RB1
0454 B920     =1339           MOV     R1,#RCRAM       ;SET RAM POINTER TO SCRATCH PAD RAM
0456 C5       =1340           SEL     RB0
0457 145B     =1341           CALL    TREPRM          ;READ EEPROM AND SEND TO HOST.
0459 54D7     =1342           CALL    ENLAS           ;CLEAR SCAN RAM AND TURN OFF LASER.
045B 83       =1343           RET
              =1344 ;CHECK COMMAND BYTE FOR ENABLE AMB MESSAGE ('A')
045C B87E     =1345 SDATA7:   MOV     R0,#STSDTA
045E F0       =1346           MOV     A,@R0           ;RETRIEVE COMMAND BYTE FROM RAM
045F D3C1     =1347           XRL     A,#EAMESE
0461 9668     =1348           JNZ     SDATA8          ;JUMP IF NOT AMB MESSAGE ENABLE
0463 FC       =1349           MOV     A,R4
0464 4304     =1350           ORL     A,#EAMBMS       ;ENABLE AMB LABEL MESSAGE
0466 AC       =1351           MOV     R4,A
0467 83       =1352           RET
              =1353 ;CHECK COMMAND BYTE FOR DISABLE AMB MESSAGE ('B')
0468 B87E     =1354 SDATA8:   MOV     R0,#STSDTA
046A F0       =1355           MOV     A,@R0           ;RETRIEVE COMMAND BYTE FROM RAM
046B D3C2     =1356           XRL     A,#EAMESD
046D 9674     =1357           JNZ     SDATA9          ;JUMP IF NOT AMB MESSAGE DISABLE
046F FC       =1358           MOV     A,R4
0470 53FB     =1359           ANL     A,#255-EAMBMS   ;DISABLE AMB LABEL MESSAGE
0472 AC       =1360           MOV     R4,A
0473 83       =1361           RET
              =1362 ;CHECK COMMAND BYTE FOR READING TWO LABEL READ SETTINGS FROM RAM TO HOST ('J')
0474 B87E     =1363 SDATA9:   MOV     R0,#STSDTA
0476 F0       =1364           MOV     A,@R0           ;RETRIEVE COMMAND BYTE FROM RAM
0477 D34A     =1365           XRL     A,#TRPRM2       ;CHECK FOR 'J' CHARACTER
0479 9686     =1366           JNZ     SDAT10          ;JUMP IF NOT 'J' CHARACTER
047B 54CC     =1367           CALL    DISLAS          ;CLEAR SCAN RAM AND TURN LASER OFF
047D D5       =1368           SEL     RB1
047E B967     =1369           MOV     R1,#TWOLAB      ;SET RAM POINTER TO TWO LABEL READ SETTINGS
0480 C5       =1370           SEL     RB0
0481 1461     =1371           CALL    TRRAM           ;TRANSMIT RAM TO HOST
0483 54D7     =1372           CALL    ENLAS           ;CLEAR SCAN RAM AND TURN LASER ON
0485 83       =1373           RET
              =1374 ;CHECK COMMAND BYTE FOR READING SCANNER CONFIGURATION FROM RAM. ('K')
0486 B87E     =1375 SDAT10:   MOV     R0,#STSDTA
0488 F0       =1376           MOV     A,@R0           ;RETRIEVE COMMAND BYTE FROM RAM
0489 D3CB     =1377           XRL     A,#SWSET1       ;CHECK FOR 'K' CHARACTER
048B 9694     =1378           JNZ     SDAT11          ;JUMP IF NOT 'K' CHARACTER
048D 54CC     =1379           CALL    DISLAS          ;CLEAR SCAN RAM AND TURN LASER OFF
048F 34A0     =1380           CALL    SWSET           ;READ SWITCH SETTING FROM RAM AND TRANSMIT TO HOST
0491 54D7     =1381           CALL    ENLAS           ;CLEAR SCAN RAM AND TURN LASER ON
0493 83       =1382           RET
              =1383 ;CHECK COMMAND BYTE FOR OVERRIDING SCANNER SETTINGS. ('L')
0494 B87E     =1384 SDAT11:   MOV     R0,#STSDTA
0496 F0       =1385           MOV     A,@R0           ;RETRIEVE COMMAND BYTE FROM RAM
0497 D38C     =1386           XRL     A,#OVRST1       ;CHECK FOR 'L' CHARACTER
0499 96A2     =1387           JNZ     SDAT12          ;JUMP IF NOT 'L' CHARACTER
049B 54CC     =1388           CALL    DISLAS          ;CLEAR SCAN RAM AND TURN LASER OFF
049D 94A6     =1389           CALL    OVRSET          ;OVERRIDE SWITCH SETTINGS VIA HOST
049F 54D7     =1390           CALL    ENLAS           ;CLEAR SCAN RAM AND TURN LASER ON
04A1 83       =1391           RET
              =1392 ;IF WE GET HERE, GOT RESET COMMAND OR NON-VALID COMMAND.  JUMP TO RESET SCANNER.
```

```
04A2 0400      =1393 SDAT12: JMP    RSTTRP
04A4 84A2       1394 THO05:  JMP    SDAT12
                1395 $        INCLUDE(:F3:OVRSET.SRC)
               =1396 ;************************************************************
               =1397 ;**                    Subroutine OVRSET                    **
               =1398 ;** Function: Overide Switch settings by changing RAM from host **
               =1399 ;** Date: 3-15-87                                           **
               =1400 ;** Subroutines Called: ROCIA                               **
               =1401 ;** Registers/Flags affected: F0, CARRY, R2, R1, ACCUMULATOR **
               =1402 ;** Ports affected: None                                    **
               =1403 ;** RAM locations affected: @SWISET                         **
               =1404 ;************************************************************
               =1405 OVRSET:
               =1406 ;GET COMMAND BYTE FROM HOST
04A6 8452      =1407         CALL   ROCIA          ;RECIEVE BYTE FROM HOST
04A8 E6AC      =1408         JNC    CHECLB         ;JUMP TO CHECK FOR LAST BYTE IF NO PARITY ERROR
               =1409 ;PARITY ERROR, GO TO ERROR ROUTINE. WE GOT GARBAGE.
04AA 848C      =1410         JMP    OVRERR         ;JUMP TO ERROR ROUTINE
               =1411 ;PARITY BYTE CHECKS OK. CHECK FOR LAST BYTE BIT.
04AC D2B0      =1412 CHECLB: JB6    SAVEBT         ;JUMP IF LAST BYTE BIT SET.
               =1413 ;LAST BYTE BIT NOT SET. SOMETHING IS WRONG.
04AE 848C      =1414         JMP    OVRERR         ;JUMP TO ERROR ROUTINE
               =1415 ;LAST BYTE BIT SET AND PARITY CHECKED OK. SAVE SWITCH SETTINGS IN RAM.
04B0 530F      =1416 SAVEBT: ANL    A,#0FH         ;MASK OUT UPPER 4 BITS.
04B2 AA        =1417         MOV    R2,A           ;TEMPORATILY STORE RECIEVED BYTE
04B3 B97D      =1418         MOV    R1,#SWISET     ;RAM POINTER
04B5 F1        =1419         MOV    A,@R1          ;SAVE SCANNER SETTINGS
04B6 5340      =1420         ANL    A,#40H         ;SAVE DOUBLE READ BIT
04B8 4A        =1421         ORL    A,R2           ;SET BITS 3-0 ACCORDING TO RECIEVED DATA
04B9 A1        =1422         MOV    @R1,A          ;SAVE RECIEVED BYTE IN RAM.
04BA 84C0      =1423         JMP    OVRRET         ;RETURN
               =1424 ;ERROR ROUTINE. BEEP 6 TIMES AND TURN ON RED LIGHT.
04BC B806      =1425 OVRERR: MOV    R0,#6          ;SET BEEP COUNTER
04BE 7481      =1426         CALL   TERRWT         ;BEEP 6 TIMES
04C0 83        =1427 OVRRET: RET
                1428 $        INCLUDE(:F3:TRNFLG.SRC)
               =1429 ;************************************************************
               =1430 ;**                    Subroutine TRNFLG                    **
               =1431 ;** Function: Transfers label flags from UPC code to RAM    **
               =1432 ;** Date: 7-17-87                                           **
               =1433 ;** Subroutines Called: SHIFTL                              **
               =1434 ;** Registers/Flags affected: R0, R2, R3, ACCUMULATOR, R1   **
               =1435 ;** Ports affected: None                                    **
               =1436 ;** RAM locations affected: @R1                             **
               =1437 ;************************************************************
               =1438 TRNFLG:
               =1439 ;GET FIRST FOUR BYTES OF LABEL (ABCD)
04C1 B824      =1440         MOV    R0,#L6S1       ;SOURCE RAM POINTER
04C3 BB02      =1441         MOV    R3,#2          ;SET FLAG COUNTER
04C5 B4C1      =1442         CALL   SHIFTL         ;SHIFT NIBBLES LEFT ONE NIBBLE
               =1443 ;GET SECOND TWO BYTES OF LABEL (EF)
               =1444 ;TRICK WITH THIS ROUTINE IS THAT THE NIBBLES TO COMPRISE FLAG 'EF' IS SPLIT
               =1445 ; BETWEEN LEFT AND RIGHT HALF OF LABEL.
04C7 F0        =1446         MOV    A,@R0          ;RETRIEVE DE NIBBLES
04C8 530F      =1447         ANL    A,#0FH         ;MASK OUT 'D' NIBBLE
04CA 47        =1448         SWAP   A              ;E0
04CB AA        =1449         MOV    R2,A           ;SAVE NIBBLE
04CC B82E      =1450         MOV    R0,#R6S1       ;GET RIGHT HALF OF LABEL
04CE F0        =1451         MOV    A,@R0          ; (RIGHT HALF OF LABEL)
04CF 53F0      =1452         ANL    A,#0F0H        ;MASK LOWER NIBBLE (F0)
04D1 47        =1453         SWAP   A              ;0F
04D2 4A        =1454         ORL    A,R2           ;EF
04D3 A1        =1455         MOV    @R1,A          ;SAVE NIBBLES IN RAM
04D4 19        =1456         INC    R1             ;INCREMENT SOURCE POINTER
               =1457 ;GET BYTES GH INTO RAM.
04D5 BB01      =1458         MOV    R3,#1          ;SET FLAG COUNTER
04D7 B4C1      =1459         CALL   SHIFTL
04D9 83        =1460         RET
                1461 $        INCLUDE(:F3:ERS2RM.SRC)
               =1462 ;************************************************************
               =1463 ;**                    Subroutine ERS2RM                    **
               =1464 ;** Function: SET TWO LABEL FLAG RAM TO FF'S                **
               =1465 ;** Date: 7-22-87                                           **
               =1466 ;** Subroutines Called: None                                **
               =1467 ;** Registers/Flags affected: R0, R2, ACCUMULATOR           **
               =1468 ;** Ports affected: None                                    **
               =1469 ;** RAM locations affected: None                            **
               =1470 ;************************************************************
               =1471 ERS2RM:
04DA BA10      =1472         MOV    R2,#160        ;SET CYCLE COUNTER FOR LABEL FLAGS
04DC B867      =1473         MOV    R0,#TWOLAB     ;SET RAM POINTER TO LABEL 1 FLAG 1
04DE B0FF      =1474 ELST1:  MOV    @R0,#0FFH      ;FILL RAM WITH FF'S
04E0 18        =1475         INC    R0
04E1 EADE      =1476         DJNZ   R2,ELST1
04E3 83        =1477         RET
                1478 ;******************************************
04E4 A3         1479 TROPG4: MOVP   A,@A
04E5 83         1480         RET
0500            1481         ORG    500H
                1482 $        INCLUDE(:F3:CHKSCN.SRC)
```

```
         =1483 ;****************************************************************
         =1484 ;**                   Subroutine CHKSCN                         **
         =1485 ;** Function: Check Switch RAM settings for two scan option and set R1 accor.*
         =1486 ;** Date: 3-18-87                                               **
         =1487 ;** Subroutines Called: None                                    **
         =1488 ;** Registers/Flags affected: R1, Accumulator                   **
         =1489 ;** Ports affected: None                                        **
         =1490 ;** RAM locations affected: None                                **
         =1491 ;****************************************************************
         =1492 ;THIS ROUTINE USED FOR UPCA, EAN8, AND EAN13
         =1493 CHKSCN:
0500 B97D =1494        MOV    R1,#SWISET         ;SET RAM POINTER TO SWITCH SETTINGS
0502 F1   =1495        MOV    A,@R1              ;RETRIEVE SETTINGS
0503 530C =1496        ANL    A,#0CH             ;MASK OUT ALL BUT TWO SCAN SETTINGS
0505 03F4 =1497        ADD    A,#0F4H            ;CHECK FOR B3,B2=11 (750F MODE)
0507 F611 =1498        JC     STOCIA             ;JUMP IF B3,B2=11
0509 0304 =1499        ADD    A,#004H            ;CHECK FOR B3,B2=10 (MODIFIED 2-SCAN)
050B F615 =1500        JC     SP2SCN             ;JUMP IF B3,B2=10
050D 0304 =1501        ADD    A,#004H            ;CHECK FOR B3,B2=01 (750F-T 2 SCAN)
050F F61E =1502        JC     ST2SCN             ;JUMP IF B3,B2=01
         =1503 ;MUST BE B3,B2=00 WHICH IS 750F MODE
0511 B9FF =1504 STOCIA: MOV   R1,#-1             ;SET FOR 1 SCAN
0513 A420 =1505        JMP    CKSNRT             ;FINISHED, RETURN
0515 B9FE =1506 SP2SCN: MOV   R1,#-2             ;SET FOR 2 SCAN
0517 F8   =1507        MOV    A,R0               ;CHECK FOR EAN13, OF WHICH WE ONLY WANT 1 SCAN
0518 C620 =1508        JZ     CKSNRT             ;JUMP IF NOT EAN13. OTHER LABELS ARE 2 SCAN
051A B9FF =1509        MOV    R1,#-1             ;EAN13, REQUIRE 1 SCAN.
051C A420 =1510        JMP    CKSNRT             ;FINISHED, RETURN
051E B9FE =1511 ST2SCN: MOV   R1,#-2             ;SET FOR 2 SCAN
0520 83   =1512 CKSNRT: RET
          1513 $      INCLUDE(:F3:WREPRM.SRC)
         =1514 ;****************************************************************
         =1515 ;**                   Subroutine WREPRM                         **
         =1516 ;** Function: Write packed RAM to EEPROM                        **
         =1517 ;** Date: 2-26-87                                               **
         =1518 ;** Subroutines Called: WRACC, WAIT                             **
         =1519 ;** Registers/Flags affected: F0, R0, R1, R2, R3, *R1, *R2, Carry, Acc **
         =1520 ;** Ports affected: P1, P2                                      **
         =1521 ;** RAM locations affected: None                                **
         =1522 ;****************************************************************
         =1523 WREPRM:
         =1524 ;SEND OP CODE TO ENABLE EEPROM WRITE
0521 B4D1 =1525        CALL   SNDWRT
         =1526 ;SEND OP CODE TO ERASE ALL OF EEPROM
0523 2320 =1527        MOV    A,#ERAL            ;ERASE ALL OF EEPROM
0525 B4B5 =1528        CALL   ERASFL
         =1529 ;TRANSFER 16 BYTES FROM RAM TO EEPROM
0527 B967 =1530        MOV    R1,#TWOLAB         ;INITIALIZE RAM POINTER
0529 BA40 =1531        MOV    R2,#OWRITE         ;INITIALIZE EEPROM ADDRESS AND OP CODE
052B BB08 =1532        MOV    R3,#8D             ;INITIALIZE LABELSET COUNTER
         =1533 ;SEND OP CODE AND EEPROM ADDRESS
         =1534 TRNDTA:
052D 8A80 =1535        ORL    P2,#EPRMCS         ;SET EEPROM_CS HIGH
052F 85   =1536        CLR    F0                 ;SET F0=0 TO SIGNIFY OP CODE
0530 FA   =1537        MOV    A,R2               ;OP CODE + EEPROM ADDRESS IN ACCUMULATOR
0531 34C2 =1538        CALL   WRACC              ;SEND OP CODE + EEPROM ADDRESS TO EEPROM
         =1539 ;SEND BITS 15-8 TO EEPROM (LABEL 1)
0533 F1   =1540        MOV    A,@R1              ;GET DATA FROM RAM (LABEL 1)
0534 85   =1541        CLR    F0                 ;SET F0
0535 95   =1542        CPL    F0                 ; TO '1' TO SIGNIFY DATA TRANSFER
0536 34C2 =1543        CALL   WRACC              ;WRITE DATA BITS 15-8 TO EEPROM
         =1544 ;SEND BITS 7-0 TO EEPROM (LABEL 2)
0538 19   =1545        INC    R1                 ;INCREMENT RAM POINTER TO LABEL 2
0539 F1   =1546        MOV    A,@R1              ;RETREIVE DATA (LABEL 2)
053A 85   =1547        CLR    F0                 ;SET F0
053B 95   =1548        CPL    F0                 ; TO '1' TO SIGNIFY DATA TRANSFER
053C 34C2 =1549        CALL   WRACC              ;WRITE DATA BITS 7-0
         =1550 ;SET EEPROM_CS LOW FOR 15MS
053E 9A7F =1551        ANL    P2,#255-EPRMCS     ;SET EEPROM_CS LOW
0540 230F =1552        MOV    A,#15D             ;WAIT FOR
0542 34E1 =1553        CALL   WAIT               ; 15 MILLI-SECONDS
         =1554 ;SET UP POINTERS FOR NEXT LABEL SET
0544 19   =1555        INC    R1                 ;INCREMENT RAM POINTER TO LABEL 1 OF NEXT LABEL SET
0545 1A   =1556        INC    R2                 ;INCREMENT EEPROM ADDRESS POINTER FOR NEXT 16 BITS
0546 EB2D =1557        DJNZ   R3,TRNDTA          ;IF R3 NOT ZERO, GO BACK TO TRANSFER ANOTHER 16 BITS TO
         =1558 ;DATA ALL TRANSFERRED. SEND OP CODE TO DISABLE ERASE/WRITE TO EEPROM.
0548 8A80 =1559        ORL    P2,#EPRMCS         ;SET EEPROM_CS HIGH
054A 2300 =1560        MOV    A,#EWDS            ;MOV OP CODE TO DISABLE ERASE/WRITE TO ACCUMULATOR
054C 85   =1561        CLR    F0                 ;SET F0 LOW TO SIGNIFY 9 BITS TO SEND
054D 34C2 =1562        CALL   WRACC              ;WRITE OP CODE TO EEPROM
054F 9A7F =1563        ANL    P2,#255-EPRMCS     ;SET EEPROM_CS LOW
         =1564 ;RETURN BACK
0551 83   =1565        RET
          1566 $      INCLUDE(:F3:ROCIA.SRC)
         =1567 ;****************************************************************
         =1568 ;**                   Subroutine ROCIA                          **
         =1569 ;** Function: Recieve data from VLSI chip with output in accumulator. **
         =1570 ;** Date: 3-15-87                                               **
         =1571 ;** Subroutines Called: PARITY                                  **
         =1572 ;** Registers/Flags affected: F0, *R3, *R0, CARRY, *R2, ACCUMULATOR **
         =1573 ;** Ports affected: NONE                                        **
         =1574 ;** RAM locations affected: NONE                                **
         =1575 ;****************************************************************
```

```
                    =1576 ;F0=1 MEANS LAST BITE BIT SET IN B6
                    =1577 ;F0=0 MEANS LAST BITE BIT NOT SET IN B6
                    =1578 ;CARRY MEANS THAT PARITY ERROR HAS OCCURED
                    =1579 ;NO CARRY MEANS THAT BYTE RECIEVED PASSED PARITY CHECK
0552 85             =1580 ROCIA:   CLR     F0              ;INITIALIZE B6 FLAG
0553 97             =1581          CLR     C               ;INITIALIZE PARITY FLAG
0554 8658           =1582 ROCIA1:  JNI     ROCIA2          ;IF INTERUPT LINE LOW, VLSI HAS OCIA DATA.
0556 A454           =1583          JMP     ROCIA1          ;NO DATA.  JUMP BACK TO CHECK ROCIA.
0558 D5             =1584 ROCIA2:  SEL     RB1
0559 B802           =1585          MOV     R0,#EOCIA       ;SET POINTER TO WRITE TO VLSI CHIP.
055B 80             =1586          MOVX    A,@R0           ;GET BYTE FROM ACCUMULATOR
055C AA             =1587          MOV     R2,A            ;TEMPORARILY SAVE BYTE TO CHECK FOR PARITY
                    =1588 ;CHECK FOR CORRECT PARITY
055D 3490           =1589          CALL    PARITY          ;CALCULATE PARITY
055F D5             =1590          SEL     RB1
0560 DA             =1591          XRL     A,R2            ;COMPARE TO RECIEVED BYTE
0561 C664           =1592          JZ      LASTBT          ;IF ZERO, PARITY IS OK
0563 A7             =1593          CPL     C               ;BAD PARITY. SET CARRY FLAG.
                    =1594 ;PARITY CHECKED. RESTORE RECIEVED BYTE AND CHECK FOR LAST BYTE.
0564 FA             =1595 LASTBT:  MOV     A,R2            ;RESTORE RECIEVED BYTE
0565 37             =1596          CPL     A
0566 D269           =1597          JB6     OCIRET          ;JUMP IF NOT LAST BYTE
0568 95             =1598          CPL     F0              ;MUST BE LAST BYTE
                    =1599 ;BYTE RECIEVED AND CHECKED. RETURN TO ROUTINE.
                    =1600 OCIRET:
0569 FA             =1601          MOV     A,R2            ;RESTORE RECIEVED DATA
056A C5             =1602          SEL     RB0
056B 83             =1603          RET
                    1604 $        INCLUDE(:F3:TON1CT.SRC)
                    =1605 ;****************************************************************
                    =1606 ;**                    SUBROUTINE TON1CT                       **
                    =1607 ;** FUNCTION: SET R5 (RB1) ACCORDING TO SWITCH SETTINGS        **
                    =1608 ;** DATE: 3/15/87                                              **
                    =1609 ;** SUBROUTINES CALLED: NONE                                   **
                    =1610 ;** REGISTERS/FLAGS AFFECTED: R5 (RB1), R1 (RB1), ACCUMULATOR  **
                    =1611 ;** PORTS AFFECTED: NONE                                       **
                    =1612 ;** RAM LOCATIONS AFFECTED: NONE                               **
                    =1613 ;****************************************************************
                    =1614 TON1CT:
                    =1615 ;SET TONE CYCLE COUNTER ACCORDING TO RAM (SWITCH SETTINGS)
056C B97D           =1616          MOV     R1,#SWISET      ;SET RAM POINTER
056E F1             =1617          MOV     A,@R1           ;RETRIEVE SWITCH SETTINGS FROM RAM
056F 5303           =1618          ANL     A,#03H          ;MASK ALL BUT TONE BITS
0571 0376           =1619          ADD     A,#LOW TONADD   ;SET OF EPROM ADDRESS FETCH
0573 A3             =1620          MOVP    A,@A            ;GET TONE CYCLE SETTING
0574 AD             =1621          MOV     R5,A            ;SET TONE CYCLE COUNT IN R5
0575 83             =1622          RET
                    =1623 ;
0576                =1624 TONADD   EQU     $
0576 14             =1625          DB      ETNCT1          ;TONE CYCLE COUNT FOR 500HZ
0577 1E             =1626          DB      ETNCT2          ;TONE CYCLE COUNT FOR 730HZ
0578 28             =1627          DB      ETNCT3          ;TONE CYCLE COUNT FOR 960HZ
0579 38             =1628          DB      ETNCT4          ;TONE CYCLE COUNT FOR 1370HZ
                    1629 $        INCLUDE(:F3:COPYRT.SRC)
                    =1630 ;****************************************************************
                    =1631 ;
057A 434F5059       =1632          DB      'COPYRIGHT (C)1987 '
057E 52494748
0582 54202843
0586 29313938
058A 3720
058C 53504543       =1633          DB      'SPECTRA-PHYSICS, INC. '
0590 5452412D
0594 50485953
0598 4943532C
059C 20494E43
05A0 2E20
05A2 414C4C20       =1634          DB      'ALL RIGHTS RESERVED'
05A6 52494748
05AA 54532052
05AE 45534552
05B2 564544
                    =1635 ;
                    =1636 ;****************************************************************
                    1637 $        INCLUDE(:F3:ERASFL.SRC)
                    =1638 ;****************************************************************
                    =1639 ;**                    Subroutine ERASFL                       **
                    =1640 ;** Function: Send OP code to enable EEPROM Write              **
                    =1641 ;** Date: 3-17-87                                              **
                    =1642 ;** Subroutines Called: WRACC, WAIT                            **
                    =1643 ;** Registers/Flags affected: F0, R0, Accumulator, Carry, *R1, *R2 **
                    =1644 ;** Ports affected: P2,P1                                      **
                    =1645 ;** RAM locations affected: None                               **
                    =1646 ;****************************************************************
                    =1647 ERASFL:
05B5 85             =1648          CLR     F0              ;SET F0=0 TO SIGNIFY 9 BITS FOR OP CODE.
05B6 8A80           =1649          ORL     P2,#EPRMCS      ;SET EEPROM_CS HIGH
05B8 34C2           =1650          CALL    WRACC           ;WRITE OP CODE TO EEPROM
05BA 9A7F           =1651          ANL     P2,#255-EPRMCS  ;SET EEPROM_CS LOW
05BC 230F           =1652          MOV     A,#15D          ; FOR
05BE 34E1           =1653          CALL    WAIT            ;    15 MS
05C0 83             =1654          RET
                    1655 $        INCLUDE(:F3:SHIFTL.SRC)
```

```
                =1656 ;*********************************************************************
                =1657 ;**                        Subroutine SHIFTL                         **
                *1658 ;** Function: Shifts characters one nible left from to inputs        **
                =1659 ;** Date:  7-17-87                                                   **
                =1660 ;** Subroutines Called: None                                         **
                =1661 ;** Registers/Flags affected: R0, R2, R3, ACCUMULATOR, R1            **
                =1662 ;** Ports affected: None                                             **
                =1663 ;** RAM locations affected: @R1                                      **
                =1664 ;*********************************************************************
                =1665 SHIFTL:
05C1 F0         =1666         MOV     A,@R0           ;RETRIEVE WX CHARACTERS
05C2 530F       =1667         ANL     A,#0FH          ;MASK UPPER NIBBLE (0X)
05C4 47         =1668         SWAP    A               ;X0
05C5 AA         =1669         MOV     R2,A            ;SAVE NIBBLE TEMPORARILY
05C6 18         =1670         INC     R0              ;INCREMENT SOURCE POINTER
05C7 F0         =1671         MOV     A,@R0           ;RETRIEVE 'YZ' CHARACTERS
05C8 53F0       =1672         ANL     A,#0F0H         ;MASK OUT 'C' CHARACTER (Y0)
05CA 47         =1673         SWAP    A               ;0Y
05CB 4A         =1674         ORL     A,R2            ;XY IS RESULT
05CC A1         =1675         MOV     @R1,A           ;SAVE XY IN RAM @R1 POINTER
05CD 19         =1676         INC     R1              ;INC DESTINATION POINTER
05CE EBC1       =1677         DJNZ    R3,SHIFTL
05D0 83         =1678         RET
                 1679 $       INCLUDE(:F3:SNDWRT.SRC)
                =1680 ;*********************************************************************
                =1681 ;**                        Subroutine SNDWRT                         **
                *1682 ;** Function: Send OP code to enable EEPROM Write                    **
                =1683 ;** Date: 3-17-87                                                    **
                =1684 ;** Subroutines Called: WRACC                                        **
                =1685 ;** Registers/Flags affected: F0, R0, Accumulator, Carry             **
                =1686 ;** Ports affected: P2,P1                                            **
                =1687 ;** RAM locations affected: None                                     **
                =1688 ;*********************************************************************
                =1689 SNDWRT:
05D1 2330       =1690         MOV     A,#EWEN         ;SEND OP CODE TO ENABLE EEPROM
05D3 85         =1691         CLR     F0              ;SET FLAG=0 TO SIGNIFY 9 BITS FOR OP CODE
05D4 8A80       =1692         ORL     P2,#EPRMCS      ;SET EEPROM_CS HIGH
05D6 34C2       =1693         CALL    WRACC           ;WRITE OPCODE TO EEPROM
05D8 9A7F       =1694         ANL     P2,#255-EPRMCS  ;SET EEPROM_CS LOW
05DA 83         =1695         RET
                 1696 ;****************************************
05DB A3          1697 TROPG5: MOVP    A,@A
05DC 83          1698         RET
0600             1699         ORG     600H
                 1700 $       INCLUDE(:F3:STRRAM.SRC)
                =1701 ;*********************************************************************
                =1702 ;**                        Subroutine STRRAM                         **
                =1703 ;** Function: Write two label settings to RAM from host.             **
                =1704 ;** Date: 3-15-87                                                    **
                =1705 ;** Subroutines Called: ROCIA                                        **
                =1706 ;** Registers/Flags affected: CARRY, F0, R0, R1, R2, R3, ACCUMULATOR **
                =1707 ;** Ports affected: None                                             **
                =1708 ;** RAM locations affected: @TWOLAB TO @TWOLABEL+8                   **
                =1709 ;*********************************************************************
                =1710 STRRAM:
                =1711 ;INITIALIZE REGISTERS
0600 B808       =1712         MOV     R0,#8D          ;LABEL SET COUNTER
0602 B967       =1713         MOV     R1,#TWOLAB      ;SET RAM POINTER TO TWO LABEL READ LOCATIONS.
0604 85         =1714         CLR     F0              ;USE F0 TO STORE LAST BYTE BIT
                =1715 ;RETRIEVE 1ST LABEL, MS DIGIT
0605 B452       =1716 RTRLAB: CALL    ROCIA           ;RECIEVE DATA FROM VLSI CHIP
0607 B665       =1717         JF0     ELSTBT          ;IF LAST BYTE BIT SET WE HAVE ERROR.  JUMP TO FILL REMAINING RAM
0609 F665       =1718         JC      ELSTBT          ;IF CARRY FLAG SET, WE HAVE TRANSMISSION ERROR.  JUMP TO FILL RE
060B 530F       =1719         ANL     A,#0FH          ;MASK UPPER 4 BITS
060D 47         =1720         SWAP    A               ;MS NIBBLE MUST BE IN UPPER 4 BITS OF R2
060E A1         =1721         MOV     @R1,A           ;STORE MASKED BYTE IN R2.
                =1722 ;RETRIEVE 1ST LABEL, LS DIGIT
060F B452       =1723         CALL    ROCIA           ;RECIEVE DATA FROM VLSI CHIP
0611 B665       =1724         JF0     ELSTBT          ;IF LAST BYTE BIT SET WE HAVE ERROR.  JUMP TO FILL REMAINING RAM
0613 F665       =1725         JC      ELSTBT          ;IF CARRY FLAG SET, WE HAVE TRANSMISSION ERROR.  JUMP TO FILL RE
0615 530F       =1726         ANL     A,#0FH          ;MASK UPPER 4 BITS
0617 41         =1727         ORL     A,@R1           ;PACK MS AND LS DIGITS TOGETHER
0618 A1         =1728         MOV     @R1,A           ;SAVE 1ST LABEL IN R2 FOR TEMPORARY STORAGE.
                =1729 ;RAM POINTER STILL SET AT 1ST LABEL.
                =1730 ;GET 2ND LABEL, MS NIBBLE AND CHECK BEFORE STORING.
0619 B452       =1731         CALL    ROCIA           ;RECIEVE DATA FROM VLSI CHIP
061B B665       =1732         JF0     ELSTBT          ;IF LAST BYTE BIT SET WE HAVE ERROR.  JUMP TO FILL REMAINING RAM
061D F665       =1733         JC      ELSTBT          ;IF CARRY FLAG SET, WE HAVE TRANSMISSION ERROR.  JUMP TO FILL RE
061F 530F       =1734         ANL     A,#0FH          ;MASK UPPER 4 BITS
0621 47         =1735         SWAP    A               ;MS NIBBLE MUST BE IN UPPER 4 BITS.
0622 19         =1736         INC     R1              ;INCREMENT RAM POINTER
0623 A1         =1737         MOV     @R1,A           ;TEMPORARILY STORE LABEL 2, MS NIBBLE IN R3.
                =1738 ;GET 2ND LABEL, LS NIBBLE AND CHECK BEFORE STORING.
0624 B452       =1739         CALL    ROCIA           ;RECIEVE DATA FROM VLSI CHIP
                =1740 NOLSBT:
0626 F665       =1741         JC      ELSTBT          ;IF CARRY FLAG SET, WE HAVE TRANSMISSION ERROR.  JUMP TO FILL RE
0628 530F       =1742         ANL     A,#0FH          ;MASK UPPER 4 BITS
062A 41         =1743         ORL     A,@R1           ;PACK MS NIBBLE WITH LS NIBBLE TO FORM 1 BYTE
062B A1         =1744         MOV     @R1,A           ;STORE 2ND LABEL IN R3 TEMPORARILY.
062C 19         =1745         INC     R1              ;INCREMENT RAM POINTER.
                *1746 ;CHECK FOR LAST BYTE
062D B631       *1747         JF0     LBDET           ;JUMP IF NO LAST BYTE TO NEXT LABEL SET
```

```
062F C441       =1748           JMP     DECR0
                =1749 ;LAST BYTE DETECTED. FILL IN THE REST OF RAM WITH FF'S.
0631 F8         =1750 LBDET:    MOV     A,R0            ;CHECK COUNTER FOR 8 BYTES RECIEVED
0632 D301       =1751           XRL     A,#01D          ;COUNTER SHOULD BE AT 1 IF 8 BYTES DONE
0634 C647       =1752           JZ      RTRCVR          ;IF ZERO, NO RAM TO FILL WITH FF'S.
                =1753 ;FILL REST OF RAM WITH FF'S
0636 C8         =1754           DEC     R0              ;ADJUST LABEL SET COUNTER TO BYTE COUNTER
0637 F8         =1755           MOV     A,R0
0638 E7         =1756           RL      A               ;MULTIPLY COUNT BY 2
0639 A8         =1757           MOV     R0,A
063A B1FF       =1758 FILFF:    MOV     @R1,#0FFH       ;STORE FF IN RAM TO SIGNIFY NO LABEL.
063C 19         =1759           INC     R1              ;INCREMENT RAM POINTER.
063D E83A       =1760           DJNZ    R0,FILFF        ;IF R0 NOT 0, GO TO NEXT RAM LOCATION.
063F C447       =1761           JMP     RTRCVR          ;REST OF RAM FILLED WITH FF'S.
                =1762 ;LABEL SET SAVED IN RAM. REPEAT PROCESS UNTIL ALL BYTES ARE STORED.
                =1763 DECR0:
0641 E805       =1764           DJNZ    R0,RTRLAB       ;DECREMENT LABEL SET COUNTER AND JUMP TO BEGINNING OF ROUTINE IF
                =1765 ;F0 SHOULD BE SET DUE TO LAST BYTE BIT. IF NOT, THERE IS AN ERROR.
0643 B647       =1766           JF0     RTRCVR          ;JUMP IF LAST BYTE BIT OK.
0645 C465       =1767           JMP     ELSTBT          ;JUMP TO ERROR ROUTINE IF NO FLAG.
                =1768 ;CHECK FOR LABEL 1 FLAGS BEING EQUAL TO LABEL 2 FLAGS. IF ERROR OCCURS, BEEP 5 TIMES,
                =1769 ; AND THEN CLEAR RAM WITH FF'S.
0647 BB08       =1770 RTRCVR:   MOV     R3,#8D          ;SET LABEL 1 FLAG SET COUNTER
0649 B867       =1771           MOV     R0,#TWOLAB      ;SET RAM POINTER #1 TO LABEL 1 FLAGS
064B BA08       =1772 RDLAB1:   MOV     R2,#8D          ;SET LABEL 2 FLAG SET COUNTER
064D B968       =1773           MOV     R1,#TWOLAB+1    ;SET RAM POINTER #2 TO LABEL 2 FLAGS
064F F0         =1774 RDLAB2:   MOV     A,@R0           ;READ LABEL 1 FLAG
0650 37         =1775           CPL     A
0651 C66F       =1776           JZ      FLCKRT          ;JUMP TO END OF CHECK ROUTINE. NO MORE FLAGS TO CHECK.
0653 37         =1777           CPL     A               ;PUT ACCUMULATOR BACK TO LABEL 1 FLAG
0654 D1         =1778           XRL     A,@R1           ;COMPARE LABEL 1 FLAG TO LABEL 2 FLAG
0655 C665       =1779           JZ      ELSTBT          ;JUMP IF ERROR. THERE IS A MATCH.
0657 D0         =1780           XRL     A,@R0           ;GET LABEL 2 FLAG BACK IN ACCUMULATOR
0658 37         =1781           CPL     A
0659 C65F       =1782           JZ      INLAB1          ;JUMP IF LABEL 2 FLAG IS FF
065B 19         =1783           INC     R1
065C 19         =1784           INC     R1              ;INCREMENT RAM POINTER FOR LABEL 2
065D EA4F       =1785           DJNZ    R2,RDLAB2       ;DECREMENT LABEL 2 FLAG COUNTER. JUMP IF ZERO.
065F 18         =1786 INLAB1:   INC     R0
0660 18         =1787           INC     R0              ;INCREMENT RAM POINTER FOR LABEL 1
0661 EB4B       =1788           DJNZ    R3,RDLAB1       ;DECREMENT LABEL 1 FLAG COUNTER. JUMP IF ZERO.
0663 C46F       =1789           JMP     FLCKRT          ;TRANSMISSION CHECKS OK. JUMP TO RETURN.
                =1790 ;ERROR. TURN ON RED LIGHT AND BEEP 5 TIMES AFTER CLEARING RAM.
                =1791 ELSTBT:
0665 94DA       =1792           CALL    ERS2RM          ;FILL FLAG RAM UP WITH FF'S
                =1793 ;
0667 B805       =1794           MOV     R0,#5           ;SET BEEP COUNT
0669 7481       =1795           CALL    TERRWT          ;BEEP 5 TIMES
                =1796 ;
066B FC         =1797           MOV     A,R4            ;RETRIEVE FLAGS
066C 4380       =1798           ORL     A,#80H          ;SET TWO LABEL ERROR FLAG
066E AC         =1799           MOV     R4,A            ;SAVE SET FLAG
                =1800 ;EVERYTHING IS DONE. RETURN.
066F 83         =1801 FLCKRT:   RET                     ;RAM IS FULL. RETURN TO MAIN ROUTINE.
                =1802
                 1803 $         INCLUDE(:F3:FLGPR1.SRC)
                =1804 ;************************************************************************
                =1805 ;**                        Routine FLGPRG                              **
                =1806 ;** Function: Read UPC codes and check if programming to EEPROM is required **
                =1807 ;** Date:  3-17-87                                                     **
                =1808 ;** Subroutines Called: SNDWRT, ERASFL, TRNFLG, SHIFTL, WRACC, WAIT, TRNDTA **
                =1809 ;************************************************************************
                =1810 ;CHECK SWITCH SETTING FOR EEPROM PROGRAMMING. DIP SWITCH 9, BIT 5 IS
                =1811 FLGPRG:
                =1812 ;RESET TWO LABEL ERROR FLAG
0670 FC         =1813           MOV     A,R4
0671 537F       =1814           ANL     A,#7FH          ;RESET ERROR FLAG
0673 AC         =1815           MOV     R4,A            ;RE-SAVE FLAGS
                =1816 ; ENABLE PROGRAMING SWITCH.
0674 B97D       =1817           MOV     R1,#SWISET      ;SET RAM POINTER TO READ OPTIONS REG.
0676 F1         =1818           MOV     A,@R1           ;RETRIEVE RAM SWITCH SETTINGS
0677 B285       =1819           JB5     PROLAB          ;JUMP TO PROGRAM FLAGS
                =1820 ;CHECK SWITCH 9 FOR PROGRAM FLAGS OPTION
0679 B908       =1821           MOV     R1,#SWLATC      ;SET POINTER TO READ EXTERNAL SWITCHES.
067B 81         =1822           MOVX    A,@R1
067C B285       =1823           JB5     PROLAB
                =1824 ;PROGRAMMING FLAGS BY READING LABELS IS NOT A CHOSEN OPTION. CONTINUE TO READ
                =1825 ; GOOD READ AND COMMUNICATE OUT OCIA PORT.
                =1826 ;SET FLAG POINTER TO 0.
067E FE         =1827           MOV     A,R6
067F 538F       =1828           ANL     A,#08FH         ;RESET FLAG POINTER
0681 AE         =1829           MOV     R6,A            ;SAVE POINTERS
0682 F5         =1830           SEL     MB1
0683 C482       =1831           JMP     GOOD30
                =1832 ;IN 'PROGRAM FLAG' MODE. CHECK FOR UPC A LABEL.
0685 FE         =1833 PROLAB:   MOV     A,R6            ;CHECK VERSION FLAGS FOR UPC A
0686 5307       =1834           ANL     A,#07H          ;MASK ALL BUT VERSION POINTERS
0688 D301       =1835           XRL     A,#EVERA        ;CHECK AGAINST UPCA CODE
068A C68F       =1836           JZ      CHKLP1          ;JUMP TO CHECK WHICH LABEL PAIRS ARE ENCODED.
068C F5         =1837           SEL     MB1
068D C400       =1838           JMP     RDTAG           ;NOT A VALID FLAG LABEL, DO NOT TRANSMIT.
                =1839 ;
```

```
                    =1840 ;CHECK FOR LABEL PAIRS TO LOAD INTO EEPROM.
                    =1841 ;R6S1 REGISTER HOLDS RIGHT TAG WHICH COMPRISES 6 NIBBLES WITH CHECKSUM AS
                    =1842 ; ONE OF THE 6 NIBBLES.  L6S1 REGISTER HOLDS LEFT TAG WHICH COMPRISES 6 NIBBLES.
                    =1843 ; UPC A CODE HAS THE FOLLOWING ENCODED INFORMATION:
                    =1844 ;    OABCDE  FGHIJ(CHECK DIGIT)
                    =1845 ;     L6S1    R6S1
                    =1846 ; AB SIGNIFIES FIRST PAIR, FIRST LABEL FLAG DIGITS.
                    =1847 ; CD SIGNIFIES FIRST PAIR, SECOND LABEL FLAG DIGITS.
                    =1848 ; EF SIGNIFIES SECOND PAIR, FIRST LABEL FLAG DIGITS.
                    =1849 ; GH SIGNIFIES SECOND PAIR, SECOND LABEL FLAG DIGITS.
                    =1850 ; IJ HAS THE FOLLOWING DEFINITION:
                    =1851 ;      IJ       DEFINITION
                    =1852 ;      01       LABEL PAIRS 1 AND 2
                    =1853 ;      02       LABEL PAIRS 3 AND 4
                    =1854 ;      03       LABEL PAIRS 5 AND 6
                    =1855 ;      04       LABEL PAIRS 7 AND 8
                    =1856 ;
                    =1857 CHKLP1:
068F B92F           =1858        MOV     R1,#R6S1+1       ;SET POINTER TO RETRIEVE HI NIBBLES
0691 F1             =1859        MOV     A,@R1            ;RETRIEVE HI NIBBLES
0692 530F           =1860        ANL     A,#0FH           ;MASK OUT H NIBBLE
0694 47             =1861        SWAP    A                ;I0
0695 AA             =1862        MOV     R2,A
0696 19             =1863        INC     R1               ;SET POINTER TO J (CHECK DIGIT) NIBBLES
0697 F1             =1864        MOV     A,@R1
0698 53F0           =1865        ANL     A,#0F0H          ;MASK OUT CHECK DIGIT
069A 47             =1866        SWAP    A                ;0J
069B 4A             =1867        ORL     A,R2             ;IJ NIBBLE RETRIEVED
069C AA             =1868        MOV     R2,A             ;SAVE IJ
                    =1869 ;
                    =1870 ;CHECK IJ FOR BEING 0
069D 96A1           =1871        JNZ     CHKIJ            ;JUMP ON IJ>00
069F C4E7           =1872        JMP     RTPRG            ;JUMP AND IGNORE LABEL. IJ IS INVALID.
                    =1873 ;CHECK IJ FOR BEING LESS THAN OR EQUAL TO 4
06A1 03FB           =1874 CHKIJ: ADD     A,#0FBH
06A3 E6A7           =1875        JNC     VALFLG           ;JUMP TO READ LABEL INTO RAM.  TAG IS VALID.
06A5 C4E7           =1876        JMP     RTPRG            ;JUMP AND IGNORE LABEL. IJ IS INVALID.
                    =1877 ;
                    =1878 ;VALID FLAG LABEL.  CHECK FLAG POINTER.
                    =1879 VALFLG:
06A7 FE             =1880        MOV     A,R6             ;RETRIEVE FLAG POINTER
06A8 5370           =1881        ANL     A,#70H           ;MASK ALL BUT FLAG POINTER
06AA 96B0           =1882        JNZ     FLGCHK           ;JUMP FLAG POINTER >0
                    =1883 ;FLAG POINTER IS 0.  FILL FLAG RAM WITH FF'S.
06AC 940A           =1884        CALL    ERS2RM           ;FILL TWO LABEL RAM WITH FF'S
06AE C4C3           =1885        JMP     INCPNT           ;JUMP TO INC FLAG POINTER
                    =1886 ;CHECK FLAG POINTER FOR BEING GREATER THAN 3. (TOTAL OF 4 UPC CODES)
06B0 FE             =1887 FLGCHK: MOV    A,R6             ;RETRIEVE FLAG POINTER
06B1 5340           =1888        ANL     A,#40H           ;MASK ALL BUT FLAG POINTER (B2)
06B3 C6B7           =1889        JZ      RTRMRT           ;FLAG POINTER IS <= 3.  ROTATE RAM.
                    =1890 ;FOUR SETS OF LABEL FLAGS HAVE BEEN PROGRAMED.  DO NOT ALLOW ANY MORE READS UNLESS SWITCH 9 IS C
06B5 C4E7           =1891        JMP     RTPRG            ;GO TO DISPLAY BAD READ.
                    =1892 ;ROTATE RAM 4 BYTES RIGHT.
06B7 BA0C           =1893 RTRMRT: MOV    R2,#12           ;SET LOOP COUNTER
06B9 B976           =1894        MOV     R1,#TWOLAB+15    ;SET DESTINATION POINTER
06BB B872           =1895        MOV     R0,#TWOLAB+11    ;SET SOURCE POINTER
06BD F0             =1896 RTRM1: MOV     A,@R0            ;RETRIEVE BYTE TO BE SHIFTED
06BE A1             =1897        MOV     @R1,A            ;SAVE BYTE TO NEW LOCATION
06BF C9             =1898        DEC     R1               ;DECREMENT DESTINATION POINTER
06C0 C8             =1899        DEC     R0               ;DECREMENT SOURCE POINTER
06C1 EABD           =1900        DJNZ    R2,RTRM1
                    =1901 ;INCREMENT FLAG POINTER
                    =1902 INCPNT:
06C3 FE             =1903        MOV     A,R6             ;RETRIEVE FLAG COUNTER
06C4 0310           =1904        ADD     A,#10H           ;INCREMENT FLAG COUNTER
06C6 AE             =1905        MOV     R6,A             ;SAVE FLAG COUNTER
                    =1906 ;PLACE L6S1 AND R6S1 INTO RAM
06C7 B967           =1907        MOV     R1,#TWOLAB       ;DESTINATION POINTER
06C9 94C1           =1908        CALL    TRNFLG           ;TRANSFER UPC CODE TO TWO LABEL RAM
06CB D447           =1909        CALL    RTRCVR           ;CHECK TWO LABEL READ RAM
                    =1910 ;CHECK TWO LABEL ERROR FLAG
06CD FC             =1911        MOV     A,R4             ;RETRIEVE ERROR FLAG
06CE 37             =1912        CPL     A
06CF F2DD           =1913        JB7     WRTPRM           ;NO ERROR FLAG. JUMP TO WRITE TO EEPROM.
                    =1914 ;ERROR. ERASE RAM AND RESET POINTER.
06D1 940A           =1915        CALL    ERS2RM           ;ERASE RAM
06D3 FE             =1916        MOV     A,R6             ;RETRIEVE FLAG COUNTER
06D4 538F           =1917        ANL     A,#8FH           ;CLEAR FLAG COUNTER
06D6 AE             =1918        MOV     R6,A
                    =1919 ;RETRIEVE AND CLEAR TWO LABEL FLAG ERROR
06D7 FC             =1920        MOV     A,R4             ;RETRIEVE FLAG
06D8 537F           =1921        ANL     A,#7FH           ;RESET FLAG
06DA AC             =1922        MOV     R4,A             ;SAVE FLAG
06DB C4E7           =1923        JMP     RTPRG            ;JUMP TO RDTAG ROUTINE.
                    =1924 ;
                    =1925 ;ERASE AND PROGRAM EEPROM CONTENTS ACCORDING TO RAM
06DD B421           =1926 WRTPRM: CALL   WREPRM           ;WRITE CONTENTS TO EEPROM
06DF 99BF           =1927        ANL     P1,#255-EBDLT    ;BD-LT OFF
06E1 8920           =1928        ORL     P1,#EGDLT        ;GD-LT ON
06E3 D5             =1929        SEL     RB1
06E4 BE08           =1930        MOV     R6,#EGDTON*2     ;GOOD TONE LENGTH*2
06E6 C5             =1931        SEL     RB0
06E7 F5             =1932 RTPRG: SEL     MB1
```

```
06E8 C400       =1933           JMP     RDTAG           ;GO READ ANOTHER LABEL
                =1934 ;****************************************
06EA A3         =1935 TROPG6:   MOVP    A,@A
06EB 83         =1936           RET
0700            =1937           ORG     700H
                =1938 $         INCLUDE(:F4:FCKCTS.SRC)
                =1939 ;****************************************
                =1940 ;  FILE: FCKCTS.SRC  09-11-86 09:00  BOB ACTIS
                =1941 ;  ROUTINE: CKCNTS
                =1942 ;  FUNCTION: CHECK SEGMENT BUFFER TOTAL COUNTS FOR ENOUGH SEGMENTS FOR
                =1943 ;                    A POSSIBLE VALID VERSION.
                =1944 ;  ENTRY: NO SETUP
                =1945 ;  EXIT:  A = 0 IF ENOUGH SEGMENTS
                =1946 ;         A <> 0 IF NOT ENOUGH SEGMENTS
                =1947 ;         USES R0,R1
                =1948 ;
0700 B9FE       =1949 CKCNTS:   MOV     R1,#-2          ;SETUP MINIMUM SCANS REQUIRED VALUE
0702 B835       =1950           MOV     R0,#R6STOT
0704 F0         =1951           MOV     A,@R0
0705 69         =1952           ADD     A,R1
0706 F61C       =1953           JC      CKCN20          ;POSSIBLE UPC-A, EAN-13 OR UPC-D-BLK2
                =1954 ;
0708 B82D       =1955           MOV     R0,#L6STOT
070A F0         =1956           MOV     A,@R0
070B 69         =1957           ADD     A,R1
070C F629       =1958           JC      CKCN30          ;POSSIBLE UPC-E OR UPC-D-BLK1
                =1959 ;
070E B83B       =1960           MOV     R0,#L4STOT
0710 F0         =1961           MOV     A,@R0
0711 69         =1962           ADD     A,R1
0712 E685       =1963           JNC     CKCNNG
                =1964 ;
0714 B841       =1965 CKCN10:   MOV     R0,#R4STOT
0716 F0         =1966           MOV     A,@R0
0717 69         =1967           ADD     A,R1
0718 F683       =1968           JC      CKCNOK          ;POSSIBLE EAN-8 VERSION
071A E485       =1969           JMP     CKCNNG
                =1970 ;
071C B82D       =1971 CKCN20:   MOV     R0,#L6STOT
071E F0         =1972           MOV     A,@R0
071F 69         =1973           ADD     A,R1
0720 E685       =1974           JNC     CKCNNG
                =1975 ;
0722 B827       =1976           MOV     R0,#L6S1+3
0724 F0         =1977           MOV     A,@R0           ;GET THE PARITY DECODE BYTE
0725 B247       =1978           JB5     CKCN50          ;JUMP IF UPC-D SEGMENT
0727 E483       =1979           JMP     CKCNOK          ;POSSIBLE UPC-A OR EAN-13
                =1980 ;
0729 B827       =1981 CKCN30:   MOV     R0,#L6S1+3      ;CHECK L6 BUFFER 1
072B F0         =1982           MOV     A,@R0
072C B239       =1983           JB5     CKCN40          ;JUMP IF UPC-D SEGMENT
072E 9283       =1984           JB4     CKCNOK          ;POSSIBLE UPC-E
                =1985 ;
0730 B82B       =1986           MOV     R0,#L6S2+3      ;CHECK L6 BUFFER 2
0732 F0         =1987           MOV     A,@R0
0733 B239       =1988           JB5     CKCN40          ;JUMP IF UPC-D SEGMENT
0735 9283       =1989           JB4     CKCNOK          ;POSSIBLE UPC-E
0737 E485       =1990           JMP     CKCNNG
                =1991 ;
0739 B865       =1992 CKCN40:   MOV     R0,#N6STOT
073B F0         =1993           MOV     A,@R0
073C 69         =1994           ADD     A,R1
073D E685       =1995           JNC     CKCNNG
                =1996 ;
073F B83B       =1997 CKCN45:   MOV     R0,#L4STOT
0741 F0         =1998           MOV     A,@R0
0742 69         =1999           ADD     A,R1
0743 F683       =2000           JC      CKCNOK          ;POSSIBLE UPC-D1
0745 E485       =2001           JMP     CKCNNG
                =2002 ;
0747 B841       =2003 CKCN50:   MOV     R0,#R4STOT
0749 F0         =2004           MOV     A,@R0
074A 69         =2005           ADD     A,R1
074B E685       =2006           JNC     CKCNNG
                =2007 ;
074D B859       =2008           MOV     R0,#N4STOT
074F F0         =2009           MOV     A,@R0
0750 69         =2010           ADD     A,R1
0751 F669       =2011           JC      CKCN70          ;POSSIBLE UPC-D4 OR D5
                =2012 ;
0753 B85F       =2013           MOV     R0,#N5STOT
0755 F0         =2014           MOV     A,@R0
0756 69         =2015           ADD     A,R1
0757 F661       =2016           JC      CKCN60
                =2017 ;
0759 B84D       =2018           MOV     R0,#N2STOT
075B F0         =2019           MOV     A,@R0
075C 69         =2020           ADD     A,R1
075D F683       =2021           JC      CKCNOK          ;POSSIBLE UPC-D2
075F E485       =2022           JMP     CKCNNG
                =2023 ;
0761 B853       =2024 CKCN60:   MOV     R0,#N3STOT
0763 F0         =2025           MOV     A,@R0
0764 69         =2026           ADD     A,R1
0765 F683       =2027           JC      CKCNOK          ;POSSIBLE UPC-D3
0767 E485       =2028           JMP     CKCNNG
```

```
                      =2029 ;
0769 B847   =2030 CKCN70: MOV    R0,#N1STOT
076B F0     =2031           MOV    A,@R0
076C 69     =2032           ADD    A,R1
076D E685   =2033           JNC    CKCNNG
            =2034 ;
076F B865   =2035           MOV    R0,#N6STOT
0771 F0     =2036           MOV    A,@R0
0772 69     =2037           ADD    A,R1
0773 F67D   =2038           JC     CKCN80
            =2039 ;
0775 B85F   =2040           MOV    R0,#N5STOT
0777 F0     =2041           MOV    A,@R0
0778 69     =2042           ADD    A,R1
0779 F683   =2043           JC     CKCNOK         ;POSSIBLE UPC-D4
077B E485   =2044           JMP    CKCNNG
            =2045 ;
077D B853   =2046 CKCN80: MOV    R0,#N3STOT
077F F0     =2047           MOV    A,@R0
0780 69     =2048           ADD    A,R1
0781 E685   =2049           JNC    CKCNNG         ;FALL THRU POSSIBLE UPC-D5
            =2050 ;
0783 27     =2051 CKCNOK: CLR    A              ;ENOUGH SCANS FOR A POSSIBLE SEGMENT
0784 83     =2052           RET
            =2053 ;
0785 27     =2054 CKCNNG: CLR    A              ;NO POSSIBLE VERSIONS YET
0786 37     =2055           CPL    A
0787 83     =2056           RET
            2057 $       INCLUDE(:F4:DRSUMT.SRC)
            =2058 ;**************************************************************
            =2059 ;  FILE:  DRSUMT  05-28-86 11:00  BOB ACTIS
            =2060 ;**************************************************************
            =2061 ;  ROUTINE: SUM4BY, SUM3BY, SUM2BY
            =2062 ;  FUNCTION: ADD 4,3 OR 2 BYTE SEGMENT DATA TO ACCUMULATOR
            =2063 ;  ENTRY:  R0 = START ADDRESS OF SEGMENT BUFFER TO SUM
            =2064 ;  EXIT:   R0 = END ADDRESS OF SEGMENT BUFFER
            =2065 ;          A = RUNNING SUM (BASE 256) OF SEGMENT BUFFER DATA
            =2066 ;
0788 60     =2067 SUM4BY: ADD    A,@R0
0789 18     =2068           INC    R0
078A 60     =2069 SUM3BY: ADD    A,@R0
078B 18     =2070           INC    R0
078C 60     =2071 SUM2BY: ADD    A,@R0
078D 18     =2072           INC    R0
078E 60     =2073           ADD    A,@R0
078F 83     =2074           RET
            =2075 ;**************************************************************
            =2076 ;  ROUTINE: DRSUMT  DOUBLE READ SUM TEST
            =2077 ;  FUNCTION: CALCULATE THE LABEL DATA SUM (BASE 256)
            =2078 ;           COMPARE IT TO THE PREVIOUS LABEL SUM
            =2079 ;           SAVE THE NEW SUM
            =2080 ;  ENTRY:  A VALID LABEL VERSION HAS BEEN FOUND
            =2081 ;  EXIT:   USES R0
            =2082 ;          LABEL DATA SUM STORED IN DRSUM
            =2083 ;          A=0 IF OLD=NEW (CONSECUTIVE LABELS ARE THE SAME)
            =2084 ;          A<>0 IF OLD<>NEW (CONSECUTIVE LABELS ARE DIFFERENT)
            =2085 ;
0790 FE     =2086 DRSUMT: MOV    A,R6           ;GET VERSION FLAG
0791 530F   =2087           ANL    A,#0FH         ;MASK VERSION POINTER
0793 0300   =2088           ADD    A,#0           ;SETUP CARRY FOR DA
0795 57     =2089           DA     A
0796 92F4   =2090           JB4    DRVRNG         ;JUMP IF POINTER > 9. ILLEGAL VERSION.
            =2091 ;
0798 039B   =2092           ADD    A,#LOW DRSTBL  ;ADD OFFSET TO TABEL ADDRESS
079A B3     =2093           JMPP   @A             ;JUMP TO VERSION ROUTINE
079B F4     =2094 DRSTBL: DB     LOW DRVRNG     ;NO VALID VERSION. POINTER=0.
079C A5     =2095           DB     LOW DRSMA
079D A5     =2096           DB     LOW DRSM13
079E A8     =2097           DB     LOW DRSME
079F E6     =2098           DB     LOW DRSM8
07A0 CA     =2099           DB     LOW DRSMD1
07A1 D3     =2100           DB     LOW DRSMD2
07A2 C1     =2101           DB     LOW DRSMD3
07A3 B4     =2102           DB     LOW DRSMD4
07A4 AB     =2103           DB     LOW DRSMD5
            =2104 ;
07A5        =2105 DRSMA   EQU    $
07A5 27     =2106 DRSM13: CLR    A
07A6 E4DC   =2107           JMP    DRSM7B         ;GO SUM 7 BYTES
            =2108 ;
07A8 27     =2109 DRSME:  CLR    A
07A9 E4E0   =2110           JMP    DRSM7C         ;GO SUM 7 CHARACTERS
            =2111 ;
07AB 27     =2112 DRSMD5: CLR    A
07AC B860   =2113           MOV    R0,#N6S1
07AE F48C   =2114           CALL   SUM2BY
07B0 B84E   =2115           MOV    R0,#N3S1
07B2 E4B7   =2116           JMP    DRSM5X         ;GO FINISH THE D5 SUM
            =2117 ;
07B4 27     =2118 DRSMD4: CLR    A
07B5 B85A   =2119           MOV    R0,#N5S1
07B7 F48C   =2120 DRSM5X: CALL   SUM2BY
07B9 B854   =2121           MOV    R0,#N4S1
07BB F48C   =2122           CALL   SUM2BY
```

```
07BD 8842    =2123          MOV    R0,#N1S1
07BF E4D6    =2124          JMP    DRSM4X         ;GO FINISH THE D4 OR D5 SUM
             =2125 ;
07C1 27      =2126 DRSMD3:  CLR    A
07C2 B85A    =2127          MOV    R0,#N5S1
07C4 F48C    =2128          CALL   SUM2BY
07C6 B84E    =2129          MOV    R0,#N3S1
07C8 E4D6    =2130          JMP    DRSM3X         ;GO FINISH THE D3 SUM
             =2131 ;
07CA 27      =2132 DRSMD1:  CLR    A
07CB B860    =2133          MOV    R0,#N6S1
07CD F48C    =2134          CALL   SUM2BY
07CF B836    =2135          MOV    R0,#L4S1
07D1 E4DE    =2136          JMP    DRSM1X         ;GO FINISH THE D1 SUM
             =2137 ;
07D3 27      =2138 DRSMD2:  CLR    A
07D4 B848    =2139          MOV    R0,#N2S1
07D6         =2140 DRSM3X   EQU    $
07D6 F48C    =2141 DRSM4X:  CALL   SUM2BY
07D8 B83C    =2142          MOV    R0,#R4S1
07DA F48C    =2143          CALL   SUM2BY
07DC B82E    =2144 DRSM7B:  MOV    R0,#R6S1       ;SUM 7 BYTES
07DE F48A    =2145 DRSM1X:  CALL   SUM3BY
07E0 B824    =2146 DRSM7C:  MOV    R0,#L6S1       ;SUM 7 CHARACTERS
07E2 F488    =2147          CALL   SUM4BY
07E4 E4EF    =2148          JMP    DRSMDN         ;JUMP - THE SUM IS FINISHED
             =2149 ;
07E6 27      =2150 DRSM8:   CLR    A
07E7 B836    =2151          MOV    R0,#L4S1
07E9 F48C    =2152          CALL   SUM2BY
07EB B83C    =2153          MOV    R0,#R4S1
07ED F48C    =2154          CALL   SUM2BY
             =2155 ;
07EF B87C    =2156 DRSMDN:  MOV    R0,#DRSUM
07F1 20      =2157          XCH    A,@R0          ;SAVE THE NEW SUM IN DRSUM
07F2 D0      =2158          XRL    A,@R0          ;COMPARE THE OLD AND NEW SUM
07F3 83      =2159          RET
             =2160 ;
07F4 27      =2161 DRVRNG:  CLR    A              ;DOUBLE READ VERSION N/G
07F5 83      =2162          RET
             =2163 ;****************************
07F6 A3       2164 TROPG7:  MOVP   A,@A
07F7 83       2165          RET
0800          2166          ORG    800H           ;START OF MEMORY BANK 1
              2167 $        INCLUDE(:F4:VERDLB.SRC)
             =2168 ;************************************************************
             =2169 ; FILE: VERDLB.SRC  6-17-86  17:15  BOB ACTIS
             =2170 ;       VERSION "D" FIRMWARE LIBRARY.
             =2171 ;************************************************************
             =2172 ; ROUTINE: CLR6SG
             =2173 ; FUNCTION: CLEAR 6-CHAR SEGMENTS AND COUNTERS.
             =2174 ; ENTRY: START ADDRESS AND COUNT IN DEFS TABLE.
             =2175 ; EXIT:   A = 0
             =2176 ;         R0 = END OF 6-CHAR BUFFER/COUNTER SPACE PLUS 1.
             =2177 ;         R2 = 0
             =2178 ;         6-CHAR BUFFER/COUNTER SPACE = 0'S.
             =2179 ;
0800 B824    =2180 CLR6SG:  MOV    R0,#BF6CST     ;START OF 6-CHAR BUFFER AREA
0802 BA12    =2181          MOV    R2,#BF6CNT     ;NUMBER OF BYTES IN BUFFER
0804 0410    =2182          JMP    CLRT00         ;JUMP TO THE CLEAR LOOP
             =2183 ;************************************************************
             =2184 ; ROUTINE: CLR4SG
             =2185 ; FUNCTION: CLEAR 4-CHAR SEGMENTS AND COUNTERS.
             =2186 ; ENTRY: START ADDRESS AND COUNT IN DEFS TABLE.
             =2187 ; EXIT:   A = 0
             =2188 ;         R0 = END OF 4-CHAR BUFFER/COUNTER SPACE PLUS 1.
             =2189 ;         R2 = 0
             =2190 ;         4-CHAR BUFFER/COUNTER SPACE = 0'S.
             =2191 ;
0806 B836    =2192 CLR4SG:  MOV    R0,#BF4CST     ;START OF 4-CHAR BUFFER AREA
0808 BA30    =2193          MOV    R2,#BF4CNT     ;NUMBER OF BYTES IN BUFFER
080A 0410    =2194          JMP    CLRT00         ;JUMP TO THE CLEAR LOOP
             =2195 ;************************************************************
             =2196 ; ROUTINE: CLRSNB
             =2197 ; FUNCTION: CLEAR THE SCAN BUFFER.
             =2198 ; ENTRY: START ADDRESS IN DEFS TABLE.
             =2199 ; EXIT:   A = 0
             =2200 ;         R0 = END OF SCAN BUFFER SPACE PLUS 1.
             =2201 ;         R2 = 0
             =2202 ;         SCAN BUFFER SPACE = 0'S.
             =2203 ;
080C B820    =2204 CLRSNB:  MOV    R0,#SCNBUF     ;START OF SCAN BUFFER AREA
080E BA04    =2205          MOV    R2,#4          ;NUMBER OF BYTES IN BUFFER
0810 27      =2206 CLRT00:  CLR    A              ;CLEAR LOOP USED BY OTHER ROUTINES
0811 A0      =2207 CLRSN1:  MOV    @R0,A
0812 18      =2208          INC    R0
0813 EA11    =2209          DJNZ   R2,CLRSN1
0815 83      =2210          RET
             =2211 ;************************************************************
             =2212 ; ROUTINE: CLRSBF
             =2213 ; FUNCTION: CLEAR SEND BUFFER, POINTER AND FLAG.
             =2214 ; ENTRY: START ADDRESS AND COUNT IN DEFS TABLE.
             =2215 ;         RB0
```

```
                =2216 ; EXIT:   A = 0
                =2217 ;         R0 = END OF SEND BUFFER SPACE PLUS 1.
                =2218 ;         R2 = 0
                =2219 ;         SEND BUFFER SPACE = 0CCH'S.  (TERMINATION BYTES)
                =2220 ;         SEND BUFFER FULL FLAG CLEAR. RB0-R4-B3
                =2221 ;         SEND BUFFER POINTER SET TO PACKED DATA START ADDRESS.
                =2222 ;
0816 FC         =2223 CLRSBF: MOV    A,R4
0817 53F7       =2224         ANL    A,#255-ESBFUL    ;CLEAR SEND BUFFER FULL FLAG
0819 AC         =2225         MOV    R4,A
                =2226 ;
081A B866       =2227         MOV    R0,#SBFPNT
081C B0CE       =2228         MOV    @R0,#SBSTRT      ;SET POINTER TO PACKED START ADDRESS
                =2229 ;
081E B867       =2230         MOV    R0,#SBUF         ;START OF SEND BUFFER AREA
0820 BA12       =2231         MOV    R2,#SBUFSZ       ;NUMBER OF BYTES IN BUFFER
0822 23CC       =2232         MOV    A,#0CCH          ;LOAD TERMINATION BYTES
0824 0411       =2233         JMP    CLRSN1           ;JUMP TO THE CLEAR LOOP
                =2234 ;****************************************************************
                =2235 ; ROUTINE: MOV2BY, MOV3BY, MOV4BY
                =2236 ; FUNCTION: MOVE BYTES FROM ONE BUFFER TO ANOTHER BUFFER.
                =2237 ; ENTRY: R0 = FIRST BYTE ADDRESS OF SOURCE BUFFER.
                =2238 ;        R1 = FIRST AVAILABLE BYTE ADDRESS OF DESTINATION BUFFER.
                =2239 ; EXIT:  DATA MOVED FROM SOURCE BUFFER TO DESTINATION BUFFER.
                =2240 ;        R0 = END OF SOURCE BUFFER ADDRESS PLUS 1.
                =2241 ;        R1 = NEXT AVAILABLE BYTE ADDRESS OF DESTINATION BUFFER.
                *2242 ;        R2 = 0
                *2243 ;        A = LAST BYTE TRANSFERED
                *2244 ;
0826 BA02       *2245 MOV2BY: MOV    R2,#2
0828 0430       *2246         JMP    MOVXBY
082A BA03       *2247 MOV3BY: MOV    R2,#3
082C 0430       *2248         JMP    MOVXBY
082E BA04       *2249 MOV4BY: MOV    R2,#4
0830 F0         =2250 MOVXBY: MOV    A,@R0
0831 A1         *2251         MOV    @R1,A
0832 18         *2252         INC    R0
0833 19         *2253         INC    R1
0834 EA30       =2254         DJNZ   R2,MOVXBY
0836 83         =2255         RET
                =2256 ;****************************************************************
                *2257 ; ROUTINE: SGSUM4, SGSUM6
                =2258 ; FUNCTION: SUM THE DIGITS OF A SEGMENT FOR THE MOD-10 TEST.
                =2259 ;           ALL ARITHMETIC IS ASSUMED BCD AND ONLY THE UNITS DIGIT
                =2260 ;           IS VALID IN THE SUMS.
                =2261 ; ENTRY: R0 = FIRST BYTE ADDRESS OF SEGMENT TO BE SUMMED.
                =2262 ; EXIT:  R0 = NOT CHANGED
                =2263 ;        R2 = C1+C3+C5   [C1+C3]
                *2264 ;        A  = C2+C4+C6   [C2+C4]
                *2265 ;        F0 IS USED
                =2266 ;
0837 85         *2267 SGSUM4: CLR    F0
0838 95         *2268         CPL    F0               ;SET F0 FOR 4-CHAR SUM
0839 043C       =2269         JMP    SGSUMX
                =2270 ;
083B 85         =2271 SGSUM6: CLR    F0               ;CLEAR F0 FOR 6-CHAR SUM
083C BAF0       =2272 SGSUMX: MOV    R2,#0F0H         ;MASK FOR ODD DIGITS
083E F0         =2273         MOV    A,@R0            ;C1
083F 5A         =2274         ANL    A,R2
0840 18         =2275         INC    R0
0841 60         =2276         ADD    A,@R0            ;C1+C3
0842 57         =2277         DA     A
0843 5A         =2278         ANL    A,R2
0844 B649       =2279         JF0    SGSUMY           ;JUMP IF 4-CHAR SUM
                =2280 ;
0846 18         =2281         INC    R0
0847 60         =2282         ADD    A,@R0            ;C1+C3+C5
0848 57         =2283         DA     A
0849 47         =2284 SGSUMY: SWAP   A                ;PUT SUM IN LOW BYTE
084A AA         =2285         MOV    R2,A             ;SAVE C1+C3+C5  [C1+C3]
                =2286 ;
084B F0         =2287         MOV    A,@R0            ;C6   [C4]
084C C8         =2288         DEC    R0
084D 60         =2289         ADD    A,@R0            ;C6+C4  [C4+C2]
084E 57         =2290         DA     A
084F B654       =2291         JF0    SGSUMR           ;JUMP IF 4-CHAR SUM
                =2292 ;
0851 C8         =2293         DEC    R0
0852 60         =2294         ADD    A,@R0            ;C6+C4+C2
0853 57         =2295         DA     A
0854 83         =2296 SGSUMR: RET
                =2297 ;****************************************************************
                =2298 ; ROUTINE: APL3R2
                =2299 ; FUNCTION: ADD 3*R2 TO A.  (BCD)
                =2300 ; ENTRY: NO SETUP
                =2301 ; EXIT:  A = A+(3*R2)
                =2302 ;        R2 = NOT CHANGED
                =2303 ;
0855 6A         =2304 APL3R2: ADD    A,R2
0856 57         =2305         DA     A
0857 6A         =2306         ADD    A,R2
0858 57         =2307         DA     A
0859 6A         =2308         ADD    A,R2
```

```
085A 57       =2309         DA      A
085B 83       =2310         RET
              =2311 ;***********************************************************
              =2312 ; ROUTINE: MOD104  6-2-86  14:25  BOB ACTIS
              =2313 ; FUNCTION: CALCULATE 4 CHARACTER MODULO 10 CHECKSUM VALUE
              =2314 ; ENTRY: R0 = FIRST BYTE ADDRESS OF SEGMENT TO BE PROCESSED
              =2315 ; EXIT:  A = CALCULATED VALUE
              =2316 ;
085C 1437     =2317 MOD104: CALL    SGSUM4
085E 1455     =2318         CALL    APL3R2
0860 83       =2319         RET
              =2320 ;***********************************************************
              =2321 ; ROUTINE: MOD106  6-2-86  14:25  BOB ACTIS
              =2322 ; FUNCTION: CALCULATE 6 CHARACTER MODULO 10 CHECKSUM VALUE
              =2323 ; ENTRY: R0 = FIRST BYTE ADDRESS OF SEGMENT TO BE PROCESSED
              =2324 ; EXIT:  A = CALCULATED VALUE
              =2325 ;
0861 1438     =2326 MOD106: CALL    SGSUM6
0863 1455     =2327         CALL    APL3R2
0865 83       =2328         RET
               2329 $       INCLUDE(:F3:EMOD10.SRC)
              =2330 ;***********************************************************
              =2331 ; FILE: EMOD10.SRC  11-18-86 12:15  BOB ACTIS
              =2332 ; ROUTINE: EMOD10
              =2333 ; FUNCTION: VERIFY THE EMOD10 CHECK CHARACTER
              =2334 ; ENTRY: SEGMENT IN SCAN BUFFER
              =2335 ; EXIT:  USES R0,R2,A
              =2336 ;          A = 0 IF CHECK CHARACTER IS GOOD
              =2337 ;          A <> 0 IF CHECK CHARACTER IS BAD
              =2338 ;
0866 B820     =2339 EMOD10: MOV     R0,#SCNBUF
0868 B979     =2340         MOV     R1,#WRKBUF
086A 142A     =2341         CALL    MOV3BY          ;MOVE SCAN BUFFER DATA TO WORK BUFFER
              =2342 ;
086C B822     =2343         MOV     R0,#SCNBUF+2
086E F0       =2344         MOV     A,@R0           ;GET CHARACTER C6
086F 530F     =2345         ANL     A,#0FH
0871 03FD     =2346         ADD     A,#-3
0873 F27C     =2347         JB7     ECASE1          ;JUMP IF C6=0,1,2
0875 C685     =2348         JZ      ECASE2          ;JUMP IF C6=3
0877 07       =2349         DEC     A
0878 C690     =2350         JZ      ECASE3          ;JUMP IF C6=4
087A 0496     =2351         JMP     ECASE4          ;JUMP IF C6=5,6,7,8,9
              =2352 ;
              =2353 ; FOR C6=0,1,2 COMPUTE 3*(C2+C3+C5)+C1+C4+C6
              =2354 ;
087C B879     =2355 ECASE1: MOV     R0,#WRKBUF
087E F0       =2356         MOV     A,@R0
087F 47       =2357         SWAP    A               ;SWAP C1 AND C2
0880 A0       =2358         MOV     @R0,A
0881 1438     =2359         CALL    SGSUM6          ;C2,C1,C3,C4,C5,C6
0883 0498     =2360         JMP     EMODSM
              =2361 ;
              =2362 ; FOR C6=3   COMPUTE 3*(C2+0+C5)+C1+C3+C4
              =2363 ;
0885 B87A     =2364 ECASE2: MOV     R0,#WRKBUF+1
0887 27       =2365         CLR     A
0888 30       =2366         XCHD    A,@R0           ;C4=0
0889 18       =2367         INC     R0
088A 30       =2368         XCHD    A,@R0           ;C6=C4
088B F0       =2369         MOV     A,@R0           ;A=C5,C4
088C 47       =2370         SWAP    A               ;A=C4,C5
088D A0       =2371         MOV     @R0,A
088E 0496     =2372         JMP     ECASE4          ;C1,C2,C3,0,C4,C5
              =2373 ; FOR C6=4   COMPUTE 3*(C2+C4+C5)+C1+C3+0
              =2374 ;
0890 B87B     =2375 ECASE3: MOV     R0,#WRKBUF+2
0892 27       =2376         CLR     A
0893 20       =2377         XCH     A,@R0           ;C5=C6=0
0894 47       =2378         SWAP    A
0895 30       =2379         XCHD    A,@R0           ;C5=0, C6=C5
              =2380                                 ;C1,C2,C3,C4,0,C5
              =2381 ;
              =2382 ; FOR C6=5,6,7,8,9 COMPUTE 3*(C2+C4+C6)+C1+C3+C5
              =2383 ;
0896 B879     =2384 ECASE4: MOV     R0,#WRKBUF      ;C1,C2,C3,C4,C5,C6
0898 1438     =2385         CALL    SGSUM6
089A 2A       =2386         XCH     A,R2
              =2387 ;
              =2388 ; FINAL SUM
              =2389 ;
089B 1455     =2390 EMODSM: CALL    APL3R2
              =2391 ;
              =2392 ; CHECK AGAINST THE CHECK CHARACTER
              =2393 ;
089D B823     =2394 EMODCK: MOV     R0,#SCNBUF+3
089F 60       =2395         ADD     A,@R0
08A0 57       =2396         DA      A
08A1 530F     =2397         ANL     A,#0FH
08A3 83       =2398         RET
               2399 $       INCLUDE(:F3:FCKFCA.SRC)
              =2400 ;***********************************************************
              =2401 ; FILE: FCKFCA.SRC  10-25-83 17:10  BOB ACTIS
```

```
              =2402 ; ROUTINE: CKFCA
              =2403 ; FUNCTION: CHECK IF FRAME CONTROL ARRAY HAS DATA.
              =2404 ;           IF SDATA, PROCESS BYTE.
              =2405 ;           IF SEGMENT CAPTURE AND SCANNING BIT IS SET, PUT SEGMENT
              =2406 ;             INTO THE SCAN BUFFER.
              =2407 ;           IF SEGMENT CAPTURE AND NOT SCANNING, RESET THE FRAME.
              =2408 ;           IF A SEGMENT IS SEEN, SET R7.
              =2409 ; ENTRY: RB0
              =2410 ; EXIT: USES R0,R1,A
              =2411 ;       R7 IS SET IF A SEGMENT IS SEEN.
              =2412 ;
08A4 86A7     =2413 CKFCA:  JNI     CKFC10          ;JUMP IF FCA HAS DATA
08A6 83       =2414         RET
              =2415 ;
08A7 B801     =2416 CKFC10: MOV     R0,#ESRRD
08A9 FC       =2417         MOV     A,R4
08AA 12B3     =2418         JB0     CKFC20          ;JUMP IF SCANNING BIT IS SET
08AC 80       =2419         MOVX    A,@R0           ;READ BYTE
08AD F2DF     =2420         JB7     CKFC95          ;JUMP IF HOST DATA
08AF 90       =2421         MOVX    @R0,A           ;RESET FRAME CAPTURE
08B0 BF08     =2422         MOV     R7,#EWAIT       ;SET THE "SEG SEEN" TIMER
08B2 83       =2423         RET
              =2424 ;
08B3 80       =2425 CKFC20: MOVX    A,@R0           ;READ 1ST CHAR OF SEGMENT
08B4 F2DF     =2426         JB7     CKFC95          ;JUMP IF HOST DATA
08B6 D2DB     =2427         JB6     CKFC90          ;JUMP IF PERIODICAL CAPTURE
08B8 B920     =2428         MOV     R1,#SCNBUF
              =2429 ;
08BA 47       =2430         SWAP    A
08BB A1       =2431         MOV     @R1,A           ;STORE 1ST CHAR
08BC 80       =2432         MOVX    A,@R0           ;READ 2ND CHAR OF SEGMENT
08BD 31       =2433         XCHD    A,@R1           ;1ST AND 2ND STORED
08BE 19       =2434         INC     R1
08BF 80       =2435         MOVX    A,@R0           ;READ 3RD CHAR
              =2436 ;
08C0 47       =2437         SWAP    A
08C1 A1       =2438         MOV     @R1,A           ;STORE 3RD CHAR
08C2 80       =2439         MOVX    A,@R0           ;READ 4TH CHAR
08C3 31       =2440         XCHD    A,@R1           ;3RD AND 4TH STORED
08C4 19       =2441         INC     R1
08C5 80       =2442         MOVX    A,@R0           ;READ 5TH CHAR
              =2443 ;
08C6 47       =2444         SWAP    A
08C7 A1       =2445         MOV     @R1,A           ;STORE 5TH CHAR
08C8 80       =2446         MOVX    A,@R0
08C9 31       =2447         XCHD    A,@R1           ;5TH AND 6TH STORED
08CA 19       =2448         INC     R1
              =2449 ;
08CB B804     =2450         MOV     R0,#EPRDEC
08CD 80       =2451         MOVX    A,@R0           ;READ PARITY DECODE BYTE
08CE 537F     =2452         ANL     A,#07FH         ;MASK OFF THE UNUSED BIT
08D0 A1       =2453         MOV     @R1,A           ;STORE PARITY DECODE B0-B6
              =2454 ;
08D1 D37F     =2455         XRL     A,#07FH         ;TEST FOR NO DECODE. (BAD PARITY MAP)
08D3 9609     =2456         JNZ     CKFC80          ;JUMP IF DECODE IS OK.
08D5 140C     =2457         CALL    CLRSNB          ;CLEAR THE SCAN BUFFER
08D7 04DB     =2458         JMP     CKFC90
              =2459 ;
08D9 BF08     =2460 CKFC80: MOV     R7,#EWAIT       ;SET THE "SEG SEEN" TIMER
              =2461 ;
08DB B801     =2462 CKFC90: MOV     R0,#EFRRST
08DD 90       =2463         MOVX    @R0,A           ;RESET THE FRAME
08DE 83       =2464         RET
              =2465 ;
08DF E5       =2466 CKFC95: SEL     MB0
08E0 9400     =2467         CALL    SDATA
08E2 F5       =2468         SEL     MB1
08E3 83       =2469         RET
               2470 ;****************************************
08E4 A3        2471 TROPG8: MOVP    A,@A
08E5 83        2472         RET
0900           2473         ORG     0900H
               2474 $       INCLUDE(:F4:HCOMM.SRC)
              =2475 ;********************************************************************
              =2476 ; FILE: HCOMM.SRC 11-18-86 12:15  BOB ACTIS
              =2477 ; ROUTINE: HCOMM -- FOR THE OCIA INTERFACE
              =2478 ; FUNCTION: SEND NEXT CHARACTER IN SEND BUFFER TO HOST.
              =2479 ; ENTRY: RB0
              =2480 ; EXIT: USES R0,R1,R2,R3,A
              =2481 ;
0900 FC       =2482 HCOMM:  MOV     A,R4
0901 7209     =2483         JB3     HCOM10          ;JUMP IF SEND BUFFER HAS DATA
0903 37       =2484         CPL     A
0904 B248     =2485         JB5     HCOM90          ;JUMP IF BUFMAN REQUEST FLAG NOT SET
0906 F40A     =2486         CALL    BUFMAN          ;PUT MESSAGE INTO THE COMM BUFFER
0908 83       =2487         RET
              =2488 ;
0909 0A       =2489 HCOM10: IN      A,P2
090A 9248     =2490         JB4     HCOM90          ;JUMP IF RDATA SR NOT READY
              =2491 ;
090C B966     =2492         MOV     R1,#SBFPNT      ;GET POINTER ADDRESS
090E F1       =2493         MOV     A,@R1           ;GET POINTER
090F 97       =2494         CLR     C
```

```
0910 67      =2495            RRC    A              ;PUT NIBBLE POINTER IN CARRY
0911 11      =2496            INC    @R1            ;INCREMENT POINTER
0912 A9      =2497            MOV    R1,A           ;BYTE ADDRESS
0913 17      =2498            INC    A
0914 A8      =2499            MOV    R0,A           ;NEXT BYTE ADDRESS
0915 F1      =2500            MOV    A,@R1          ;GET DATA
0916 D3CC    =2501            XRL    A,#ETRMBY
0918 C642    =2502            JZ     HCOM55         ;JUMP IF TERMINATION BYTE TOO SOON
             =2503 ;
091A F1      =2504            MOV    A,@R1          ;ONE MORE TIME...
091B F61E    =2505            JC     HCOM20         ;JUMP IF LOW NIBBLE IS NEXT
091D 47      =2506            SWAP   A
             =2507 ;
091E 530F    =2508 HCOM20:    ANL    A,#0FH         ;MASK NIBBLE
0920 AB      =2509            MOV    R3,A           ;SAVE NIBBLE
0921 D30C    =2510            XRL    A,#0CH
0923 C648    =2511            JZ     HCOM90         ;JUMP IF FILLER CHARACTER (DON'T SEND)
0925 27      =2512            CLR    A
0926 A9      =2513            MOV    R1,A           ;CLEAR R1 FOR POSSIBLE LAST CHAR BIT
0927 E632    =2514            JNC    HCOM30         ;JUMP IF NOT LOW (POSSIBLE LAST) NIBBLE
             =2515 ;
0929 F0      =2516            MOV    A,@R0          ;GET NEXT DATA BYTE
092A D3CC    =2517            XRL    A,#ETRMBY
092C 9632    =2518            JNZ    HCOM30         ;JUMP IF NOT TERMINATION BYTE
             =2519 ;
092E B940    =2520            MOV    R1,#EBIT6      ;PUT IN THE LAST CHAR BIT
0930 1416    =2521            CALL   CLRSBF         ;CLEAR SEND BUFFER, ETC.
             =2522 ;
0932 FB      =2523 HCOM30:    MOV    A,R3           ;GET NIBBLE
0933 0330    =2524            ADD    A,#00110000B
0935 57      =2525            DA     A
0936 823A    =2526            JB5    HCOM40         ;JUMP IF CHAR IS 0-9
0938 03C1    =2527            ADD    A,#11000001B   ;FORMAT CHARACTERS A-F
             =2528 ;
093A 49      =2529 HCOM40:    ORL    A,R1           ;ADD POSSIBLE LAST CHAR BIT
093B AB      =2530            MOV    R3,A           ;SAVE DATA BYTE
093C E5      =2531            SEL    MB0
093D 3490    =2532            CALL   PARITY
093F F5      =2533            SEL    MB1
0940 2445    =2534            JMP    HCOM80
             =2535 ;
0942 1416    =2536 HCOM55:    CALL   CLRSBF         ;CLEAR, TERMINATION BYTE TOO SOON
0944 83      =2537            RET
             =2538 ;
0945 B802    =2539 HCOM80:    MOV    R0,#EOCIA
0947 90      =2540            MOVX   @R0,A          ;SEND CHARACTER
             =2541 ;
0948 83      =2542 HCOM90:    RET
             2543 $      INCLUDE(:F4:PROCSG.SRC)
             =2544 ;***********************************************************
             =2545 ; FILE: PROCSG.SRC  07-03-86 15:15  BOB ACTIS
             =2546 ;***********************************************************
             =2547 ; ROUTINE: SWP4SN, SWP6SN
             =2548 ; FUNCTION: SWAP (REVERSE) ORDER OF PACKED CHARACTERS IN SCAN BUFFER.
             =2549 ;           SWP4SN SWAPS CHARACTERS IN SCNBUF+1 AND SCNBUF+2.
             =2550 ;           SWP6SN SWAPS CHARACTERS IN SCNBUF, SCNBUF+1 AND SCNBUF+2.
             =2551 ;           CLEARS BACKWARD BIT IN THE PARITY DECODE BYTE SCNBUF+3.
             =2552 ; ENTRY: NO SETUP
             =2553 ; EXIT:  CHARACTERS SWAPED.
             =2554 ;        R0 = SCNBUF+3 (PARITY DECODE BYTE ADDRESS)
             =2555 ;             BACKWARD BIT IS CLEARED.
             =2556 ;        A = PARITY DECODE BYTE
             =2557 ;
0949 B822    =2558 SWP4SN:    MOV    R0,#SCNBUF+2
094B F0      =2559            MOV    A,@R0
094C 47      =2560            SWAP   A
094D C8      =2561            DEC    R0
094E 20      =2562            XCH    A,@R0
094F 47      =2563            SWAP   A
0950 18      =2564            INC    R0
0951 A0      =2565            MOV    @R0,A
0952 2462    =2566            JMP    SWPXEX
             =2567 ;
0954 B822    =2568 SWP6SN:    MOV    R0,#SCNBUF+2
0956 F0      =2569            MOV    A,@R0
0957 47      =2570            SWAP   A
0958 C8      =2571            DEC    R0
0959 20      =2572            XCH    A,@R0
095A 47      =2573            SWAP   A
095B 20      =2574            XCH    A,@R0
095C C8      =2575            DEC    R0
095D 20      =2576            XCH    A,@R0
095E 47      =2577            SWAP   A
095F 18      =2578            INC    R0
0960 18      =2579            INC    R0
0961 A0      =2580            MOV    @R0,A
             =2581 ;
0962 18      =2582 SWPXEX:    INC    R0
0963 F0      =2583            MOV    A,@R0
0964 53BF    =2584            ANL    A,#255-EDECBK
0966 A0      =2585            MOV    @R0,A
0967 4409    =2586            JMP    SWPXRT
             =2587 ;***********************************************************
             =2588 ; ROUTINE: INCHNB, INCLNB
```

```
                =2589 ; FUNCTION: INCREMENT SEGMENT COUNTERS.
                =2590 ;           LOW NIBBLE IS SEGMENT ONE COUNTER.
                =2591 ;           HIGH NIBBLE IS SEGMENT TWO COUNTER.
                =2592 ;           TERMINAL COUNT IS 15. (OFH)
                =2593 ;           IF NOT ALREADY TERMINAL COUNT, INCREMENT THE SEGMENT
                =2594 ;           COUNTER AND TOTAL COUNTER.
                =2595 ; ENTRY:  R0 = PACKED SEGMENT COUNTER ADDRESS
                =2596 ;         R0+1 = SEGMENT TOTAL COUNTER ADDRESS
                =2597 ; EXIT:   IF NIBBLE WAS INCREMENTED:
                =2598 ;             R0 = SEGMENT TOTAL COUNTER ADDRESS
                =2599 ;             A  = PACKED COUNTER
                =2600 ;             CARRY = CLEAR
                =2601 ;         IF NIBBLE WAS ALREADY 0FH:
                =2602 ;             R0 = PACKED SEGMENT COUNTER ADDRESS
                =2603 ;             A  = NOT DEFINED
                =2604 ;             CARRY = SET
                =2605 ;
0969 F0         =2606 INCHNB: MOV    A,@R0           ;GET PACKED COUNTER
096A 97         =2607         CLR    C
096B 0310       =2608         ADD    A,#10H          ;INCREMENT HIGH NIBBLE
096D F67C       =2609         JC     INCXRT          ;JUMP IF ALREADY 0F0H
096F 2479       =2610         JMP    INCX90
                =2611 ;
0971 F0         =2612 INCLNB: MOV    A,@R0
0972 47         =2613         SWAP   A
0973 97         =2614         CLR    C
0974 0310       =2615         ADD    A,#10H
0976 F67C       =2616         JC     INCXRT          ;JUMP IF ALREADY 00FH
0978 47         =2617         SWAP   A
                =2618 ;
0979 A0         =2619 INCX90: MOV    @R0,A           ;UPDATE THE PACKED COUNTER
097A 18         =2620         INC    R0
097B 10         =2621         INC    @R0             ;INCREMENT TOTAL COUNTER
                =2622 ;
097C 83         =2623 INCXRT: RET
                =2624 ;****************************************************************
                =2625 ; ROUTINE: MCH2BY, MCH3BY, MCH4BY
                =2626 ; FUNCTION: COMPARE BYTES IN ONE BUFFER WITH A SECOND BUFFER.
                =2627 ; ENTRY: R0 = FIRST BYTE ADDRESS OF FIRST BUFFER
                =2628 ;        R1 = FIRST BYTE ADDRESS OF SECOND BUFFER
                =2629 ; EXIT:  IF BUFFER ONE EQUALS BUFFER TWO:
                =2630 ;            R0 = END OF FIRST BUFFER ADDRESS PLUS 1.
                =2631 ;            R1 = END OF SECOND BUFFER ADDRESS PLUS 1.
                =2632 ;            R2 = 0
                =2633 ;            A  = 0
                =2634 ;        IF BUFFER ONE DOESN'T EQUAL BUFFER TWO:
                =2635 ;            R0 = BUFFER ONE "NOT EQUAL" BYTE ADDRESS
                =2636 ;            R1 = BUFFER TWO "NOT EQUAL" BYTE ADDRESS
                =2637 ;            R2 <> 0
                =2638 ;            A  <> 0
                =2639 ;
097D BA02       =2640 MCH2BY: MOV    R2,#2
097F 2487       =2641         JMP    MCHXBY
0981 BA03       =2642 MCH3BY: MOV    R2,#3
0983 2487       =2643         JMP    MCHXBY
0985 BA04       =2644 MCH4BY: MOV    R2,#4
0987 F0         =2645 MCHXBY: MOV    A,@R0
0988 D1         =2646         XRL    A,@R1
0989 968F       =2647         JNZ    MCHXRT          ;JUMP IF NOT EQUAL
098B 18         =2648         INC    R0
098C 19         =2649         INC    R1
098D EA87       =2650         DJNZ   R2,MCHXBY
098F 83         =2651 MCHXRT: RET
                =2652 ;****************************************************************
0990 A3         =2653 TROPG9: MOVP   A,@A
0991 83         =2654         RET
0A00            =2655         ORG    0A00H
                =2656 ;****************************************************************
                =2657 ; ROUTINE: PROCSG
                =2658 ; FUNCTION: CHECK FOR SCAN BUFFER DATA.
                =2659 ;           SWAP SCAN BUFFER DATA IF BACKWARDS.
                =2660 ;           CHECK FOR MISMATCHES.
                =2661 ;           MOVE SCAN BUFFER TO PROPER SEGMENT BUFFER.
                =2662 ;           INCREMENT SEGMENT AND TOTAL COUNTERS.
                =2663 ; ENTRY: NO SETUP
                =2664 ; EXIT:  USES R0,R1,R2,R3,A
                =2665 ;
0A00 2449       =2666 SWP4SJ: JMP    SWP4SN
0A02 2454       =2667 SWP6SJ: JMP    SWP6SN
                =2668 ;
0A04 B823       =2669 PROCSG: MOV    R0,#SCNBUF+3
0A06 F0         =2670         MOV    A,@R0           ;GET PARITY DECODE BYTE
0A07 C650       =2671         JZ     PROCRT          ;JUMP IF NO DATA
                =2672 ;
0A09 8228       =2673 SWPXRT: J85    PROCDX          ;JUMP IF UPC-D BIT SET
0A0B 923D       =2674         JB4    PROCE           ;JUMP IF UPC-E BIT SET
0A0D 530F       =2675         ANL    A,#0FH
0A0F 0300       =2676         ADD    A,#0            ;SETS CARRY FLAGS FOR DA
0A11 57         =2677         DA     A
0A12 9219       =2678         JB4    PROC05          ;JUMP IF DECODE > 9
                =2679 ;
0A14            =2680 PROC3L  EQU    $               ;PROCESS AN EAN-13-L
0A14 F0         =2681 PROCD:  MOV    A,@R0           ;PROCESS A D-SEGMENT
```

```
0A15 D202      =2682           JB6     SWP6SJ          ;JUMP IF BACKWARDS
0A17 6400      =2683           JMP     PRO7CH
               =2684 ;
0A19 3245      =2685 PROC05:   JB1     PROCA           ;JUMP IF UPC-A
0A1B F0        =2686 PROC8:    MOV     A,@R0           ;EAN-8 COMES HERE
0A1C D200      =2687           JB6     SWP4SJ          ;JUMP IF BACKWARDS
0A1E 1224      =2688           JB0     PROC8R          ;JUMP IF EAN-8-R
0A20 BB3A      =2689 PROC8L:   MOV     R3,#L4SCNT
0A22 4451      =2690           JMP     PRO4CH          ;GO PROCESS A 4-CHAR SEG
0A24 BB40      =2691 PROC8R:   MOV     R3,#R4SCNT
0A26 4451      =2692           JMP     PRO4CH
               =2693 ;
0A28 530F      =2694 PROCDX:   ANL     A,#0FH
0A2A C614      =2695           JZ      PROCD           ;JUMP IF UPC-D SEG
0A2C F0        =2696 PROCDN:   MOV     A,@R0
0A2D D200      =2697           JB6     SWP4SJ
0A2F 530F      =2698           ANL     A,#0FH          ;PROCESS N(1) TO N(6) SEGS
0A31 0336      =2699           ADD     A,#LOW PROCNT-1
0A33 A3        =2700           MOVP    A,@A            ;GET THE SEGMENT COUNTER ADDRESS
0A34 AB        =2701           MOV     R3,A
0A35 4451      =2702           JMP     PRO4CH
0A37 46        =2703 PROCNT:   DB      LOW N1SCNT
0A38 4C        =2704           DB      LOW N2SCNT
0A39 52        =2705           DB      LOW N3SCNT
0A3A 58        =2706           DB      LOW N4SCNT
0A3B 5E        =2707           DB      LOW N5SCNT
0A3C 64        =2708           DB      LOW N6SCNT
               =2709 ;
0A3D D202      =2710 PROCE:    JB6     SWP6SJ
0A3F 1466      =2711           CALL    EMOD10
0A41 964E      =2712           JNZ     PROCEX          ;JUMP IF EMOD10 TEST FAILED
0A43 6400      =2713           JMP     PRO7CH
               =2714 ;
0A45 F0        =2715 PROCA:    MOV     A,@R0
0A46 D202      =2716           JB6     SWP6SJ
0A48 124C      =2717           JB0     PROCAR          ;JUMP IF UPC-A-R
0A4A 6400      =2718 PROCAL:   JMP     PRO7CH
0A4C 4495      =2719 PROCAR:   JMP     PRO6CH
               =2720 ;
0A4E 140C      =2721 PROCEX:   CALL    CLRSNB          ;GO CLEAR THE SCAN BUFFER
0A50 83        =2722 PROCRT:   RET                     ;RETURN FROM PROCESS SEGMENT ROUTINE
               =2723 ;****************************************************************
               =2724 ; ROUTINE: PRO4CH
               =2725 ; FUNCTION: PROCESS 4-CHAR SEGMENTS (2 BYTES)
               =2726 ;                 CHECKS FOR MISMATCHES.
               =2727 ;                 MOVES SEGMENT FROM SCAN BUFFER TO SEGMENT BUFFER.
               =2728 ;                 INCREMENTS SCAN AND TOTAL COUNTERS.
               =2729 ; ENTRY: R3 = PACKED SCAN COUNTER ADDRESS
               =2730 ;        R3-4 = SCAN 1 BUFFER ADDRESS
               =2731 ;        R3-2 = SCAN 2 BUFFER ADDRESS
               =2732 ;        R3+1 = TOTAL COUNTER ADDRESS
               =2733 ; EXIT:  SEGMENT PROCESSED
               =2734 ;        SCAN BUFFER CLEARED
               =2735 ;        USES R0,R1,R2,R3,A
               =2736 ;
0A51 FB        =2737 PRO4CH:   MOV     A,R3
0A52 A8        =2738           MOV     R0,A
0A53 F0        =2739           MOV     A,@R0           ;GET S2/S1 PACKED COUNTS
0A54 530F      =2740           ANL     A,#0FH
0A56 B821      =2741           MOV     R0,#SCNBUF+1
0A58 9662      =2742           JNZ     PRO4C2          ;JUMP IF SCAN 1 COUNTER <> 0
               =2743 ;
0A5A FB        =2744           MOV     A,R3            ;SCAN 1 COUNTER = 0
0A5B 03FC      =2745           ADD     A,#-4
0A5D A9        =2746           MOV     R1,A            ;SCAN 1 BUFFER ADDRESS
0A5E 1426      =2747           CALL    MOV2BY
0A60 446A      =2748           JMP     PRO4C3
               =2749 ;
0A62 FB        =2750 PRO4C2:   MOV     A,R3            ;SCAN 1 COUNTER <> 0
0A63 03FC      =2751           ADD     A,#-4
0A65 A9        =2752           MOV     R1,A            ;SCAN 1 BUFFER ADDRESS
0A66 3470      =2753           CALL    MCH2BY
0A68 9670      =2754           JNZ     PRO4C4          ;JUMP IF NO MATCH
               =2755 ;
0A6A FB        =2756 PRO4C3:   MOV     A,R3
0A6B A8        =2757           MOV     R0,A
0A6C 3471      =2758           CALL    INCLNB          ;INCREMENT SCAN 1 COUNTER AND TOTAL
0A6E 444E      =2759           JMP     PROCEX
               =2760 ;
0A70 FB        =2761 PRO4C4:   MOV     A,R3            ;SCAN 1 BUFFER DOESN'T MATCH
0A71 A8        =2762           MOV     R0,A
0A72 F0        =2763           MOV     A,@R0
0A73 53F0      =2764           ANL     A,#0F0H
0A75 B821      =2765           MOV     R0,#SCNBUF+1
0A77 9681      =2766           JNZ     PRO4C6          ;JUMP IF SCAN 2 COUNTER <> 0
               =2767 ;
0A79 FB        =2768           MOV     A,R3
0A7A 03FE      =2769           ADD     A,#-2
0A7C A9        =2770           MOV     R1,A            ;SCAN 2 BUFFER ADDRESS
0A7D 1426      =2771           CALL    MOV2BY
0A7F 4489      =2772           JMP     PRO4C7
               =2773 ;
0A81 FB        =2774 PRO4C6:   MOV     A,R3            ;SCAN 2 COUNT <> 0
```

```
0A82 03FE    =2775           ADD    A,#-2
0A84 A9      =2776           MOV    R1,A       ;SCAN 2 BUFFER ADDRESS
0A85 347D    =2777           CALL   MCH2BY
0A87 968F    =2778           JNZ    PRO4C8     ;JUMP IF NO MATCH
             =2779 ;
0A89 FB      =2780 PRO4C7:   MOV    A,R3
0A8A A8      =2781           MOV    R0,A
0A8B 3469    =2782           CALL   INCHNB     ;INCREMENT SCAN 2 COUNT AND TOTAL
0A8D 444E    =2783           JMP    PROCEX
             =2784 ;
0A8F FB      =2785 PRO4C8:   MOV    A,R3       ;NEITHER SCAN BUFFER MATCHED
0A90 17      =2786           INC    A
0A91 A8      =2787           MOV    R0,A       ;TOTAL COUNTER ADDRESS
0A92 10      =2788           INC    @R0        ;INCREMENT TOTAL COUNTER
0A93 444E    =2789           JMP    PROCEX
             =2790 ;************************************************************
             =2791 ; ROUTINE:  PRO6CH
             =2792 ; FUNCTION: PROCESS 6-CHAR SEGMENTS (3 BYTES)
             =2793 ;           CHECKS FOR MISMATCHES.
             =2794 ;           MOVES SEGMENT FROM SCAN BUFFER TO SEGMENT BUFFER.
             =2795 ;           INCREMENTS SCAN AND TOTAL COUNTERS.
             =2796 ; ENTRY: NO SETUP
             =2797 ; EXIT:  SEGMENT IS PROCESSED
             =2798 ;        SCAN BUFFER CLEARED
             =2799 ;        USES R0,R1,R2,R3,A
             =2800 ;
0A95 B834    =2801 PRO6CH:   MOV    R0,#R6SCNT
0A97 F0      =2802           MOV    A,@R0      ;GET S2/S1 PACKED COUNTS
0A98 530F    =2803           ANL    A,#0FH
0A9A B92E    =2804           MOV    R1,#R6S1
0A9C B820    =2805           MOV    R0,#SCNBUF
0A9E 96A4    =2806           JNZ    PRO6C2     ;JUMP IF SCAN 1 COUNTER <> 0
             =2807 ;
0AA0 142A    =2808           CALL   MOV3BY     ;SCAN 1 COUNTER = 0
0AA2 44A8    =2809           JMP    PRO6C3
             =2810 ;
0AA4 3481    =2811 PRO6C2:   CALL   MCH3BY     ;SCAN 1 COUNTER <> 0
0AA6 96AE    =2812           JNZ    PRO6C4     ;JUMP IF NO MATCH
             =2813 ;
0AA8 B834    =2814 PRO6C3:   MOV    R0,#R6SCNT
0AAA 3471    =2815           CALL   INCLNB     ;INCREMENT SCAN 1 COUNTER AND TOTAL
0AAC 444E    =2816           JMP    PROCEX
             =2817 ;
0AAE B834    =2818 PRO6C4:   MOV    R0,#R6SCNT ;SCAN 1 BUFFER DOESN'T MATCH
0AB0 F0      =2819           MOV    A,@R0
0AB1 53F0    =2820           ANL    A,#0F0H
0AB3 B931    =2821           MOV    R1,#R6S2
0AB5 B820    =2822           MOV    R0,#SCNBUF
0AB7 968D    =2823           JNZ    PRO6C6     ;JUMP IF SCAN 2 COUNTER <> 0
             =2824 ;
0AB9 142A    =2825           CALL   MOV3BY
0ABB 44C1    =2826           JMP    PRO6C7
             =2827 ;
0ABD 3481    =2828 PRO6C6:   CALL   MCH3BY     ;SCAN 2 COUNTER <> 0
0ABF 96C7    =2829           JNZ    PRO6C8     ;JUMP IF NO MATCH
             =2830 ;
0AC1 B834    =2831 PRO6C7:   MOV    R0,#R6SCNT
0AC3 3469    =2832           CALL   INCHNB     ;INCREMENT SCAN 2 COUNT AND TOTAL
0AC5 444E    =2833           JMP    PROCEX
             =2834 ;
0AC7 B835    =2835 PRO6C8:   MOV    R0,#R6STOT ;NEITHER SCAN BUFFER MATCHED
0AC9 10      =2836           INC    @R0        ;INCREMENT TOTAL COUNTER
0ACA 444E    =2837           JMP    PROCEX
             =2838 ;*******************************************
0ACC A3      =2839 TROPGA:   MOVP   A,@A
0ACD 83      =2840           RET
0B00         =2841           ORG    0B00H
             =2842 ;************************************************************
             =2843 ; ROUTINE:  PRO7CH
             =2844 ; FUNCTION: PROCESS 7-CHAR SEGMENTS (4 BYTES)
             =2845 ;           CHECKS FOR MISMATCHES.
             =2846 ;           MOVES SEGMENT FROM SCAN BUFFER TO SEGMENT BUFFER.
             =2847 ;           INCREMENTS SCAN AND TOTAL COUNTERS.
             =2848 ; ENTRY: NO SETUP
             =2849 ; EXIT:  SEGMENT IS PROCESSED
             =2850 ;        SCAN BUFFER CLEARED
             =2851 ;        USES R0,R1,R2,R3,A
             =2852 ;
0B00 B82C    =2853 PRO7CH:   MOV    R0,#L6SCNT
0B02 F0      =2854           MOV    A,@R0      ;GET S2/S1 PACKED COUNTS
0B03 530F    =2855           ANL    A,#0FH
0B05 B924    =2856           MOV    R1,#L6S1
0B07 B820    =2857           MOV    R0,#SCNBUF
0B09 960F    =2858           JNZ    PRO7C2     ;JUMP IF SCAN 1 COUNTER <> 0
             =2859 ;
0B0B 142E    =2860           CALL   MOV4BY     ;SCAN 1 COUNTER = 0
0B0D 6413    =2861           JMP    PRO7C3
             =2862 ;
0B0F 3485    =2863 PRO7C2:   CALL   MCH4BY     ;SCAN 1 COUNTER <> 0
0B11 9619    =2864           JNZ    PRO7C4     ;JUMP IF NO MATCH
             =2865 ;
0B13 B82C    =2866 PRO7C3:   MOV    R0,#L6SCNT
0B15 3471    =2867           CALL   INCLNB     ;INCREMENT SCAN 1 COUNTER AND TOTAL
```

```
0B17 444E      =2868           JMP    PROCEX
               =2869 ;
0B19 B82C      =2870 PRO7C4:   MOV    R0,#L6SCNT      ;SCAN 1 BUFFER DOESN'T MATCH
0B1B F0        =2871           MOV    A,@R0
0B1C 53F0      =2872           ANL    A,#0F0H
0B1E B928      =2873           MOV    R1,#L6S2
0B20 B820      =2874           MOV    R0,#SCNBUF
0B22 9628      =2875           JNZ    PRO7C6          ;JUMP IF SCAN 2 COUNTER <> 0
               =2876 ;
0B24 142E      =2877           CALL   MOV4BY
0B26 642C      =2878           JMP    PRO7C7
               =2879 ;
0B28 3485      =2880 PRO7C6:   CALL   MCH4BY          ;SCAN 2 COUNTER <> 0
0B2A 9632      =2881           JNZ    PRO7C8          ;JUMP IF NO MATCH
               =2882 ;
0B2C B82C      =2883 PRO7C7:   MOV    R0,#L6SCNT
0B2E 3469      =2884           CALL   INCHNB          ;INCREMENT SCAN 2 COUNT AND TOTAL
0B30 444E      =2885           JMP    PROCEX
               =2886 ;
0B32 B82D      =2887 PRO7C8:   MOV    R0,#L6STOT      ;NEITHER SCAN BUFFER MATCHED
0B34 10        =2888           INC    @R0             ;INCREMENT TOTAL COUNTER
0B35 444E      =2889           JMP    PROCEX
                2890 $         INCLUDE(:F4:VERTAG.SRC)
               =2891 ;****************************************************************
               =2892 ;  FILE: VERTAG.SRC  09-11-86 09:05  BOB ACTIS
               =2893 ;****************************************************************
               =2894 ; ROUTINE: CKMAJ
               =2895 ; FUNCTION: DETERMINE MAJORITY SEGMENT COUNTER
               =2896 ; ENTRY: R0 = PACKED COUNTER ADDRESS
               =2897 ; EXIT:  R0 = NOT CHANGED
               =2898 ;        USES R2,A
               =2899 ;        CARRY SET IF LOW>=HIGH NIBBLE  (S1CNT>=S2CNT)
               =2900 ;        CARRY CLEAR IF LOW<HIGH NIBBLE (S1CNT<S2CNT)
               =2901 ;
0B37 F0        =2902 CKMAJ:    MOV    A,@R0           ;GET PACKED COUNTER
0B38 530F      =2903           ANL    A,#0FH
0B3A AA        =2904           MOV    R2,A            ;S1CNT
0B3B F0        =2905           MOV    A,@R0
0B3C 47        =2906           SWAP   A
0B3D 530F      =2907           ANL    A,#0FH          ;MASK S2CNT
0B3F C645      =2908           JZ     CKMAJ9          ;JUMP IF S2CNT=0
0B41 37        =2909           CPL    A
0B42 17        =2910           INC    A               ;2'S COMP S2CNT
0B43 6A        =2911           ADD    A,R2            ;S1CNT-S2CNT
0B44 83        =2912           RET
               =2913 ;
0B45 97        =2914 CKMAJ9:   CLR    C               ;S2CNT=0 IS A SPECIAL CASE
0B46 A7        =2915           CPL    C
0B47 83        =2916           RET
               =2917 ;****************************************************************
               =2918 ; ROUTINE: CKMISM
               =2919 ; FUNCTION: CHECK FOR EXCESS MISMATCHED SEGMENTS.
               =2920 ;           CLEAR COUNTERS IF EXCESS MISMATCHES.
               =2921 ; ENTRY: SCAN 1 COUNTER HAS THE MAJORITY SEGMENT COUNT.
               =2922 ;        R0 = PACKED SCAN2/SCAN1 SEGMENT COUNTER ADDRESS.
               =2923 ;        R0+1 = TOTAL SEGMENT COUNTER ADDRESS.
               =2924 ; EXIT:  USES R1,R2,A
               =2925 ;        R0 = NOT CHANGED
               =2926 ;        IF TOTAL=MAJORITY (0 MISMATCHES)
               =2927 ;           OR TOTAL-1=MAJORITY (1 MISMATCH) AND MAJORITY>=3
               =2928 ;           OR TOTAL-2=MAJORITY (2 MISMATCH) AND MAJORITY>=15
               =2929 ;        THEN RETURN,
               =2930 ;        ELSE COUNTERS ARE CLEARED.
               =2931 ;
0B48 F0        =2932 CKMISM:   MOV    A,@R0
0B49 C66F      =2933           JZ     CKMS90          ;JUMP IF S2/S1 COUNTERS=0
               =2934 ;
0B4B F8        =2935           MOV    A,R0
0B4C 17        =2936           INC    A
0B4D A9        =2937           MOV    R1,A            ;SCAN TOTAL COUNTER ADDRESS
               =2938 ;
0B4E F0        =2939           MOV    A,@R0
0B4F 530F      =2940           ANL    A,#0FH          ;MASK S1 COUNT
0B51 AA        =2941           MOV    R2,A            ;SAVE MAJORITY COUNT
0B52 D1        =2942           XRL    A,@R1
0B53 C66F      =2943           JZ     CKMS90          ;JUMP IF TOTAL=MAJORITY (0 MISMATCHES)
               =2944 ;
0B55 F1        =2945           MOV    A,@R1
0B56 07        =2946           DEC    A
0B57 DA        =2947           XRL    A,R2
0B58 C666      =2948           JZ     CKMS30          ;JUMP IF TOTAL-1=MAJORITY (1 MISMATCH)
               =2949 ;
0B5A F1        =2950           MOV    A,@R1
0B5B 07        =2951           DEC    A
0B5C 07        =2952           DEC    A
0B5D DA        =2953           XRL    A,R2
0B5E 966C      =2954           JNZ    CKMS80          ;JUMP IF >2 MISMATCHES
               =2955 ;
               =2956 ; TOTAL-2=MAJORITY (2 MISMATCHES). CHECK FOR MAJORITY>=15.
               =2957 ;
0B60 FA        =2958           MOV    A,R2
0B61 03F1      =2959           ADD    A,#-15
0B63 E66C      =2960           JNC    CKMS80          ;JUMP IF <15
```

```
0B65 83        =2961         RET
               =2962 ;
               =2963 ; TOTAL-1=MAJORITY (1 MISMATCH). CHECK FOR MAJORITY>=3.
               =2964 ;
0B66 FA        =2965 CKMS30: MOV     A,R2
0B67 03FD      =2966         ADD     A,#-3
0B69 E66C      =2967         JNC     CKMS80          ;JUMP IF <3
0B6B 83        =2968         RET
               =2969 ;
               =2970 ; FAILED TEST. CLEAR COUNTERS.
               =2971 ;
0B6C 27        =2972 CKMS80: CLR     A
0B6D A0        =2973         MOV     @R0,A           ;CLEAR S2/S1 COUNTERS
0B6E A1        =2974         MOV     @R1,A           ;CLEAR TOTAL COUNTER
0B6F 83        =2975 CKMS90: RET
               =2976 ;********************************************************
               =2977 ; ROUTINE: EXSBF2, EXSBF3, EXSBF4
               =2978 ; FUNCTION: EXCHANGE SEGMENT BUFFERS AND COUNTERS. (2,3 OR 4 BYTES)
               =2979 ;           (I.E. EXCHANGE BUFFER 1 DATA WITH BUFFER 2 DATA)
               =2980 ; ENTRY:  R0 = SCAN 1 BUFFER ADDRESS
               =2981 ;         R0+2[3,4] = SCAN 2 BUFFER ADDRESS
               =2982 ;         R0+3[4,5] = SCAN2/SCAN1 PACKED COUNTER ADDRESS
               =2983 ; EXIT: USES R1,R2
               =2984 ;       SCAN 1 AND SCAN 2 DATA AND COUNTERS EXCHANGED.
               =2985 ;       R0 = SCAN2/SCAN1 COUNTER ADDRESS.
               =2986 ;       A = SCAN2/SCAN1 COUNTERS
               =2987 ;
0B70 BA02      =2988 EXSBF2: MOV     R2,#2
0B72 647A      =2989         JMP     EXSBFX
0B74 BA03      =2990 EXSBF3: MOV     R2,#3
0B76 647A      =2991         JMP     EXSBFX
0B78 BA04      =2992 EXSBF4: MOV     R2,#4
0B7A F8        =2993 EXSBFX: MOV     A,R0            ;GET SCAN 1 BUFFER ADDRESS
0B7B A9        =2994         MOV     R1,A            ;SAVE IT
0B7C 6A        =2995         ADD     A,R2            ;CALCULATE SCAN 2 BUFFER ADDRESS
0B7D A8        =2996         MOV     R0,A            ;SAVE IT
               =2997 ;
0B7E F0        =2998 EXSBFL: MOV     A,@R0           ;GET SCAN 2 DATA
0B7F 21        =2999         XCH     A,@R1           ;EXCHANGE DATA
0B80 A0        =3000         MOV     @R0,A           ;STORE SCAN 1 DATA
0B81 18        =3001         INC     R0
0B82 19        =3002         INC     R1
0B83 EA7E      =3003         DJNZ    R2,EXSBFL
               =3004 ;
0B85 F0        =3005         MOV     A,@R0           ;GET S2/S1 COUNTERS
0B86 47        =3006         SWAP    A               ;EXCHANGE COUNTERS
0B87 A0        =3007         MOV     @R0,A           ;SAVE COUNTERS
0B88 83        =3008         RET
               =3009 ;********************************************************
               =3010 ; ROUTINE: SUM12C
               =3011 ; FUNCTION: CALCULATE L6S1 + R6S1 MOD-10 CHECKSUM.
               =3012 ; ENTRY: L6S1 AND R6S1 HAVE DATA TO USE.
               =3013 ; EXIT: A = MOD-10 CHECKSUM CALCULATION FOR 12 CHARACTERS.
               =3014 ;       USES R0,R2,R3
               =3015 ;
0B89 B824      =3016 SUM12C: MOV     R0,#L6S1
0B8B 1461      =3017         CALL    MOD106
0B8D AB        =3018         MOV     R3,A            ;SAVE LEFT HALF SUM
               =3019 ;
0B8E B82E      =3020         MOV     R0,#R6S1
0B90 1461      =3021         CALL    MOD106
0B92 6B        =3022         ADD     A,R3            ;RIGHT SUM + LEFT SUM
0B93 57        =3023         DA      A
0B94 530F      =3024         ANL     A,#0FH          ;MASK SUM DIGIT
0B96 83        =3025         RET
               =3026 ;********************************************************
               =3027 ; ROUTINE: CK6TOT
               =3028 ; FUNCTION: CHECK L6STOT AND R6STOT FOR COUNTS.
               =3029 ; ENTRY: R1 SETUP WITH MINUS THE MINIMUM NUMBER OF SCANS REQUIRED
               =3030 ; EXIT: A=0 IF EITHER COUNTER < MINIMUM REQUIRED.
               =3031 ;       A<>0 IF BOTH COUNTERS >= MINIMUM REQUIRED.
               =3032 ;       USES R0
               =3033 ;
0B97 B82D      =3034 CK6TOT: MOV     R0,#L6STOT
0B99 F0        =3035         MOV     A,@R0           ;GET LEFT SEGMENT TOTAL
0B9A 69        =3036         ADD     A,R1
0B9B F69F      =3037         JC      CK6T20          ;JUMP IF L6STOT >= -R1
0B9D 27        =3038 CK6T10: CLR     A
0B9E 83        =3039         RET                     ;EITHER L6 OR R6 HAD < MINIMUM
               =3040 ;
0B9F B835      =3041 CK6T20: MOV     R0,#R6STOT
0BA1 F0        =3042         MOV     A,@R0           ;GET RIGHT SEGMENT TOTAL
0BA2 69        =3043         ADD     A,R1
0BA3 E69D      =3044         JNC     CK6T10          ;JUMP R6STOT < -R1
0BA5 27        =3045         CLR     A
0BA6 37        =3046         CPL     A
0BA7 83        =3047         RET                     ;BOTH L6 AND R6 HAD >= MINIMUM
               =3048 ;
0BA8 83        =3049 CK6TRT: RET
               =3050 ;********************************************************
               =3051 ; ROUTINE: MAJSGS
               =3052 ; FUNCTION: DETERMINE MAJORITY SEGMENTS.
               =3053 ;           MOVE MAJORITY SEGMENT TO BUFFER #1 IF NECESSARY.
```

```
                =3054 ;            (I.E. EXCHANGE BUFFER 1 AND BUFFER 2 DATA AND COUNTERS.)
                =3055 ;            CHECK FOR EXCESS MISMATCHES.
                =3056 ;            IF EXCESS MISMATCHES, CLEAR COUNTERS.
                =3057 ; ENTRY: NO SETUP
                =3058 ; EXIT: IF THE MISMATCH RATIO IS OK,
                =3059 ;            SEGMENT BUFFER 1 AND COUNTER 1 HAS MAJORITY.
                =3060 ;            SEGMENT BUFFER 2 AND COUNTER 2 HAS MINORITY.
                =3061 ;       IF EXCESS MISMATCHES, SEGMENT COUNTERS ARE CLEARED.
                =3062 ;
0BA9 B82C       =3063 MAJSGS: MOV    R0,#L6SCNT
0BAB 7437       =3064         CALL   CKMAJ
0BAD F6B3       =3065         JC     MAJSG0             ;JUMP IF S1 IS MAJORITY
0BAF B824       =3066         MOV    R0,#L6S1
0BB1 7478       =3067         CALL   EXSBF4             ;EXCHANGE S2/S1 DATA AND COUNTERS
0BB3 7448       =3068 MAJSG0: CALL   CKMISM
                =3069 ;
0BB5 B834       =3070         MOV    R0,#R6SCNT
0BB7 7437       =3071         CALL   CKMAJ
0BB9 F6BF       =3072         JC     MAJSG1
0BBB B82E       =3073         MOV    R0,#R6S1
0BBD 7474       =3074         CALL   EXSBF3
0BBF 7448       =3075 MAJSG1: CALL   CKMISM
                =3076 ;
0BC1 BB08       =3077         MOV    R3,#8              ;NUMBER OF 4-CHAR SEGMENT BUFFERS
0BC3 B83A       =3078         MOV    R0,#L4SCNT         ;FIRST S2/S1 COUNTER ADDRESS
                =3079 ;
0BC5 7437       =3080 MAJSG4: CALL   CKMAJ
0BC7 F6CF       =3081         JC     MAJSG5             ;JUMP IF S1 IS THE MAJORITY
0BC9 F8         =3082         MOV    A,R0
0BCA 03FC       =3083         ADD    A,#-4              ;CALCULATE THE S1 DATA BUFFER ADDRESS
0BCC A8         =3084         MOV    R0,A
0BCD 7470       =3085         CALL   EXSBF2             ;EXCHANGE S2/S1 DATA AND COUNTS
                =3086 ;
0BCF 7448       =3087 MAJSG5: CALL   CKMISM             ;CHECK MISMATCHES
0BD1 F8         =3088         MOV    A,R0
0BD2 0306       =3089         ADD    A,#6               ;CALCULATE NEXT S2/S1 COUNTER ADDRESS
0BD4 A8         =3090         MOV    R0,A
0BD5 EBC5       =3091         DJNZ   R3,MAJSG4
0BD7 83         =3092         RET
                =3093 ;************************************************
0BD8 A3         =3094 TROPGB: MOVP   A,@A
0BD9 83         =3095         RET
0C00            =3096         ORG    0C00H
                =3097 ;***********************************************************************
                =3098 ; ROUTINE: VERTAG
                =3099 ; FUNCTION: PERFORM MISMATCH TEST AND GET MAJORITY SEGMENT AND COUNT
                =3100 ;            INTO BUFFER AND COUNTER #1.  (MAJSGS)
                =3101 ;            TRY TO BUILD BLOCKS INTO VERSIONS. (TBLKXX)
                =3102 ; ENTRY: NO SETUP
                =3103 ; EXIT: A=0 IF ENOUGH BLOCKS FOR A VERSION ARE FOUND.
                =3104 ;        A<>0 IF NOT ENOUGH BLOCKS FOUND.
                =3105 ;        R6 SET TO INDICATE VALID VERSION IF ONE WAS FOUND.
                =3106 ;        R1 SETUP WITH MINUS THE MINIMUM NUMBER OF SCANS REQUIRED.
                =3107 ;
0C00 74A9       =3108 VERTAG: CALL   MAJSGS             ;MAJORITY/MISMATCH SEGMENT TEST
0C02 3400       =3109         CALL   HCOMM              ;CHECK COMM. MAJSGS TAKES A WHILE.
0C04 FE         =3110         MOV    A,R6
0C05 53F0       =3111         ANL    A,#0F0H            ;CLEAR THE VERSION POINTER/FLAG.
0C07 AE         =3112         MOV    R6,A
                =3113 ;
0C08 E5         =3114         SEL    MB0
0C09 B400       =3115         CALL   CHKSCN             ;SET R1 ACCORDING TO 2 SCAN OPTION
0C0B F5         =3116         SEL    MB1
                =3117 ;
0C0C 944F       =3118 TRYBLK: CALL   TBLKA
0C0E C64D       =3119         JZ     VERA               ;JUMP IF A GOOD UPC-A BLOCK
                =3120 ;
0C10 946C       =3121         CALL   TBLK13
0C12 C64C       =3122         JZ     VER13              ;JUMP IF A GOOD EAN-13 BLOCK
                =3123 ;
0C14 9488       =3124         CALL   TBLK2
0C16 C62B       =3125         JZ     VERT10             ;JUMP IF A GOOD BLK-2
                =3126 ;
0C18 B9FE       =3127         MOV    R1,#-2             ;ALWAYS REQUIRE 2 SCANS MINIMUM FOR E
0C1A 9498       =3128         CALL   TBLKE
0C1C C64B       =3129         JZ     VERE               ;JUMP IF A GOOD UPC-E BLOCK
                =3130 ;
0C1E E5         =3131         SEL    MB0
0C1F B400       =3132         CALL   CHKSCN             ;SET R1 ACCORDING TO SELECTED 2 SCAN OPTION
0C21 F5         =3133         SEL    MB1
                =3134 ;
0C22 B42F       =3135 VERT05: CALL   TBLK1
0C24 C649       =3136         JZ     VERD1              ;JUMP IF A GOOD BLK-1. (D-1)
                =3137 ;
0C26 94AE       =3138         CALL   TBLK8
0C28 C64A       =3139         JZ     VER8               ;JUMP IF A GOOD EAN-8 BLOCK
0C2A 83         =3140         RET                       ;RETURN IF NOT ENOUGH BLOCKS
                =3141 ;
                =3142 VERT10:
0C2B E5         =3143         SEL    MB0
0C2C B400       =3144         CALL   CHKSCN             ;SET R1 ACCORDING TO SELECTED 2 SCAN OPTION
0C2E F5         =3145         SEL    MB1
                =3146 ;
```

```
OC2F B49E    =3147 VERT15: CALL   TBLK5
OC31 C63C    =3148         JZ     VERT20        ;JUMP IF A GOOD BLK-5
             =3149 ;
OC33 B406    =3150         CALL   TBLK6
OC35 C647    =3151         JZ     VERD3         ;JUMP IF A GOOD BLK-6.  (D-3)
             =3152 ;
OC37 B466    =3153         CALL   TBLK3
OC39 C648    =3154         JZ     VERD2         ;JUMP IF A GOOD BLK-3.  (D-2)
OC3B 83      =3155         RET                  ;RETURN IN NOT ENOUGH BLOCKS
             =3156 ;
OC3C B48A    =3157 VERT20: CALL   TBLK7
OC3E C645    =3158         JZ     VERD5         ;JUMP IF A GOOD BLK-7.  (D-5)
             =3159 ;
OC40 B482    =3160         CALL   TBLK4
OC42 C646    =3161         JZ     VERD4         ;JUMP IF A GOOD BLK-4.  (D-4)
OC44 83      =3162         RET                  ;RETURN IF NOT ENOUGH BLOCKS
             =3163 ;
OC45 1E      =3164 VERD5:  INC    R6            ;SET R6=9
OC46 1E      =3165 VERD4:  INC    R6            ;SET R6=8
OC47 1E      =3166 VERD3:  INC    R6            ;SET R6=7
OC48 1E      =3167 VERD2:  INC    R6            ;SET R6=6
OC49 1E      =3168 VERD1:  INC    R6            ;SET R6=5
OC4A 1E      =3169 VER8:   INC    R6            ;SET R6=4
OC4B 1E      =3170 VERE:   INC    R6            ;SET R6=3
OC4C 1E      =3171 VER13:  INC    R6            ;SET R6=2
OC4D 1E      =3172 VERA:   INC    R6            ;SET R6=1
             =3173 ;
OC4E 83      =3174 VERT90: RET
              3175 $       INCLUDE(:F4:TBLKXX.SRC)
             =3176 ;**********************************************************
             =3177 ; FILE: TBLKXX.SRC  09-11-86 09:10  BOB ACTIS
             =3178 ;**********************************************************
             =3179 ; ROUTINE: TBLKA
             =3180 ; FUNCTION: TRY FOR A VALID UPC-A BLOCK.
             =3181 ;           CHECK THAT L6 AND R6 HAVE ENOUGH DATA.
             =3182 ;           CHECK THAT L6 IS AN A-L.
             =3183 ;           IF OK SO FAR, CALCULATE MOD-10 CHECK CHARACTER.
             =3184 ;           IF STILL OK, RETURN WITH A=0.
             =3185 ;           IF MOD-10 ERROR, CLEAR 4&6-CHAR SEGMENT COUNTERS AND
             =3186 ;               CLEAR VERSION POINTER/FLAG.
             =3187 ; ENTRY: SCAN 1 BUFFER IS MAJORITY SCAN.
             =3188 ;        R1 SETUP WITH MINUS THE MINIMUM NUMBER OF SCANS REQUIRED
             =3189 ; EXIT:  USES R0,R2,R3,A
             =3190 ;        A=0 IF GOOD BLOCK
             =3191 ;        A<>0 IF NO BLOCK
             =3192 ;
OC4F 7497    =3193 TBLKA:  CALL   CK6TOT
OC51 C669    =3194         JZ     TBNONE        ;JUMP IF NO LEFT OR NO RIGHT SEGMENTS
             =3195 ;
OC53 B827    =3196         MOV    R0,#L6S1+3
OC55 F0      =3197         MOV    A,@R0         ;GET PARITY DECODE BYTE
OC56 530C    =3198         ANL    A,#0CH
OC58 D30C    =3199         XRL    A,#0CH
OC5A 9669    =3200         JNZ    TBNONE        ;JUMP IF NOT AN AL
             =3201 ;
OC5C 7489    =3202         CALL   SUM12C        ;GO CALCULATE LEFT + RIGHT CHECKSUM
OC5E 9661    =3203         JNZ    TBERR6        ;JUMP IF MOD-10 IS BAD
OC60 83      =3204         RET
             =3205 ;
             =3206 ; THE FOLLOWING IS USED BY OTHER TBLKXX ROUTINES, BUFMAN, & RDTAG
             =3207 ;
OC61         =3208 CLRVER  EQU    $             ;ENTRY POINT TO CLEAR VERSION FLAGS & DATA
OC61 1400    =3209 TBERR6: CALL   CLR6SG        ;CLEAR 6-CHAR SEGMENTS AND COUNTERS
OC63 1406    =3210 TBERR4: CALL   CLR4SG        ;CLEAR 4-CHAR SEGMENTS AND COUNTERS
OC65 FE      =3211         MOV    A,R6
OC66 53F0    =3212         ANL    A,#0F0H       ;CLEAR VERSION POINTER/FLAG
OC68 AE      =3213         MOV    R6,A
OC69 27      =3214 TBNONE: CLR    A
OC6A 37      =3215         CPL    A
OC6B 83      =3216         RET
             =3217 ;**********************************************************
             =3218 ; ROUTINE: TBLK13
             =3219 ; FUNCTION: TRY FOR A VALID EAN-13 BLOCK.
             =3220 ;           CHECK THAT L6 AND R6 HAVE ENOUGH DATA.
             =3221 ;           CHECK THAT L6 IS AN EAN-13-L.
             =3222 ;           IF OK SO FAR, CALCULATE MOD-10 CHECK CHARACTER.
             =3223 ;           IF STILL OK, RETURN WITH A=0.
             =3224 ;           IF MOD-10 FAILS, CLEAR 4&6-CHAR SEGMENT COUNTER AND
             =3225 ;               CLEAR VERSION POINTER/FLAG.
             =3226 ; ENTRY: SCAN 1 BUFFER IS MAJORITY SCAN.
             =3227 ;        R1 SETUP WITH MINUS THE MINIMUM NUMBER OF SCANS REQUIRED
             =3228 ; EXIT:  USES R0,R2,R3,A
             =3229 ;        A=0 IF GOOD BLOCK.
             =3230 ;        A<>0 IF NO BLOCK FOUND.
             =3231 ;
OC6C 7497    =3232 TBLK13: CALL   CK6TOT
OC6E C669    =3233         JZ     TBNONE        ;JUMP IF NO LEFT OR NO RIGHT SEGMENTS
             =3234 ;
OC70 B827    =3235         MOV    R0,#L6S1+3
OC72 F0      =3236         MOV    A,@R0         ;GET PARITY DECODE BYTE
OC73 5330    =3237         ANL    A,#EDECE+EDECD ;MASK D AND E SEG BITS
OC75 9669    =3238         JNZ    TBNONE        ;JUMP IF D OR E SEGMENT
             =3239 ;
```

```
0C77 F0         =3240           MOV     A,@R0
0C78 530F       =3241           ANL     A,#0FH          ;MASK THE DECODED CHARACTER
0C7A 03F6       =3242           ADD     A,#-10          ;A>9 IS AN A OR 8 SEGMENT
0C7C F669       =3243           JC      TBNONE          ;JUMP IS A OR 8 SEGMENT
                =3244 ;
0C7E 7489       =3245           CALL    SUM12C
0C80 AB         =3246           MOV     R3,A            ;SAVE 12 CHARACTER SUM
                =3247 ;
0C81 B827       =3248           MOV     R0,#L6S1+3
0C83 F0         =3249           MOV     A,@R0           ;GET PARITY DECODE CHARACTER
0C84 6B         =3250           ADD     A,R3            ;ADD 13TH CHARACTER
0C85 57         =3251           DA      A
0C86 530F       =3252           ANL     A,#0FH
0C88 9661       =3253           JNZ     TBERR6          ;JUMP IF MOD-10 IS BAD
0C8A 83         =3254           RET
                =3255 ;*****************************************************************
                =3256 ; ROUTINE: TBLK2
                =3257 ; FUNCTION: TRY FOR A VALID VERSION-D BLOCK-2.
                =3258 ;           CHECK THAT L6 AND R6 HAVE ENOUGH DATA.
                =3259 ;           CHECK THAT L6 IS A D-TAG.
                =3260 ;           IF OK SO FAR, CALCULATE MOD-10 CHECK CHARACTER.
                =3261 ;           IF STILL OK, RETURN WITH A=0.
                =3262 ;           IF MOD-10 ERROR, CLEAR 4&6-CHAR SEGMENT COUNTERS AND
                =3263 ;                CLEAR VERSION POINTER/FLAG.
                =3264 ; ENTRY: SCAN 1 BUFFER IS MAJORITY SCAN.
                =3265 ;        R1 SETUP WITH MINUS THE MINIMUM NUMBER OF SCANS REQUIRED
                =3266 ; EXIT: USER R0,R2,R3,A
                =3267 ;        A=0 IF GOOD BLOCK
                =3268 ;        A<>0 IF NO BLOCK
                =3269 ;
0C8B 7497       =3270 TBLK2:   CALL    CK6TOT
0C8D C669       =3271           JZ      TBNONE          ;JUMP IF NO LEFT OR NO RIGHT SEGMENTS
                =3272 ;
0C8F B827       =3273           MOV     R0,#L6S1+3
0C91 F0         =3274           MOV     A,@R0           ;GET PARITY DECODE BYTE
0C92 5320       =3275           ANL     A,#EDECD
0C94 C669       =3276           JZ      TBNONE          ;JUMP IF NOT A D-TAG.
                =3277 ;
0C96 7489       =3278           CALL    SUM12C
0C98 9661       =3279           JNZ     TBERR6          ;JUMP IF MOD-10 TEST FAILED
0C9A 83         =3280           RET
                =3281 ;*****************************************************************
                =3282 ; ROUTINE: TBLKE
                =3283 ; FUNCTION: TRY FOR A VALID UPC-E BLOCK.
                =3284 ;           CHECK THAT L6 HAS ENOUGH DATA
                =3285 ;           CHECK THAT L6 IS AN E-TAG.
                =3286 ;           CHECK THAT R6 HAS NO DATA.
                =3287 ;           IF OK, RETURN WITH A=0.
                =3288 ;           ELSE, CLEAR 4&6-CHAR SEGMENT COUNTERS AND
                =3289 ;                CLEAR THE VERSION POINTER/FLAG.
                =3290 ; ENTRY: SCAN 1 BUFFER IS THE MAJORITY SCAN.
                =3291 ;        R1 SETUP WITH MINUS THE MINIMUM NUMBER OF SCANS REQUIRED
                =3292 ; EXIT: USES R0,A
                =3293 ;        A=0 IF GOOD BLOCK.
                =3294 ;        A<>0 IF NO BLOCK.
                =3295 ;
0C9B B82D       =3296 TBLKE:   MOV     R0,#L6STOT
0C9D F0         =3297           MOV     A,@R0
0C9E 69         =3298           ADD     A,R1
0C9F E669       =3299           JNC     TBNONE          ;JUMP IF < -R1 LEFT SEGMENTS
                =3300 ;
0CA1 B827       =3301           MOV     R0,#L6S1+3
0CA3 F0         =3302           MOV     A,@R0           ;GET PARITY DECODE BYTE
0CA4 5310       =3303           ANL     A,#EDECE
0CA6 C669       =3304           JZ      TBNONE          ;JUMP IF NOT AN E-SEG.
                =3305 ;
0CA8 B835       =3306           MOV     R0,#R6STOT
0CAA F0         =3307           MOV     A,@R0
0CAB 9661       =3308           JNZ     TBERR6          ;JUMP IF R6 SEGMENTS ARE PRESENT
                =3309 ;
0CAD 83         =3310           RET
                =3311 ;*****************************************************************
                =3312 ; ROUTINE: TBLK8
                =3313 ; FUNCTION: TRY FOR A VALID EAN-8 BLOCK.
                =3314 ;           IF ANY 6-CHAR SEGMENTS ARE PRESENT, CLEAR 4-CHAR
                =3315 ;              SEGMENT COUNTERS AND VERSION POINTER/FLAG.
                =3316 ;           CHECK THAT L4 AND R4 HAVE ENOUGH DATA.
                =3317 ;           IF OK SO FAR, CALCULATE THE MOD-10 CHECK CHARACTER.
                =3318 ;           IF STILL OK, RETURN WITH A=0.
                =3319 ;           IF MOD-10 ERROR, CLEAR 4-CHAR SEGMENT COUNTERS AND
                =3320 ;                CLEAR VERSION POINTER/FLAG.
                =3321 ; ENTRY: SCAN 1 BUFFER IS THE MAJORITY SCAN.
                =3322 ;        R1 SETUP WITH MINUS THE MINIMUM NUMBER OF SCANS REQUIRED
                =3323 ; EXIT: USES R0,R2,R3,A
                =3324 ;        A=0 IF GOOD BLOCK
                =3325 ;        A<>0 IF NO BLOCK
                =3326 ;
0CAE B82D       =3327 TBLK8:   MOV     R0,#L6STOT
0CB0 F0         =3328           MOV     A,@R0
0CB1 9663       =3329           JNZ     TBERR4          ;JUMP IF ANY 6L SEGMENTS
                =3330 ;
0CB3 B835       =3331           MOV     R0,#R6STOT
0CB5 F0         =3332           MOV     A,@R0
```

```
OCB6 9663    =3333          JNZ    TBERR4         ;JUMP IF ANY 6R SEGMENTS
             =3334 ;
OCB8 B83B    =3335          MOV    R0,#L4STOT
OCBA F0      =3336          MOV    A,@R0
OCBB 69      =3337          ADD    A,R1
OCBC E669    =3338          JNC    TBNONE         ;JUMP IF < -R1 LEFT HALF SEGMENTS
             =3339 ;
OCBE B841    =3340          MOV    R0,#R4STOT
OCC0 F0      =3341          MOV    A,@R0
OCC1 69      =3342          ADD    A,R1
OCC2 E669    =3343          JNC    TBNONE         ;JUMP IF < -R1 RIGHT HALF SEGMENTS
             =3344 ;
OCC4 B836    =3345          MOV    R0,#L4S1
OCC6 145C    =3346          CALL   MOD104
OCC8 AB      =3347          MOV    R3,A           ;SAVE LEFT SUM
OCC9 B83C    =3348          MOV    R0,#R4S1
OCCB 145C    =3349          CALL   MOD104
OCCD 6B      =3350          ADD    A,R3           ;RIGHT SUM + LEFT SUM
OCCE 57      =3351          DA     A
OCCF 530F    =3352          ANL    A,#0FH
OCD1 9663    =3353          JNZ    TBERR4         ;JUMP IF MOD-10 IS BAD
OCD3 83      =3354          RET
             =3355 ;***********************************************
OCD4 A3      =3356 TROPGC:  MOVP   A,@A
OCD5 83      =3357          RET
OD00         =3358          ORG    0D00H
             =3359 ;**************************************************************
             =3360 ; ROUTINE: TBLK6
             =3361 ; FUNCTION: TRY FOR A VALID VERSION-D BLOCK-6.
             =3362 ;           CHECK THAT N(3), N(5) AND 8(R) HAVE ENOUGH DATA.
             =3363 ;           IF THEY DO, CALCULATE MOD-10 CHECK CHARACTER.
             =3364 ;           IF OK, RETURN WITH A=0.
             =3365 ;           ELSE, CLEAR 4-CHAR SEGMENT COUNTERS AND
             =3366 ;                 CLEAR THE VERSION POINTER/FLAG.
             =3367 ; ENTRY: SCAN 1 IS THE MAJORITY SCAN.
             =3368 ;        R1 SETUP WITH MINUS THE MINIMUM NUMBER OF SCANS REQUIRED
             =3369 ; EXIT:  USES R0,R2,R3,A
             =3370 ;        A=0 IF GOOD BLOCK
             =3371 ;        A<>0 IF NO BLOCK
             =3372 ;
OD00 8463    =3373 TBER4J:  JMP    TBERR4
OD02 8461    =3374 TBER6J:  JMP    TBERR6
OD04 8469    =3375 TBNONJ:  JMP    TBNONE
             =3376 ;
OD06 B853    =3377 TBLK6:   MOV    R0,#N3STOT
OD08 F0      =3378          MOV    A,@R0
OD09 69      =3379          ADD    A,R1
OD0A E604    =3380          JNC    TBNONJ         ;JUMP IF < -R1 N3 SEGMENTS
             =3381 ;
OD0C B85F    =3382          MOV    R0,#N5STOT
OD0E F0      =3383          MOV    A,@R0
OD0F 69      =3384          ADD    A,R1
OD10 E604    =3385          JNC    TBNONJ         ;JUMP IF < -R1 N5 SEGMENTS
             =3386 ;
OD12 B841    =3387          MOV    R0,#R4STOT
OD14 F0      =3388          MOV    A,@R0
OD15 69      =3389          ADD    A,R1
OD16 E604    =3390          JNC    TBNONJ         ;JUMP IF < -R1 8R SEGMENTS
             =3391 ;
OD18 B84E    =3392          MOV    R0,#N3S1
OD1A 145C    =3393          CALL   MOD104
OD1C AB      =3394          MOV    R3,A
             =3395 ;
OD1D B85A    =3396          MOV    R0,#N5S1
OD1F 145C    =3397          CALL   MOD104
OD21 6B      =3398          ADD    A,R3
OD22 57      =3399          DA     A
OD23 AB      =3400          MOV    R3,A
             =3401 ;
OD24 B83C    =3402          MOV    R0,#R4S1
OD26 145C    =3403          CALL   MOD104
OD28 6B      =3404          ADD    A,R3
OD29 57      =3405          DA     A
OD2A 530F    =3406          ANL    A,#0FH
OD2C 9600    =3407          JNZ    TBER4J
OD2E 83      =3408          RET
             =3409 ;**************************************************************
             =3410 ; ROUTINE: TBLK1
             =3411 ; FUNCTION: TRY FOR A VALID VERSION-D BLOCK-1.
             =3412 ;           CHECK THAT L6, N(6) AND 8(L) HAVE ENOUGH DATA.
             =3413 ;           CHECK THAT L6 IS A D-TAG
             =3414 ;           REVERSE 8L DATA
             =3415 ;           CALCULATE MOD-10 CHECK CHARACTER.
             =3416 ;           IF OK, RETURN WITH A=0.
             =3417 ;           ELSE, CLEAR 4&6-CHAR SEGMENT COUNTERS AND
             =3418 ;                 CLEAR THE VERSION POINTER/FLAG.
             =3419 ; ENTRY: SCAN 1 IS THE MAJORITY SCAN.
             =3420 ;        R1 SETUP WITH MINUS THE MINIMUM NUMBER OF SCANS REQUIRED
             =3421 ; EXIT:  USES R0,R2,R3,A
             =3422 ;        A=0 IF GOOD BLOCK
             =3423 ;        A<>0 IF NO BLOCK
             =3424 ;
OD2F B82D    =3425 TBLK1:   MOV    R0,#L6STOT
OD31 F0      =3426          MOV    A,@R0
```

```
0032 69          =3427            ADD     A,R1
0033 E604        =3428            JNC     TBNONJ          ;JUMP IF < -R L6 SEGMENTS
                 =3429 ;
0035 B827        =3430            MOV     R0,#L6S1+3
0037 F0          =3431            MOV     A,@R0           ;GET PARITY DECODE BYTE
0038 5320        =3432            ANL     A,#EDECD
003A C604        =3433            JZ      TBNONJ          ;JUMP IF NOT A D-TAG
                 =3434 ;
003C B865        =3435            MOV     R0,#N6STOT
003E F0          =3436            MOV     A,@R0
003F 69          =3437            ADD     A,R1
0040 E604        =3438            JNC     TBNONJ          ;JUMP IF < -R1 N6 SEGMENTS
                 =3439 ;
0042 B838        =3440            MOV     R0,#L4STOT
0044 F0          =3441            MOV     A,@R0
0045 69          =3442            ADD     A,R1
0046 E604        =3443            JNC     TBNONJ          ;JUMP IF < -R1 8L SEGMENTS
                 =3444 ;
0048 B824        =3445            MOV     R0,#L6S1
004A 1461        =3446            CALL    MOD106
004C AB          =3447            MOV     R3,A
                 =3448 ;
004D B860        =3449            MOV     R0,#N6S1
004F 145C        =3450            CALL    MOD104
0051 6B          =3451            ADD     A,R3
0052 57          =3452            DA      A
0053 AB          =3453            MOV     R3,A
                 =3454 ;
0054 B836        =3455            MOV     R0,#L4S1        ;REVERSE 8L DATA
0056 F0          =3456            MOV     A,@R0           ;GET CHAR 1&2
0057 47          =3457            SWAP    A
0058 18          =3458            INC     R0
0059 20          =3459            XCH     A,@R0           ;GET CHAR 3&4, SAVE CHAR 2&1
005A 47          =3460            SWAP    A
005B C8          =3461            DEC     R0
005C A0          =3462            MOV     @R0,A           ;SAVE CHAR 4&3
                 =3463 ;
005D 145C        =3464            CALL    MOD104
005F 6B          =3465            ADD     A,R3
0060 57          =3466            DA      A
0061 530F        =3467            ANL     A,#0FH
0063 9602        =3468            JNZ     TBER6J
0065 83          =3469            RET
                 =3470 ;****************************************************************
                 =3471 ; ROUTINE: TBLK3
                 =3472 ; FUNCTION: TRY FOR A VALID VERSION-D BLOCK-3.
                 =3473 ;              CHECK THAT N(2) AND 8(R) HAVE ENOUGH DATA.
                 =3474 ;              IF THEY DO, CALCULATE MOD-10 CHECK CHARACTER.
                 =3475 ;              IF OK, RETURN WITH A=0.
                 =3476 ;              ELSE, CLEAR 4-CHAR SEGMENT COUNTERS AND
                 =3477 ;                    CLEAR THE VERSION POINTER/FLAG.
                 =3478 ; ENTRY: SCAN 1 IS THE MAJORITY SCAN.
                 =3479 ;        R1 SETUP WITH MINUS THE MINIMUM NUMBER OF SCANS REQUIRED
                 =3480 ; EXIT:  USES R0,R2,R3,A
                 =3481 ;           A=0 IF GOOD BLOCK
                 =3482 ;           A<>0 IF NO BLOCK
                 =3483 ;
0066 B84D        =3484 TBLK3:     MOV     R0,#N2STOT
0068 F0          =3485            MOV     A,@R0
0069 69          =3486            ADD     A,R1
006A E604        =3487            JNC     TBNONJ          ;JUMP IF < -R1 N2 SEGMENTS
                 =3488 ;
006C B841        =3489            MOV     R0,#R4STOT
006E F0          =3490            MOV     A,@R0
006F 69          =3491            ADD     A,R1
0070 E604        =3492            JNC     TBNONJ          ;JUMP IF < -R1 8R SEGMENTS
                 =3493 ;
0072 B848        =3494            MOV     R0,#N2S1
0074 145C        =3495            CALL    MOD104
0076 AB          =3496            MOV     R3,A
                 =3497 ;
0077 B83C        =3498            MOV     R0,#R4S1
0079 145C        =3499            CALL    MOD104
007B 6B          =3500            ADD     A,R3
007C 57          =3501            DA      A
007D 530F        =3502            ANL     A,#0FH
007F 9600        =3503            JNZ     TBER4J
0081 83          =3504            RET
                 =3505 ;****************************************************************
                 =3506 ; ROUTINE: TBLK4
                 =3507 ; FUNCTION: TRY FOR A VALID VERSION-D BLOCK-4.
                 =3508 ;              CHECK THAT N(5) AND N(1) HAVE ENOUGH DATA.
                 =3509 ;              IF THEY DO, CALCULATE MOD-10 CHECK CHARACTER.
                 =3510 ;              IF OK, RETURN WITH A=0.
                 =3511 ;              ELSE, CLEAR 4-CHAR SEGMENT COUNTERS AND
                 =3512 ;                    CLEAR THE VERSION POINTER/FLAG.
                 =3513 ; ENTRY: SCAN 1 IS THE MAJORITY SCAN.
                 =3514 ;        R1 SETUP WITH MINUS THE MINIMUM NUMBER OF SCANS REQUIRED
                 =3515 ; EXIT:  USES R0,R2,R3,A
                 =3516 ;           A=0 IF GOOD BLOCK
                 =3517 ;           A<>0 IF NO BLOCK
                 =3518 ;
0082 B85F        =3519 TBLK4:     MOV     R0,#N5STOT
```

```
0D84 F0         =3520           MOV     A,@R0
0D85 69         =3521           ADD     A,R1
0D86 E604       =3522           JNC     TBNONJ          ;JUMP IF < -R1 N5 SEGMENTS
                =3523 ;
0D88 B847       =3524           MOV     R0,#N1STOT
0D8A F0         =3525           MOV     A,@R0
0D8B 69         =3526           ADD     A,R1
0D8C E604       =3527           JNC     TBNONJ          ;JUMP IF < -R1 N1 SEGMENTS
                =3528 ;
0D8E B85A       =3529           MOV     R0,#N5S1
0D90 145C       =3530           CALL    MOD104
0D92 AB         =3531           MOV     R3,A
                =3532 ;
0D93 B842       =3533           MOV     R0,#N1S1
0D95 145C       =3534           CALL    MOD104
0D97 6B         =3535           ADD     A,R3
0D98 57         =3536           DA      A
0D99 530F       =3537           ANL     A,#0FH
0D9B 9600       =3538           JNZ     TBER4J
0D9D 83         =3539           RET
                =3540 ;****************************************************************
                =3541 ; ROUTINE: TBLK5
                =3542 ; FUNCTION: TRY FOR A VALID VERSION-D BLOCK-5.
                =3543 ;                   CHECK THAT N(4) AND 8(R) HAVE ENOUGH DATA.
                =3544 ;                   IF THEY DO, CALCULATE MOD-10 CHECK CHARACTER.
                =3545 ;                   IF OK, RETURN WITH A=0.
                =3546 ;                   ELSE, CLEAR 4-CHAR SEGMENT COUNTERS AND
                =3547 ;                         CLEAR THE VERSION POINTER/FLAG.
                =3548 ; ENTRY: SCAN 1 IS THE MAJORITY SCAN.
                =3549 ;        R1 SETUP WITH MINUS THE MINIMUM NUMBER OF SCANS REQUIRED
                =3550 ; EXIT:  USES R0,R2,R3,A
                =3551 ;        A=0 IF GOOD BLOCK
                =3552 ;        A<>0 IF NO BLOCK
                =3553 ;
0D9E B859       =3554 TBLK5:    MOV     R0,#N4STOT
0DA0 F0         =3555           MOV     A,@R0
0DA1 69         =3556           ADD     A,R1
0DA2 E604       =3557           JNC     TBNONJ          ;JUMP IF < -R1 N4 SEGMENTS
                =3558 ;
0DA4 B841       =3559           MOV     R0,#R4STOT
0DA6 F0         =3560           MOV     A,@R0
0DA7 69         =3561           ADD     A,R1
0DA8 E604       =3562           JNC     TBNONJ          ;JUMP IF < -R1 8R SEGMENTS
                =3563 ;
0DAA B854       =3564           MOV     R0,#N4S1
0DAC 145C       =3565           CALL    MOD104
0DAE AB         =3566           MOV     R3,A
                =3567 ;
0DAF B83C       =3568           MOV     R0,#R4S1
0DB1 145C       =3569           CALL    MOD104
0DB3 6B         =3570           ADD     A,R3
0DB4 57         =3571           DA      A
0DB5 530F       =3572           ANL     A,#0FH
0DB7 9600       =3573           JNZ     TBER4J
0DB9 83         =3574           RET
                =3575 ;****************************************************************
                =3576 ; ROUTINE: TBLK7
                =3577 ; FUNCTION: TRY FOR A VALID VERSION-D BLOCK-7.
                =3578 ;                   CHECK THAT N(3), N(6) AND N(1) HAVE ENOUGH DATA.
                =3579 ;                   IF THEY DO, CALCULATE MOD-10 CHECK CHARACTER.
                =3580 ;                   IF OK, RETURN WITH A=0.
                =3581 ;                   ELSE, CLEAR 4-CHAR SEGMENT COUNTERS AND
                =3582 ;                         CLEAR THE VERSION POINTER/FLAG.
                =3583 ; ENTRY: SCAN 1 IS THE MAJORITY SCAN.
                =3584 ;        R1 SETUP WITH MINUS THE MINIMUM NUMBER OF SCANS REQUIRED
                =3585 ; EXIT:  USES R0,R2,R3,A
                =3586 ;        A=0 IF GOOD BLOCK
                =3587 ;        A<>0 IF NO BLOCK
                =3588 ;
0DBA B853       =3589 TBLK7:    MOV     R0,#N3STOT
0DBD 69         =3591           ADD     A,R1
0DBE E604       =3592           JNC     TBNONJ          ;JUMP IF < -R1 N3 SEGMENTS
                =3593 ;
0DC0 B865       =3594           MOV     R0,#N6STOT
0DC2 F0         =3595           MOV     A,@R0
0DC3 69         =3596           ADD     A,R1
0DC4 E604       =3597           JNC     TBNONJ          ;JUMP IF < -R1 N6 SEGMENTS
                =3598 ;
0DC6 B847       =3599           MOV     R0,#N1STOT
0DC8 F0         =3600           MOV     A,@R0
0DC9 69         =3601           ADD     A,R1
0DCA E604       =3602           JNC     TBNONJ          ;JUMP IF < -R1 N1 SEGMENTS
                =3603 ;
0DCC B84E       =3604           MOV     R0,#N3S1
0DCE 145C       =3605           CALL    MOD104
0DD0 AB         =3606           MOV     R3,A
                =3607 ;
0DD1 B860       =3608           MOV     R0,#N6S1
0DD3 145C       =3609           CALL    MOD104
0DD5 6B         =3610           ADD     A,R3
0DD6 57         =3611           DA      A
0DD7 AB         =3612           MOV     R3,A
                =3613 ;
```

```
0DD8 B842    =3614            MOV     R0,#N1S1
0DDA 145C    =3615            CALL    MOD104
0DDC 6B      =3616            ADD     A,R3
0DDD 57      =3617            DA      A
0DDE 530F    =3618            ANL     A,#0FH
0DE0 9600    =3619            JNZ     TBER4J
0DE2 83      =3620            RET
             3621 ;****************************************
0DE3 A3      3622  TROPGD:    MOVP    A,@A
0DE4 83      3623             RET
0E00         3624             ORG     0E00H
             3625 $           INCLUDE(:F4:FTRDTG.SRC)
             =3626 ;*********************************************************
             =3627 ; FILE: FTRDTG.SRC  07-09-86 13:00  BOB ACTIS
             =3628 ; ROUTINE: RDTAG  THIS IS THE MAIN PROGRAM
             =3629 ;
0E00 FC      =3630  RDTAG:    MOV     A,R4                 ;CLEAR THE SCAN FLAGS EXCEPT FOR
0E01 5328    =3631             ANL    A,#ESBFUL+EBFREQ     ;SEND BUFFER FULL AND
0E03 AC      =3632             MOV    R4,A                 ;BUFMAN REQUEST
0E04 B208    =3633             JB5    RDT05                ;JUMP IF THE BUFMAN REQUEST FLAG IS SET
             =3634 ;
0E06 9461    =3635             CALL   CLRVER               ;CLEAR THE VERSION POINTER/FLAG & DATA
0E08 140C    =3636  RDT05:    CALL    CLRSNB               ;CLEAR THE SCAN BUFFER
             =3637 ;
             =3638 ; WAIT FOR THE LABEL TO GO AWAY
             =3639 ;
0E0A D492    =3640  RDT10:    CALL    MTRCHK               ;CHECK MOTOR SPEED
0E0C 3400    =3641             CALL   HCOMM                ;SERVICE THE I/F AND BUFMAN
0E0E 8619    =3642             JNI    RDT20                ;JUMP IF SYMCAP (SEGMENT OR SDATA)
             =3643 ;
0E10 FF      =3644             MOV    A,R7                 ;GET THE "SEG SEEN" TIMER
0E11 960A    =3645             JNZ    RDT10                ;JUMP IF A SEG RECENTLY SEEN
             =3646 ;
0E13 BD16    =3647             MOV    R5,#EDRDLY           ;SET THE DOUBLE READ TIMER
0E15 BF2A    =3648             MOV    R7,#EGDLTW           ;SET THE GD-LT ON TIMER
0E17 C41F    =3649             JMP    RDT30                ;GO WAIT FOR A LABEL TO READ
             =3650 ;
             =3651 ; RESET THE SYMCAP OR SERVICE SDATA
             =3652 ;
0E19 14A4    =3653  RDT20:    CALL    CKFCA                ;RESET THE SEG, ALSO CHECK FOR SDATA
0E1B 3400    =3654             CALL   HCOMM                ;SERVICE THE I/F AND BUFMAN. ALSO
0E1D C40A    =3655             JMP    RDT10                ;DELAY FOR FCA TO RESET
             =3656 ;
             =3657 ; WAIT FOR A LABEL TO READ. CHECK GD-LT ON TIME.
             =3658 ;
0E1F FC      =3659  RDT30:    MOV     A,R4
0E20 4301    =3660             ORL    A,#ESCNG             ;SET THE SCAN FLAG SO CKFCA WILL
0E22 AC      =3661             MOV    R4,A                 ;PUT THE SEGMENT INTO THE SCAN BUFFER
             =3662 ;
             =3663  RDT35:
0E23 B808    =3664             MOV    R0,#SWLATC           ;CHECK SWITCHES (SWITCH 9- B5)
0E25 80      =3665             MOVX   A,@R0                ; FOR TWO LABEL FLAG PROGRAM MODE.
0E26 B231    =3666             JB5    RDT37                ;IN PROGRAM MODE - JUMP TO READ LABEL.
0E28 B87D    =3667             MOV    R0,#SWISET           ;CHECK PROGRAMMED SWITCH SETTINGS.
0E2A F0      =3668             MOV    A,@R0                ;
0E2B B231    =3669             JB5    RDT37                ;IN PROGRAM MODE - JUMP TO READ LABEL.
             =3670 ;NOT IN PROGRAM MODE. CLEAR TWO LABEL FLAG POINTER.
0E2D FE      =3671             MOV    A,R6
0E2E 538F    =3672             ANL    A,#8FH
0E30 AE      =3673             MOV    R6,A
             =3674 ;
             =3675  RDT37:
0E31 3400    =3676             CALL   HCOMM
0E33 14A4    =3677             CALL   CKFCA                ;SERVICE FCA. POSSIBLE SEG OR SDATA.
0E35 B823    =3678             MOV    R0,#SCNBUF+3
0E37 F0      =3679             MOV    A,@R0                ;GET THE SCAN BUF PARITY DECOTE BYTE
0E38 9645    =3680             JNZ    RDT40                ;JUMP IF SCAN BUFFER HAS DATA
             =3681 ;
0E3A D492    =3682             CALL   MTRCHK               ;CHECK MOTOR SPEED
             =3683 ;
0E3C FF      =3684             MOV    A,R7
0E3D 9623    =3685             JNZ    RDT35                ;JUMP IF GD-LT TIMER <> 0
0E3F 99DF    =3686             ANL    P1,#255-EGDLT        ;GD-LT OFF
0E41 8940    =3687             ORL    P1,#EBDLT            ;BD-LT ON
0E43 C423    =3688             JMP    RDT35                ;STILL WAITING FOR A LABEL
             =3689 ;
             =3690 ; START READING THE LABEL
             =3691 ;
0E45 3400    =3692  RDT40:    CALL    HCOMM
0E47 99DF    =3693             ANL    P1,#255-EGDLT        ;GREEN LIGHT OFF
0E49 8940    =3694             ORL    P1,#EBDLT            ;RED LIGHT ON
0E4B FC      =3695             MOV    A,R4
0E4C B200    =3696             JB5    RDTAG                ;JUMP IF THE BUFMAN REQUEST FLAG IS SET
0E4E C456    =3697             JMP    RDT60                ;GO PROCESS THE FIRST SEGMENT
             =3698 ;
             =3699 ; COLLECT AND PROCESS SEGMENTS
             =3700 ;
0E50 D492    =3701  RDT50:    CALL    MTRCHK               ;CHECK MOTOR SPEED
0E52 3400    =3702             CALL   HCOMM
0E54 14A4    =3703             CALL   CKFCA                ;GET SEGMENTS IF ANY
0E56 5404    =3704  RDT60:    CALL    PROCSG               ;PROCESS SEGMENTS IF ANY
0E58 E5      =3705             SEL    MB0
```

```
OE59 F400      =3706           CALL    CKCNTS          ;CHK FOR ENOUGH SEGS FOR PSBL VERSION
OE5B F5        =3707           SEL     MB1
OE5C C661      =3708           JZ      RDT70           ;JUMP IF ENOUGH SEGMENTS
               =3709 ;
OE5E FF        =3710           MOV     A,R7
OE5F 9650      =3711           JNZ     RDT50           ;JUMP IF SEGMENTS RECENTLY SEEN
               =3712 ;
               =3713 ;    TRY FOR A VALID LABEL
               =3714 ;
OE61 3400      =3715 RDT70:    CALL    HCOMM
OE63 9400      =3716           CALL    VERTAG
OE65 C66E      =3717           JZ      GOODRD          ;JUMP IF A GOOD VERSION WAS FOUND
               =3718 ;
OE67 FF        =3719           MOV     A,R7
OE68 9650      =3720           JNZ     RDT50           ;JUMP IF SEGMENTS RECENTLY SEEN
               =3721 ;
OE6A 3400      =3722 BADRD:    CALL    HCOMM
OE6C C48A      =3723           JMP     RDT90
               =3724 ;
OE6E 3400      =3725 GOODRD:   CALL    HCOMM
OE70 FD        =3726           MOV     A,R5            ;GET THE DOUBLE READ TIMER
OE71 C67B      =3727           JZ      GOOD10          ;JUMP IF DR TIMER=0 (OK TO DOUBLE READ)
               =3728 ;
OE73 E5        =3729           SEL     MB0
OE74 F490      =3730           CALL    DRSUMT          ;CALCULATE AND TEST THE DOUBLE READ SUM
OE76 F5        =3731           SEL     MB1
OE77 967F      =3732           JNZ     GOOD20          ;JUMP IF OLD<>NEW (NO DOUBLE READ)
OE79 C400      =3733           JMP     RDTAG           ;JUMP IF DOUBLE READ TOO SOON
               =3734 ;
OE7B E5        =3735 GOOD10:   SEL     MB0
OE7C F490      =3736           CALL    DRSUMT          ;CALCULATE AND SAVE THE LABEL SUM
OE7E F5        =3737           SEL     MB1
               =3738 GOOD20:
OE7F E5        =3739           SEL     MB0
OE80 C470      =3740           JMP     FLGPRG          ;JUMP TO CHECK SWITCH 9
               =3741 GOOD30:
OE82 99BF      =3742           ANL     P1,#255-EBDLT   ;BD-LT OFF
OE84 8920      =3743           ORL     P1,#EGDLT       ;GD-LT ON
OE86 D5        =3744           SEL     RB1
OE87 BE04      =3745           MOV     R6,#EGDTON      ;GOOD TONE LENGHT
OE89 C5        =3746           SEL     RB0
               =3747 ;
OE8A FC        =3748 RDT90:    MOV     A,R4
OE8B 4320      =3749           ORL     A,#EBFREQ       ;SET THE BUFMAN REQUEST FLAG
OE8D AC        =3750           MOV     R4,A
OE8E F40A      =3751           CALL    BUFMAN
OE90 C400      =3752           JMP     RDTAG
               =3753 ;
               =3754 ;    CHECK MOTOR UP2SPD* SIGNAL  (UP TO SPEED & OVER SPEED)
OE92 0A        =3755 MTRCHK:   IN      A,P2
OE93 37        =3756           CPL     A
OE94 B297      =3757           JB5     MTRC10          ;JUMP IF MOTOR SPEED PROBLEM
OE96 83        =3758           RET                     ;RETURN IF OK
               =3759 ;
OE97 BF64      =3760 MTRC10:   MOV     R7,#100         ;SET TIMER FOR 2 SECONDS
OE99 FF        =3761 MTRC20:   MOV     A,R7
OE9A 9699      =3762           JNZ     MTRC20          ;WAIT IN CASE OF SPURIOUS ERROR
               =3763 ;
OE9C 0A        =3764           IN      A,P2
OE9D 37        =3765           CPL     A
OE9E B2A1      =3766           JB5     MTRERR          ;JUMP IF STILL A PROBLEM AFTER WAIT
OEA0 83        =3767           RET                     ;REUTRN IF OK
               =3768 ;
               =3769 ;  COME HERE IF THERE IS A MOTOR PROBLEM DURING RDTAG
OEA1 8910      =3770 MTRERR:   ORL     P1,#ELASDB      ;LASER OFF
OEA3 99DD      =3771           ANL     P1,#255-(EMTREB+EGDLT)  ;MOTOR OFF, GREEN LIGHT OFF
OEA5 B804      =3772           MOV     R0,#4
OEA7 E5        =3773           SEL     MB0
OEA8 7481      =3774           CALL    TERRWT          ;GIVE 4 BEEPS FOR A MOTOR ERROR
OEAA F5        =3775           SEL     MB1
               =3776 ;
               =3777 ;  STICK HERE WITH THE RED LIGHT FLASHING
OEAB BF05      =3778 MTRE20:   MOV     R7,#5           ;SET TIMER FOR 100MS
OEAD FF        =3779 MTRE30:   MOV     A,R7
OEAE 96AD      =3780           JNZ     MTRE30          ;WAIT BETWEEN LIGHT TOGGLES
               =3781 ;
OEB0 09        =3782           IN      A,P1
OEB1 99BF      =3783           ANL     P1,#255-EBDLT   ;RED LIGHT OFF
OEB3 D2AB      =3784           JB6     MTRE20          ;JUMP IF THE RED LIGHT WAS ON
OEB5 8940      =3785           ORL     P1,#EBDLT       ;RED LIGHT ON
OEB7 C4AB      =3786           JMP     MTRE20
                3787 ;****************************************
OEB9 A3         3788 TROPGE:   MOVP    A,@A
OEBA 83         3789           RET
OF00            3790           ORG     0F00H
                3791 $         INCLUDE(:F4:BUFMAN.SRC)
               =3792 ;******************************************************************
               =3793 ;  FILE:  BUFMAN.SRC  9-11-86 09:20  BOB ACTIS
               =3794 ;******************************************************************
               =3795 ;  ROUTINE:  BUF12C
               =3796 ;  FUNCTION: LOAD 12 CHARACTERS INTO THE COMMUNICATIONS BUFFER.
               =3797 ;            (LOAD L6 AND R6 DATA)
```

```
                    =3798 ; ENTRY: R1+1 = NEXT AVAILABLE COMM BUFFER BYTE.
                    =3799 ; EXIT:  R1 = NEXT AVAILABLE COMM BUFFER BYTE.
                    =3800 ;        L6 AND R6 DATA MOVED TO COMM BUFFER.
                    =3801 ;
0F00 19             =3802 BUF12C: INC    R1              ;INCREMENT TO NEXT AVAILABLE BYTE
0F01 B824           =3803         MOV    R0,#L6S1
0F03 142A           =3804         CALL   MOV3BY
0F05 B82E           =3805         MOV    R0,#R6S1
0F07 142A           =3806         CALL   MOV3BY
0F09 83             =3807         RET
                    =3808 ;**********************************************************************
                    =3809 ; ROUTINE: BUFMAN
                    =3810 ; FUNCTION: IF BUFMAN REQUEST FLAG IS NOT SET,
                    =3811 ;            THEN RETURN,
                    =3812 ;            ELSE IF COMM BUF IS BUSY
                    =3813 ;                  THEN IF NO VALID VERSIONS, CLR REQ FLAG. RETURN
                    =3814 ;                  ELSE PROCESS MESSAGE BUFFER REQUEST.
                    =3815 ; ENTRY:  R80
                    =3816 ;         R6 VERSION FLAGS SETUP
                    =3817 ; EXIT:   USES R0,R1,A
                    =3818 ;         SPECIAL CHARACTERS
                    =3819 ;            DATA "C" = FILLER CHARACTER
                    =3820 ;            BYTE 0CCH = TERMINATION (ETRMBY)
                    =3821 ;
0F0A FC             =3822 BUFMAN: MOV    A,R4
0F0B B20E           =3823         JB5    BUFM10          ;JUMP IF BUFMAN REQUEST FLAG IS SET
0F0D 83             =3824         RET
0F0E 72AD           =3825 BUFM10: JB3    BUFM93          ;JUMP IF COMM BUFFER IS BUSY
                    =3826 ;
0F10 FE             =3827         MOV    A,R6
0F11 530F           =3828         ANL    A,#0FH
0F13 C6B2           =3829         JZ     BUFM94          ;JUMP IF NOT A VALID VERSION
                    =3830 ;
0F15 B967           =3831 BUFM20: MOV    R1,#SBUF        ;SEND BUFFER START ADDRESS
0F17 FE             =3832         MOV    A,R6            ;GET VERSION FLAGS
0F18 530F           =3833         ANL    A,#0FH          ;MASK VERSION POINTER
0F1A 0300           =3834         ADD    A,#0            ;SETUP CARRY FOR DA
0F1C 57             =3835         DA     A
0F1D 92B2           =3836         JB4    BUFM94          ;JUMP IF POINTER > 9. ILLEGAL VERSION.
                    =3837 ;
0F1F 0321           =3838         ADD    A,#LOW BUFTBL-1 ;DID AWAY WITH MISCAN OPTION
0F21 B3             =3839         JMPP   @A
                    =3840 BUFTBL:
0F22 2B             =3841         DB     LOW BUFMA
0F23 31             =3842         DB     LOW BUFM13
0F24 39             =3843         DB     LOW BUFME
0F25 42             =3844         DB     LOW BUFM8
0F26 49             =3845         DB     LOW BUFMD1
0F27 5A             =3846         DB     LOW BUFMD2
0F28 62             =3847         DB     LOW BUFMD3
0F29 6E             =3848         DB     LOW BUFMD4
0F2A 84             =3849         DB     LOW BUFMD5
                    =3850 ;
0F2B B1AC           =3851 BUFMA:  MOV    @R1,#0ACH       ;UPC-A HEADER AND FILLER
0F2D F400           =3852 BUFM12: CALL   BUF12C
0F2F E49E           =3853         JMP    BUFM90
                    =3854 ;
0F31 23F0           =3855 BUFM13: MOV    A,#0F0H         ;EAN-13 HEADER
0F33 B827           =3856         MOV    R0,#L6S1+3      ;PARITY DECODE CHARACTER ADDRESS
0F35 30             =3857         XCHD   A,@R0           ;PUT PARITY DECODE CHAR INTO A WITH HEADER
0F36 A1             =3858         MOV    @R1,A           ;PUT HEADER & CHAR INTO SEND BUFFER
0F37 E42D           =3859         JMP    BUFM12          ;GO DO THE NEXT 12 CHARS
                    =3860 ;
0F39 B1E0           =3861 BUFME:  MOV    @R1,#0E0H       ;UPC-E HEADER AND N/S 0
0F3B 19             =3862         INC    R1
0F3C B824           =3863         MOV    R0,#L6S1
0F3E 142A           =3864         CALL   MOV3BY
0F40 E49E           =3865         JMP    BUFM90
                    =3866 ;
0F42 B1FF           =3867 BUFM8:  MOV    @R1,#0FFH       ;EAN-8 HEADER CHARS
0F44 19             =3868         INC    R1
0F45 B836           =3869         MOV    R0,#L4S1
0F47 E47C           =3870         JMP    BUFM8R
                    =3871 ;
0F49 B1D1           =3872 BUFMD1: MOV    @R1,#0D1H       ;VERSION D-1 HEADER
0F4B 19             =3873         INC    R1
0F4C B824           =3874         MOV    R0,#L6S1
0F4E 142A           =3875         CALL   MOV3BY
0F50 B860           =3876         MOV    R0,#N6S1
0F52 1426           =3877         CALL   MOV2BY
0F54 B836           =3878         MOV    R0,#L4S1
0F56 1426           =3879         CALL   MOV2BY          ;ALREADY SWAPPED
0F58 E49E           =3880         JMP    BUFM90
                    =3881 ;
0F5A B1D2           =3882 BUFMD2: MOV    @R1,#0D2H       ;VERSION D-2 HEADER
0F5C F400           =3883         CALL   BUF12C
0F5E B848           =3884         MOV    R0,#N2S1
0F60 E47C           =3885         JMP    BUFM8R
                    =3886 ;
0F62 B1D3           =3887 BUFMD3: MOV    @R1,#0D3H       ;VERSION D-3 HEADER
0F64 F400           =3888         CALL   BUF12C
0F66 B84E           =3889         MOV    R0,#N3S1
```

```
OF68 1426    =3890         CALL   MOV2BY
OF6A B85A    =3891         MOV    R0,#N5S1
OF6C E47C    =3892         JMP    BUFM8R
             =3893 ;
OF6E B1D4    =3894 BUFMD4: MOV    @R1,#0D4H      ;VERSION D-4 HEADER
OF70 F400    =3895         CALL   BUF12C
OF72 B85A    =3896         MOV    R0,#N5S1
OF74 1426    =3897         CALL   MOV2BY
OF76 B842    =3898         MOV    R0,#N1S1
OF78 1426    =3899         CALL   MOV2BY
OF7A B854    =3900         MOV    R0,#N4S1
OF7C 1426    =3901 BUFM8R: CALL   MOV2BY
OF7E B83C    =3902         MOV    R0,#R4S1
OF80 1426    =3903         CALL   MOV2BY
OF82 E49E    =3904         JMP    BUFM90
             =3905 ;
OF84 B1D5    =3906 BUFMD5: MOV    @R1,#0D5H      ;VERSION D-5 HEADER
OF86 F400    =3907         CALL   BUF12C
OF88 8854    =3908         MOV    R0,#N4S1
OF8A 1426    =3909         CALL   MOV2BY
OF8C B83C    =3910         MOV    R0,#R4S1
OF8E 1426    =3911         CALL   MOV2BY
OF90 B84E    =3912         MOV    R0,#N3S1
OF92 1426    =3913         CALL   MOV2BY
OF94 B860    =3914         MOV    R0,#N6S1
OF96 1426    =3915         CALL   MOV2BY
OF98 B842    =3916         MOV    R0,#N1S1
OF9A 1426    =3917         CALL   MOV2BY
OF9C E49E    =3918         JMP    BUFM90
             =3919 ;
OF9E B1CC    =3920 BUFM90: MOV    @R1,#ETRMBY    ;LOAD THE DATA TERMINATION CHARACTER
OFA0 B966    =3921         MOV    R1,#SBFPNT     ;SEND BUFFER POINTER ADDRESS
OFA2 B1CE    =3922         MOV    @R1,#SBSTRT    ;PUT PACKED DATA START ADRS IN POINTER
OFA4 9461    =3923         CALL   CLRVER         ;CLEAR THE VERSION POINTER/FLAG & DATA
OFA6 FC      =3924         MOV    A,R4
OFA7 53DF    =3925         ANL    A,#255-EBFREQ  ;CLEAR THE BUFMAN REQUEST FLAG
OFA9 4308    =3926         ORL    A,#ESBFUL      ;SET THE SEND BUFFER FULL BIT
OFAB AC      =3927         MOV    R4,A
OFAC 83      =3928         RET
             =3929 ;
OFAD FE      =3930 BUFM93: MOV    A,R6
OFAE 530F    =3931         ANL    A,#0FH         ;MASK THE VERSION POINTER/FLAG
OFB0 9686    =3932         JNZ    BUFM95         ;JUMP IF A VALID VERSION
             =3933 ;
OFB2 FC      =3934 BUFM94: MOV    A,R4
OFB3 53DF    =3935         ANL    A,#255-EBFREQ  ;CLEAR THE BUFMAN REQUEST FLAG
OFB5 AC      =3936         MOV    R4,A
             =3937 ;
OFB6 83      =3938 BUFM95: RET
             3939 ;****************************************
OFB7 A3      3940 TROPGF: MOVP   A,@A
OFB8 83      3941         RET
             3942 ;****************************************
OFF7         3943         ORG    OFF7H
             3944 ;
             3945 ; CHECKSUM BYTE
             3946 ;
OFF7 FF      3947         DB     OFFH
             3948 ;
             3949 ; DATE
             3950 ;
OFF8 07      3951         DB     07H,22H,87H
OFF9 22
OFFA 87
             3952 ;
             3953 ; PART NUMBER
             3954 ;
OFFB 52      3955         DB     'R',096H,001H,030H
OFFC 96
OFFD 01
OFFE 30
             3956 ;
             3957 ; REVISION
             3958 ;
OFFF 30      3959         DB     '0'
             3960 ;****************************************
             3961         END
```

```
USER SYMBOLS
APL3R2  0855   BADRD   0E6A   BF4CNT  0030   BF4CST  0036   BF6CNT  0012   BF6CST  0024   BUF12C  0F00   BUFM10  0F0E
BUFM12  0F2D   BUFM13  0F31   BUFM20  0F15   BUFM8   0F42   BUFM8R  0F7C   BUFM90  0F9E   BUFM93  0FAD   BUFM94  0FB2
BUFM95  0FB6   BUFMA   0F2B   BUFMAN  0F0A   BUFMD1  0F49   BUFMD2  0F5A   BUFMD3  0F62   BUFMD4  0F6E   BUFMD5  0F84
BUFME   0F39   BUFTBL  0F22   CHECLB  04AC   CHKIJ   06A1   CHKLP1  068F   CHKSCN  0500   CK4H10  004A   CK4H20  004B
CK4H30  0052   CK4HRS  0048   CK6T10  0B90   CK6T20  0B9F   CK6TOT  0B97   CK6TRT  0BAB   CKCN10  0714   CKCN20  071C
CKCN30  0729   CKCN40  0739   CKCN45  073F   CKCN50  0747   CKCN60  0761   CKCN70  0769   CKCN80  077D   CKCNNG  0785
CKCNOK  0783   CKCNTS  0700   CKEPD0  01B6   CKEPRM  01B3   CKFC10  08A7   CKFC20  08B3   CKFC80  08D9   CKFC90  08DB
CKFC95  08DF   CKFCA   08A4   CKMAJ   0837   CKMAJ9  0B45   CKMISM  0B48   CKMS30  0B66   CKMS80  0B6C   CKMS90  0B6F
CKSENT  01ED   CKSNRT  0520   CLKEPM  01D9   CLR4SG  0806   CLR6SG  0800   CLRRAM  02A4   CLRSBF  0816   CLRSN1  0811
CLRSNB  080C   CLRT00  0810   CLRVER  0C61   DATA    01CE   DECR0   0641   DISLAS  02CC   DRSM13  07A5   DRSM1X  07DE
DRSM3X  07D6   DRSM4X  07D6   DRSM5X  07B7   DRSM7B  07DC   DRSM7C  07E0   DRSM8   07E6   DRSMA   07A5   DRSMD1  07CA
DRSMD2  07D3   DRSMD3  07C1   DRSMD4  07B4   DRSMD5  07AB   DRSMDN  07EF   DRSME   07A8   DRSTBL  079B   DRSUM   007C
DRSUMT  0790   DRTIMR  0005   DRVRNG  07F4   E1000M  0032   EAMBBY  008B   EAMBMS  0004   EAMESD  00C2   EAMESE  00C1
```

| Symbol | Value | Symbol | Value | Symbol | Value | Symbol | Value | Symbol | Value | Symbol | Value | Symbol | Value | Symbol | Value |
|---|---|---|---|---|---|---|---|---|---|---|---|---|---|---|---|
| EBDLT | 0040 | EBDTON | 0014 | EBFREQ | 0020 | EBIT6 | 0040 | ECASE1 | 087C | ECASE2 | 0885 | ECASE3 | 0890 | ECASE4 | 0896 |
| EDEC8L | 000A | EDEC8R | 000B | EDECAL | 000C | EDECAR | 000D | EDECB7 | 0080 | EDECBE | 000E | EDECBF | 000F | EDECBK | 0040 |
| EDECD | 0020 | EDECE | 0010 | EDECOD | 0010 | EDRDLY | 0016 | EFCRST | 0003 | EFRRST | 0001 | EGDLT | 0020 | EGDLTW | 002A |
| EHCNTL | 0001 | ELASDB | 0010 | ELST1 | 04DE | ELSTBT | 0665 | EMOD10 | 0866 | EMODCK | 089D | EMODSM | 089B |
| EMTREB | 0002 | ENLAS | 02D7 | EOCIA | 0002 | EPARRD | 0000 | EPRDEC | 0004 | EPRMCS | 0080 | EPRMDI | 0004 | EPRMSK | 0008 |
| ER4B1 | 0002 | ER4B4 | 0010 | ER4B6 | 0040 | ER4B7 | 0080 | ER6B4 | 0010 | ER6B5 | 0020 | ER6B6 | 0040 | ER6B7 | 0080 |
| ERAL | 0020 | ERASE | 00C0 | ERASFL | 05B5 | ERS2RM | 04DA | ESBFUL | 0008 | ESCNG | 0001 | ESDIS | 00C4 | ESEN | 0045 |
| ESENT | 0010 | ESR4CH | 0010 | ESRCHR | 000F | ESRF13 | 0020 | ESRPER | 0040 | ESRRD | 0001 | ESRSDT | 0080 | ETEST | 0001 |
| ETMARK | 0002 | ETNCT1 | 0014 | ETNCT2 | 001E | ETNCT3 | 0028 | ETNCT4 | 0038 | ETNFQ1 | 00F4 | ETNFQ2 | 00F8 | ETNFQ3 | 00FA |
| ETNFQ4 | 00FC | ETONCT | 0028 | ETONE | 0080 | ETONFQ | FFFA | ETRMBY | 00CC | EUP2SP | 0020 | EVER00 | 0000 | EVER13 | 0002 |
| EVER8 | 0004 | EVERA | 0001 | EVERD1 | 0005 | EVERD2 | 0006 | EVERD3 | 0007 | EVERD4 | 0008 | EVERD5 | 0009 | EVERE | 0003 |
| EVLSIR | 0040 | EWAIT | 0008 | EWDS | 0000 | EWEN | 0030 | EXSBF2 | 0B70 | EXSBF3 | 0B74 | EXSBF4 | 0B78 | EXSBFL | 0B7E |
| EXSBFX | 0B7A | FACTOR | 0001 | FILFF | 063A | FLCKRT | 066F | FLGCHK | 0B80 | FLGPRG | 0670 | FREQAD | 0044 | GETLUP | 0275 |
| GOOD10 | 0E7B | GOOD20 | 0E7F | GOOD30 | 0E82 | GOODRD | 0E6E | HCOM10 | 0909 | HCOM20 | 091E | HCOM30 | 0932 | HCOM40 | 093A |
| HCOM55 | 0942 | HCOM80 | 0945 | HCOM90 | 0948 | HCOMM | 0900 | INCHNB | 0969 | INCLNB | 0971 | INCPNT | 06C3 | INCX90 | 0979 |
| INCXRT | 097C | INLAB1 | 065F | INTSTR | 007F | INTTRP | 0003 | L4S1 | 0036 | L4S2 | 0038 | L4SCNT | 003A | L4STOT | 003B |
| L6S1 | 0024 | L6S2 | 0028 | L6SCNT | 002C | L6STOT | 002D | LASTBT | 0564 | LBDET | 0631 | LOOPCK | 0292 | LSTBYT | 009F |
| LSTUSD | 007F | MAJSG0 | 0BB3 | MAJSG1 | 0BBF | MAJSG4 | 0BC5 | MAJSG5 | 0BCF | MAJSGS | 0BA9 | MCH2BY | 097D | MCH3BY | 0981 |
| MCH4BY | 0985 | MCHXBY | 0987 | MCHXRT | 098F | MOD104 | 085C | MOD106 | 0861 | MOV2BY | 0826 | MOV3BY | 082A | MOV4BY | 082E |
| MOVXBY | 0830 | MRB0 | 0000 | MRB1 | 0018 | MRB1R4 | 001C | MTRC10 | 0E97 | MTRC20 | 0E99 | MTRCHK | 0E92 | MTRE20 | 0EAB |
| MTRE30 | 0EAD | MTRERR | 0EA1 | N1S1 | 0042 | N1S2 | 0044 | N1SCNT | 0046 | N1STOT | 0047 | N2S1 | 0048 | N2S2 | 004A |
| N2SCNT | 004C | N2STOT | 004D | N3S1 | 004E | N3S2 | 0050 | N3SCNT | 0052 | N3STOT | 0053 | N4S1 | 0054 | N4S2 | 0056 |
| N4SCNT | 0058 | N4STOT | 0059 | N5S1 | 005A | N5S2 | 005C | N5SCNT | 005E | N5STOT | 005F | N6S1 | 0060 | N6S2 | 0062 |
| N6SCNT | 0064 | N6STOT | 0065 | NOLSBT | 0626 | OCIRET | 0569 | OPREAD | 0080 | OVRERR | 04BC | OVRRET | 04C0 | OVRSET | 04A6 |
| OVRST1 | 008C | OWRITE | 0040 | PARITY | 0190 | PDATA | 006F | POW00 | 03A3 | POW10 | 03BB | POW20 | 03D1 | POW25 | 03DA |
| POW30 | 03E1 | POWUP | 03A4 | PRO4C2 | 0A62 | PRO4C3 | 0A6A | PRO4C4 | 0A70 | PRO4C6 | 0A81 | PRO4C7 | 0A89 | PRO4C8 | 0A8F |
| PRO4CH | 0A51 | PRO6C2 | 0AA4 | PRO6C3 | 0AA8 | PRO6C4 | 0AAE | PRO6C6 | 0ABD | PRO6C7 | 0AC1 | PRO6C8 | 0AC7 | PRO6CH | 0A95 |
| PRO7C2 | 080F | PRO7C3 | 0B13 | PRO7C4 | 0B19 | PRO7C6 | 0B28 | PRO7C7 | 0B2C | PRO7C8 | 0B32 | PRO7CH | 0B00 | PROC05 | 0A19 |
| PROC3L | 0A14 | PROC8 | 0A18 | PROC8L | 0A20 | PROC8R | 0A24 | PROCA | 0A45 | PROCAL | 0A4A | PROCAR | 0A4C | PROCD | 0A14 |
| PROCDN | 0A2C | PROCDX | 0A28 | PROCE | 0A3D | PROCEX | 0A4E | PROCNT | 0A37 | PROCRT | 0A50 | PROCSG | 0A04 | PROLAB | 0685 |
| R4S1 | 003C | R4S2 | 003E | R4SCNT | 0040 | R4STOT | 0041 | R6S1 | 002E | R6S2 | 0031 | R6SCNT | 0034 | R6STOT | 0035 |
| RAMRT | 02E6 | RCRAM | 0020 | RDEPRM | 02B0 | RDLAB1 | 064B | RDLAB2 | 064F | RDT05 | 0E08 | RDT10 | 0E0A | RDT20 | 0E19 |
| RDT30 | 0E1F | RDT35 | 0E23 | RDT37 | 0E31 | RDT40 | 0E45 | RDT50 | 0E50 | RDT60 | 0E56 | RDT70 | 0E61 | RDT90 | 0E8A |
| RDTAG | 0E00 | RLACC | 01BA | ROCIA | 0552 | ROCIA1 | 0554 | ROCIA2 | 0558 | RSTTRP | 0000 | RTPRG | 06E7 | RTRCVR | 0647 |
| RTRLAB | 0605 | RTRM1 | 068D | RTRMRT | 068F | SAVEBT | 04B0 | SBFEND | 0078 | SBFPNT | 0066 | SBSTRT | 00CE | SBUF | 0067 |
| SBUFAD | 0067 | SBUFSZ | 0012 | SCNBUF | 0040 | SDAT10 | 0486 | SDAT11 | 0494 | SDAT12 | 04A2 | SDATA | 0400 |
| SDATA1 | 0406 | SDATA2 | 0400 | SDATA3 | 0417 | SDATA4 | 0425 | SDATA5 | 043C | SDATA6 | 044A | SDATA7 | 045C | SDATA8 | 0468 |
| SDATA9 | 0474 | SDATAH | 042C | SEGBUF | 0020 | SETCS | 0284 | SETDI | 01D1 | SETDII | 01D7 | SFTLFT | 0196 | SGSUM4 | 0837 |
| SGSUM6 | 083B | SGSUMX | 0854 | SGSUMY | 083C | SGSUMY | 0849 | SHIFTL | 05C1 | SNDWRT | 0501 | SOCIA | 01EB | SP2SCN | 0515 |
| ST2SCN | 051E | STACK | 0008 | STOCIA | 0511 | STRAM1 | 0089 | STRRAM | 0600 | STSDTA | 007E | SUM12C | 0889 | SUM2BY | 078C |
| SUM3BY | 078A | SUM4BY | 0788 | SWISET | 007D | SWLATC | 0008 | SWP4SJ | 0A00 | SWP4SN | 0949 | SWP6SJ | 0A02 | SWP6SN | 0954 |
| SWPXEX | 0962 | SWPXRT | 0A09 | SWSET | 01A0 | SWSET1 | 00CB | TASAVE | 001F | TBER4J | 0000 | TBER6J | 0002 | TBERR4 | 0C63 |
| TBERR6 | 0C61 | TBLK1 | 002F | TBLK13 | 0C6C | TBLK2 | 0C88 | TBLK3 | 0066 | TBLK4 | 0082 | TBLK5 | 0D9E | TBLK6 | 0D06 |
| TBLK7 | 0DBA | TBLK8 | 0CAE | TBLKA | 0C4F | TBLKE | 0C9B | TBNONE | 0C69 | TBNONJ | 0004 | TCKCNT | 0280 | TCNT1 | 0038 |
| TCNT2 | 003A | TERR02 | 0387 | TERR04 | 038A | TERR06 | 038F | TERR08 | 0395 | TERR10 | 039A | TERR12 | 039C | TERRWT | 0381 |
| TEST1 | 0241 | TEST2 | 0245 | TEST3 | 0248 | TEST4 | 0258 | TH005 | 04A4 | TIME05 | 0015 | TIME10 | 0019 | TIME20 | 001B |
| TIME30 | 0023 | TIME40 | 002A | TIME50 | 0033 | TIME60 | 003A | TIMER | 0007 | TIMREG | 0007 | TIMTRP | 0007 | TMOT10 | 0306 |
| TMOT20 | 030F | TMOT22 | 0311 | TMOT24 | 0313 | TMOT28 | 0325 | TMOT40 | 032B | TMOT50 | 0331 | TMOT60 | 0333 | TMOT80 | 0335 |
| TMOT90 | 034A | TMOT95 | 034F | TMOTOR | 0300 | TOC10 | 0185 | TOC20 | 018A | TOC50 | 018C | TOCIA | 0176 | TOCRET | 0363 |
| TON1CT | 056C | TONADD | 0576 | TONCNT | 001D | TONLTH | 001E | TPON | 0351 | TPON15 | 03CE | TPON20 | 0359 | TPON30 | 0361 |
| TPON40 | 0369 | TPON50 | 0373 | TPON60 | 037B | TPON90 | 037D | TPORET | 0387 | TRAM | 0131 | TRAM10 | 0133 | TRAM20 | 0139 |
| TRAM30 | 0141 | TRAM40 | 014E | TRAM60 | 015B | TRAMER | 0174 | TRARET | 035B | TREPRM | 005B | TRNDTA | 052D |
| TRNFLG | 04C1 | TRO10 | 0109 | TRO20 | 0110 | TRO50 | 011C | TROMSM | 0100 | TROPG0 | 00AC | TROPG1 | 01F6 | TROPG2 | 02E9 |
| TROPG3 | 03F7 | TROPG4 | 04E4 | TROPG5 | 05DB | TROPG6 | 06EA | TROPG7 | 07F6 | TROPG8 | 08E4 | TROPG9 | 0990 | TROPGA | 0ACC |
| TROPGB | 0BD8 | TROPGC | 0CD4 | TROPGD | 0DE3 | TROPGE | 0EB9 | TROPGF | 0FB7 | TRORET | 0353 | TROTAB | 0121 | TRPRM1 | 00C8 |
| TRPRM2 | 004A | TRRAM | 0061 | TRYBLK | 0C0C | TSCBUF | 0050 | TSEG1 | 0030 | TSEG2 | 0034 | TST31 | 0251 | TST32 | 0255 |
| TST41 | 0262 | TST42 | 0266 | TTA90 | 02A7 | TTACHK | 02A9 | TTAG | 020E | TTARET | 036B | TTATAB | 0200 | TWOLAB | 0067 |
| TXRET | 00AB | UNPACK | 0073 | UNPAK1 | 0077 | UNPK1 | 021D | UNPK2 | 0222 | VALFLG | 06A7 | VER13 | 0C4C | VER8 | 0C4A |
| VERA | 0C4D | VERD1 | 0C49 | VERD2 | 0C47 | VERD3 | 0C47 | VERD4 | 0C4A | VERD5 | 0C45 | VERE | 0C4B | VERFLG | 0006 |
| VERT05 | 0C22 | VERT10 | 0C2B | VERT15 | 0C2F | VERT20 | 0C3C | VERT90 | 0C4E | VERTAG | 0C00 | WAIT | 01E1 | WAIT0 | 01E3 |
| WAIT1 | 01E5 | WRACC | 01C2 | WREPRM | 0521 | WRKBUF | 0079 | WRPRM1 | 00C7 | WRTPRM | 06DD | | | | |

ASSEMBLY COMPLETE,    NO ERRORS

```
APL3R2    2304#   2318    2327    2390
BADRD     3722#
BF4CNT    274#    2193
BF4CST    234#    274     2192
BF6CNT    232#    2181
BF6CST    222#    232     2180
BUF12C    3802#   3852    3883    3888    3895    3907
BUFM10    3823    3825#
BUFM12    3852#   3859
BUFM13    3842    3855#
BUFM20    3831#
BUFM8     3844    3867#
BUFM8R    3870    3885    3892    3901#
BUFM90    3853    3865    3880    3904    3918    3920#
BUFM93    3825    3930#
BUFM94    3829    3836    3934#
BUFM95    3932    3938#
BUFMA     3841    3851#
BUFMAN    2486    3751    3822#
BUFMD1    3845    3872#
BUFMD2    3846    3882#
BUFMD3    3847    3887#
BUFMD4    3848    3894#
BUFMD5    3849    3906#
BUFME     3843    3861#
BUFTBL    3838    3840#
CHECLB    1408    1412#
CHKIJ     1871    1874#
CHKLP1    1836    1857#
```

| Symbol | | | | | | | | | | | | | |
|---|---|---|---|---|---|---|---|---|---|---|---|---|---|
| CHKSCN | 1493# | 3115 | 3132 | 3144 | | | | | | | | | |
| CK4H10 | 393# | 404 | | | | | | | | | | | |
| CK4H20 | 392 | 395# | | | | | | | | | | | |
| CK4H30 | 397 | 401# | | | | | | | | | | | |
| CK4HRS | 392# | 1035 | 1063 | | | | | | | | | | |
| CK6T10 | 3038# | 3044 | | | | | | | | | | | |
| CK6T20 | 3037 | 3041# | | | | | | | | | | | |
| CK6TOT | 3034# | 3193 | 3232 | 3270 | | | | | | | | | |
| CK6TRT | 3049# | | | | | | | | | | | | |
| CKCN10 | 1965# | | | | | | | | | | | | |
| CKCN20 | 1953 | 1971# | | | | | | | | | | | |
| CKCN30 | 1958 | 1981# | | | | | | | | | | | |
| CKCN40 | 1983 | 1988 | 1992# | | | | | | | | | | |
| CKCN45 | 1997# | | | | | | | | | | | | |
| CKCN50 | 1978 | 2003# | | | | | | | | | | | |
| CKCN60 | 2016 | 2024# | | | | | | | | | | | |
| CKCN70 | 2011 | 2030# | | | | | | | | | | | |
| CKCN80 | 2038 | 2046# | | | | | | | | | | | |
| CKCNNG | 1963 | 1969 | 1974 | 1990 | 1995 | 2001 | 2006 | 2022 | 2028 | 2033 | 2044 | 2049 | 2054# |
| CKCNOK | 1968 | 1979 | 1984 | 1989 | 2000 | 2021 | 2027 | 2043 | 2051# | | | | |
| CKCNTS | 1949# | 3706 | | | | | | | | | | | |
| CKEPD0 | 722# | 727 | | | | | | | | | | | |
| CKEPRM | 719# | 962 | 967 | | | | | | | | | | |
| CKFC10 | 2413 | 2416# | | | | | | | | | | | |
| CKFC20 | 2418 | 2425# | | | | | | | | | | | |
| CKFC80 | 2456 | 2460# | | | | | | | | | | | |
| CKFC90 | 2427 | 2458 | 2462# | | | | | | | | | | |
| CKFC95 | 2420 | 2426 | 2466# | | | | | | | | | | |
| CKFCA | 896 | 2413# | 3653 | 3677 | 3703 | | | | | | | | |
| CKMAJ | 2902# | 3064 | 3071 | 3080 | | | | | | | | | |
| CKMAJ9 | 2908 | 2914# | | | | | | | | | | | |
| CKMISM | 2932# | 3068 | 3075 | 3087 | | | | | | | | | |
| CKMS30 | 2948 | 2965# | | | | | | | | | | | |
| CKMS80 | 2954 | 2960 | 2967 | 2972# | | | | | | | | | |
| CKMS90 | 2933 | 2943 | 2975# | | | | | | | | | | |
| CKSENT | 792# | 793 | | | | | | | | | | | |
| CKSNRT | 1505 | 1508 | 1510 | 1512# | | | | | | | | | |
| CLKEPM | 753 | 755# | | | | | | | | | | | |
| CLR4SG | 2192# | 3210 | | | | | | | | | | | |
| CLR6SG | 888 | 2180# | 3209 | | | | | | | | | | |
| CLRRAM | 931# | 932 | | | | | | | | | | | |
| CLRSBF | 2223# | 2521 | 2536 | | | | | | | | | | |
| CLRSN1 | 2207# | 2209 | 2233 | | | | | | | | | | |
| CLRSNB | 1003 | 2204# | 2457 | 2721 | 3636 | | | | | | | | |
| CLRTOO | 2182 | 2194 | 2206# | | | | | | | | | | |
| CLRVER | 1002 | 3208# | 3635 | 3923 | | | | | | | | | |
| DATA | 742 | 749# | | | | | | | | | | | |
| DECR0 | 1748 | 1763# | | | | | | | | | | | |
| DISLAS | 985# | 1303 | 1328 | 1337 | 1367 | 1379 | 1388 | | | | | | |
| DRSM13 | 2096 | 2106# | | | | | | | | | | | |
| DRSM1X | 2136 | 2145# | | | | | | | | | | | |
| DRSM3X | 2130 | 2140# | | | | | | | | | | | |
| DRSM4X | 2124 | 2141# | | | | | | | | | | | |
| DRSM5X | 2116 | 2120# | | | | | | | | | | | |
| DRSM7B | 2107 | 2144# | | | | | | | | | | | |
| DRSM7C | 2110 | 2146# | | | | | | | | | | | |
| DRSM8 | 2098 | 2150# | | | | | | | | | | | |
| DRSMA | 2095 | 2105# | | | | | | | | | | | |
| DRSMD1 | 2099 | 2132# | | | | | | | | | | | |
| DRSMD2 | 2100 | 2138# | | | | | | | | | | | |
| DRSMD3 | 2101 | 2126# | | | | | | | | | | | |
| DRSMD4 | 2102 | 2118# | | | | | | | | | | | |
| DRSMD5 | 2103 | 2112# | | | | | | | | | | | |
| DRSMDN | 2148 | 2156# | | | | | | | | | | | |
| DRSME | 2097 | 2109# | | | | | | | | | | | |
| DRSTBL | 2092 | 2094# | | | | | | | | | | | |
| DRSUM | 290# | 2156 | | | | | | | | | | | |
| DRSUMT | 2086# | 3730 | 3736 | | | | | | | | | | |
| DRTIMR | 201# | | | | | | | | | | | | |
| DRVRNG | 2090 | 2094 | 2161# | | | | | | | | | | |
| E1000M | 143# | 1157 | 1221 | | | | | | | | | | |
| EAMBBY | 166# | | | | | | | | | | | | |
| EAMBMS | 108# | 988 | 1350 | 1359 | | | | | | | | | |
| EAMESD | 152# | 1356 | | | | | | | | | | | |
| EAMESE | 153# | 1347 | | | | | | | | | | | |
| EBDLT | 45# | 986 | 995 | 1044 | 1047 | 1050 | 1136 | 1228 | 1321 | 1927 | 3687 | 3694 | 3742 | 3783 | 3785 |
| EBDTON | 146# | | | | | | | | | | | | |
| EBFREQ | 111# | 3631 | 3749 | 3925 | 3935 | | | | | | | | |
| EBIT6 | 156# | 2520 | | | | | | | | | | | |
| ECASE1 | 2347 | 2355# | | | | | | | | | | | |
| ECASE2 | 2348 | 2364# | | | | | | | | | | | |
| ECASE3 | 2350 | 2375# | | | | | | | | | | | |
| ECASE4 | 2351 | 2372 | 2384# | | | | | | | | | | |
| EDEC8L | 83# | | | | | | | | | | | | |
| EDEC8R | 84# | | | | | | | | | | | | |
| EDECAL | 85# | | | | | | | | | | | | |
| EDECAR | 86# | | | | | | | | | | | | |
| EDECB7 | 92# | | | | | | | | | | | | |
| EDECBE | 87# | | | | | | | | | | | | |
| EDECBF | 88# | | | | | | | | | | | | |
| EDECBK | 91# | 2584 | | | | | | | | | | | |
| EDECD | 90# | 3237 | 3275 | 3432 | | | | | | | | | |
| EDECE | 89# | 3237 | 3303 | | | | | | | | | | |
| EDECOO | 82# | | | | | | | | | | | | |

| | | | | | | | | | | | | | | |
|---|---|---|---|---|---|---|---|---|---|---|---|---|---|---|
| EDRDLY | 175# | 3647 | | | | | | | | | | | | |
| EFCRST | 64# | 642 | 814 | 991 | 1161 | 1189 | 1230 | | | | | | | |
| EFRRST | 62# | 996 | 2462 | | | | | | | | | | | |
| EGDLT | 44# | 986 | 995 | 1006 | 1044 | 1047 | 1050 | 1075 | 1078 | 1135 | 1216 | 1227 | 1320 | 1928 | 3686 | 3693 | 3 |
| EGDLTW | 174# | 3648 | | | | | | | | | | | | |
| EGDTON | 145# | 1930 | 3745 | | | | | | | | | | | |
| EHCNTL | 184# | 403 | 1310 | | | | | | | | | | | |
| ELASDB | 43# | 849 | 1019 | 1184 | 1220 | 1227 | 1289 | 1296 | 1321 | 3770 | | | | |
| ELST1 | 1474# | 1476 | | | | | | | | | | | | |
| ELSTBT | 1717 | 1718 | 1724 | 1725 | 1732 | 1733 | 1741 | 1767 | 1779 | 1791# | | | | |
| EMOD10 | 2339# | 2711 | | | | | | | | | | | | |
| EMODCK | 2394# | | | | | | | | | | | | | |
| EMODSM | 2360 | 2390# | | | | | | | | | | | | |
| EMTREB | 40# | 1019 | 1032 | 1052 | 1082 | 1228 | 3771 | | | | | | | |
| ENLAS | 994# | 1305 | 1330 | 1342 | 1372 | 1381 | 1390 | | | | | | | |
| EOCIA | 63# | 401 | 645 | 795 | 1282 | 1585 | 2539 | | | | | | | |
| EPARRD | 60# | | | | | | | | | | | | | |
| EPRDEC | 65# | 2450 | | | | | | | | | | | | |
| EPRMCS | 53# | 953 | 970 | 1181 | 1535 | 1551 | 1559 | 1563 | 1649 | 1651 | 1692 | 1694 | | |
| EPRMDI | 41# | 752 | 754 | 756 | | | | | | | | | | |
| EPRMSK | 42# | 725 | 726 | 744 | 745 | 755 | 756 | 959 | 960 | | | | | |
| ER4B1 | 107# | | | | | | | | | | | | | |
| ER4B4 | 110# | | | | | | | | | | | | | |
| ER4B6 | 112# | | | | | | | | | | | | | |
| ER4B7 | 113# | | | | | | | | | | | | | |
| ER6B4 | 128# | | | | | | | | | | | | | |
| ER6B5 | 129# | | | | | | | | | | | | | |
| ER6B6 | 130# | | | | | | | | | | | | | |
| ER6B7 | 131# | | | | | | | | | | | | | |
| ERAL | 136# | 1527 | | | | | | | | | | | | |
| ERASE | 139# | | | | | | | | | | | | | |
| ERASFL | 1528 | 1647# | | | | | | | | | | | | |
| ERS2RM | 1471# | 1792 | 1884 | 1915 | | | | | | | | | | |
| ESBFUL | 109# | 2224 | 3631 | 3926 | | | | | | | | | | |
| ESCNG | 106# | 893 | 999 | 3660 | | | | | | | | | | |
| ESDIS | 155# | 1294 | | | | | | | | | | | | |
| ESEN | 154# | 1287 | | | | | | | | | | | | |
| ESENT | 50# | | | | | | | | | | | | | |
| ESR4CH | 97# | | | | | | | | | | | | | |
| ESRCHR | 96# | | | | | | | | | | | | | |
| ESRF13 | 98# | | | | | | | | | | | | | |
| ESRPER | 99# | | | | | | | | | | | | | |
| ESRRD | 61# | 395 | 2416 | | | | | | | | | | | |
| ESRSDT | 100# | | | | | | | | | | | | | |
| ETEST | 38# | 641 | 816 | 849 | 1113 | | | | | | | | | |
| ETMARK | 39# | 863 | 865 | 877 | 879 | 1113 | | | | | | | | |
| ETNCT1 | 186# | 1625 | | | | | | | | | | | | |
| ETNCT2 | 187# | 1626 | | | | | | | | | | | | |
| ETNCT3 | 188# | 1627 | | | | | | | | | | | | |
| ETNCT4 | 189# | 1628 | | | | | | | | | | | | |
| ETNFQ1 | 190# | 379 | | | | | | | | | | | | |
| ETNFQ2 | 191# | 380 | | | | | | | | | | | | |
| ETNFQ3 | 192# | 381 | | | | | | | | | | | | |
| ETNFQ4 | 193# | 382 | | | | | | | | | | | | |
| ETONCT | 148# | 1145 | | | | | | | | | | | | |
| ETONE | 46# | 353 | 355 | 367 | 849 | 1184 | | | | | | | | |
| ETONFQ | 149# | | | | | | | | | | | | | |
| ETRMBY | 167# | 2501 | 2517 | 3920 | | | | | | | | | | |
| EUP2SP | 51# | | | | | | | | | | | | | |
| EVER00 | 117# | | | | | | | | | | | | | |
| EVER13 | 119# | | | | | | | | | | | | | |
| EVER8 | 121# | | | | | | | | | | | | | |
| EVERA | 118# | 1835 | | | | | | | | | | | | |
| EVERD1 | 122# | | | | | | | | | | | | | |
| EVERD2 | 123# | | | | | | | | | | | | | |
| EVERD3 | 124# | | | | | | | | | | | | | |
| EVERD4 | 125# | | | | | | | | | | | | | |
| EVERD5 | 126# | | | | | | | | | | | | | |
| EVERE | 120# | | | | | | | | | | | | | |
| EVLSIR | 52# | 1181 | 1183 | | | | | | | | | | | |
| EWAIT | 173# | 174 | 175 | 2422 | 2460 | | | | | | | | | |
| EWDS | 138# | 1560 | | | | | | | | | | | | |
| EWEN | 135# | 1690 | | | | | | | | | | | | |
| EXSBF2 | 2988# | 3085 | | | | | | | | | | | | |
| EXSBF3 | 2990# | 3074 | | | | | | | | | | | | |
| EXSBF4 | 2992# | 3067 | | | | | | | | | | | | |
| EXSBFL | 2998# | 3003 | | | | | | | | | | | | |
| EXSBFX | 2989 | 2991 | 2993# | | | | | | | | | | | |
| FACTOR | 176# | 343 | 1023 | 1034 | 1053 | 1062 | 1146 | 1151 | 1157 | 1218 | 1221 | 1232 | | |
| FILFF | 1758# | 1760 | | | | | | | | | | | | |
| FLCKRT | 1776 | 1789 | 1801# | | | | | | | | | | | |
| FLGCHK | 1882 | 1887# | | | | | | | | | | | | |
| FLGPRG | 1811# | 3740 | | | | | | | | | | | | |
| FREQAD | 374 | 378# | | | | | | | | | | | | |
| GETLUP | 895# | 899 | | | | | | | | | | | | |
| GOOD10 | 3727 | 3735# | | | | | | | | | | | | |
| GOOD20 | 3732 | 3738# | | | | | | | | | | | | |
| GOOD30 | 1831 | 3741# | | | | | | | | | | | | |
| GOODRD | 3717 | 3725# | | | | | | | | | | | | |
| HCOM10 | 2483 | 2489# | | | | | | | | | | | | |
| HCOM20 | 2505 | 2508# | | | | | | | | | | | | |
| HCOM30 | 2514 | 2518 | 2523# | | | | | | | | | | | | |
| HCOM40 | 2526 | 2529# | | | | | | | | | | | | |
| HCOM55 | 2502 | 2536# | | | | | | | | | | | | |
| HCOM80 | 2534 | 2539# | | | | | | | | | | | | |
| HCOM90 | 2485 | 2490 | 2511 | 2542# | | | | | | | | | | | |

```
HCOMM   2482#  3109   3641   3654   3676   3692   3702   3715   3722   3725
INCHNB  2606#  2782   2832   2884
INCLNB  2612#  2758   2815   2867
INCPNT  1885   1902#
INCX90  2610   2619#
INCXRT  2609   2616   2623#
INLAB1  1782   1786#
INTSTR  295#   331    347
INTTRP  310#
L4S1    235#   2135   2151   3345   3455   3869   3878
L4S2    236#
L4SCNT  237#   2689   3078
L4STOT  238#   1960   1997   3335   3440
L6S1    223#   914    1440   1976   1981   2146   2856   3016   3066   3196   3235   3248   3273   3301   3430   3445   3
        3863   3874
L6S2    224#   1986   2873
L6SCNT  225#   902    2853   2866   2870   2883   3063
L6STOT  226#   1955   1971   2887   3034   3296   3327   3425
LASTBT  1592   1595#
LBDET   1747   1750#
LOOPCK  916#   923    928
LSTBYT  466    475    487#
LSTUSD  297#
MAJSG0  3065   3068#
MAJSG1  3072   3075#
MAJSG4  3080#  3091
MAJSG5  3081   3087#
MAJSGS  3063#  3108
MCH2BY  2640#  2753   2777
MCH3BY  2642#  2811   2828
MCH4BY  2644#  2863   2880
MCHXBY  2641   2643   2645#  2650
MCHXRT  2647   2651#
MOD104  2317#  3346   3349   3393   3397   3403   3450   3464   3495   3499   3530   3534   3565   3569   3605   3609   3
MOD106  2326#  3017   3021   3446
MOV2BY  2245#  2747   2771   3877   3879   3890   3897   3899   3901   3903   3909   3911   3913   3915   3917
MOV3BY  2247#  2341   2808   2825   3804   3806   3864   3875
MOV4BY  2249#  2860   2877
MOVXBY  2246   2248   2250#  2254
MRB0    199#
MRB1    209#
MRB1R4  210#
MTRC10  3757   3760#
MTRC20  3761#  3762
MTRCHK  3640   3682   3701   3755#
MTRE20  3778#  3784   3786
MTRE30  3779#  3780
MTRERR  3766   3770#
N1S1    245#   2123   3533   3614   3898   3916
N1S2    246#
N1SCNT  247#   2703
N1STOT  248#   2030   3524   3599
N2S1    250#   2139   3494   3884
N2S2    251#
N2SCNT  252#   2704
N2STOT  253#   2018   3484
N3S1    255#   2115   2129   3392   3604   3889   3912
N3S2    256#
N3SCNT  257#   2705
N3STOT  258#   2024   2046   3377   3589
N4S1    260#   2121   3564   3900   3908
N4S2    261#
N4SCNT  262#   2706
N4STOT  263#   2008   3554
N5S1    265#   2119   2127   3396   3529   3891   3896
N5S2    266#
N5SCNT  267#   2707
N5STOT  268#   2013   2040   3382   3519
N6S1    270#   2113   2133   3449   3608   3876   3914
N6S2    271#
N6SCNT  272#   2708
N6STOT  273#   1992   2035   3435   3594
NOLSBT  1740#
OCIRET  1597   1600#
OPREAD  134#   952
OVRERR  1410   1414   1425#
OVRRET  1423   1427#
OVRSET  1389   1405#
OVRST1  160#   1386
OWRITE  137#   1531
PARITY  478    481    488    492    671#   706    1589   2532
PDATA   435    441#
POW00   1171#  1177
POW10   1202#  1203
POW20   1227#
POW25   1233#  1234
POW30   1240#  1241
POWUP   307    1172#
PRO4C2  2742   2750#
PRO4C3  2748   2756#
PRO4C4  2754   2761#
PRO4C6  2766   2774#
PRO4C7  2772   2780#
PRO4C8  2778   2785#
```

```
PRO4CH   2690    2692    2702    2737#
PRO6C2   2806    2811#
PRO6C3   2809    2814#
PRO6C4   2812    2818#
PRO6C6   2823    2828#
PRO6C7   2826    2831#
PRO6C8   2829    2835#
PRO6CH   2719    2801#
PRO7C2   2858    2863#
PRO7C3   2861    2866#
PRO7C4   2864    2870#
PRO7C6   2875    2880#
PRO7C7   2878    2883#
PRO7C8   2881    2887#
PRO7CH   2683    2713    2718    2853#
PROC05   2678    2685#
PROC3L   2680#
PROC8    2686#
PROC8L   2689#
PROC8R   2688    2691#
PROCA    2685    2715#
PROCAL   2718#
PROCAR   2717    2719#
PROCD    2681#   2695
PROCDN   2696#
PROCDX   2673    2694#
PROCE    2674    2710#
PROCEX   2712    2721#   2759    2783    2789    2816    2833    2837    2868    2885    2889
PROCNT   2699    2703#
PROCRT   2671    2722#
PROCSG   897     2669#   3704
PROLAB   1819    1823    1833#
R4S1     240#    2142    2153    3348    3402    3498    3568    3902    3910
R4S2     241#
R4SCNT   242#    2691
R4STOT   243#    1965    2003    3340    3387    3489    3559
R6S1     228#    925     1450    1858    2144    2804    3020    3073    3805
R6S2     229#    2821
R6SCNT   230#    909     2801    2814    2818    2831    3070
R6STOT   231#    1950    2835    3041    3306    3331
RAMRT    993     1006#
RCRAM    218#    1339
RDEPRM   424     949#    1250
RDLAB1   1772#   1788
RDLAB2   1774#   1785
RDT05    3633    3636#
RDT10    3640#   3645    3655
RDT20    3642    3653#
RDT30    3649    3659#
RDT35    3663#   3685    3688
RDT37    3666    3669    3675#
RDT40    3680    3692#
RDT50    3701#   3711    3720
RDT60    3697    3704#
RDT70    3708    3715#
RDT90    3723    3748#
RDTAG    1259    1838    1933    3630#   3696    3733    3752
RLACC    722     724#
ROCIA    1407    1580#   1716    1723    1731    1739
ROCIA1   1582#   1583
ROCIA2   1582    1584#
RSTTRP   306#    1126    1393
RTPRG    1872    1876    1891    1923    1932#
RTRCVR   1752    1761    1766    1770#   1909
RTRLAB   1716#   1764
RTRM1    1896#   1900
RTRMRT   1889    1893#
SAVEBT   1412    1416#
SBFEND   284#
SBFPNT   277#    2227    2492    3921
SBSTRT   282#    2228    3922
SBUF     281#    282     283     2230    3831
SBUFAD   280#
SBUFSZ   283#    2231
SCNBUF   220#    2204    2339    2343    2394    2428    2558    2568    2669    2741    2765    2805    2822    2857    2874    3678
SCNFLG   200#
SDAT10   1366    1375#
SDAT11   1378    1384#
SDAT12   1387    1393#   1394
SDATA    1282#   2467
SDATA1   1287#
SDATA2   1288    1292#
SDATA3   1295    1299#
SDATA4   1302    1308#
SDATA5   1311    1324#
SDATA6   1327    1333#
SDATA7   1336    1345#
SDATA8   1348    1354#
SDATA9   1357    1363#
SDATAH   405     1312#
SEGBUF   219#
SETCS    953#    973
```

| | | | | | | | | | | | | | | |
|---|---|---|---|---|---|---|---|---|---|---|---|---|---|---|
| SETDI | 748 | 751# | 759 | | | | | | | | | | | |
| SETDI1 | 751 | 754# | | | | | | | | | | | | |
| SFTLFT | 676# | 678 | | | | | | | | | | | | |
| SGSUM4 | 2267# | 2317 | | | | | | | | | | | | |
| SGSUM6 | 2271# | 2326 | 2359 | 2385 | | | | | | | | | | |
| SGSUMR | 2291 | 2296# | | | | | | | | | | | | |
| SGSUMX | 2269 | 2272# | | | | | | | | | | | | |
| SGSUMY | 2279 | 2284# | | | | | | | | | | | | |
| SHIFTL | 1442 | 1459 | 1665# | 1677 | | | | | | | | | | |
| SNDWRT | 1525 | 1689# | | | | | | | | | | | | |
| SOCIA | 438 | 442 | 479 | 482 | 489 | 493 | 699 | 707 | 789# | | | | | |
| SP2SCN | 1500 | 1506# | | | | | | | | | | | | |
| ST2SCN | 1502 | 1511# | | | | | | | | | | | | |
| STACK | 206# | 509 | | | | | | | | | | | | |
| STOCIA | 1498 | 1504# | | | | | | | | | | | | |
| STRAM1 | 161# | 1301 | | | | | | | | | | | | |
| STRRAM | 1304 | 1710# | | | | | | | | | | | | |
| STSDTA | 294# | 1284 | 1292 | 1299 | 1308 | 1324 | 1333 | 1345 | 1354 | 1363 | 1375 | 1384 | | |
| SUM12C | 3016# | 3202 | 3245 | 3278 | | | | | | | | | | |
| SUM2BY | 2071# | 2114 | 2120 | 2122 | 2128 | 2134 | 2141 | 2143 | 2152 | 2154 | | | | |
| SUM3BY | 2069# | 2145 | | | | | | | | | | | | |
| SUM4BY | 2067# | 2147 | | | | | | | | | | | | |
| SWISET | 293# | 371 | 703 | 1253 | 1418 | 1494 | 1616 | 1817 | 3667 | | | | | |
| SWLATC | 66# | 700 | 1252 | 1821 | 3664 | | | | | | | | | |
| SWP4SJ | 2666# | 2687 | 2697 | | | | | | | | | | | |
| SWP4SN | 2558# | 2666 | | | | | | | | | | | | |
| SWP6SJ | 2667# | 2682 | 2710 | 2716 | | | | | | | | | | |
| SWP6SN | 2568# | 2667 | | | | | | | | | | | | |
| SWPXEX | 2566 | 2582# | | | | | | | | | | | | |
| SWPXRT | 2586 | 2673# | | | | | | | | | | | | |
| SWSET | 696# | 1380 | | | | | | | | | | | | |
| SWSET1 | 159# | 1377 | | | | | | | | | | | | |
| TASAVE | 213# | | | | | | | | | | | | | |
| TBER4J | 3373# | 3407 | 3503 | 3538 | 3573 | 3619 | | | | | | | | |
| TBER6J | 3374# | 3468 | | | | | | | | | | | | |
| TBERR4 | 3210# | 3329 | 3333 | 3353 | 3373 | | | | | | | | | |
| TBERR6 | 3203 | 3209# | 3253 | 3279 | 3308 | 3374 | | | | | | | | |
| TBLK1 | 3135 | 3425# | | | | | | | | | | | | |
| TBLK13 | 3121 | 3232# | | | | | | | | | | | | |
| TBLK2 | 3124 | 3270# | | | | | | | | | | | | |
| TBLK3 | 3153 | 3484# | | | | | | | | | | | | |
| TBLK4 | 3160 | 3519# | | | | | | | | | | | | |
| TBLK5 | 3147 | 3554# | | | | | | | | | | | | |
| TBLK6 | 3150 | 3377# | | | | | | | | | | | | |
| TBLK7 | 3157 | 3589# | | | | | | | | | | | | |
| TBLK8 | 3138 | 3327# | | | | | | | | | | | | |
| TBLKA | 3118 | 3193# | | | | | | | | | | | | |
| TBLKE | 3128 | 3296# | | | | | | | | | | | | |
| TBNONE | 3194 | 3200 | 3214# | 3233 | 3238 | 3243 | 3271 | 3276 | 3299 | 3304 | 3338 | 3343 | 3375 | |
| TBNONJ | 3375# | 3380 | 3385 | 3390 | 3428 | 3433 | 3438 | 3443 | 3487 | 3492 | 3522 | 3527 | 3557 | 3562 | 3592 | 3597 | 3 |
| TCKCNT | 903# | 911 | | | | | | | | | | | | |
| TCNT1 | 181# | | | | | | | | | | | | | |
| TCNT2 | 182# | | | | | | | | | | | | | |
| TERR02 | 1141# | | | | | | | | | | | | | |
| TERR04 | 1144# | 1155 | | | | | | | | | | | | |
| TERR06 | 1147# | 1148 | | | | | | | | | | | | |
| TERR08 | 1152# | 1153 | | | | | | | | | | | | |
| TERR10 | 1142 | 1157# | | | | | | | | | | | | |
| TERR12 | 1158# | 1159 | | | | | | | | | | | | |
| TERRWT | 1125 | 1135# | 1426 | 1795 | 3774 | | | | | | | | | |
| TEST1 | 854# | 885 | | | | | | | | | | | | |
| TEST2 | 856# | 884 | | | | | | | | | | | | |
| TEST3 | 859# | 859 | | | | | | | | | | | | |
| TEST4 | 872# | 872 | | | | | | | | | | | | |
| THO05 | 1322 | 1394# | | | | | | | | | | | | |
| TIME05 | 338 | 340# | | | | | | | | | | | | |
| TIME10 | 341 | 343# | 368 | | | | | | | | | | | |
| TIME20 | 344# | 376 | | | | | | | | | | | | |
| TIME30 | 335 | 352# | | | | | | | | | | | | |
| TIME40 | 354 | 356# | | | | | | | | | | | | |
| TIME50 | 363 | 365# | | | | | | | | | | | | |
| TIME60 | 357 | 366 | 369# | | | | | | | | | | | |
| TIMER | 327# | | | | | | | | | | | | | |
| TIMREG | 203# | | | | | | | | | | | | | |
| TIMTRP | 313# | | | | | | | | | | | | | |
| TMOT10 | 1024# | 1025 | | | | | | | | | | | | |
| TMOT20 | 1033# | | | | | | | | | | | | | |
| TMOT22 | 1034# | 1045 | 1048 | | | | | | | | | | | |
| TMOT24 | 1035# | 1037 | | | | | | | | | | | | |
| TMOT28 | 1041 | 1050# | | | | | | | | | | | | |
| TMOT40 | 1054# | 1055 | | | | | | | | | | | | |
| TMOT50 | 1029 | 1061# | | | | | | | | | | | | |
| TMOT60 | 1062# | 1076 | 1079 | | | | | | | | | | | |
| TMOT80 | 1063# | 1065 | | | | | | | | | | | | |
| TMOT90 | 1058 | 1072 | 1082# | | | | | | | | | | | |
| TMOT95 | 1068 | 1088# | | | | | | | | | | | | |
| TMOTOR | 1019# | 1118 | | | | | | | | | | | | |
| TOC10 | 653# | 657 | | | | | | | | | | | | |
| TOC20 | 655 | 657# | | | | | | | | | | | | |
| TOC50 | 651 | 659# | | | | | | | | | | | | |
| TOCIA | 641# | 1107 | | | | | | | | | | | | |
| TOCRET | 660 | 1108# | | | | | | | | | | | | |

| Symbol | | | | | | | | | | |
|---|---|---|---|---|---|---|---|---|---|---|
| TON1CT | 359 | 1209 | 1245 | 1614# | | | | | | |
| TONADD | 1619 | 1624# | | | | | | | | |
| TONCNT | 211# | | | | | | | | | |
| TONLTH | 212# | | | | | | | | | |
| TPON | 1095# | 1195 | | | | | | | | |
| TPON15 | 1222# | 1223 | | | | | | | | |
| TPON20 | 1098 | 1102# | | | | | | | | |
| TPON30 | 1103 | 1107# | | | | | | | | |
| TPON40 | 1108 | 1112# | | | | | | | | |
| TPON50 | 1114 | 1118# | | | | | | | | |
| TPON60 | 1119 | 1123# | | | | | | | | |
| TPON90 | 1100 | 1105 | 1110 | 1116 | 1121 | 1125# | | | | |
| TPORET | 1123 | 1196# | | | | | | | | |
| TRAM | 573# | 1102 | | | | | | | | |
| TRAM10 | 574# | 576 | | | | | | | | |
| TRAM20 | 580# | 583 | | | | | | | | |
| TRAM30 | 587# | 595 | | | | | | | | |
| TRAM40 | 599# | 607 | | | | | | | | |
| TRAM50 | 611# | 619 | | | | | | | | |
| TRAM60 | 623# | 631 | | | | | | | | |
| TRAMER | 582 | 603 | 627 | 634# | | | | | | |
| TRARET | 634 | 1103# | | | | | | | | |
| TREPRM | 416# | 1341 | | | | | | | | |
| TRNDTA | 1534# | 1557 | | | | | | | | |
| TRNFLG | 1438# | 1908 | | | | | | | | |
| TRO10 | 522# | 536 | | | | | | | | |
| TRO20 | 531# | 534 | | | | | | | | |
| TRO50 | 531 | 542# | | | | | | | | |
| TROMSM | 509# | 1095 | | | | | | | | |
| TROPG0 | 498# | 549 | | | | | | | | |
| TROPG1 | 550 | 801# | | | | | | | | |
| TROPG2 | 551 | 1009# | | | | | | | | |
| TROPG3 | 552 | 1261# | | | | | | | | |
| TROPG4 | 553 | 1479# | | | | | | | | |
| TROPG5 | 554 | 1697# | | | | | | | | |
| TROPG6 | 555 | 1935# | | | | | | | | |
| TROPG7 | 556 | 2164# | | | | | | | | |
| TROPG8 | 557 | 2471# | | | | | | | | |
| TROPG9 | 558 | 2653# | | | | | | | | |
| TROPGA | 559 | 2839# | | | | | | | | |
| TROPGB | 560 | 3094# | | | | | | | | |
| TROPGC | 561 | 3356# | | | | | | | | |
| TROPGD | 562 | 3622# | | | | | | | | |
| TROPGE | 563 | 3788# | | | | | | | | |
| TROPGF | 564 | 3940# | | | | | | | | |
| TRORET | 538 | 1096# | | | | | | | | |
| TROTAB | 523 | 549# | | | | | | | | |
| TRPRM1 | 158# | 1335 | | | | | | | | |
| TRPRM2 | 162# | 1365 | | | | | | | | |
| TRRAM | 427# | 1371 | | | | | | | | |
| TRYBLK | 3118# | | | | | | | | | |
| TSCBUF | 183# | | | | | | | | | |
| TSEG1 | 179# | 1318 | | | | | | | | |
| TSEG2 | 180# | | | | | | | | | |
| TST31 | 862 | 865# | | | | | | | | |
| TST32 | 864 | 869# | | | | | | | | |
| TST41 | 876 | 879# | | | | | | | | |
| TST42 | 878 | 883# | | | | | | | | |
| TTA90 | 907 | 919 | 934# | | | | | | | |
| TTACHK | 915 | 936# | | | | | | | | |
| TTAG | 814# | 1112 | | | | | | | | |
| TTARET | 934 | 1113# | | | | | | | | |
| TTATAB | 812# | 817 | | | | | | | | |
| TWOLAB | 279# | 1249 | 1369 | 1473 | 1530 | 1713 | 1771 | 1773 | 1894 | 1895 | 1907 |
| TXRET | 439 | 496# | | | | | | | | |
| UNPACK | 446# | | | | | | | | | |
| UNPAK1 | 452# | 484 | | | | | | | | |
| UNPK1 | 822# | 845 | | | | | | | | |
| UNPK2 | 826# | 843 | | | | | | | | |
| VALFLG | 1875 | 1879# | | | | | | | | |
| VER13 | 3122 | 3171# | | | | | | | | |
| VER8 | 3139 | 3169# | | | | | | | | |
| VERA | 3119 | 3172# | | | | | | | | |
| VERD1 | 3136 | 3168# | | | | | | | | |
| VERD2 | 3154 | 3167# | | | | | | | | |
| VERD3 | 3151 | 3166# | | | | | | | | |
| VERD4 | 3161 | 3165# | | | | | | | | |
| VERD5 | 3158 | 3164# | | | | | | | | |
| VERE | 3129 | 3170# | | | | | | | | |
| VERFLG | 202# | | | | | | | | | |
| VERT05 | 3135# | | | | | | | | | |
| VERT10 | 3125 | 3142# | | | | | | | | |
| VERT15 | 3147# | | | | | | | | | |
| VERT20 | 3148 | 3157# | | | | | | | | |
| VERT90 | 3174# | | | | | | | | | |
| VERTAG | 3108# | 3716 | | | | | | | | |
| WAIT | 771# | 1553 | 1653 | | | | | | | |
| WAIT0 | 774# | 776 | | | | | | | | |
| WAIT1 | 775# | 775 | | | | | | | | |
| WRACC | 741# | 957 | 1538 | 1543 | 1549 | 1562 | 1650 | 1693 | | |
| WREPRM | 1329 | 1523# | 1926 | | | | | | | |
| WRKBUF | 287# | 2340 | 2355 | 2364 | 2375 | 2384 | | | | |
| WRPRM1 | 157# | 1326 | | | | | | | | |
| WRTPRM | 1913 | 1926# | | | | | | | | |

CROSS REFERENCE COMPLETE

Having described the invention in detail and by reference to the preferred embodiment thereof, it will be apparent that other modifications and variations are possible without departing from the scope of the invention defined in the appended claims.

What is claimed is:

1. A scanner for scanning bar code labels and for providing data related thereto to a host computer, comprising:

scanning means for optically scanning bar code labels and providing an electrical signal in response thereto, decoding means, responsive to said scanning means for translating said electrical signal into a digital signal, a microprocessor means, responsive to said decoding means, for controlling operation of said scanner and for translating said digital signal into data to be provided to the associated host computer under control of control characters, a non-volatile random access control memory in which control characters are stored, and interface means, connected to said host computer and to said microprocessor means, for transferring data from said microprocessor means to said host computer and for transferring control characters from said host computer to non-volatile random access control memory via said microprocessor means.

2. The scanner of claim 1 in which said non-volatile random access control memory comprises an electrically erasable programmable read only memory.

3. The scanner of claim 1 in which said interface means comprises an optically isolated interface.

4. The scanner of claim 2 in which said non-volatile random access control memory comprises an EEPROM memory device.

5. The scanner of claim 1 in which said control characters are character sets which when read by the scanner indicate that two bar code labels are associated with the same item.

6. The scanner of claim 1 further comprising an audible signal generator and in which said central characters define the volume of the audible signal produced by said audible signal generator.

7. The scanner of claim 1 further comprising an audible signal generator and in which said control characters define the frequency of the audible signal produced by said audible signal generator.

8. The scanner of claim 1 in which said control characters define the rate of transfer of data and control characters between said host computer and said interface means.

9. A scanner for scanning bar code labels on products presented to the scanner and for providing the data from the bar code labels to a host computer, comprising:

scanning means for optically scanning bar code labels and providing an electrical signal in response thereto, decoding means, responsive to said scanning means for translating said electrical signal into a digital signal, a non-volatile random access control memory in which a plurality of sets of control characters are stored, said sets of control characters defining characters which, if detected on a pair of successively scanned labels, indicate that the labels are affixed to the same product and further indicate which is the first and which is the second of the label pair, microprocessor means, responsive to said decoding means, for controlling operation of said scanner and for translating said digital signal into data to be provided to the associated host computer under control of control characters, and interface means, connected to said host computer and to said microprocessor means, for transferring data from said microprocessor means to said host computer and for transferring control character sets from said host computer to non-volatile random access control memory via said microprocessor means.

10. The scanner of claim 9 in which said non-volatile random access control memory comprises an electrically erasable programmable read only memory.

11. The scanner of claim 9 in which said interface means comprises an optically isolated interface.

12. The scanner of claim 10 in which said non-volatile random access control memory comprises an EEPROM memory device.

13. The scanner of claim 10 in which said non-volatile random access control memory comprises an NOVRAM memory device.

14. A method of programming a bar code scanner of the type which optically scans bar code labels, said scanner including a non-volatile control memory in which a plurality of sets of control characters are stored, said sets of control characters defining characters which, if detected on a pair of successively scanned labels, indicate that the labels are affixed to the same product and further indicate which is the first and which is the second of the label pair, comprising the steps of:

(a) connecting a data source to said scanner;

(b) transmitting a plurality of sets of control characters to said scanner from said data source; and (c) storing said plurality of sets of control characters in said non-volatile control memory.

15. The method of claim 14, further comprising the step of:

(d) interrogating said scanner non-volatile control memory and comparing the sets of control characters stored therein with the previously transmitted control characters.

* * * * *

(12) REEXAMINATION CERTIFICATE (4246th)
United States Patent
Elliott et al.

(10) Number: US 4,866,257 C1
(45) Certificate Issued: Jan. 9, 2001

(54) BAR CODE SCANNER AND METHOD

(75) Inventors: Randy D. Elliott; Robert J. Actis, both of Eugene, OR (US)

(73) Assignee: Spectra-Physics Scanning Systems, Inc., Eugene, OR (US)

Reexamination Request:
No. 90/003,964, Sep. 22, 1995

Reexamination Certificate for:
Patent No.: 4,866,257
Issued: Sep. 12, 1989
Appl. No.: 07/122,743
Filed: Nov. 19, 1987

(51) Int. Cl.$^7$ .................................................. G06K 7/10
(52) U.S. Cl. ............... 235/462.15; 235/375; 235/462.25; 235/462.45; 235/472.02
(58) Field of Search .......................... 235/436, 375, 235/462.25, 462.45, 472.02, 462.15

(56) References Cited

U.S. PATENT DOCUMENTS

| | | | |
|---|---|---|---|
| 4,415,065 | 11/1983 | Sandstedt | 186/39 |
| 4,434,472 | 2/1984 | Kachun | 364/900 |
| 4,481,412 | 11/1984 | Fields | 235/472 |
| 4,516,016 | 5/1985 | Kodron | 235/472 |
| 4,525,788 | 7/1985 | Gottlieb et al. | 364/478 |
| 4,569,421 | 2/1986 | Sandstedt | 186/39 |
| 4,608,487 | 8/1986 | Awane | 235/383 |
| 4,734,858 | 3/1988 | Schlafly | 364/408 |
| 4,766,581 | 8/1988 | Korn et al. | 369/30 |
| 4,772,782 * | 9/1988 | Nonat | 235/380 |
| 4,825,058 | 4/1989 | Poland | 235/472 |
| 4,850,009 | 7/1989 | Zook et al. | 379/96 |
| 4,868,375 | 9/1989 | Blandord | 235/462 |

OTHER PUBLICATIONS

Intermec 9511 Online Reader Manual, 1986 * month missing.
Insta Read Model 310/350 Bar Code Scanner Operator's Manual, Jun. 1985.
Insta Read Model 380 Bar Code Scanner Operator's Manual, Jul. 1984.
Welch Allyn HBD–E2 Bar Code Decoder Product Manual * month & year missing.
Welch Allyn HBD–E Bar Code Decoder Programming Menu * month & year missing.
Spectra–Physics Model 2001 hand held laser scanner brochure, 1983 * month missing.

* cited by examiner

Primary Examiner—Michael G. Lee

(57) ABSTRACT

A scanner for scanning bar code labels and for providing data related thereto to a host computer includes a scanning apparatus for optically scanning bar code labels and for providing an electrical signal in response thereto, and a decoding circuit, responsive to the scanning apparatus for translating the electrical signal into a digital signal. A microprocessor, responsive to the decoding circuit, controls operation of the scanner and translates the digital signal into data to be provided to the associated host computer under control of control characters. The scanner further includes a non-volatile random access control memory in which control characters are stored, and an interface, connected to the host computer and to the microprocessor, for transferring data from the microprocessor to the host computer and for transferring control characters from the host computer to non-volatile random access control memory via the microprocessor.

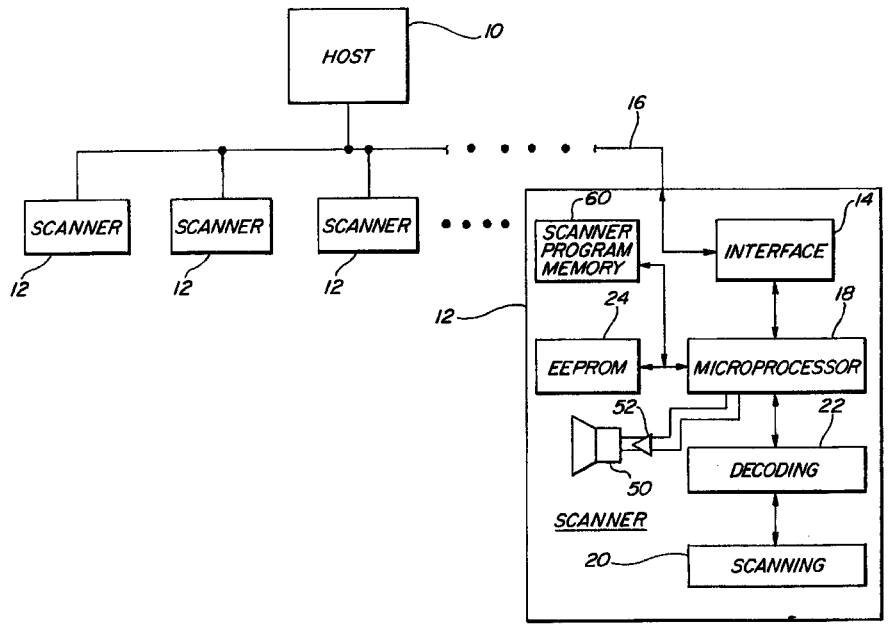

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–13 is confirmed.

Claims 1–8 and 14 are determined to be patentable as amended.

Claim 15, dependent on an amended claim, is determined to be patentable.

New claims 16–30 are added and determined to be patentable.

1. A *scanning system comprising*
*a host computer;*
*a portable terminal;*
*a plurality of scanners connectable to said host computer,* each scanner for scanning bar code labels and for providing data related thereto to [a] *said* host computer, *each scanner comprising:*
scanning means for optically scanning bar code labels and providing an electrical signal in response thereto,
decoding means, responsive to said scanning means for translating said electrical signal into a digital signal,
a microprocessor means, responsive to said decoding means, for controlling operation of said scanner and for translating said digital signal into data to be provided to the associated host computer under control of control characters,
a non-volatile random access control memory in which control characters are stored, and
interface means, connected to said host computer and to said microprocessor means, for transferring data from said microprocessor means to said host computer and for transferring control characters from said host computer to non-volatile random access control memory via said microprocessor means, *and for transferring control characters from said portable terminal to said non-volatile random access control memory,*
*wherein said portable terminal unit being connectable and disconnectable from a selected one of said scanners and having a microprocessor and a non-volatile random access memory for storing said control characters for transfer to said scanner.*

2. The [scanner] *system* of claim 1 in which said non-volatile random access control memory comprises an electrically erasable programmable read only memory.

3. The [scanner] *system* of claim 1 in which said interface means comprises an optically isolated interface.

4. The [scanner] *system* of claim 2 in which said non-volatile random access control memory comprises an EEPROM memory device.

5. [The] *A* scanner [of claim 1] *for scanning bar code labels and for providing data related thereto to a host computer, comprising:*
scanning means for optically scanning bar code labels and providing an electrical signal in response thereto,
decoding means, responsive to said scanning means for translating said electrical signal into a digital signal,
a microprocessor means, responsive to said decoding means, for controlling operation of said scanner and for translating said digital signal into data to be provided to the associated host computer under control of control characters,
a non-volatile random access control memory in which control characters are stored, and
interface means, connected to said host computer and to said microprocessor means, for transferring data from said mircorprocessor means to said host computer and for transferring control characters from said host computer to non-volatile random access control memory via said microprocessor means,
in which said control characters are character sets which when read by the scanner indicate that two bar code labels are associated with the same item.

6. The [scanner] *system* of claim 1 further comprising an audible signal generator and in which said central characters define the volume of the audible signal produced by said audible signal generator.

7. The [scanner] *system* of claim 1 further comprising an audible signal generator and in which said control characters define the frequency of the audible signal produced by said audible signal generator.

8. The [scanner] *system* of claim 1 in which said control characters define the rate of transfer of data and control characters between said host computer and said interface means.

14. A method of programming a bar code scanner of the type which optically scans bar code labels, said scanner including a non-volatile control memory in which a plurality of sets of control characters are stored, said sets of control characters defining characters which, if detected on a pair of successively scanned labels, indicate that the labels are affixed to the same product and further indicate which is the first and which is the second of the label pair, comprising the steps of:
(a) connecting a data source to said scanner;
(b) *transmitting label data to said data source from said scanner;*
(c) transmitting a plurality of sets of control characters to said scanner from said data source; and
([c] *d*) storing said plurality of sets of control characters in said non-volatile control memory.

*16. The system of claim 1 wherein said interface means comprises a single port over which both the control characters are transferred from the host computer to the scanner and the data is transferred from the microprocessor means to the host computer.*

*17. The system of claim 1 wherein the host computer is located in a cash register.*

*18. The system of claim 1 wherein each scanner is one of a plurality of scanners associated with the host computer.*

*19. The scanner of claim 5 wherein the character sets indicate which is the first and which is the second of the two bar code labels.*

*20. The scanner of claim 9 wherein said interface means comprises a single port over which both the control characters are transferred from the host computer to the scanner and the data is transferred from the microprocessor means to the host computer.*

*21. The scanner of claim 9 wherein the host computer is located in a cash register associated with the scanner, the host computer being connected only to a single scanner.*

22. The scanner of claim 9 wherein the scanner is one of a plurality of scanners associated with the host computer.

23. The method of claim 14 whereint he data source is located in a cash register associated with the scanner, the data source being connected only to a single scanner.

24. The method of claim 14 wherein the data source comprises a host computer.

25. The method of claim 24 further comprising the steps of connecting a plurality of scanners to the host computer;

selectively programming one or more of the scanners from the host computer.

26. The method of claim 14 further comprising the step of transmitting the control characters from the data source to the scanner and transmitting the data from the scanner to the data source via a common port.

27. The method of claim 14 wherein the step of connecting a data source to said scanner comprises connecting through an optically isolated interface.

28. A method of programming a bar code scanner of the type which optically scans bar code labels comprising the steps of providing said scanner with a non-volatile control memory in which a plurality of sets of control characters are stored;

defining said sets of control characters to define characters which, if detected on a pair of successively scanned labels, indicate that the labels are affixed to the same product and further indicate which is the first and which is the second of the label pair;

connecting a data source to said scanner;

transmitting a plurality of sets of control characters to said scanner from said data source; and storing said plurality of sets of control characters in said non-volatile control memory.

29. The method of claim 28 further comprising transmitting label data to said data source from said scanner.

30. The method of claim 28 wherein the step of connecting a data source to said scanner comprises connecting through an optically isolated interface.

* * * * *